(12) United States Patent
Wallace

(10) Patent No.: US 10,562,680 B2
(45) Date of Patent: Feb. 18, 2020

(54) FORMED THERMOPLASTIC ARTICLE HAVING A SMOOTHLY-CURVED DISTAL PERIPHERY

(71) Applicant: Converter Manufacturing, LLC, Orwigsburg, PA (US)

(72) Inventor: Millard F Wallace, Orwigsburg, PA (US)

(73) Assignee: Converter Manufacturing, LLC, Orwigsburg, PA (US)

( * ) Notice: Subject to any disclaimer, the term of this patent is extended or adjusted under 35 U.S.C. 154(b) by 0 days.

(21) Appl. No.: 16/212,846

(22) Filed: Dec. 7, 2018

(65) Prior Publication Data

US 2019/0168925 A1    Jun. 6, 2019

Related U.S. Application Data

(63) Continuation-in-part of application No. 15/674,787, filed on Aug. 11, 2017, now Pat. No. 10,189,624, (Continued)

(51) Int. Cl.
*B65D 43/02* (2006.01)
*B29C 57/12* (2006.01)
(Continued)

(52) U.S. Cl.
CPC .......... *B65D 43/0204* (2013.01); *B29C 57/12* (2013.01); *B29C 51/306* (2013.01); (Continued)

(58) Field of Classification Search
CPC ............ B65D 21/0233; B65D 43/0202; B65D 45/322; B29C 51/082; B29C 51/20; B29C 51/306; B29K 2105/256; B29K 2101/12
See application file for complete search history.

(56) References Cited

U.S. PATENT DOCUMENTS

| 2,891,280 A | 6/1959 | Politis |
| 2,960,134 A | 11/1960 | Fornas |

(Continued)

FOREIGN PATENT DOCUMENTS

| FR | 2424805 | 11/1979 |
| GB | 1388710 | 3/1975 |

(Continued)

OTHER PUBLICATIONS

Search Report for European Patent Office application 16 842 900.9 of Wallace. dated Jul. 3, 2019.
(Continued)

*Primary Examiner* — Andrew T Kirsch
(74) *Attorney, Agent, or Firm* — Converter Manufacturing, LLC; Gary D. Colby

(57) ABSTRACT

The disclosure relates to forming shaped thermoplastic articles having smooth peripheries. Many thermoplastic articles have sharp edges formed upon molding or cutting the article from a feedstock sheet. Such sharp edges can damage thin plastic films or flesh which they contact, and smoothing the edges is desirable. Described herein are methods of forming a smooth periphery for such sharp-edged articles by rolling over the sharp edge. The smoothing operation is performed by forming a deflectable flange including a bend region separated from the potentially sharp peripheral edge by a spacer, deflecting a portion of the deflectable flange, and softening at least one bent portion of the deflectable flange to yield a smooth periphery upon cooling. A liner sheet may be attached to the feedstock sheet prior to, during, or after forming and can be peelable therefrom.

25 Claims, 51 Drawing Sheets

Related U.S. Application Data which is a continuation-in-part of application No. 15/445,220, filed on Feb. 28, 2017, which is a continuation-in-part of application No. PCT/US2016/049692, filed on Aug. 31, 2016.

(60) Provisional application No. 62/212,367, filed on Aug. 31, 2015.

(51) Int. Cl.
- *B29C 51/30* (2006.01)
- *B29L 31/00* (2006.01)
- *B29L 31/56* (2006.01)
- *B29K 23/00* (2006.01)

(52) U.S. Cl.
CPC ............... *B29K 2023/086* (2013.01); *B29K 2995/0067* (2013.01); *B29L 2031/565* (2013.01); *B29L 2031/712* (2013.01)

(56) References Cited

U.S. PATENT DOCUMENTS

| | | |
|---|---|---|
| 3,096,546 A | 7/1963 | Edwards |
| 3,192,565 A | 7/1965 | Rukavina |
| 3,291,361 A * | 12/1966 | Commeyras ............ B29C 57/12 220/659 |
| 3,355,536 A | 11/1967 | Midgley |
| 3,357,053 A | 12/1967 | Lyon |
| 3,423,231 A | 1/1969 | Lutzmann |
| 3,466,214 A | 9/1969 | Polk |
| 3,497,917 A | 3/1970 | Negoro |
| 3,522,877 A | 8/1970 | Phillips |
| 3,568,254 A | 3/1971 | Stolki |
| 3,580,413 A | 5/1971 | Quackenbush |
| 3,695,806 A | 10/1972 | Arfert |
| 3,767,507 A | 10/1973 | Stahlecker |
| 3,834,606 A | 9/1974 | Andersson |
| 3,947,205 A | 3/1976 | Edwards |
| 4,182,462 A | 1/1980 | Buff |
| 4,281,979 A | 8/1981 | Doherty |
| 4,349,124 A | 9/1982 | Faller |
| 4,349,146 A | 9/1982 | Holden |
| 4,358,492 A | 11/1982 | Perkins |
| 4,419,320 A | 12/1983 | Perkins |
| 4,533,585 A | 8/1985 | Holden |
| 4,621,513 A | 11/1986 | Bradford |
| 4,889,231 A | 12/1989 | Foote |
| 5,098,751 A | 3/1992 | Tamura |
| 5,118,277 A | 6/1992 | Padovani |
| 5,375,701 A | 12/1994 | Hustad |
| 5,758,773 A | 6/1998 | Clements |
| 5,919,496 A | 7/1999 | Padovani |
| 5,972,447 A | 10/1999 | Hata |
| 5,976,682 A | 11/1999 | Eichbauer |
| 6,234,386 B1 | 5/2001 | Drummond |
| 6,482,452 B1 | 11/2002 | Weller |
| 6,598,740 B1 | 7/2003 | Wiegers |
| 6,737,003 B1 | 5/2004 | Golden |
| 6,983,575 B2 | 1/2006 | Longo |
| 7,395,923 B2 | 7/2008 | Chou |
| 7,921,992 B2 | 4/2011 | LaRue |
| 8,474,610 B1 | 7/2013 | Knight |
| 8,920,892 B2 | 12/2014 | Hernandez |
| 9,302,842 B2 | 4/2016 | Wallace |
| 9,908,281 B1 | 3/2018 | Wallace |
| 10,076,865 B2 | 9/2018 | Wallace |
| 10,118,332 B2 | 11/2018 | Wallace |
| 10,189,624 B2 | 1/2019 | Wallace |
| 2002/0007902 A1 | 1/2002 | Nance |
| 2002/0119334 A1 | 8/2002 | Shepard |
| 2002/0127295 A1 | 9/2002 | Padovani |
| 2003/0041955 A1 | 3/2003 | Spengler |
| 2004/0043165 A1 | 3/2004 | Van Hulle |
| 2004/0144482 A1 | 7/2004 | Cherpinsky |
| 2006/0172095 A1 | 8/2006 | Elsaesser |
| 2009/0291174 A1* | 11/2009 | Lewis ............... B32B 27/32 426/399 |
| 2011/0266168 A1 | 11/2011 | Longo |
| 2012/0085069 A1 | 4/2012 | Mader |
| 2012/0119404 A1 | 5/2012 | Wallace |
| 2012/0291712 A1 | 11/2012 | Wallace |
| 2013/0064998 A1 | 3/2013 | Wnek |
| 2013/0113137 A1 | 5/2013 | Bissoli |
| 2013/0142975 A1 | 6/2013 | Wallace |
| 2014/0054292 A1 | 2/2014 | Wallace |
| 2015/0001127 A1 | 1/2015 | Nelson |
| 2017/0001786 A1 | 1/2017 | Wallace |

FOREIGN PATENT DOCUMENTS

| | | |
|---|---|---|
| WO | 96/01179 A1 | 1/1996 |
| WO | 2012064203 A1 | 5/2012 |
| WO | 2017053937 A1 | 3/2017 |

OTHER PUBLICATIONS

Office Action for Canada patent application 2996864. dated Jun. 19, 2019.

* cited by examiner

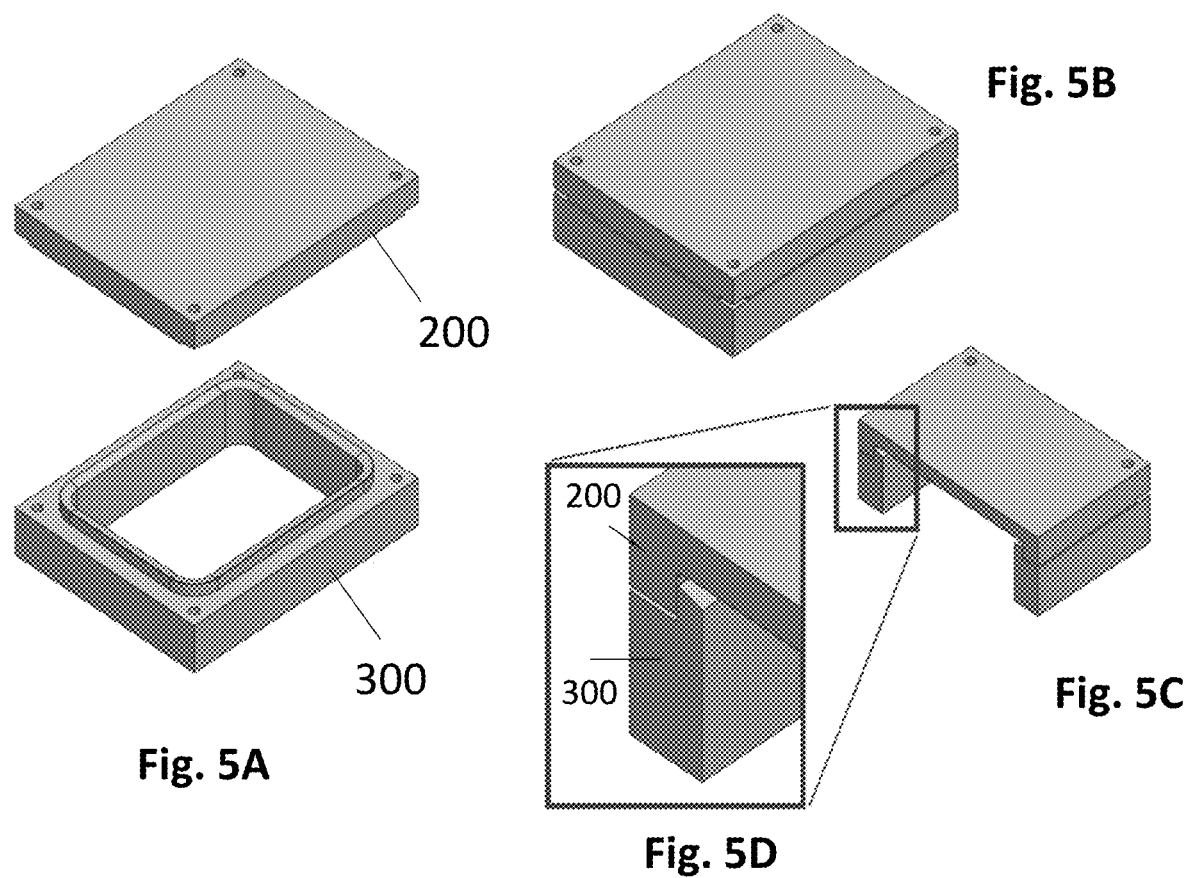

Fig. 6A
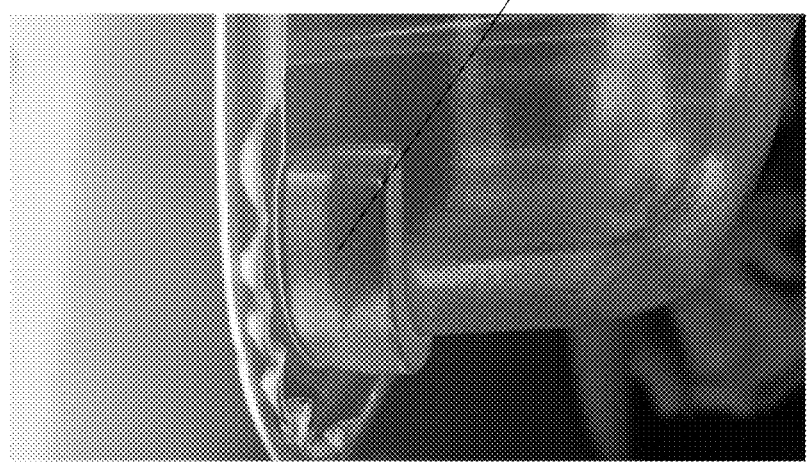
181
Fig. 6B
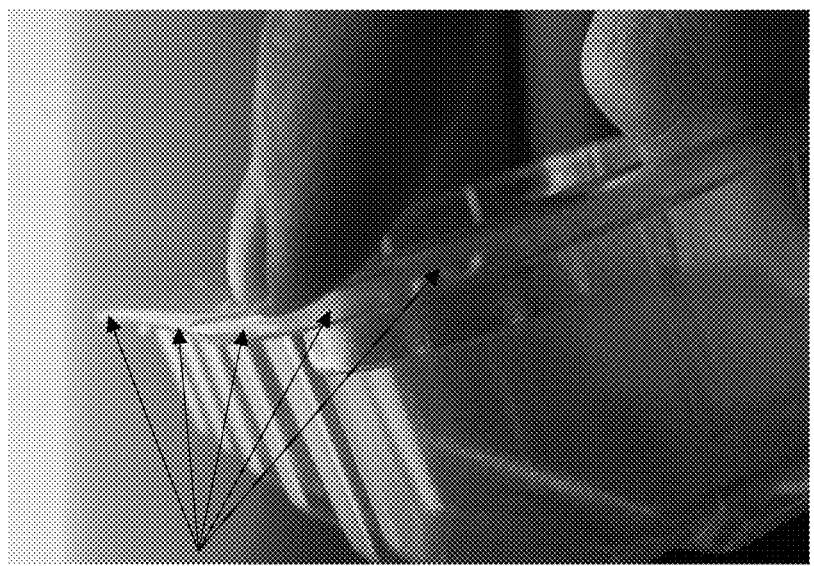
191    Fig. 6C

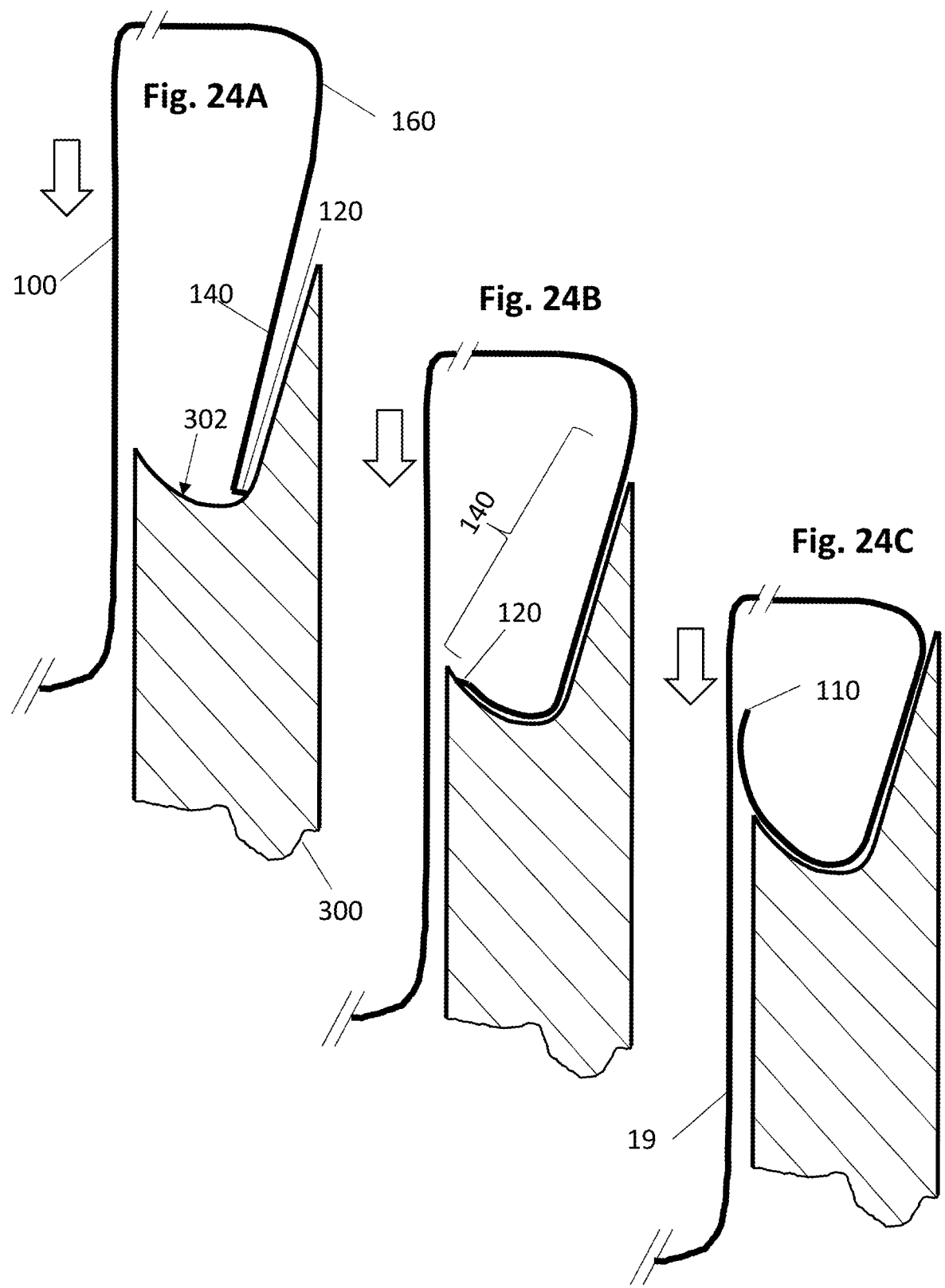

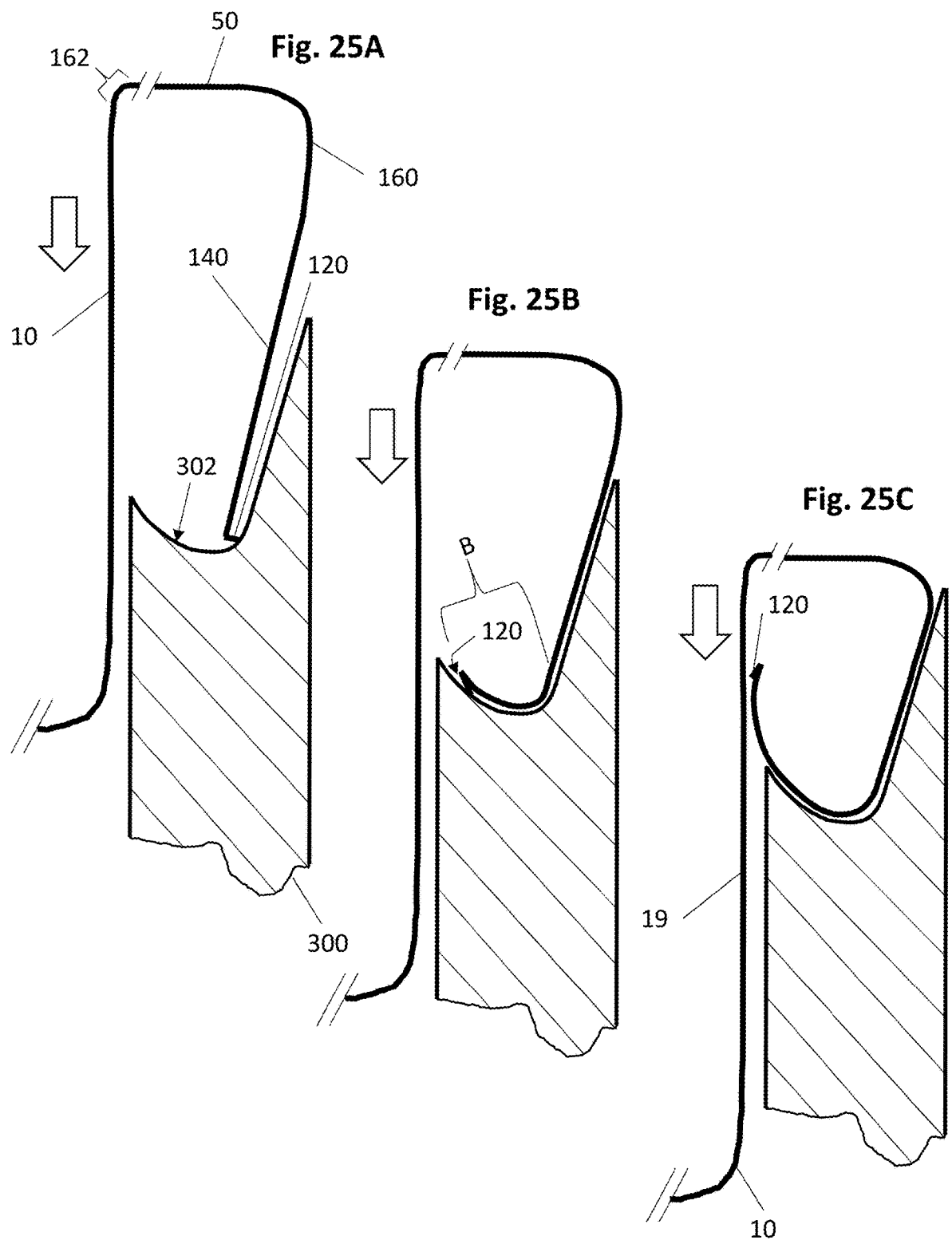

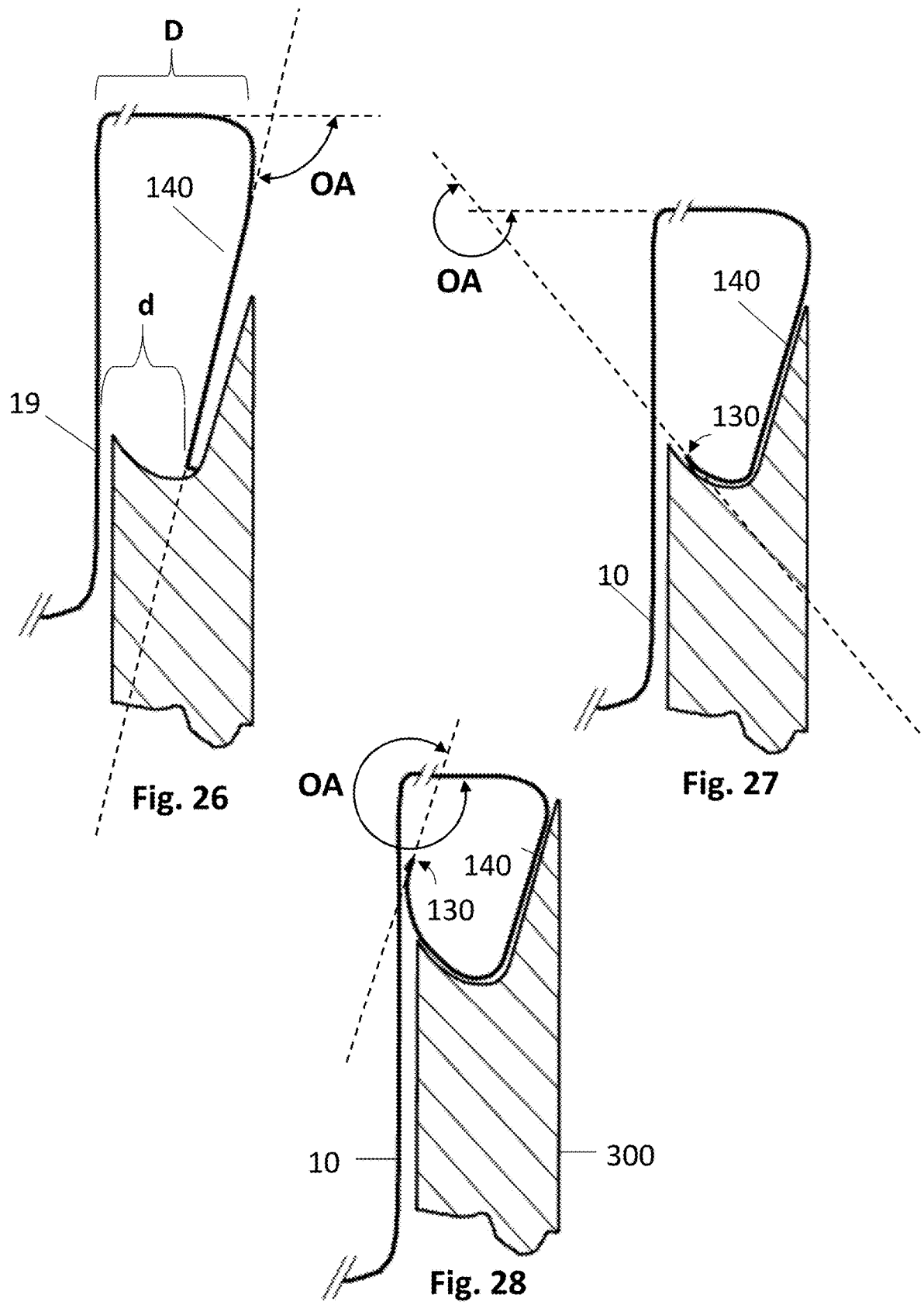

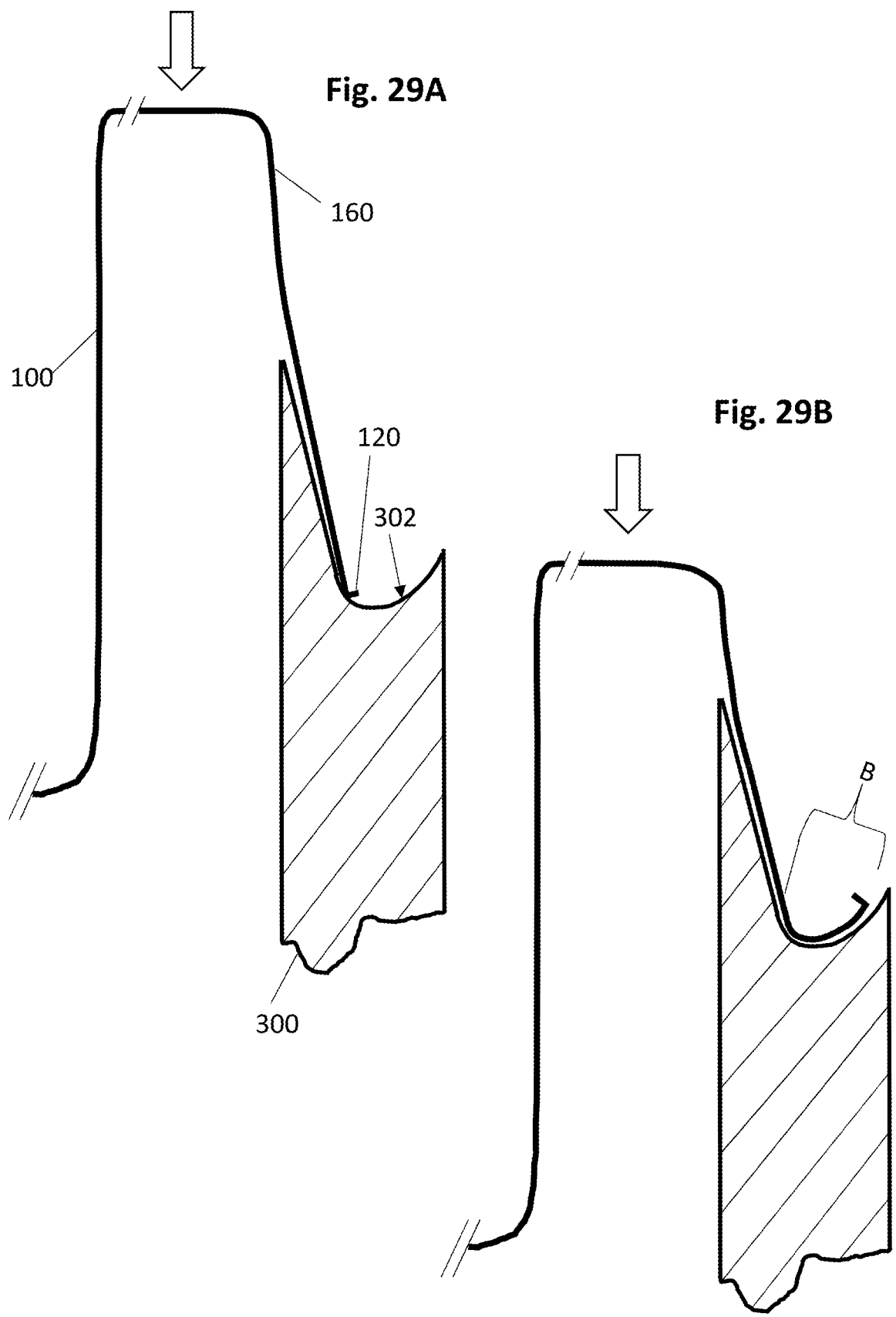

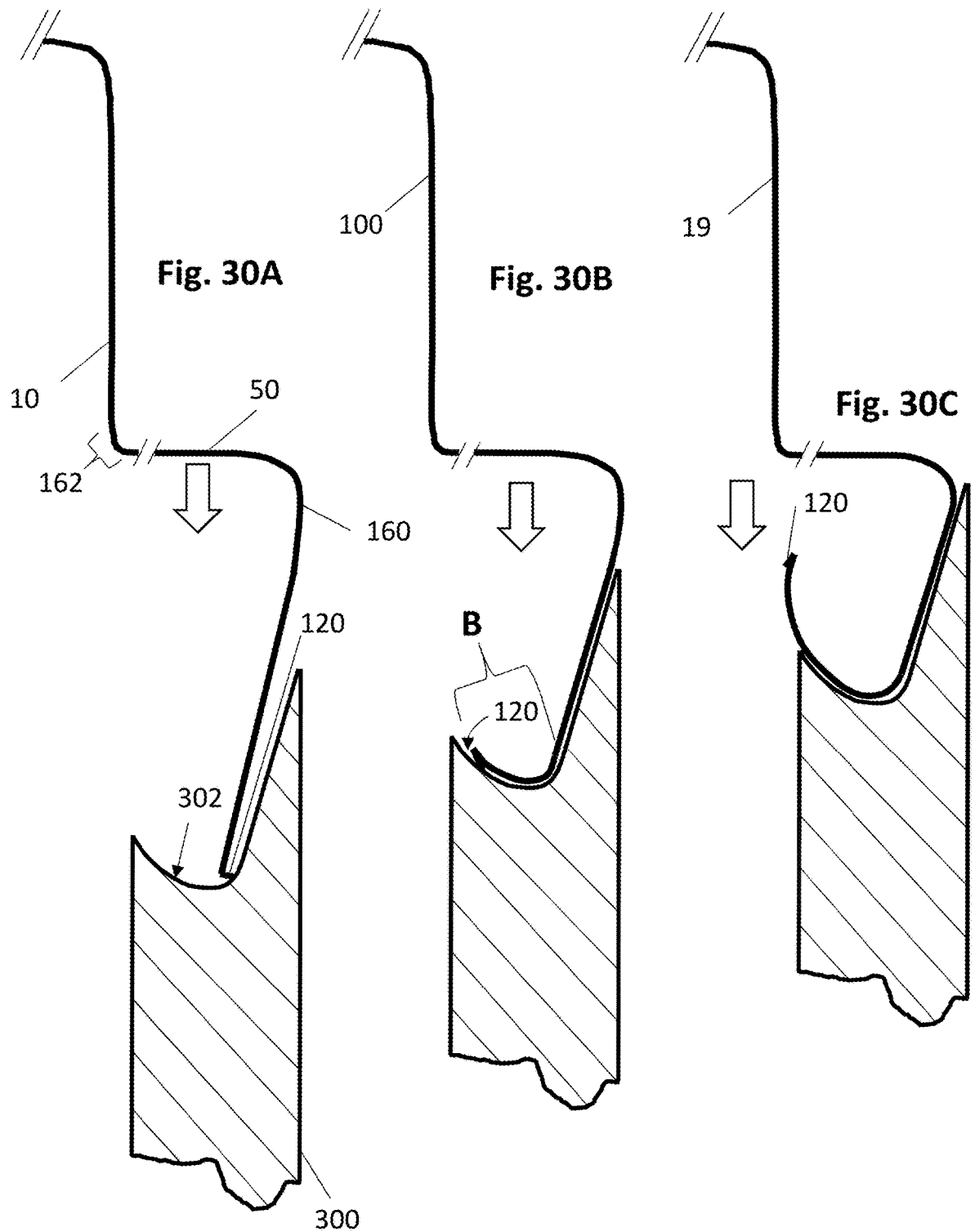

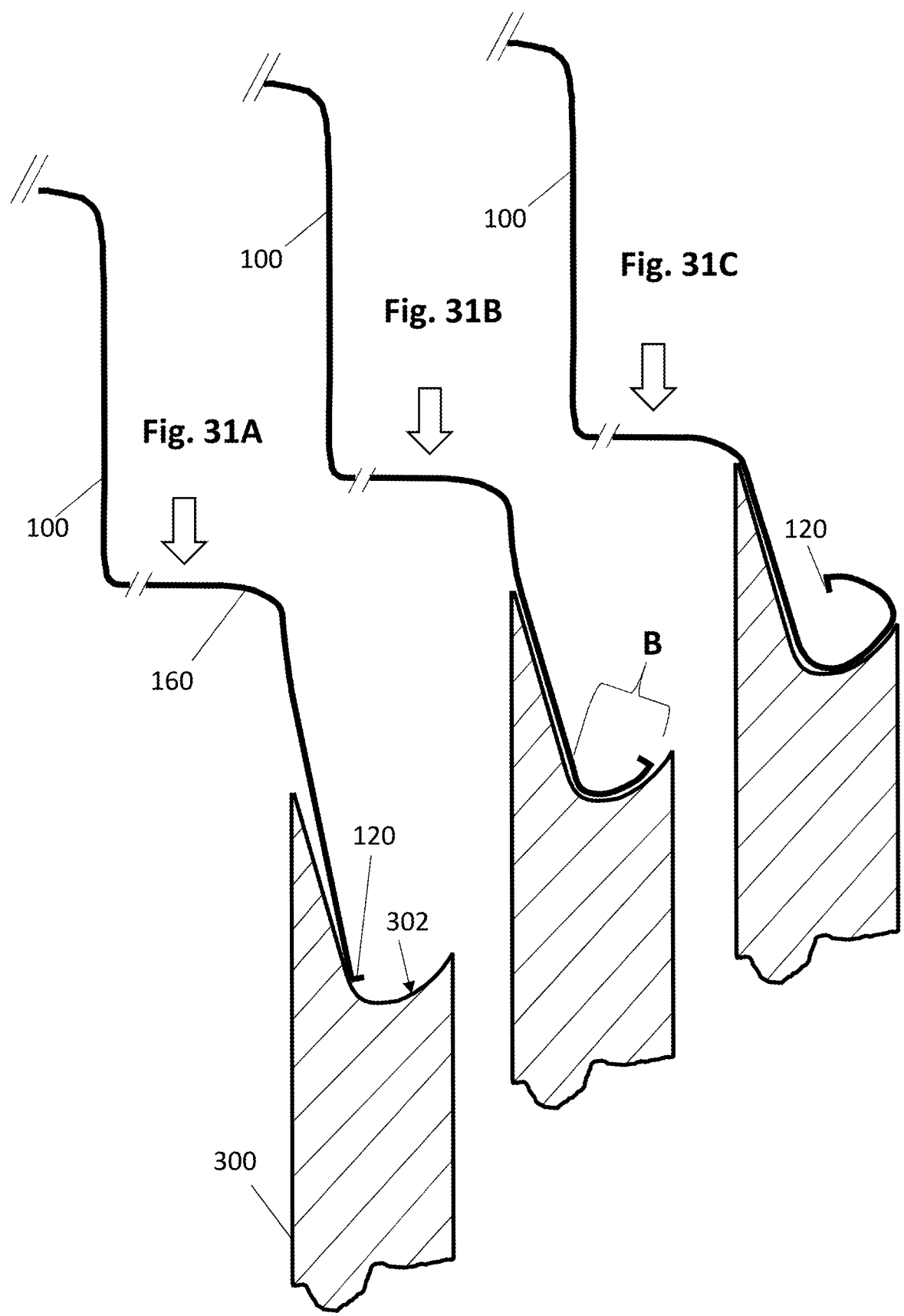

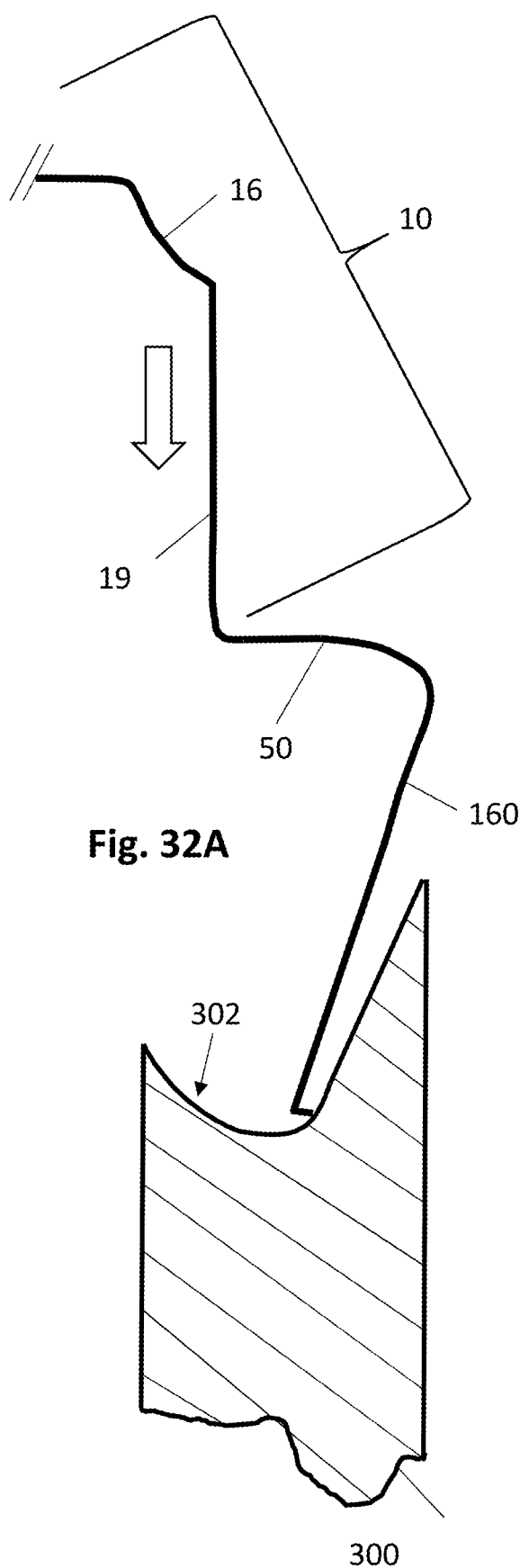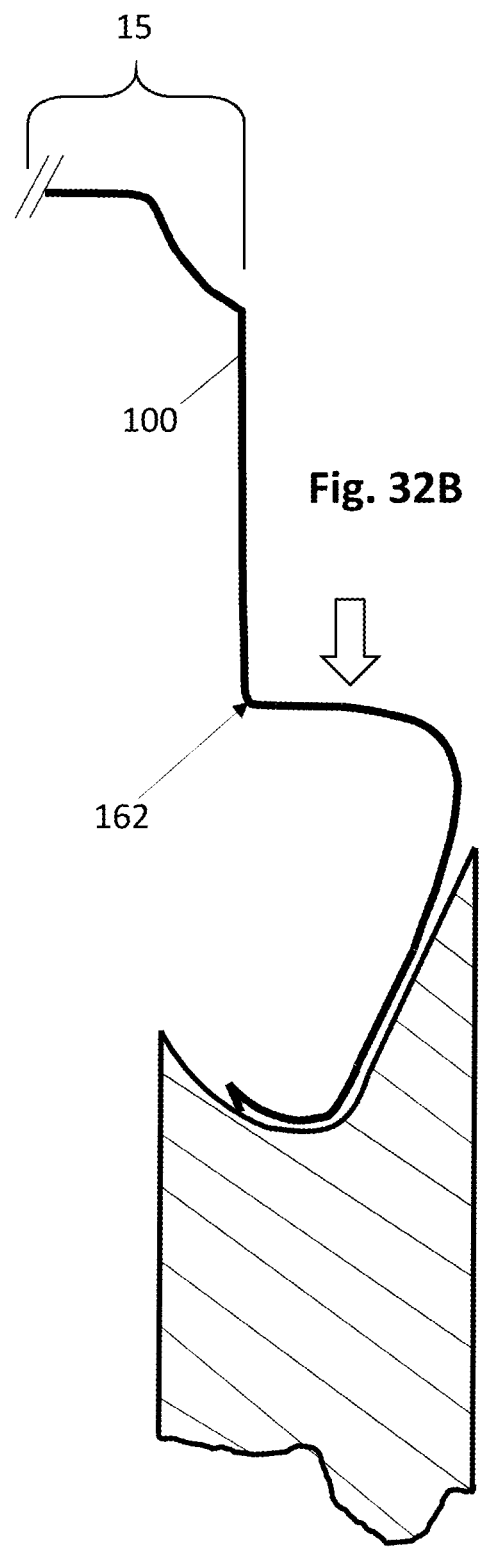

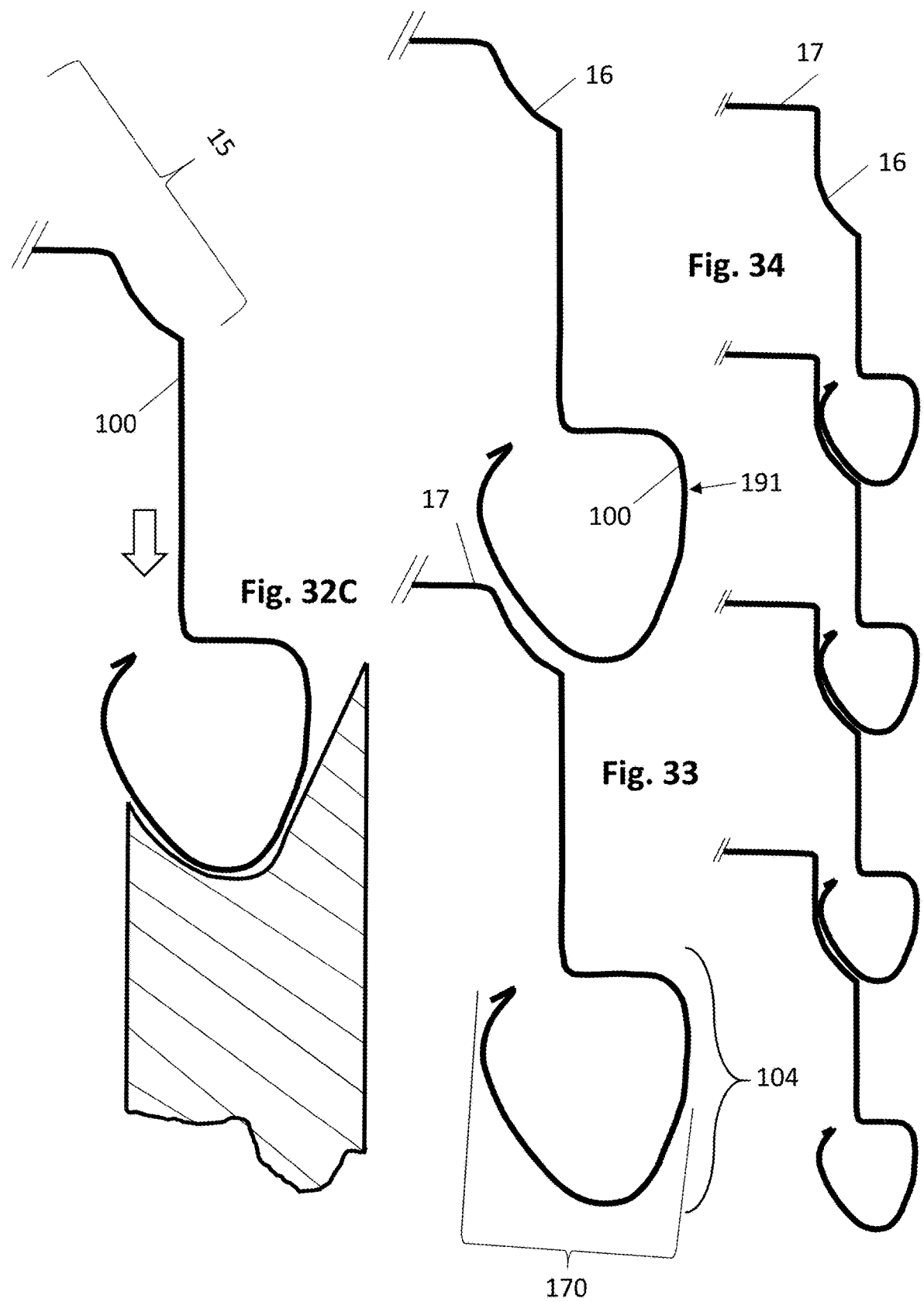

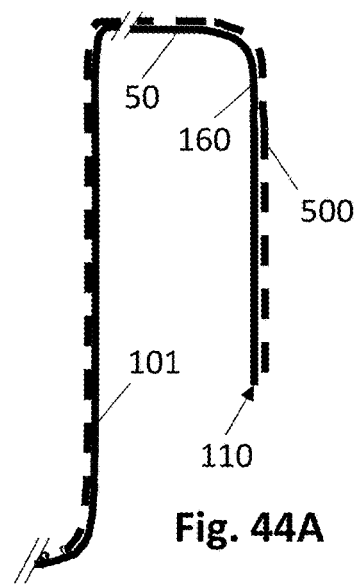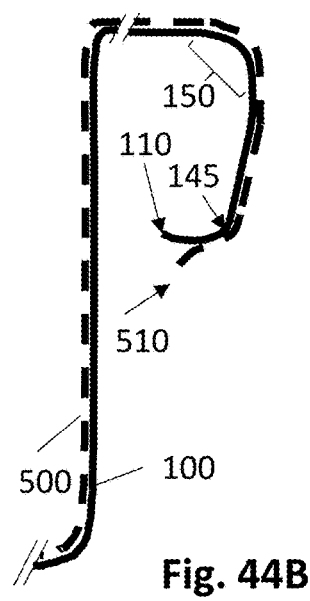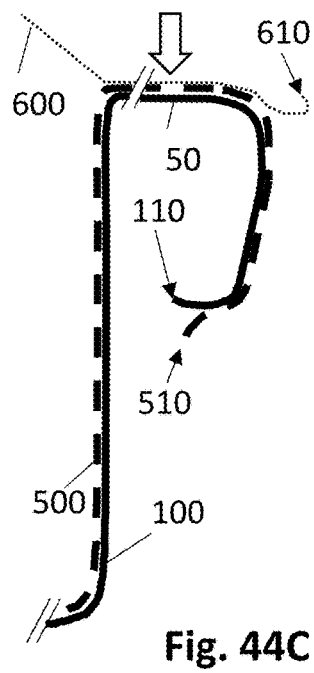
Fig. 44A     Fig. 44B     Fig. 44C
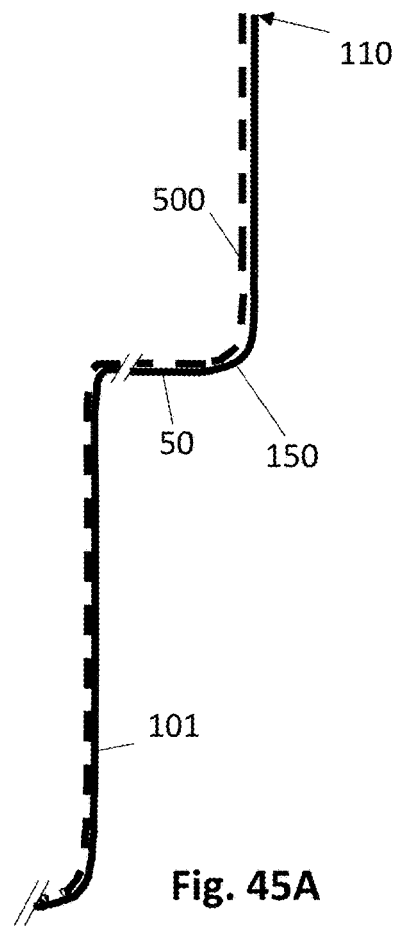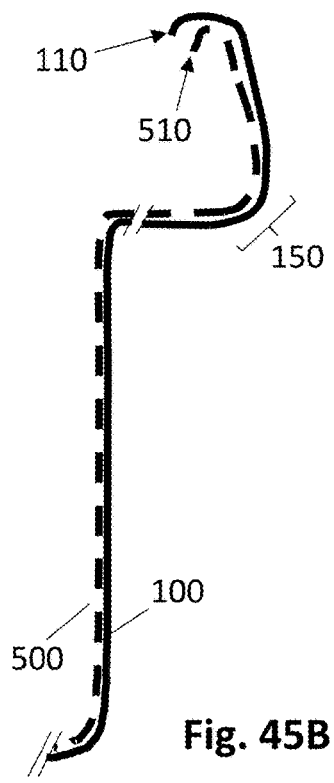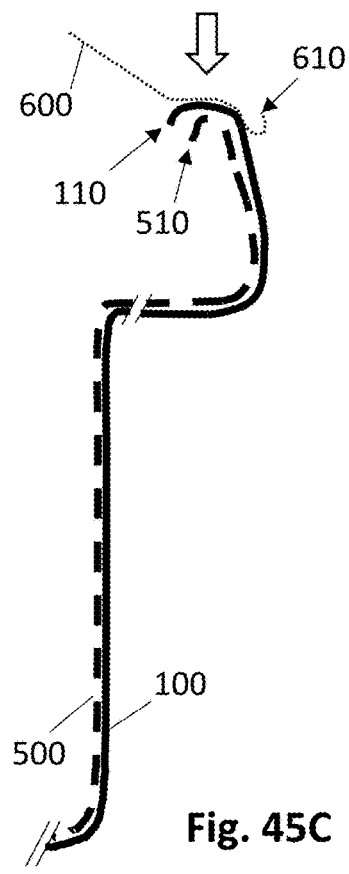
Fig. 45A     Fig. 45B     Fig. 45C

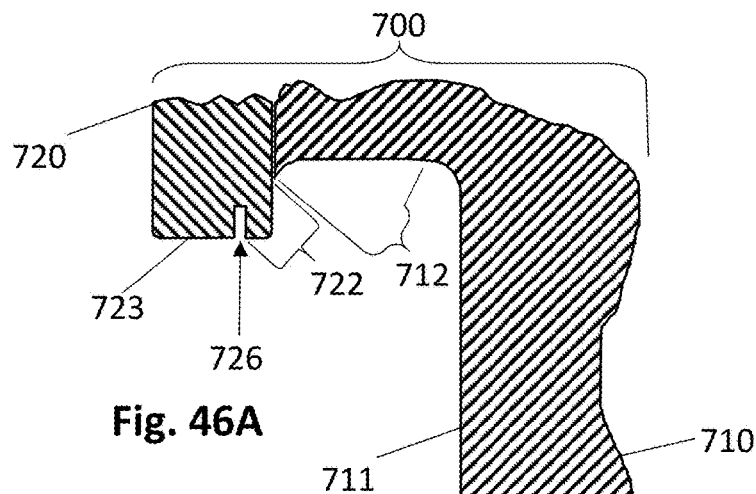
Fig. 46A
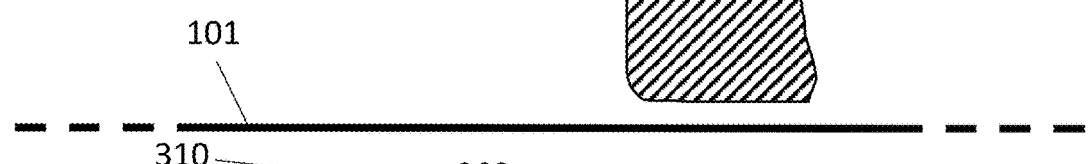
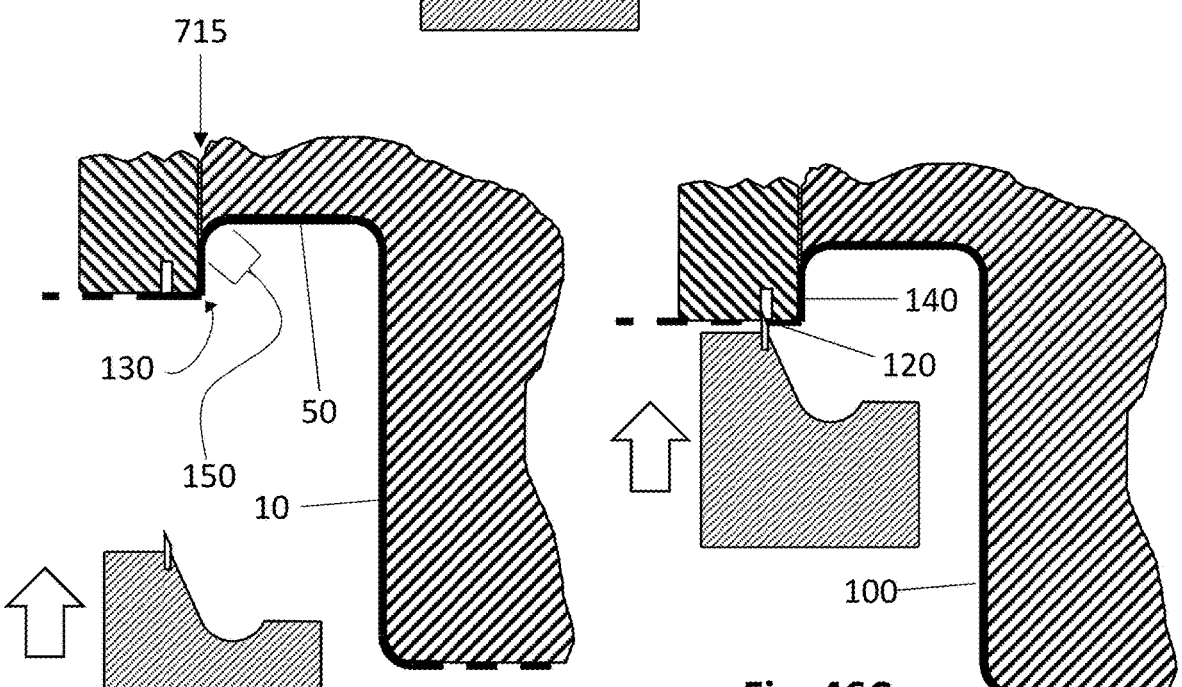
Fig. 46B
Fig. 46C

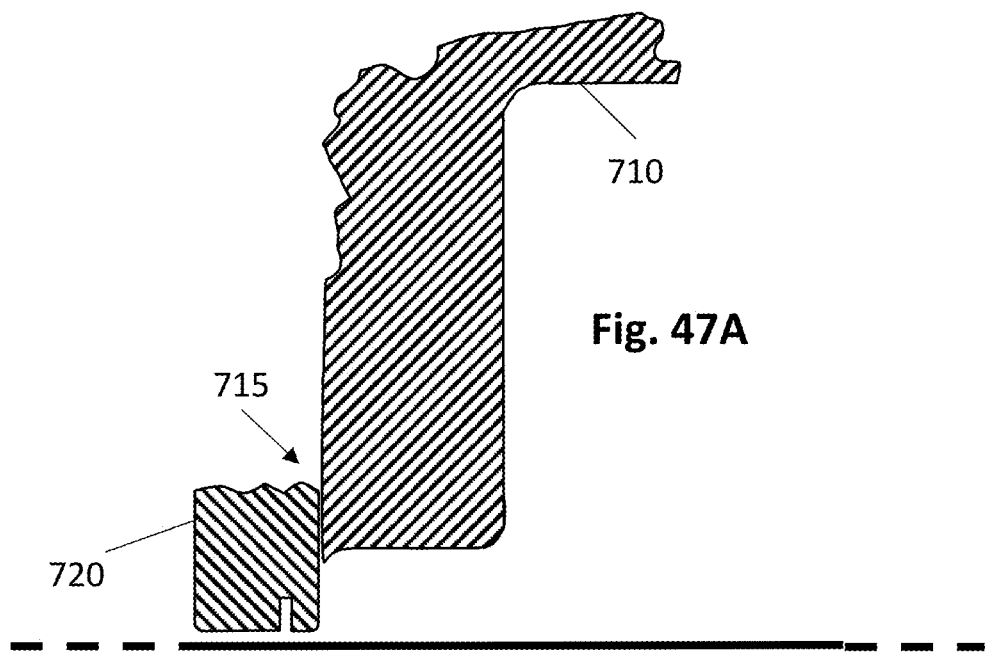
Fig. 47A
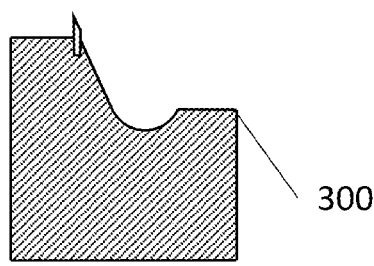
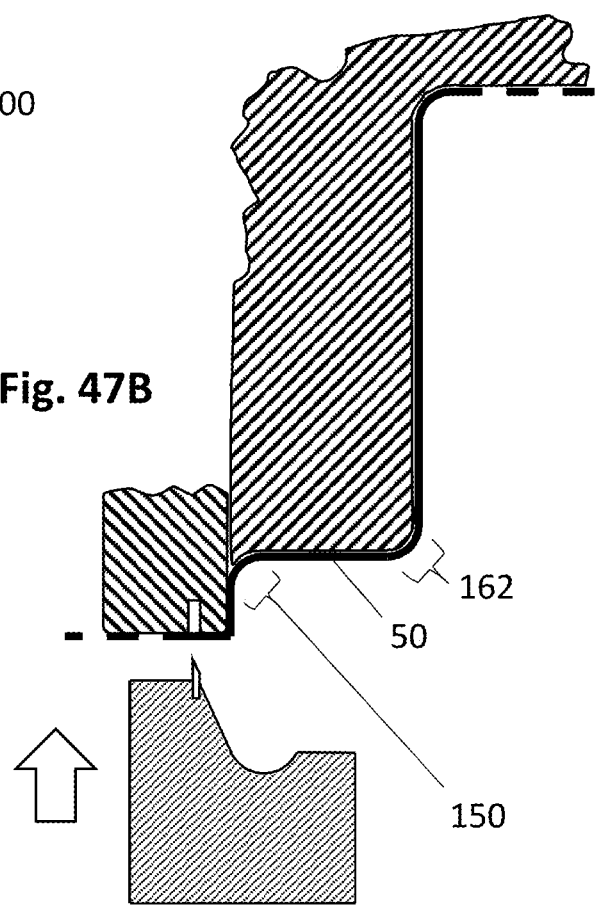
Fig. 47B

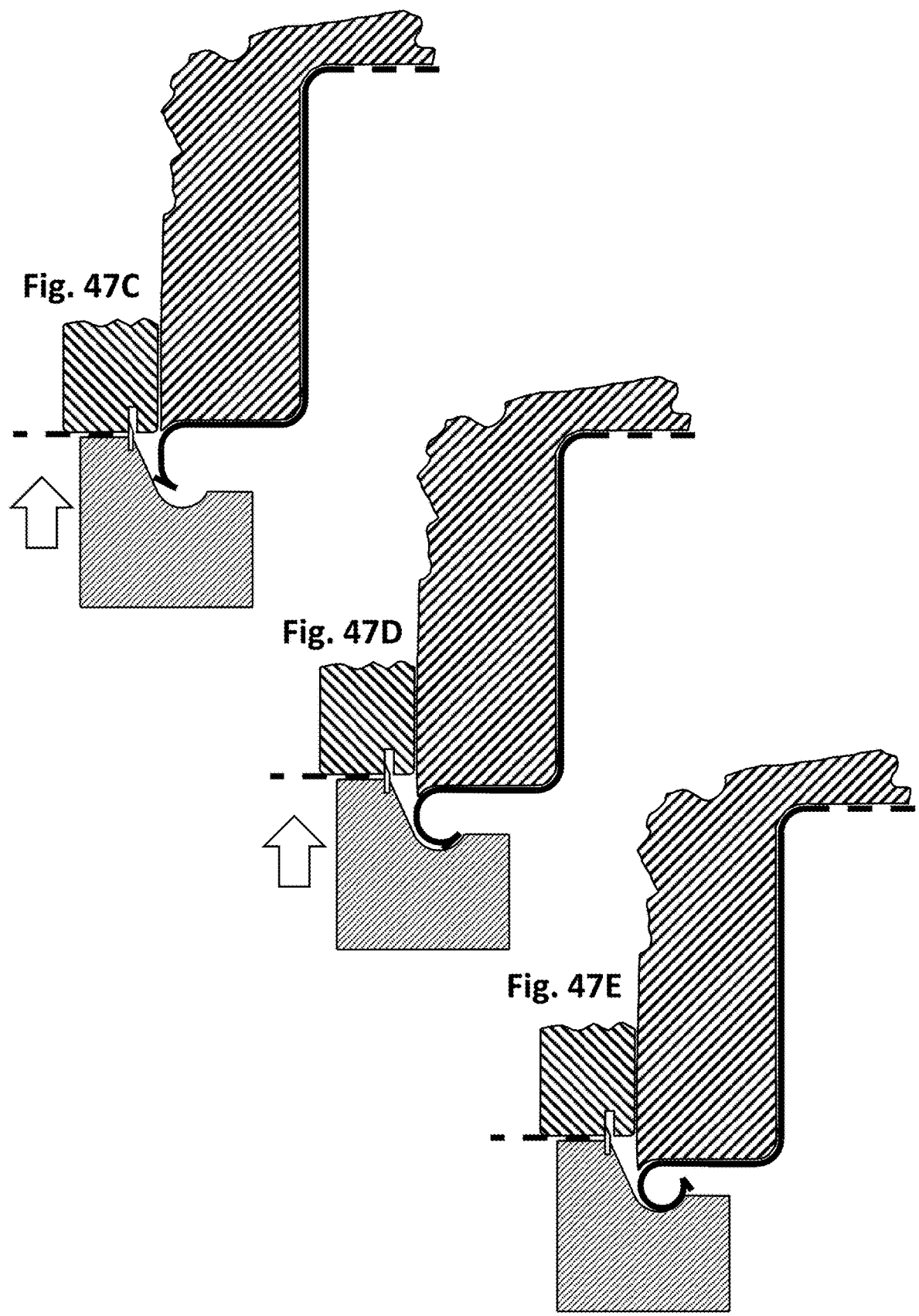

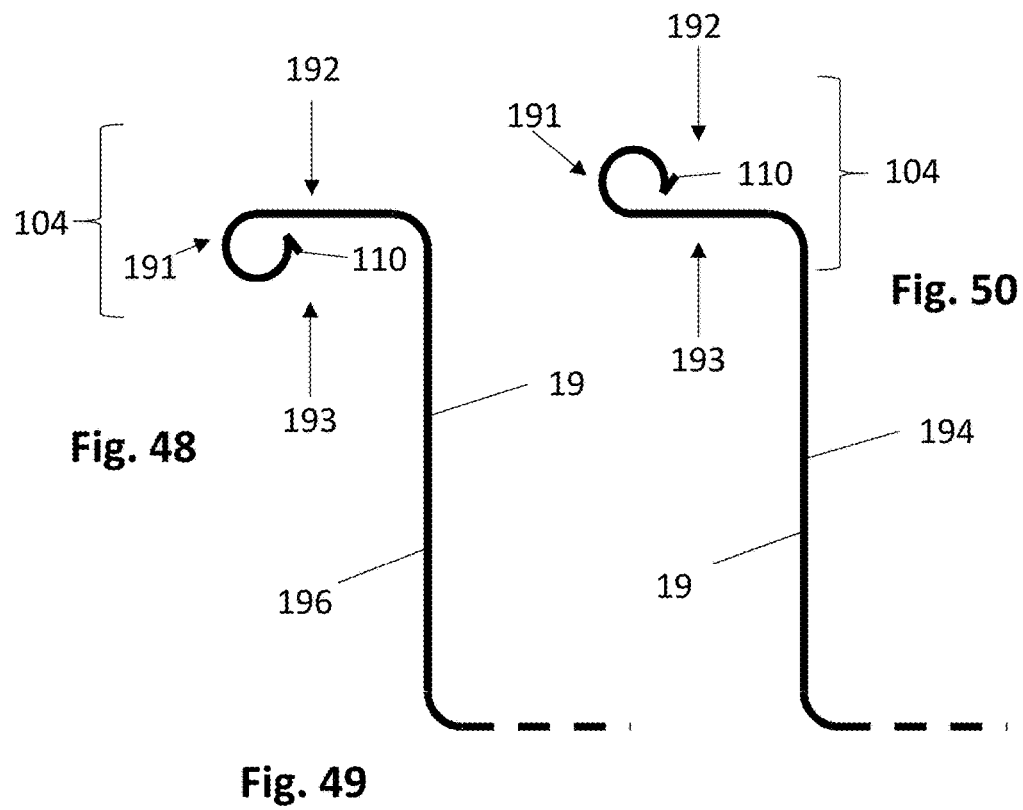
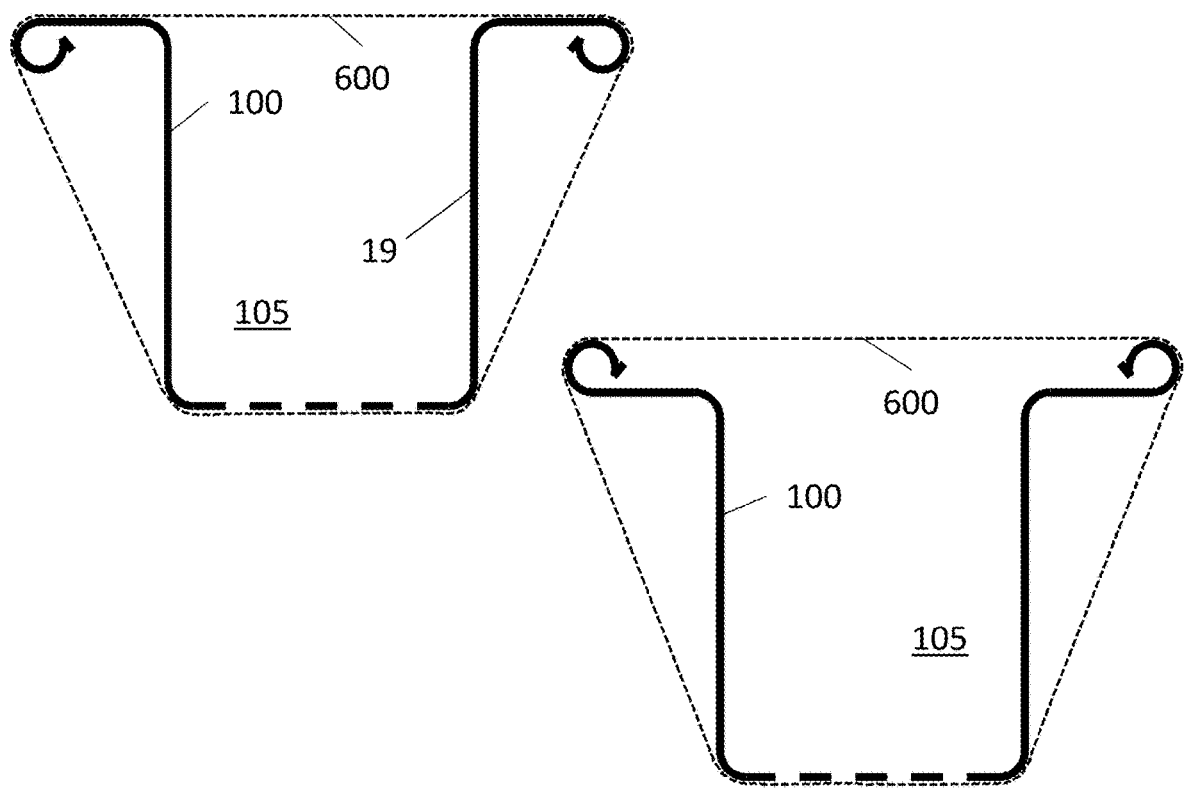

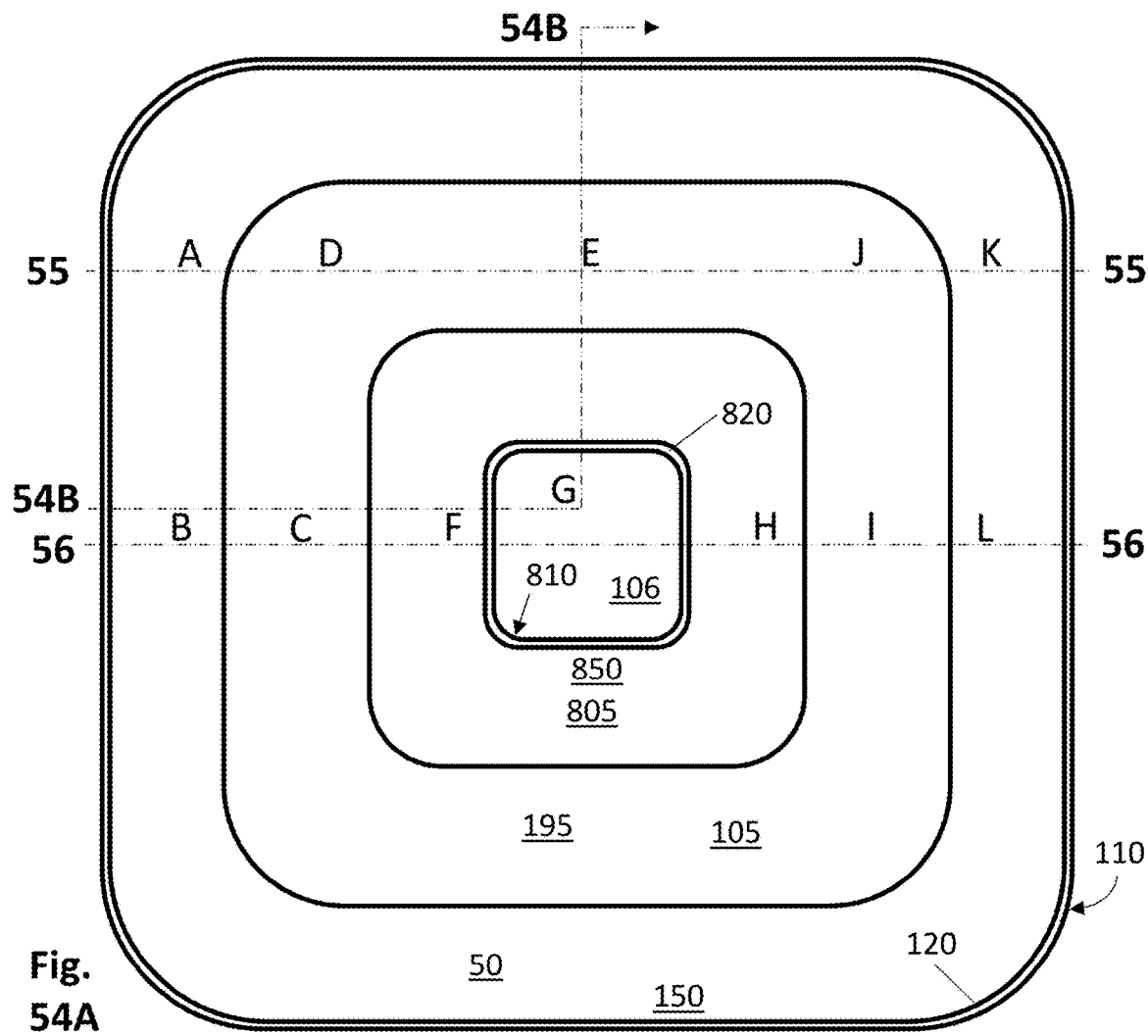
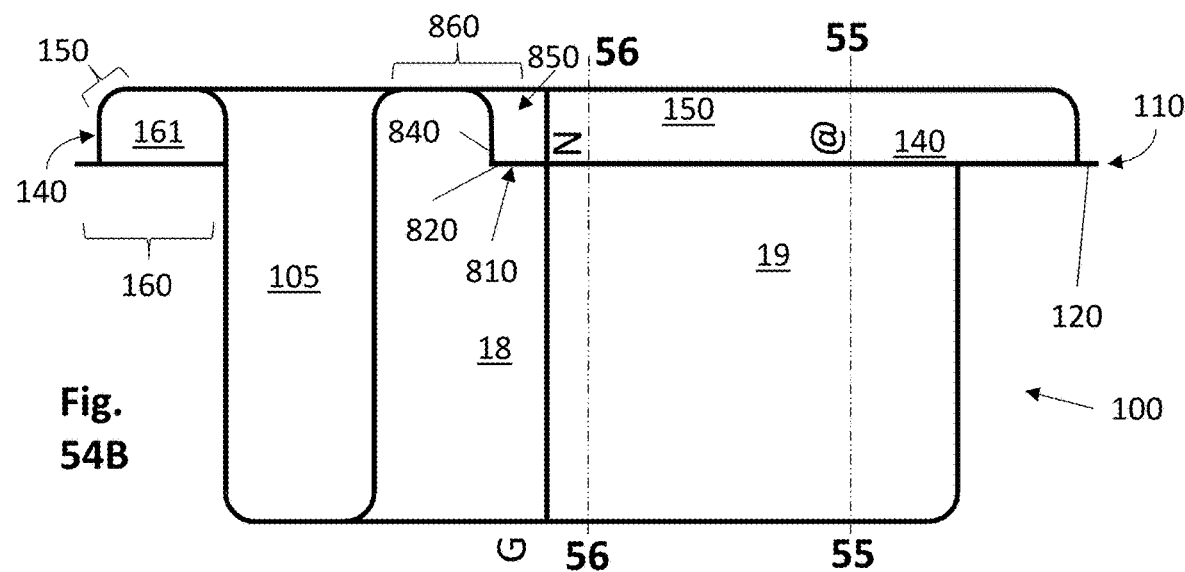
Fig. 54A
Fig. 54B

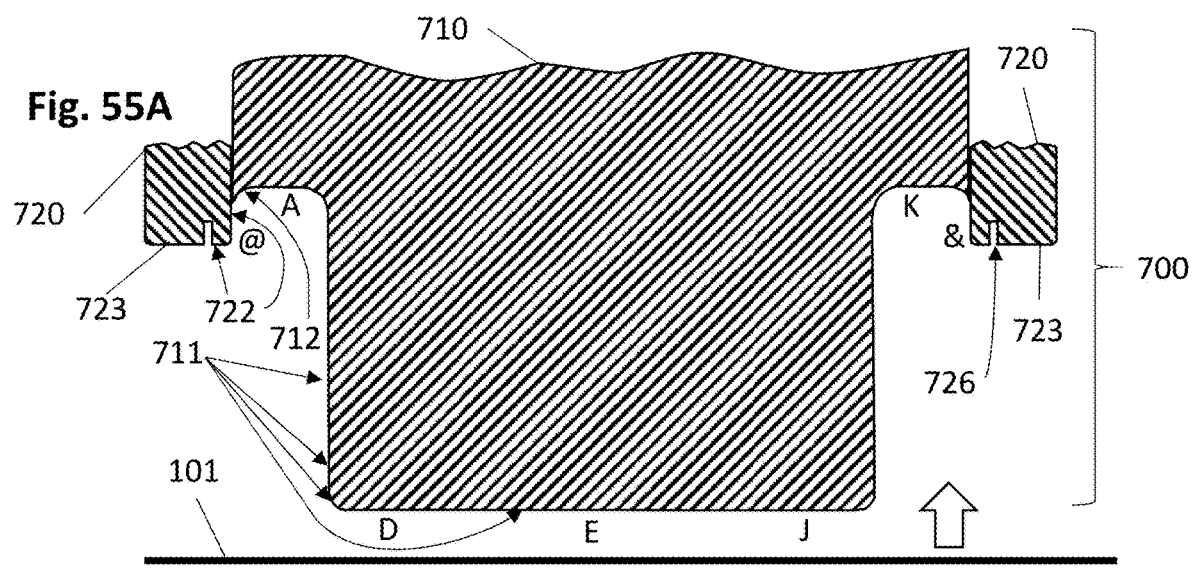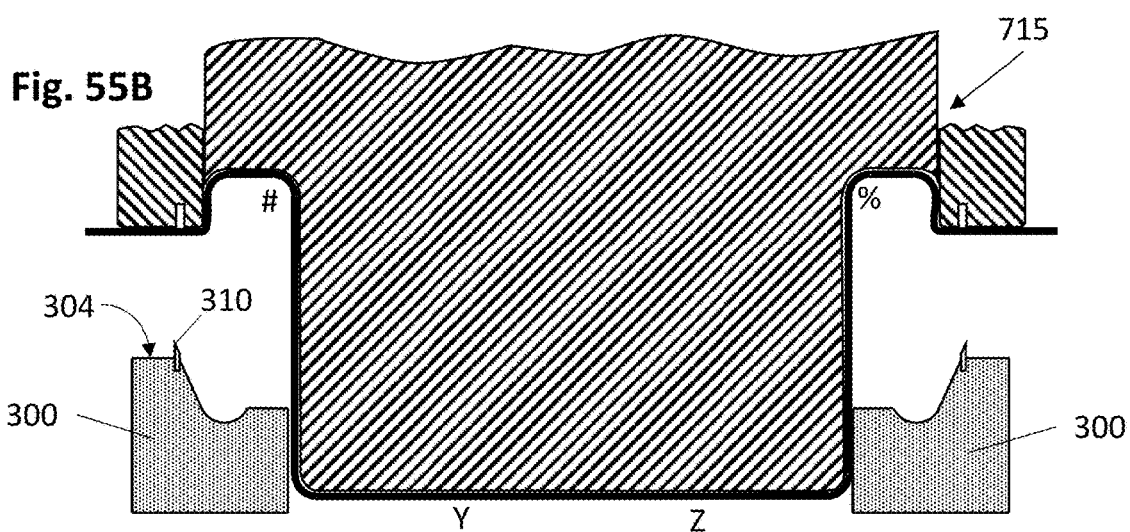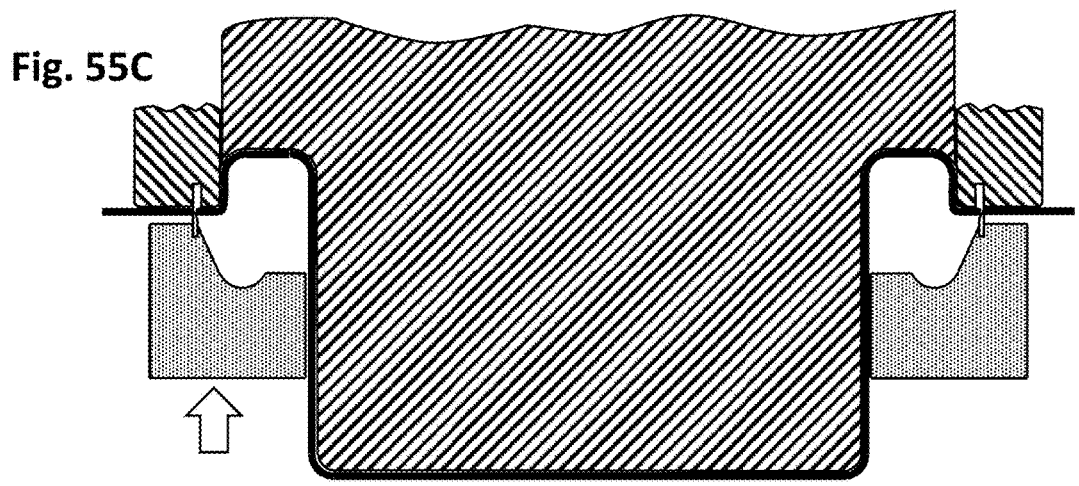

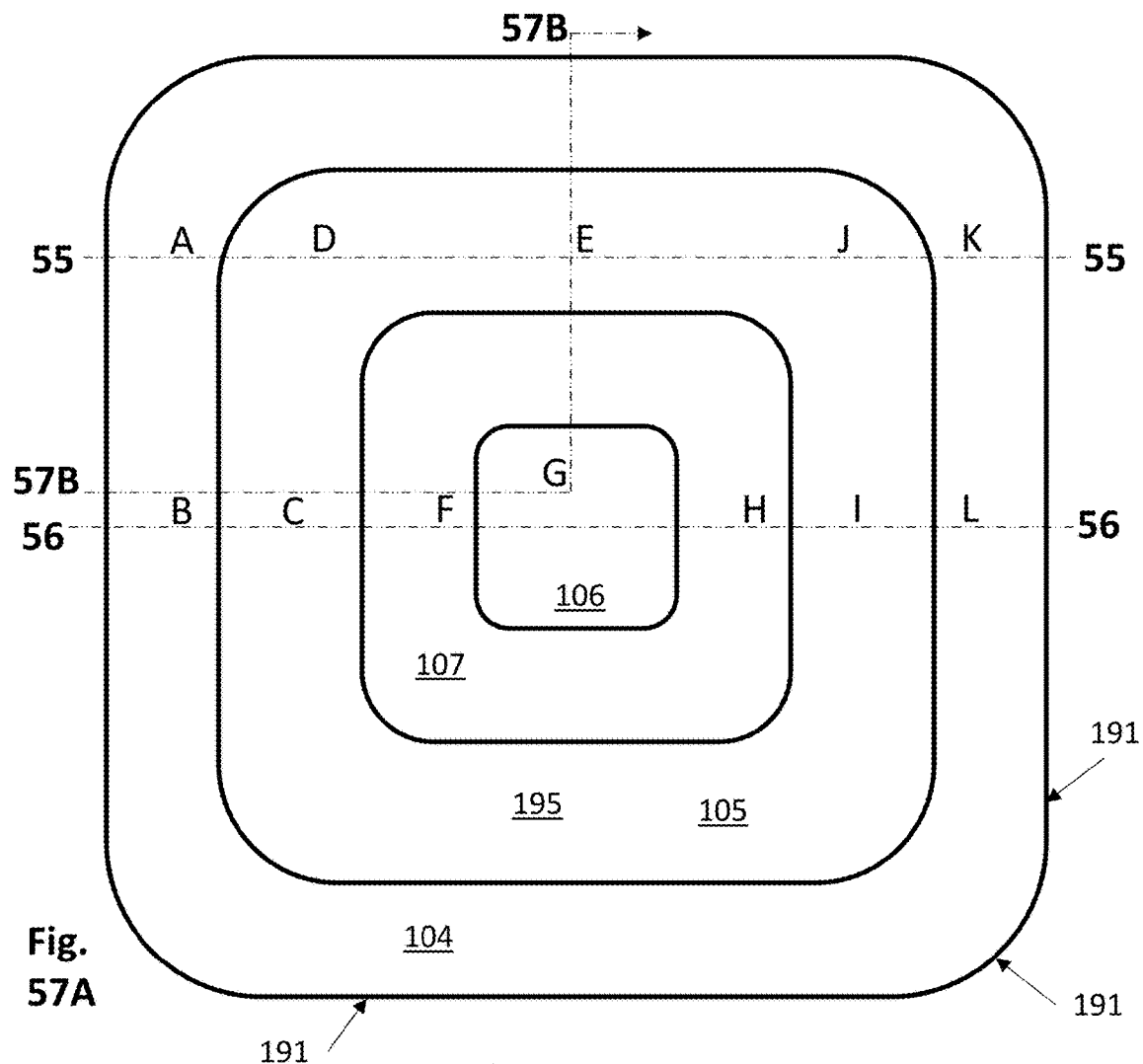
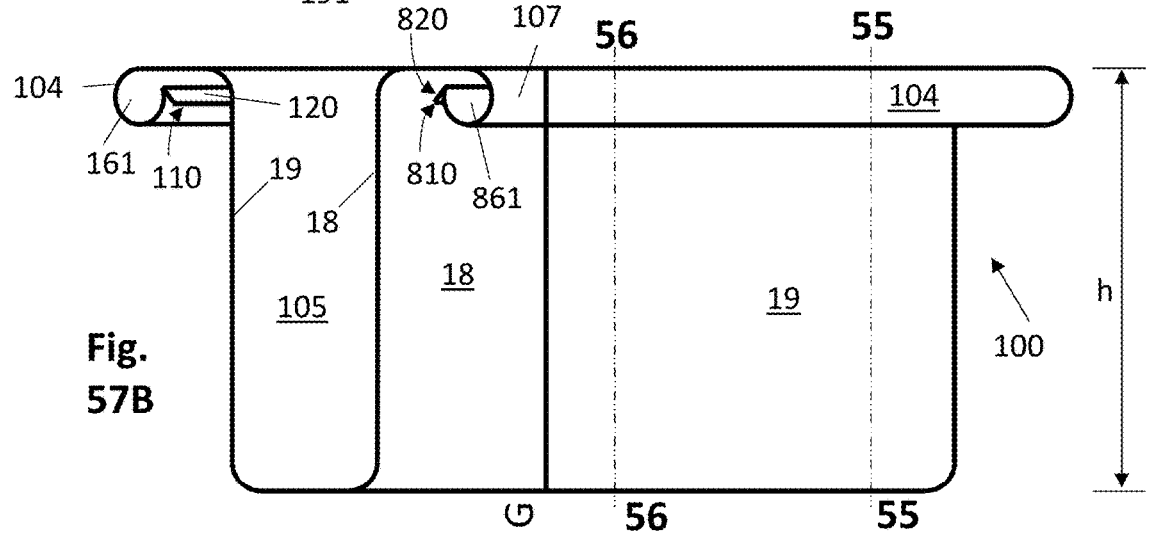

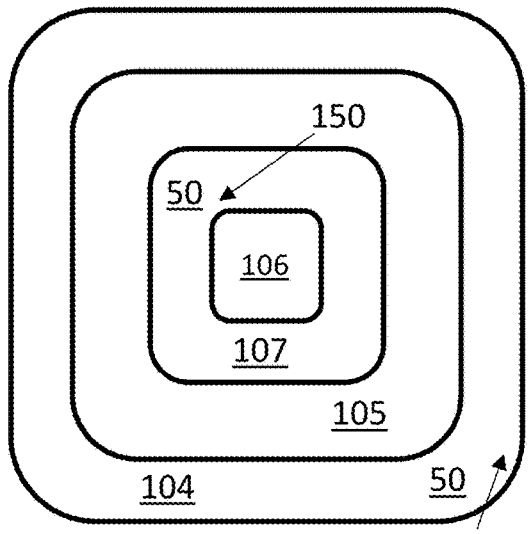
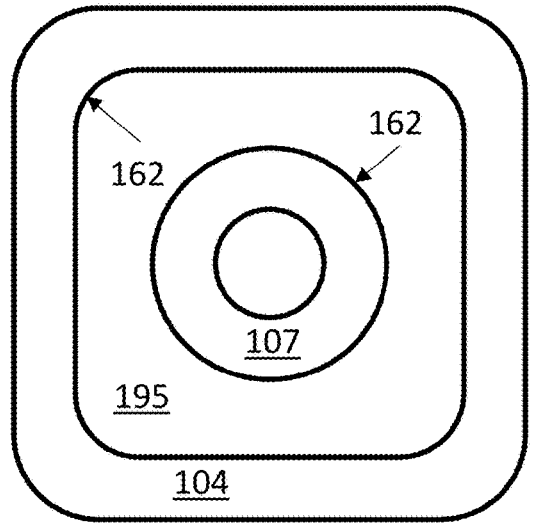
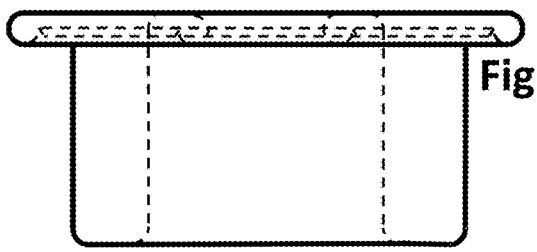
Fig. 58B
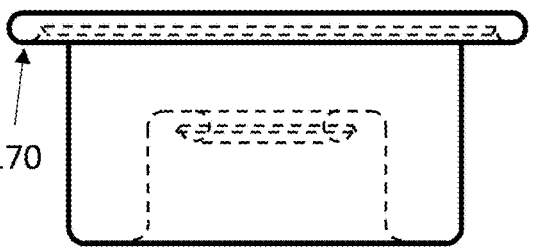
Fig. 59B
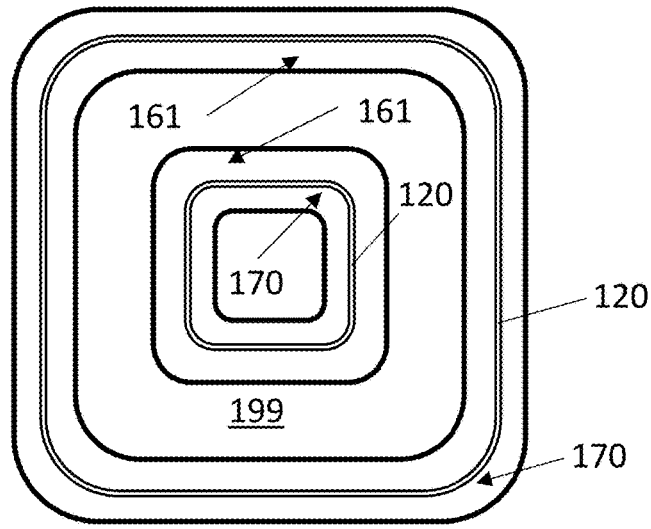
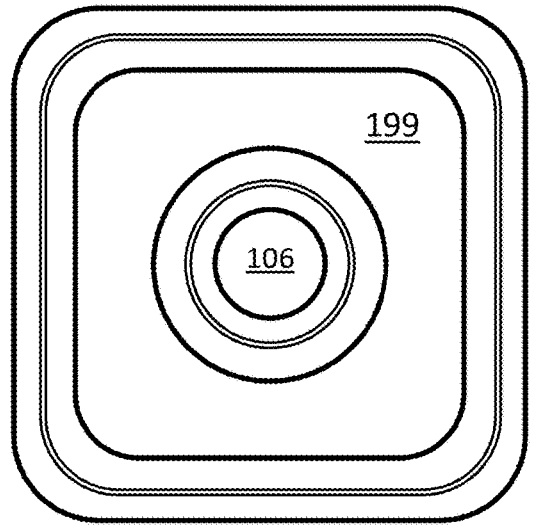
Fig. 58CFig. 59C

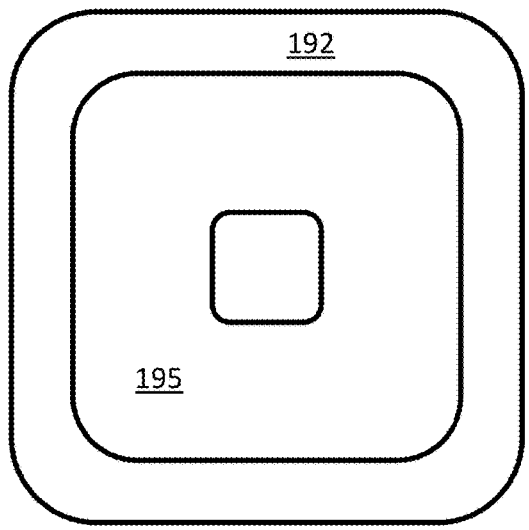 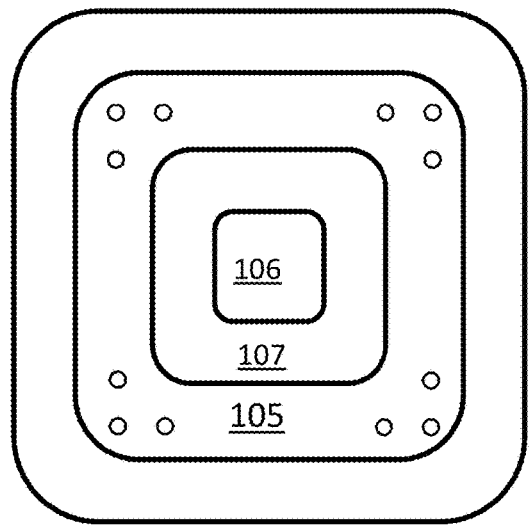
Fig. 64A Fig. 65A
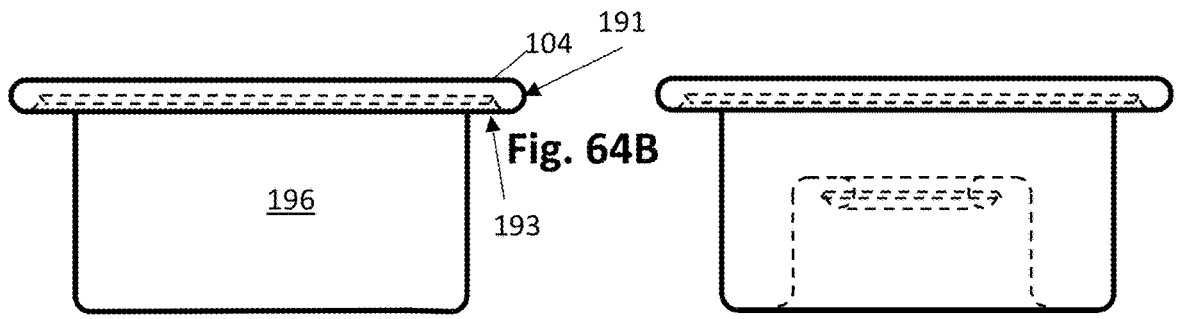
Fig. 64B Fig. 65B
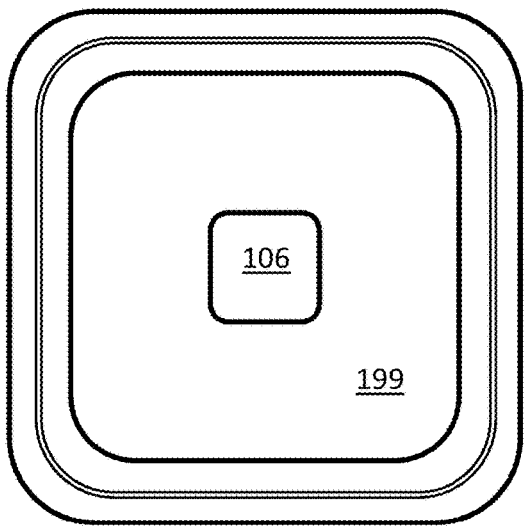 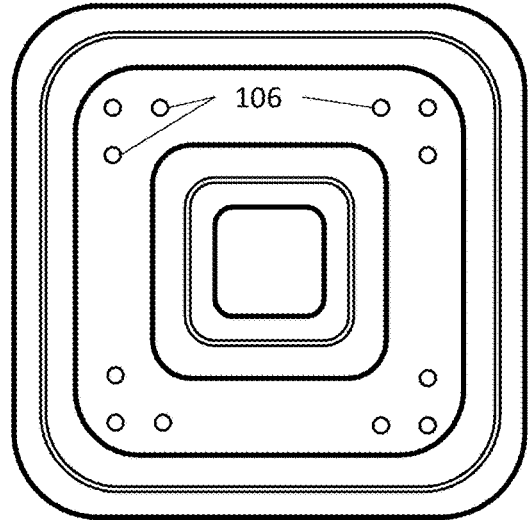
Fig. 64C Fig. 65C

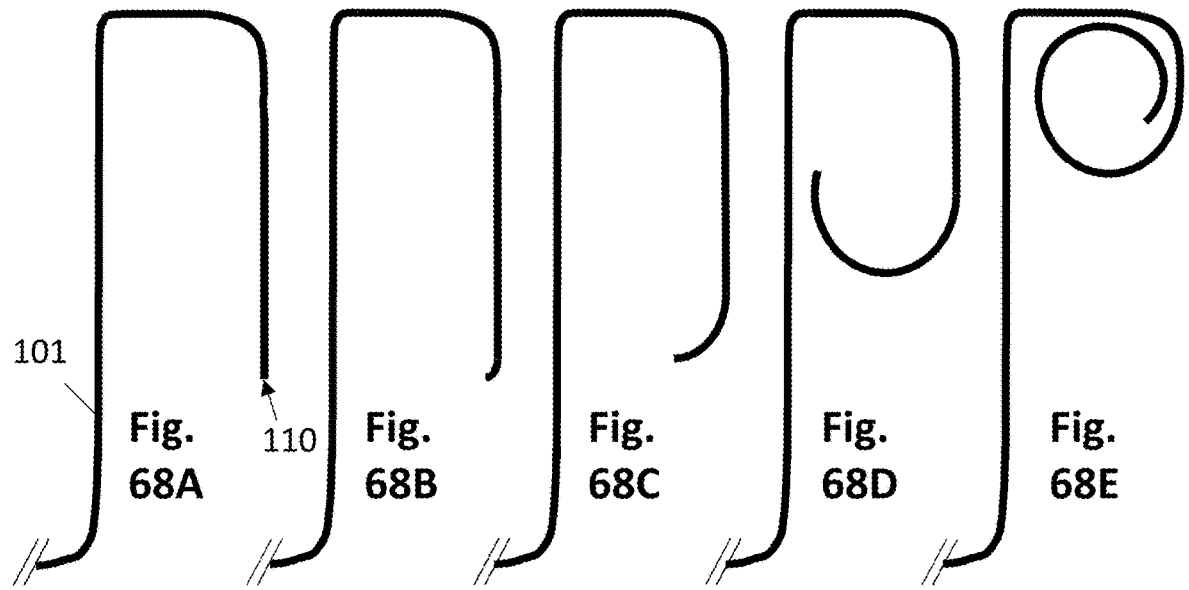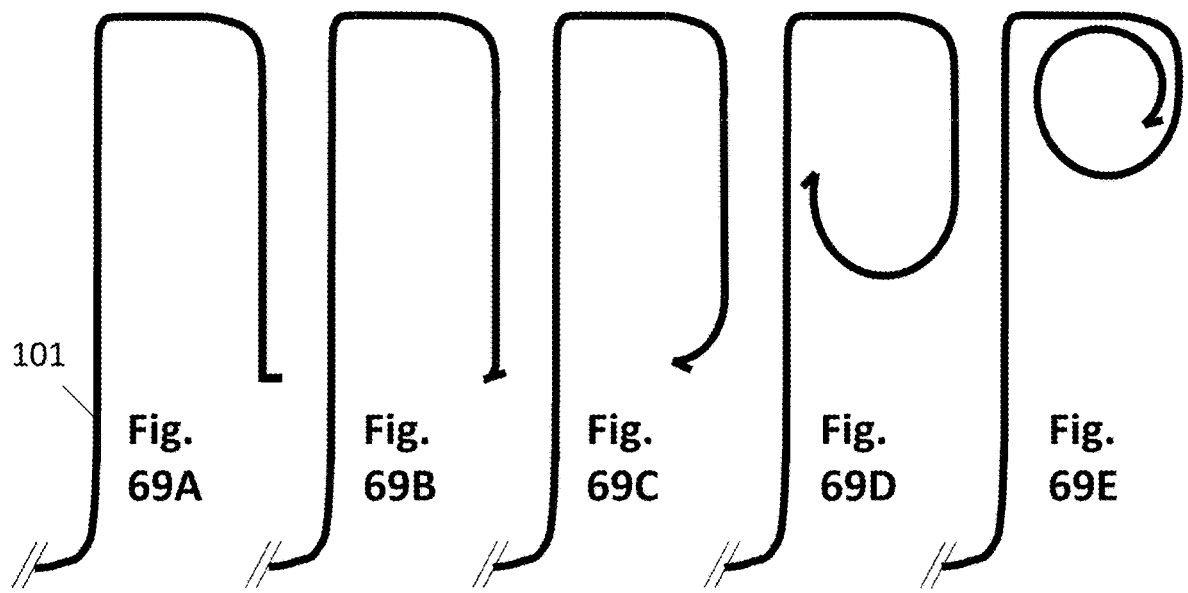

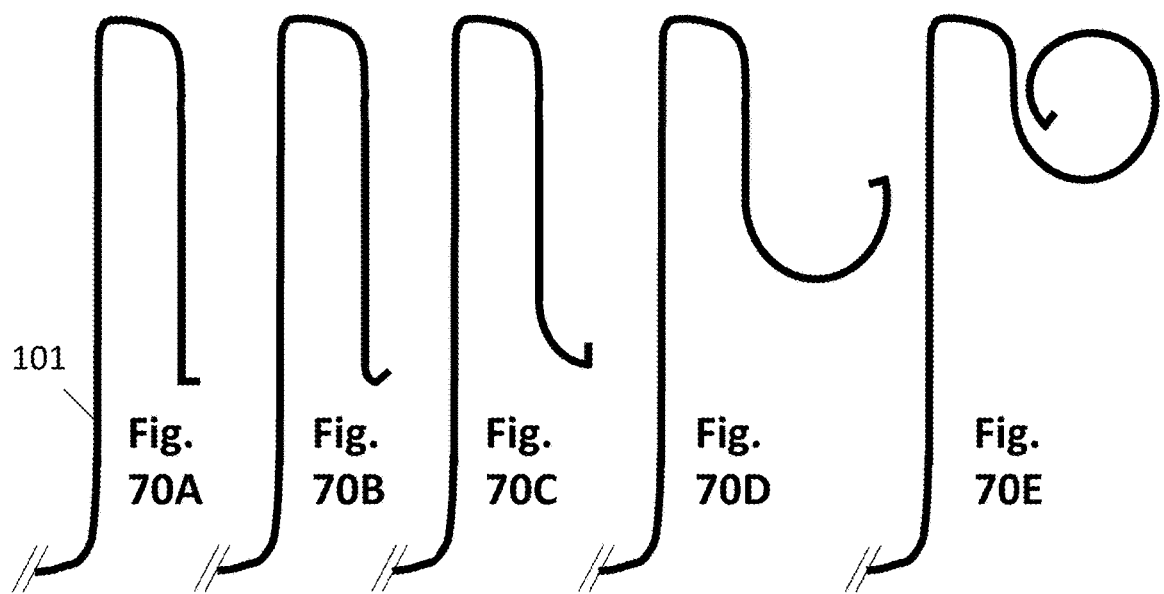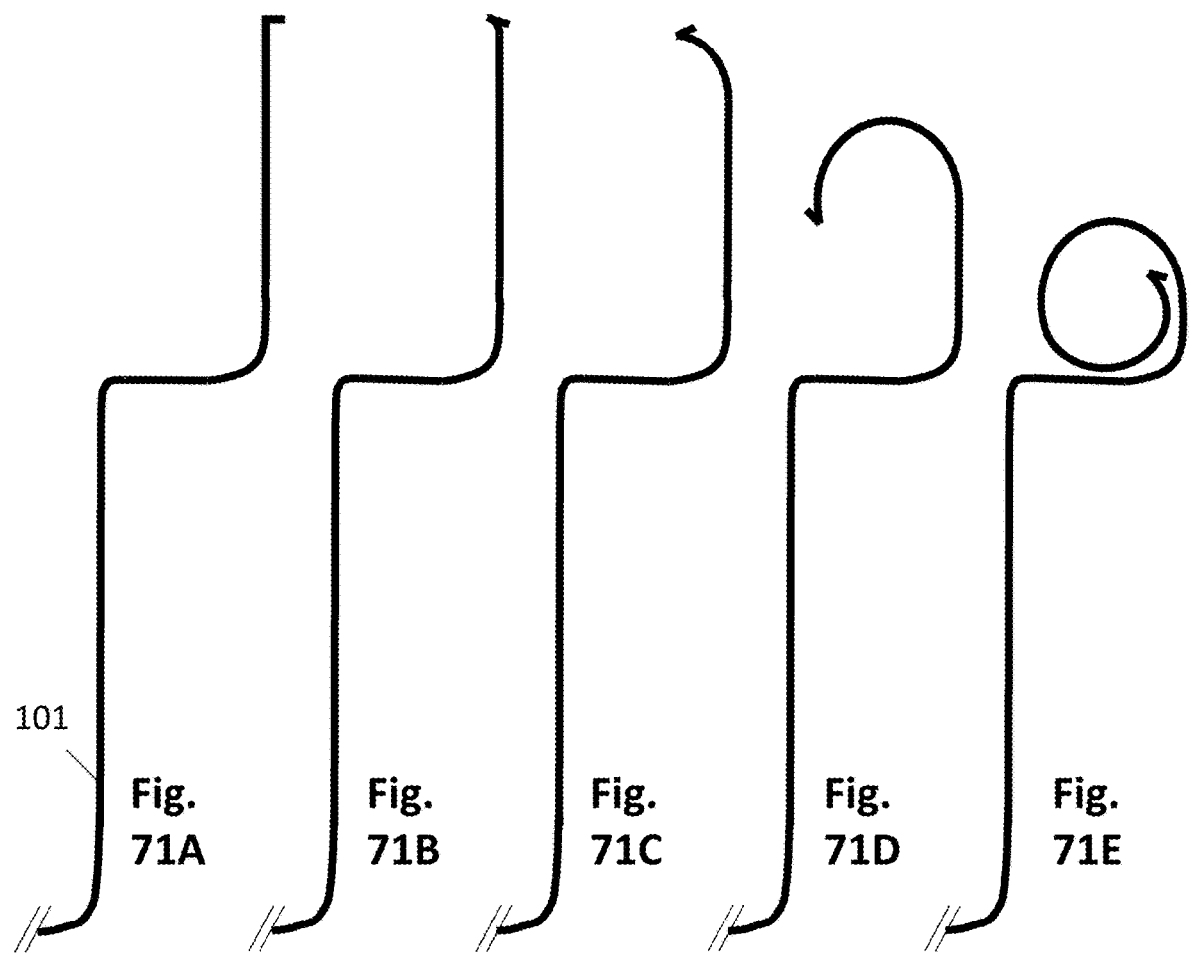

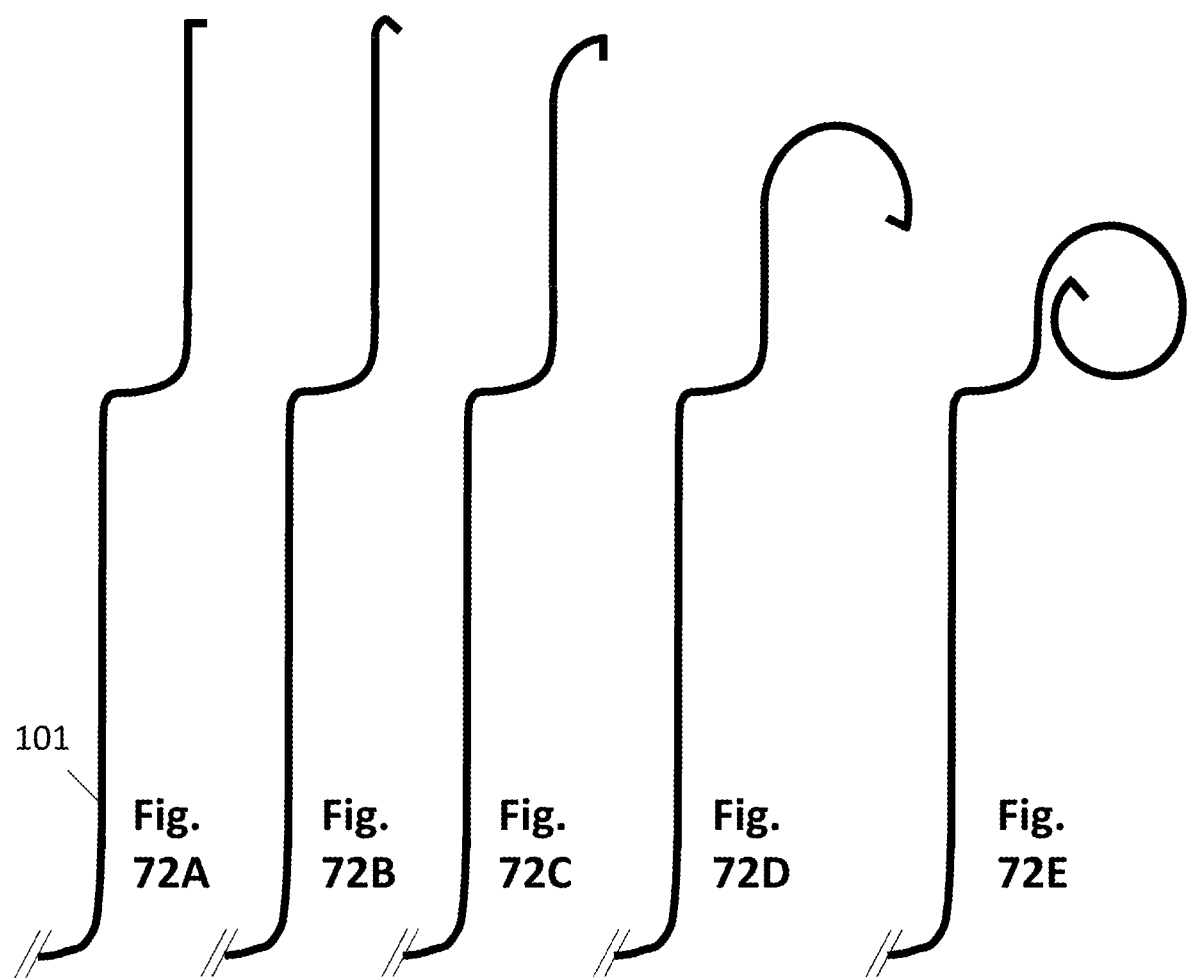

FORMED THERMOPLASTIC ARTICLE HAVING A SMOOTHLY-CURVED DISTAL PERIPHERY

CROSS-REFERENCES TO RELATED APPLICATIONS

This application is a continuation-in-part of U.S. non-provisional patent application Ser. No. 15/674,787, filed 11 Aug. 2017 (now allowed), which is a continuation-in-part of co-pending U.S. non-provisional patent application Ser. No. 15/445,220, filed 28 Feb. 2017, which is a continuation-in-part of international application PCT/US16/49692, filed 31 Aug. 2016 (expired), which is entitled to priority to U.S. provisional patent application No. 62/212,367, filed 31 Aug. 2015 (expired), each of which applications is incorporated herein by reference in its entirety.

BACKGROUND OF THE DISCLOSURE

This disclosure relates generally to the field of forming shaped thermoplastic articles.

Formation of shaped articles from thermoplastic materials is well known. A wide variety of methods (e.g., thermoforming, casting, molding, and spinning) can be used to confer shape to a molten thermoplastic or to a preformed thermoplastic sheet that has been softened or melted. Trimming of waste material from one or more edges of a shaped article is a common finishing technique, but leaves a sharp edge that can injure flesh or tear or cut materials which come into contact with the edge. The edges of shaped thermoplastics often have functional significance to the articles which are formed from them. For example, edges of a thermoplastic sheet used to form such an article often end up at the periphery of the article, where the article interacts with other articles, with surfaces upon or against which the article rests or is applied, and with materials used to cover, wrap, or seal the article. Because of the functional significance of the edges of thermoplastic sheets, it can be beneficial to be able to engineer and control the characteristics of the edges, so as to beneficially affect the properties (e.g., sharpness, stiffness, and resilience) of corresponding peripheries of articles formed therefrom.

One common use for shaped thermoplastics is to form containers that can be sealed with thin plastic films, such as trays, bowls, or bins intended to contain foodstuffs and intended to be sealed with transparent plastic film. Another common use is to contain items and to seal them from moisture or other materials which may come into contact with the container. Sealing of such containers typically involves extending or stretching the film across a compartment formed in the container and sealing the film around the periphery of the compartment, which periphery is often situated adjacent a trimmed edge of the article that includes the compartment. If that edge is sharp, it can cut or break the film, interfering with the sealing process.

Three well-known sealing technologies are commonly used in sealing foods and foodstuffs to form containers for commercial shipping, storage, display, and sale. These are referred to herein as OW, VSP, and MAP technologies. All of these technologies involve combining a container and a thin plastic film. Owing to the fragility of such films and the need, in many instances, to minimize or eliminate punctures and tears from film portions which serve to define (together with the container) sealed compartments, it is critical to minimize the opportunities for containers to tear, puncture, or abrade the film of the same or nearby containers. In addition to plastic films used for sealing such containers, plastic films are also employed for shipping the containers, such as the "mother bags" (i.e., typically thin plastic bags) used for containing multiple product-in-container-packages during shipping and the plastic grocery bags used by consumers to transport purchased goods from a retailer. This can be achieved by reducing or eliminating sharp or rough container edges, at least positions on the container at which such edges might reasonably contact the film during packaging, storage, shipment, or display.

Overwrap (OW) technology involves enveloping or wrapping a shaped article (e.g., a thermoformed tray, sheet, bowl, or multi-compartment container) with a thin (often transparent) plastic film after a foodstuff or other item has been placed on one or more faces of the article and thereafter sealing the film to itself (e.g., by heating overlapping portions of the film). In such OW technology, sharp or rough edges of the shaped article can cut, abrade, or puncture the film, potentially allowing materials to pass through the film and defeating one or more of its purposes. Heretofore, OW technology has been used primarily together with foamed trays or bins lacking sharp edges. Many municipal recycling schemes exclude or disfavor foamed plastics, and such materials are therefore increasingly disfavored by consumers. It would be desirable if a thermoformable plastic container suitable for use with multiple wrapping technologies, including OW technology, could be made, since thermoformable materials tend to be widely acceptable in recycling programs.

Vacuum-sealed package (VSP) technology involves adhering a thin (again, often transparent) plastic film against a face of a shaped article bearing a foodstuff (for example, or a moisture-sensitive object as an alternate example) on a face of the shaped article. When VSP technology is employed, that item(s) to be packaged are placed on a surface or within a cavity of the shaped article, the film is overlain such that the item(s) are interposed between the shaped article and the film, air (or whatever other gases may be present) is withdrawn from the space between the film and the shaped article (optionally in coordination of application of positive pressure to the exterior of one or both of the film and the shaped article) so that the film is closely opposed against the surface of the shaped article and/or the item(s), and the film is sealed (e.g., by way of an interposed adhesive, through heat-induced adhesion, or by static charge adhesion) to the surface of the shaped article across the desired area (usually completely encircling the item(s)), and any excess film can be trimmed from the desired area. The seal can be resistant to gas flow in order to maintain the gas-evacuated state on the interior of the sealed container. The resulting VSP-sealed package typically has a topology that mimics the shape of the surface of the shaped article having the item(s) thereon.

MAP is an abbreviation for modified atmosphere packaging and refers to a sealing technology in which a flexible (often transparent) film is sealed (e.g., using heat or an adhesive) about the perimeter of a substantially rigid shaped article. When the shaped article is otherwise closed (i.e., when it has no other openings than that sealed by the film), the gases present within the container can be controlled at the time the film is sealed to the article. Thus, if the article and film are sealed in the presence of a selected atmosphere (e.g., a gas, such as one selected to exclude oxygen or to promote fruit ripening), the selected atmosphere can be maintained within the sealed MAP package during subsequent storage, shipping, and display of the package.

As is known in the art, the shaped articles used in OW, VSP, and MAP sealing processes tend to have a variety of industry-accepted geometric shapes and properties which differ among the three types, such that a shaped article useful in one type of sealing process is often poorly suited for use in one or both of the others.

Containers used for OW-sealing, for example, tend to be rectangular and tray- or sheet-shaped, with smooth, blunt edges and rounded corners. The lack of sharp, rough, or pointed edges or corners serves to reduce the likelihood that the film used for overwrapping the container will be torn or punctured upon wrapping. OW-containers often have a flat portion (e.g., on the "bottom" of the container, relative to its intended display configuration) at which the overwrapped film can be urged against itself for the purpose of sealing the film to itself (e.g., upon application of heat to the overlapping film portions sufficient to cause such sealing), thus enclosing the container and any items on or in it.

Containers used for VSP-sealing tend to have a face or surface (sometimes within a concavity) adapted to carry an item to be sealed between the film and the container and adapted to receive the sealing film by virtue of the absence of sharp points, protrusions, or edges. The absence of such features reduces the likelihood of punctures or tears in the film as it is drawn against the surface. Unlike OW-containers, VSP-containers can have sharp edges, corners, or protrusions, at least at portions other than the film-receiving surface, because those portions need not contact the film during sealing. However, such sharp portions can still damage sealing films, especially when multiple VSP-sealed packages are stored, shipped, or displayed near one another, because a sharp portion of one container can damage the film of another container (or a film or tissue in the vicinity of the container).

Containers used for MAP-sealing tend to have a planar surface (e.g., a broad, flat rim) surrounding an opening to be sealed by applying a sheet of film against it, sealing the film to the surface (often substantially irreversibly), and then trimming the film about the perimeter of the seal. Such containers must be configured such that the film can be applied to the surface without substantial risk of tears or punctures before and during sealing and to facilitate trimming of the film from the sealed container. However, because the film typically contacts only limited portions of MAP-containers during the sealing process, MAP-containers can, and often do, include sharp, pointed, or abrasive features at positions not involved in the sealing process.

It would be beneficial if the sharp edges of shaped thermoplastic articles could be displaced in such a way that the risk of injury or damage to sealing films could be reduced. It would be further beneficial if such individual shaped articles could be used with multiple known sealing technologies, such as two or more of OW, VSP, and MAP technologies.

Reducing the sharpness and tendency of thermoformed articles to induce damage and injuries would be advantageous even in the absence of sealing. The subject matter disclosed herein addresses this shortcoming of prior shaped thermoplastic articles.

Others have recognized the desirability of reducing the occurrence of sharp edges at the edges of trays to be overwrapped. For example, Nelson et al. (U.S. patent application publication number 2015/0001127) disclosed a packaging tray that is formed by thermoforming a film sheet to yield a precursor tray having a generally U-shaped flange about its periphery, the open end of the U facing the sealing surface and the peripheral edge of the tray jutting peripherally. Nelson's tray is made by cutting the precursor tray from a sheet of thermoformable material to yield an end in which the peripherally-extending peripheral edge is positioned at the terminus of the outer (relative to the tray body) arm of the U. Nelson then compresses that outer arm inwardly toward the tray body, leaving a smoother crimped portion of the U-shaped flange at the periphery of the tray, with the still-potentially-sharp peripheral edge extending toward the sealing surface. In this way, Nelson et al., generates a tray said to be suitable for overwrapping, an overwrapping film being intended to urge the outer arm of the U-shaped flange toward or against the inner arm. However, because the tray retains a sharp peripheral edge in a position in which it can cut films (the peripheral edge of Nelson's trays can be seen to contact both the film overwrap and the film overwrapping an adjacent tray in Nelson's FIG. 13A, for example), Nelson's tray remains unsuitable for all OW applications and generally unsuitable for use with VSP and MAP technologies. A tray lacking a film-accessible sharp peripheral edge or a sharp crimps (which Nelson's trays also possess—see item 124 in Nelson's FIG. 12A) would be preferable for use with each of these sealing technologies.

The subject matter disclosed herein includes shaped thermoformed articles which are suitable for sealing with multiple technologies.

Another common use for shaped thermoplastics is to form plates, platters, trays, and inserts for supporting or separating components during shipping, use, or storage. For example, a product having a flat face at one position can be arranged on a substantially planar platter formed of a thermoplastic with the flat face opposed against the planar face of the platter, and the product-platter combination can be wrapped in a plastic film, or a plastic film can be draped across the product and sealed to the face of the platter around the product, thereby sealing the product to the platter. By way of another example, carpentry tools (e.g., hammers, screwdrivers, and wrenches), silverware, surgical equipment, and other irregularly-shaped and/or multipiece articles are often contained in trays having compartments which are shaped to contain one or more pieces (the compartments often having the shape of the outline of the piece(s) intended to be stored therein). Such compartmented trays are commonly formed by thermoforming a substantially-planar thermoplastic material against a mold which defines the compartments to be formed. In each of these examples, the peripheral edge of the thermoplastic will ordinarily be present at the periphery of the article after it is formed, and it is often that periphery, and the edge present there, that is handled, flexed, or impacted against surfaces or other articles. For such articles, it can be important to form a periphery that exhibits smoothness, strength, rigidity, and resilience.

Thermoformed drinking cups having smooth, rolled edges are also known. Such cups are made by thermoforming cups having a flange about the perimeter of the cup opening, the flange including a potentially sharp peripheral edge at the flange end distal to the interior of the cup. The flanged cups are stacked in a nested fashion, heated at their flange portions, and then passed through helical rim-rolling threads to create the rolled edge. Such technology is useful only for rolling the edge surrounding a circular orifice, and is therefore of no practical use in making shaped articles having rolled edges surrounding non-circular openings. Rolled-edge drinking cups are also not designed to facilitate wrapping or sealing with thin plastic films.

BRIEF SUMMARY OF THE DISCLOSURE

The disclosure relates to methods of displacing a sharp edge away from the periphery of an article made from a thermoplastic material, where the sharp edge might otherwise damage surfaces that contact the periphery of the article. The disclosure also relates to articles processed according to those methods and to equipment for performing such processing.

The disclosure relates to a method of forming a smooth edge (i.e., a smooth periphery) on an article made of a thermoplastic material. The method includes a step of forming a deflectable flange at an edge of the body of the article. The deflectable flange includes a peripheral edge of the thermoplastic material at the peripheral end of the deflectable flange, optionally on a peripheral flange that extends peripherally from the deflectable flange. In one embodiment, the peripheral flange is connected by an elbow to a spacer and extends peripherally beyond the spacer by a peripheral flange distance. The peripheral flange distance can be selected to yield a desired degree of deflection when it is impinged against a surface. In one embodiment, the peripheral flange distance is selected to be zero (i.e., the peripheral edge exists where the elbow would otherwise be. The spacer is connected by a bend region to the body, the bend region defining an angle (which can be acute or obtuse, and is preferably approximately a right angle) between the spacer and the body. The deflectable flange is urged within the interior of a cavity defined by an upper body, for example, the distance between the elbow and the interior being smaller than the peripheral flange distance, so that the deflectable flange is deflected at the bend region upon impingement of a portion of the interior of the cavity on the peripheral flange. Sufficient heat is applied to the bent portion (here, the bend region) of the deflectable flange to soften the thermoplastic material at the bend region. The upper body and the article are separated, whereby the bend region remains deflected upon cooling, yielding a smooth edge (i.e., periphery) on the article.

This method can be used to form a smooth edge about the entire periphery of the article. To do so, the deflectable flange is formed about all edges of the article and the interior of the cavity is configured to simultaneously impinge upon the deflectable flange about all edges of the article when the deflectable flange is urged within the interior. In the resulting article, the peripheral edge is effectively 'hidden' (e.g., it is behind the deflected peripheral flange or deflected away from the periphery of the article) so that materials (e.g., thin plastic films or animal tissue) which contact the periphery of the article will be less likely to contact the peripheral edge of the thermoplastic material from which the article is made.

The disclosure also relates to a method of forming a sealed compartment. This method includes steps thermoforming a thermoplastic sheet to form an article having a concave compartment surrounded by substantially planar sealing surface, cutting the article from the sheet peripherally to the sealing surface, forming a smooth edge about the entire periphery of the article as described herein, and thereafter sealing a top sheet to the sealing surface to form the sealed compartment. In one embodiment of this method, the top sheet is trimmed peripherally about the sealing surface after it is sealed to the sealing surface. In another embodiment, the top sheet is heat-sealed to the sealing surface.

The disclosure further relates to a method of forming a sealed compartment. This method includes steps of thermoforming a thermoplastic sheet to form an article having a concave compartment surrounded by substantially planar sealing surface, cutting the article from the sheet peripherally to the sealing surface, forming a smooth edge about the entire periphery of the article as described above, and thereafter wrapping and sealing a flexible plastic film about the article to form the sealed compartment.

In some embodiments of the methods described herein, after urging the deflectable flange within the interior of the cavity and before separating the upper body and the article, a ram can be urged into the interior, closely opposed against the interior, behind the deflectable flange to an extent that a face of the ram impinges upon and further deflects the deflectable flange, for example, at the bend region. The face can be substantially planar, for example. The face can also be substantially perpendicular to the portion of the interior that impinges upon the peripheral flange. The face can define an obtuse angle with the portion of the interior that impinges upon the peripheral flange. The face can have a concave profile, relative to the interior. If the ram is heated, urging the ram against the deflectable flange can cause bending of the portions of the deflectable flange which contact the ram, further deflecting the peripheral edge of the thermoplastic sheet away from the periphery of the shaped article.

BRIEF SUMMARY OF THE SEVERAL VIEWS OF THE DRAWINGS

FIG. 1 illustrates a sectional view of a thermoplastic article 100 having a deflectable flange 160 formed at an edge thereof.

FIG. 2 illustrates the thermoplastic article 100 inserted within the interior of an upper body 200, which is shown as a broken-away portion (indicated by the rough line).

FIG. 3 illustrates the outcome of inserting ram 300 (only a broken-away portion shown, as indicated by the rough line) into the interior of the upper body 200 behind the thermoplastic article 100. The deflectable flange extends away from the same face (the "cis" face) of the extension 50 as does the article body 10.

FIG. 4 illustrates the outcome of inserting ram 300 (only a broken-away portion shown, as indicated by the rough line) into the interior of the upper body 200 behind the thermoplastic article 100. The deflectable flange extends away from the opposite face (the "trans" face) of the extension 50 as the article body 10.

FIG. 5 consists of FIGS. 5A, 5B, 5C, and 5D and illustrates a matched upper body 200 and ram 300 for deflecting one or more deflectable flanges formed on the periphery of a shaped thermoplastic article having the conformation of a rectangular tray with rounded corners. FIG. 5A illustrates the upper body 200 disposed above the ram 300, and FIG. 5B illustrates the upper body 200 engaged with the ram 300. FIG. 5C is a cutaway view of the engaged upper body 200 and ram 300 shown in FIG. 5B and illustrates that a portion of the ram 300 fits within and closely opposed to the interior surface of a recess in the upper body 200. FIG. 5D is a detail of the section indicated in FIG. 5C and illustrates the close opposition between the ram 300 and the interior of the upper body 200. In FIG. 5D, the sloping conformation of the upper face 302 of the ram 300 is apparent.

FIG. 6 consists of FIGS. 6A, 6B, and 6C, which are images of a smoothed periphery and corner of a clear, shaped thermoplastic article having the conformation of a rectangular tray with rounded corners. The article was smoothed using an upper body 200 and ram 300 similar to those illustrated in FIG. 5. In FIG. 6A, a finger is visible within the interior of the tray, and the smoothed corner is visible to the left of the finger. Also visible at the portion where the finger is located is a stacking lug 181, which is a portion of the corner of the tray which extends peripherally to a greater extent than the portion of the corner below the finger. Extending (downwardly in the figure) from the smoothed corner is a smoothed straight sidewall of the tray. Wrinkling of the peripheral flange is visible beneath the smoothed corner, and deflection of the peripheral flange under the smoothed straight edge can be seen behind the corner on the left side of the figure. FIG. 6B is another view of a smoothed corner of a similarly-made tray, also seen from below the rim of the tray. The prominent extension at the corner just below the rim is a stacking lug 181. FIG. 6C is a view of the smoothed corner, with a finger pointing to a smooth peripheral edge of the outer rim of the tray 191 formed by bending, softening, bending, and cooling of the bend region of the deflectable flange. This smooth region can, for example, be urged against a thin plastic film without tearing it easily, since the relatively sharp edge of the thermoplastic material from which the tray is formed is bent under the corner, as shown in FIGS. 6A and 6B.

FIGS. 9, 10, and 11 differ in the distance between the elbow and the peripheral edge (i.e., the length of the peripheral flange 120), this distance being greater in FIG. 9 than in FIG. 10 and being zero in FIG. 11.

FIG. 16 consists of FIGS. 16A, 16B, and 16C and illustrate an embodiment in which an article 100 formed of a thermoplastic sheet resting on a horizontal surface (solid horizontal line) has its peripheral edges smoothed as described herein. In this embodiment, an upper body 200 (two portions shown in this cross section) is lowered over the article 100 in the direction indicated by the open arrow, causing each of the article's two deflectable flanges 160 to deflect inwardly.

FIGS. 17-32 illustrate deflection and rolling over of the deflectable flange 160, including the sharp peripheral edge 110 thereof using a ram 300 as described herein. Each of these figures is a cross-sectional view including only one edge of the article; the same deflection and rolling over of the edge can be performed on multiple edges (e.g., all edges) of the article simply by using multiple rams or a ram that contacts all edges to be so treated. FIG. 23 consists of FIGS. 23A and 23B, which are images of a rounded rectangular tray T having an interior and a plug P that is shaped and dimensioned to fit within that interior.

FIGS. 33 and 34 are cross-sectional views showing one edge of the article depicted in FIG. 32C. In FIG. 33, two of the articles are shown in a stacked configuration. FIG. 34 illustrates a stack of four of the articles.

FIG. 35 is a cross-sectional view of one edge of an article 100 showing the conformation of its deflectable flange 160 prior to the rolling-over operation described herein.

FIG. 36 is a cross-sectional view of one edge of an article 100 have a peripheral edge 110 rolled over by the technique illustrated in FIGS. 17A-17C.

FIG. 37 is a cross sectional view of the edges of three of the articles 100 shown in FIG. 36, the articles being stacked in a nested configuration.

FIG. 38 is an image of a prior art thermoformed plastic tray having a stacking lug 181 (the corner extension beneath the rim, toward which the finger in the image is pointing).

FIG. 39 is an image which illustrates, in a left portion, an image of two prior art trays stacked against one another, with the inter-tray distance being limited by the stacking lug and, in its right portion, two stacked, nested trays having rolled-over edges.

FIG. 40 is an image which shows, on its left side, three nested and stacked trays having rolled-over edges and having stacking extensions 180 formed into the corners thereof to increase separation between the straight edges of the stacked trays.

FIGS. 44 (consisting of FIG. 44A-44C) and 45 (consisting of FIGS. 45A-45C) illustrates features of an embodiment of the shaped articles having a peelable liner sheet attached to a face of the article. Each of these figures is a cross section of an edge of the shaped article 100, showing the structure of the substrate sheet 101 and the peelable liner sheet 500 at the peripheral edge 110 and nearby portions of the article 100.

Each of FIGS. 46 and 47 is a series of images which illustrate an article-forming method in which a thermoplastic substrate sheet 101 can be thermoformed using a mold, the sheet trimmed, and the trimmed edge smoothed as described herein. FIG. 47 consists of FIGS. 47A-47E. These processes are described in Example 3.

FIG. 48 illustrates the conformation the edge of the article has when the molded-and-deflected article shown in FIG. 46F is cooled below the softening temperature of the substrate material and removed from the mold 700 and ram 300.

FIG. 49 illustrates an article made by the processes shown in FIGS. 46A-46F, with a plastic film lidding 600 wrapped about the entire article.

FIG. 50 illustrates the conformation the edge of the article has when the molded-and-deflected article shown in FIG. 47E is cooled below the softening temperature of the substrate material and removed from the mold 700 and ram 300.

FIG. 51 illustrates an article made by the processes shown in FIGS. 47A-47E, with a plastic film lidding 600 wrapped about the entire article.

FIGS. 54 (consisting of FIG. 54A-54C), 55 (consisting of FIG. 55A-55F), 56 (consisting of FIG. 56A-56F), and 57 (consisting of FIG. 57A-57C) illustrate an example of formation of an article formed from a single substrate sheet and having multiple smoothed edges made as described herein. FIGS. 54A, 54B, and 54C show top, left side, and bottom views of a container described herein after it has been thermoformed, but before its outer and inner peripheral edges 110 and 810, respectively, have been smoothed. FIGS.

57A, 57B, and 57C show top, side, and bottom orthographic projections of the container having a smooth outer rim 104, sidewalls 19 which form vertical sides having horizontal sections of rounded squares, a compartment 105 contained within the sidewalls and above the floor 195 of the container. An orifice 106 extends through the container within the compartment, and the orifice 106 is also surrounded by vertical sidewalls 19 which, in a horizontal section, also have a rounded square configuration. A smooth inner rim 107 surrounds the orifice 106 atop the sidewalls 19, at the same altitude, relative to the floor 195 as the smooth outer rim 104. An orthographic projection of essentially the same container, showing hidden lines, is shown at FIG. 58B. Letters A-Z and symbols @, #, %, and & are included as landmarks so that surface configurations can be better understood in FIGS. 54-57.

FIGS. 58-67 illustrate several examples of shaped articles which can be made using the methods described herein. Each of these Figures includes top, side, and bottom orthographic projections for each example. FIGS. 58A, 59A, and so on are top views and do not include hidden lines. FIGS. 58B, 59B, and so on are side views and include hidden lines (except for FIGS. 65B and 66B). FIGS. 58C, 59C, and so on are bottom views and do not include hidden lines.

FIGS. 68-72, each of which includes five illustrations (designated FIGS. 68A-68E, 69A-69E, and so on) of different extents of edge-deflection in various configurations. Only a single peripheral edge of the substrate sheet 101 is shown in each illustration, and each is shown in cross-section, omitting any other portions of the article not relevant to this feature.

DETAILED DESCRIPTION

Figure 1:
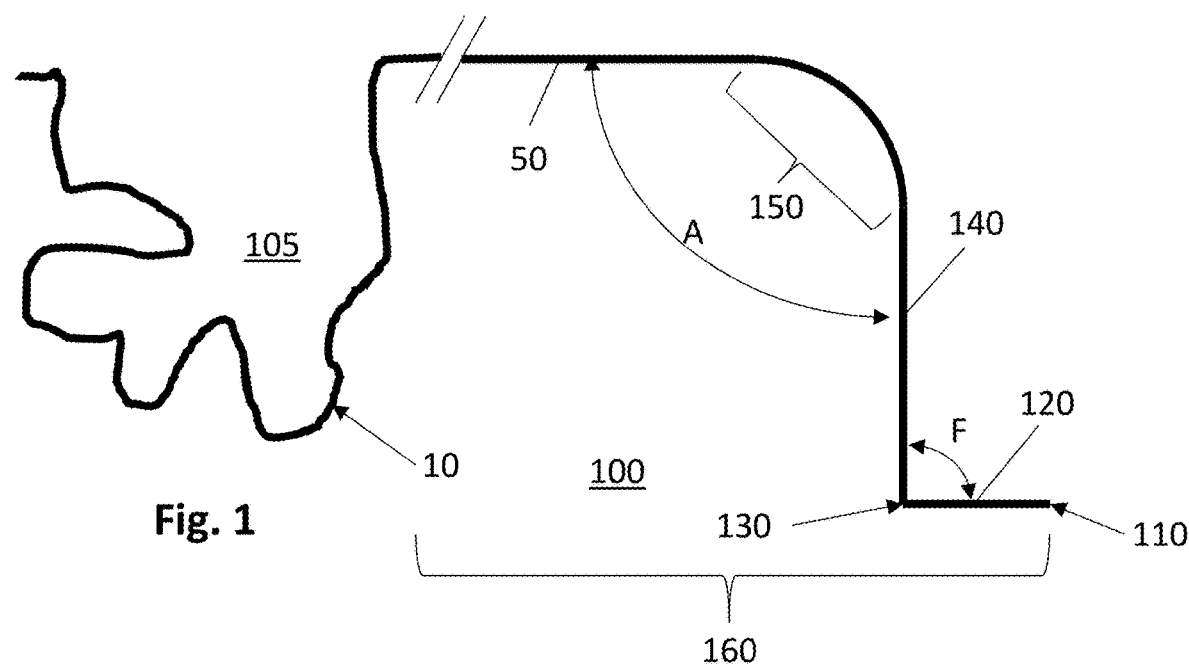
FIGS. 1, 2, 3, and 4 illustrate the basic operation of the structures and methods described herein. In all figures, parallel straight lines "//" indicate positions at which structures, dimensions, and proportions which can optionally be present are omitted for clarity. Such positions can be occupied, for example, by flat portions of the article, by curved or bent portions, or by portions having controlled shapes, and the not-shown portions can be large or small. These are omitted because they are substantially irrelevant to the edge-smoothing method and smoothed edges described herein.

Disclosed herein are shaped articles and method of making them. A shaped article 100, as described herein, includes a shaped body 10 portion joined to a deflectable flange 160 at a junction 162. The articles can be formed from a single substrate sheet 101 of a thermoplastic material (e.g., a thermoformable plastic sheet), and the deflectable flange 160 can be situated near one or more edges 110 of the sheet, and preferably near all edges, so that the deflectable flange is present about the entire periphery of the sheet. Impinging the deflectable flange 160 against an upper body 200 or a ram 300 can cause deflection of the flange, owing to flexing of the flange at one or more bent portions 170. Because the sheet is thermoplastic, the deflectable flange 160 will retain its deflected conformation if the bent portion(s) 170 are at a temperature above the glass transition temperature of the thermoplastic during this process and subsequently cooled below that temperature. The peripheral edge 110 is part of the deflectable flange 160, and deflection thereof can redirect, displace, curl, or even sequester the peripheral edge 110, with the result that the peripheral edge 110 can be made less likely to contact film, flesh, or other items than it would have been in the absence of this process. The process is herein referred to as "edge turning," "edge rolling," "edge smoothing," or "rolling over the edge" to emphasis this redirection, displacement, curling, or sequestering of the potentially sharp, rough, or jagged peripheral edge 110.

The subject matter disclosed herein relates to formation of shaped thermoplastic articles, and more specifically to articles which are formed such that one or more of the edges of the article has a conformation wherein the peripheral edge of a thermoplastic sheet from which the article is formed is turned away from a face of the article, and preferably away from the periphery of the article, so that a fragile material (e.g., flesh or a thin, flexible plastic sheet) that is applied against the face or periphery does not contact the edge of the sheet. Because such sheet edges can be sharp, especially when the edge has been cut or broken, directing the edge away from a face and/or periphery of the article can prevent damage to fragile materials which contact the face or periphery.

The subject matter disclosed herein is of particular use in forming containers which will be sealed with fragile plastic films applied against a face of the container or in which the container is wrapped. In a preferred embodiment disclosed herein, the peripheral edge of the thermoplastic sheet from which the article is formed is turned away from the article's periphery so far that the resulting article is suitable for use in any or all of OW, VSP, and MAP sealing technologies. Desirably, thermoformable and moldable plastics tend to be widely acceptable in recycling programs, and articles made therefrom can be more readily recycled than, for example, foamed plastic articles.

The subject matter described herein is also of particular use in forming containers which will be handled by humans or animals, because the bent- or rolled-over edges which result from the edge-smoothing processes described herein are less likely to present a sharp or rough edge liable to cut, abrade, or otherwise injure flesh that contacts the containers. This protective effect can be of particular importance to individuals who are packing and/or sealing items in containers (e.g., butchers or grocery workers placing meat, fish, poultry, or vegetables into tray- or bowl-shaped containers and wrapping or sealing them with plastic film), to individuals who are unsealing, unpacking, or removing items from containers (e.g., grocery customers opening and removing foodstuffs from containers), and individuals using the containers (e.g., children or animals eating foodstuffs from a shaped container or individuals using a perforated or porous container as a sieve). Because the edge-smoothing methods described herein can be used to diminish the sharpness or roughness of edges of a wide range of articles, the methods are applicable to disposable plastic articles, as well as to articles intended for prolonged or repeated use.

Briefly summarized, the basic method described herein for forming a shaped thermoplastic article having a smooth edge involves forming a deflectable flange at the periphery of the article and thereafter deflecting the flange in a controlled direction and to a controlled extent to displace the peripheral edge of the thermoplastic from which the article is made away from the periphery of the article and/or to a position or conformation which is preferable. The deflectable flange includes the potentially-sharp or—rough peripheral edge of the thermoplastic material from which the article is formed. The deflectable flange is softened (i.e., raised to a temperature at or above the glass transition temperature of the material of which the flange is formed, and preferably a temperature less than the melting point of the material) at one or more portions thereof so that the peripheral edge is directed away from the periphery of the article when the deflectable flange is deflected toward the body of the article. In one embodiment, the deflected portion of the deflectable flange and the body of the article extend from the same face of a flat portion of the deflectable flange (e.g., the flat portion referred to herein as the "extension"), preferably 'hiding' the peripheral edge between the deflected portion of the deflectable flange and the extension, the body, or both. In another embodiment, the deflectable flange is deflected or rolled over the "top" of the extension, while the article body remains "beneath" the extension (i.e., the deflectable flange and the article body extend away from opposite faces of the extension), yielding an article having a "raised rim" around the article body. Cooling (i.e., stiffening) the softened and deflected deflectable flange below its glass transition temperature "locks" the peripheral edge in that position, lessening the likelihood that material (e.g. flesh or film) that contacts the periphery of the article will be damaged by the sharpness or roughness of the peripheral edge. Various embodiments of this edge-smoothing process are illustrated in FIGS. 17-34 and 68-72.

It is the presence of the deflectable flange formed at or near the periphery that permits peripheral edges (and, particularly, curved edges and corners of peripheral edges) to be "rolled over" to yield a smooth periphery. In previous trays which included an exterior flange (e.g., a tray having a periphery like that shown in FIG. 1, lacking the bend region 150, the spacer 140, the elbow 130, and the peripheral flange 120, and having the peripheral edge 110 at the periphery of the extension 50), bending or rolling of the exterior flange might have been possible along straight edges, but bending or rolling curved edges and corners of such exterior flanges could not be performed without buckling or wrinkling of the material in the flange, yielding an undesirable non-smooth edge. It is the presence of the smooth bend region 150 and the spacer 140 of the deflectable flange described herein that permits the peripheral edge 110 to be deflected away from the periphery of the article without such buckling or wrinkling, yielding a smooth periphery. It can be seen from FIGS. 1-4, 7-11, and 16-34 that the bending, flexing, and curling that the deflectable flange undergoes can be effected in any one or more of the extension 50, the bend region 150, the spacer 140, the elbow 130, the peripheral flange 120, and even at the peripheral edge 110. Whichever one or ones of these elements are caused to bend or deflect in order to achieve the effect, the resulting disposition of the potentially sharp peripheral edge 110 away from the periphery of the article, and preferably not reasonably accessible from the exterior of the article at its periphery yields an article having a smooth periphery which is suitable for contacting with fragile films, tissues, or other surfaces.

In one embodiment, the deflectable flange includes a peripheral flange that juts outs in a peripheral direction from the article and is attached to a spacer portion by way of an elbow (e.g., a 90-degree turn or a turn through some other offset angle, such as one of 60-120 degrees) in the thermoplastic material that forms the article. The body of the article is attached to the spacer by way of a bend region, which defines an angle (angle A in FIG. 1; preferably an approximately right angle) between the spacer and the portion of the body adjacent the bend region (i.e., this portion will usually be the extension which serves to connect the body to the bend region). The deflectable flange is inserted into the interior of a cavity in a body (e.g., an upper body 200 or a ram 300) such that the peripheral flange is impinged by a wall of cavity, thereby deflecting the deflectable flange in the direction of the body of the article. Upon such deflection, heat is applied to the bend region that is sufficient to soften or melt the thermoplastic material at the bend region, so that the deflectable flange remains deflected toward the body when the bend region cools. Optionally, a ram can be inserted into the cavity after the deflectable flange, and a face of the ram which contacts the deflected peripheral flange can induce further deflection of the deflectable flange, further displacing the peripheral edge of the article away from the periphery of the article upon cooling. In this way, a smooth, "rolled" edge of the thermoplastic material forms the outermost periphery of the article, while the peripheral edge of the thermoplastic material remains within the outermost periphery of the article, where the sharpness of that edge is less likely to damage fragile materials which contact the outermost periphery of the article.

In another embodiment, the deflectable flange is contacted with a ram that deflects the deflectable flange in a direction that deflects the sharp edge of the thermoplastic sheet away from the periphery of the article. Before, during, or after such deflection, one or more portions of the deflectable flange (e.g., the bend region, the spacer, the elbow, the peripheral flange, any portion(s) that contact the ram, or a combination of these) are heated sufficiently to soften the thermoplastic material, and the deflectable flange is thereafter cooled to "lock in" the deflection. Depending on the degree of deflection, the peripheral edge of the thermoplastic material can be simply turned away from the periphery of the article, turned in a direction approximately opposite the periphery, or even "rolled up" by deflecting the deflectable flange at a sufficiently tight radius while it is softened that a J-shaped, U-shaped, or even spiral-shaped conformation is achieved (i.e., any shape yielding a substantially smooth peripheral edge), with the peripheral edge being thereby rendered virtually incapable of damaging flesh or film present at the periphery of the article.

The deflection induced by impingement by an upper body 200 or ram 300 that contacts the deflectable flange will often require that another object be applied to a different portion of the article bearing the deflectable flange, so that the article is not merely pushed through space, but is instead held in place and subjected to deflective force. Furthermore, in order to direct the applied force to deflecting the deflectable flange, it is often desirable that portions of the article other than the deflectable flange be stabilized (e.g., to prevent flexing of sidewalls of a container while an edge on the deflectable flange attached to the sidewall is being smoothed). Thus, it can be desirable to insert a plug or other form which is closely opposed against article surfaces at which deflection is not desired. For articles formed through thermoforming or other mold-mediated processes, all or a part of the mold used to form the article can serve this purpose, and it can be desirable to employ a multi-part mold including both a "core" which can be used both to mold the article and to prevent displacement of parts of the article during edge-smoothing and a displaceable, compressible, or removable "peripheral" mold portion which can be used to mold the article and displaced, compressed, or removed to facilitate the edge-smoothing process.

Individual elements and aspects of the shaped articles and methods for making them are now described in greater detail.

The Shaped Article

The shaped thermoplastic articles described herein include a shaped body 10 to which the deflectable flange 160 is joined at a junction 162. An important use of the edge-smoothing methods described herein is to reduce the likelihood of damage to flesh, film, or other items caused by contact with the generally-sharp and/or -rough edge of the thermoplastic sheet from which the article is formed. Such damage is avoided by deflecting the peripheral edge of the sheet, such as by bending or curling it (especially at its peripheral-most portions) to reposition the edge away from positions likely to cause such damage, or even rolling it back upon itself to the extent that the edge is contained within the rolled portion of the deflectable flange or within a combination of the shaped body and the deflectable flange. The degree and extent of bending or rolling can control whether damage is made a little less likely, much less likely, or even nearly impossible without un-rolling or un-bending.

The edge-smoothing methods described herein can be used to smooth the edge of articles made from thermoplastic materials, regardless of the means used to make the articles. Such methods include thermoforming, casting, blow molding, injection molding, and extrusion, for example. The methods described herein can be used to smooth edges for thermoplastic articles that are sufficiently thin at their edge that they can be deflected and shaped by the processes described herein.

The methods described herein are believed to be applicable to articles having a wide range of shapes and sizes, especially articles which normally have a sharp, rough, or jagged peripheral edge when made by common methods. Motivation for making shaped thermoplastic articles with smooth edges stemmed in part from a desire to make common storage trays (e.g., plastic trays used for storing foodstuffs such as fresh or frozen meats, fruits, or vegetables) having edges that are sufficiently dull (non-sharp) that the trays can be wrapped in or contacted with thin plastic films such as polyvinylidene chloride and polyethylene films without the film being cut or punctured by the tray edge under normal usage conditions. However, once the methods described herein were developed, it was recognized that the smooth, rounded edges are desirable in a variety of other situations, such as preventing injury to the flesh of humans handling trays and other shaped articles and preventing damage to films sealing one tray by sharp edges of a second sealed tray (e.g., as in a shipping container containing multiple sealed trays).

By way of example, a common method of making shaped articles such as meat trays is by thermoforming a sheet of a thermoplastic. In thermoforming processes, a portion of an (often long) sheet of a thermoplastic is raised to a temperature at which the thermoplastic softens and can be molded while in its pliable state (generally, above its glass transition temperature, but below its melting temperature). The softened thermoplastic is applied against the surface of one or more molds (often with the aid of positive and/or negative air pressure applied at various locations to ensure a tight opposition of the softened thermoplastic film against the mold surface) or sandwiched between opposed male and female mold sections. As the film cools (e.g., upon contact with the mold surface), the thermoplastic hardens and becomes less easily deformable, resulting in the thermoplastic film attaining and retaining the shape imposed upon it by the molding process. Multiple casts are often made of the same article in a single sheet of film in thermoforming processes, and the individual cast articles are freed from the film by cutting (e.g., die cutting) the film about the periphery of the article. This process tends to yield a sharp edge at the cut portions of the film, including a sharp edge that surrounds all or a portion of the periphery of the article (i.e., where the article was cut from the film). If the material is shaped during thermoforming to include the deflectable flange 160 described herein adjacent or near where the sheet will be trimmed and interposed between the trimmed edge and the remainder of the shaped article, then the edge of the thermoformed-and-trimmed intermediate article can be smoothed by performing on the trimmed edge the smoothing process described herein.

Further by way of example, a thermoplastic material can be melted in an extruder and injected into a mold cavity which defines the shape of the molded article. After cooling, the mold can be opened to release the molded article. In molding processes, it is common for thermoplastic material to appear at parts of the finished articles where it is not desired, such as "flashing" that occurs when molten thermoplastic flows between mold plates or at the ports through which the molten thermoplastic was fed into the closed mold. These non-desired parts can be sharp in their own right, and sharp edges can be left when these non-desired parts are cut from the molded article.

A significant drawback of molding and thermoforming operations that is overcome by the methods described herein relates to removal of molded or thermoformed objects from the mold used to shape them. When an initially-planar material such as a thermoplastic substrate sheet is softened and forced, blown, sucked, or otherwise applied against a mold surface, it can thereafter be removed (if pliable or hardened, but not if molten) and will retain the shape of the mold. However, because removal from the mold must be achieved without bending, stretching, or breaking the molded sheet material, it is difficult (often impossible) to mold into the sheet bends, folds, extensions, convexities, or other shapes that "catch" on the mold surface as the sheet is lifted away from it. It is for this reason that the bent, deflected, and "rolled-over" shapes of the deflectable flange described herein cannot simply be imposed by molding or thermoforming—articles formed with these shapes could not be removed from the mold without tearing them or un-molding these shapes.

As a solution to this shortcoming, the methods described herein involve two steps: First forming the desired article with a "precursor" (the deflectable flange 160) of a desired non-moldable, non-thermoformable shape element (e.g., a rolled-over peripheral edge, as shown in FIG. 48, for example); and then deflecting the "precursor" article using the edge-smoothing method described herein to yield the final, desired article. Thus, in the example illustrated in FIGS. 54-57, an initially planar thermoformable substrate sheet 101 is first thermoformed into the precursor article shown in FIGS. 54A-54C (see steps illustrated in FIGS. 55A-55C and 56A-56C), which has a deflectable flange formed near each of the inner and outer peripheral edges 810 and 110, respectively. Thereafter (without removing the precursor article from the mold in the example illustrated in FIGS. 54-57, but optionally after removing it), the deflectable flanges are deflected, "rolled over," and cooled (see steps illustrated in FIGS. 55A-55F and 56A-56F) to yield the finished article depicted in FIGS. 57A-57C.

The size and shape of the articles described herein are not critical. In general, the shaped articles will be ones for which handling of the articles or contact between peripheral edges of the article and one or more fragile materials is anticipated. The edge-smoothing process described herein can remove one or more sharp edges from thermoplastic articles which normally have such sharp edges, regardless of the method(s) by which the articles are produced.

By way of example, MAP trays have heretofore typically been made by thermoforming a sheet of substrate material into the characteristic shape of a MAP tray (i.e., usually a generally rectangular tray having rounded corners, a planar upper rim having a width of several millimeters surrounding a concavity, the depth of the concavity being typically on the order of several millimeters to several centimeters, ribs or other strengthening features shaped into the sidewalls of the concavity, and a generally flat bottom, sometimes including one or more offset portions which act as 'feet' or a pedestal upon which the tray rests when placed orifice-side-up on a horizontal planar surface, with the upper rim extending outwardly from the top of the sidewalls of the concavity). After forming the MAP tray shape into the substrate sheet, that sheet is trimmed about the periphery of the rim (e.g., using a moving blade, a perimeter-shaped blade, or a periphery-shaped-die and punch) to free it from the substrate sheet and to yield an individual tray. Many individual trays are commonly made from a single, long substrate sheet by sequentially thermoforming and trimming serial sections of the sheet. The trimming process tends to leave a sharp peripheral edge to the trimmed tray rims, sometimes having jagged or rough projections where the substrate is not fully cut, such as at blade ends or intersections. Because MAP trays are typically handled by grasping or rubbing the periphery of the MAP tray rim, and because MAP trays are frequently sealed by plastic films applied to, against, or near the MAP tray rim, the sharpness, jaggedness, or roughness of the rim periphery can damage flesh or films which contact it. If, however, the MAP tray is made by a process that includes thermoforming the substrate sheet to yield an article having the shape of the MAP tray and also including the deflectable flange described herein within and adjacent to the trimmed edge, then the peripheries of these articles can be smoothed prior to contacting them with flesh or film.

The article 100 formed using the methods described herein can have a wide variety of overall shapes and configurations, they typically being selected in view of the use to which the article is intended to be put. In addition to the MAP tray described above and in FIGS. 12-15 (and other well-known tray and container shapes for which rough or sharp edges are problematic), some further examples of generally-concave containers that can be made using the methods are illustrated in FIGS. 58-67.

Each of FIGS. 58 and 59 illustrates a concave container having a rounded square outline and an orifice 106 passing through its center. An outer rim 104 surrounds the periphery of the container and an inner rim 107 surrounds the periphery of the orifice. The top view (FIGS. 58A and 59A) looks into the interior of the compartment 105, and its floor 195 can be seen in this view. It can also be seen in the top view that the outer rim 104 has its rounded bend region 150 at the outer periphery of the article, with the adjacent extension 50 positioned toward the center, while the inner rim 107 has the reverse configuration, with its rounded bend region 150 at the inner periphery, nearest the center of the article, with its adjacent extension 50 positioned more distally from the center. (As used herein, "proximal" and "distal" locations on a deflectable flange refer to positions nearer to or farther from, respectively, the junction at which the deflectable flange is joined to the body.) The bottom view (FIGS. 58C and 59C) show the exterior surface 199 of the portion of the article that forms the floor 195 of the compartment 105, and the underside 161 of the deflectable flange 160 is visible, except where it is obscured by the rolled-over bent portion 170 and/or the peripheral flange 120. From the hidden lines in the right-side views (FIGS. 58B and 59B), it can be seen that the inner rim 107 of the container illustrated in FIG. 58 has the same height as the outer rim 104, while the height of the inner rim 107 of the container illustrated in FIG. 15B is substantially smaller than the height of its outer rim 104.

Also visible from the hidden lines in these figures is the fact that peripheral flange of the outer rim 104 of each container has been rolled inwardly under the outer rim 104, while the peripheral flange of the inner rim 107 of each container has been rolled outwardly under the inner rim 107.

Figure 60A:
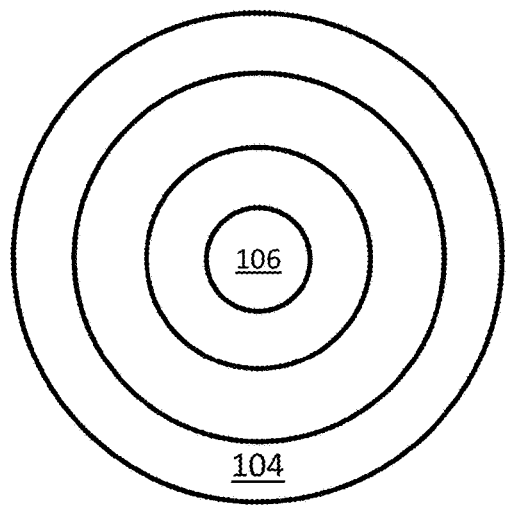
Figure 61A:
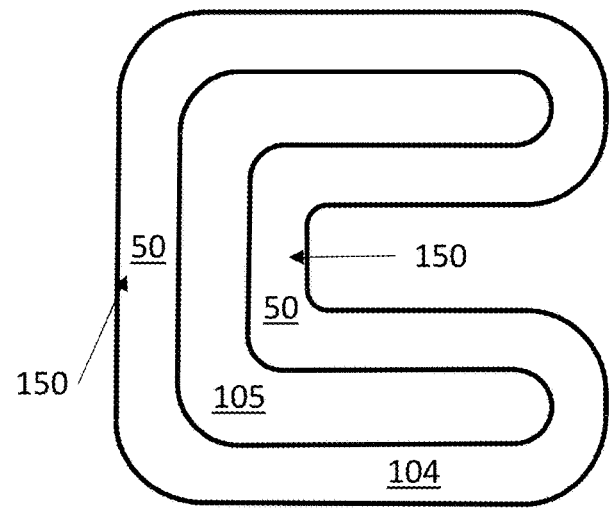
Figure 60B:
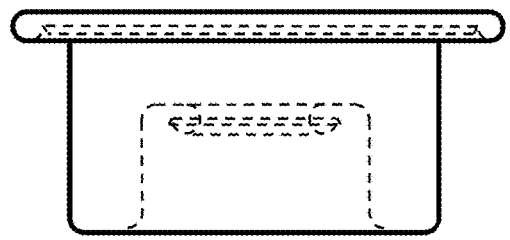
Figure 61B:
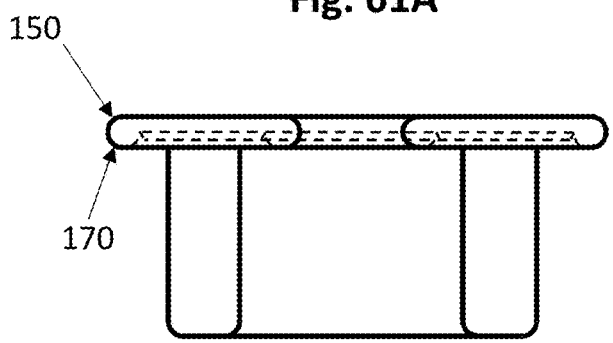
Figure 60C:
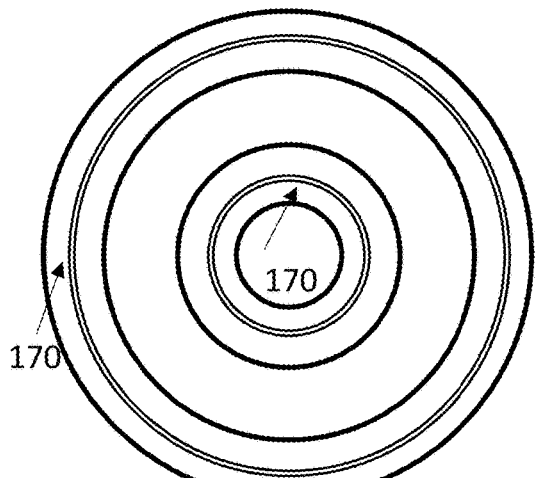
Figure 61C:
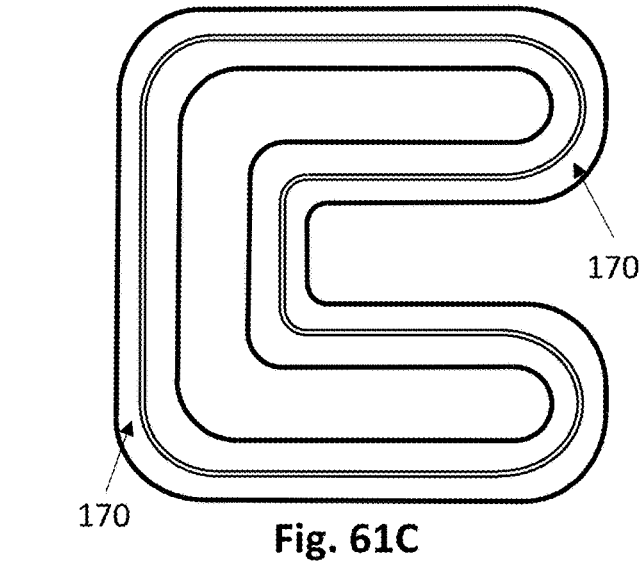

FIG. 60 illustrates another container like those shown in FIGS. 58 and 59, only having a circular overall outline, rather than a rounded square outline. FIG. 61 similarly illustrates yet another outline, this one having a "cutout" on the right side of the top view (FIG. 61A), rather than an internal orifice, yielding a "C"-shaped container having an outer rim 104 extending about its entire periphery, both on the interior and the exterior of the "C." In this container, the bend regions 150 and bent portions 170 of the deflectable flange are on the "exterior" side of the container along all edges of the outer rim 104, while the flat extension 50 is adjacent the compartment 105.

Figure 62A:
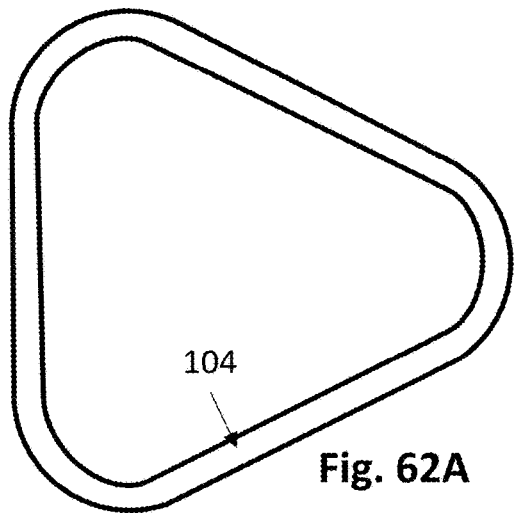
Figure 63A:
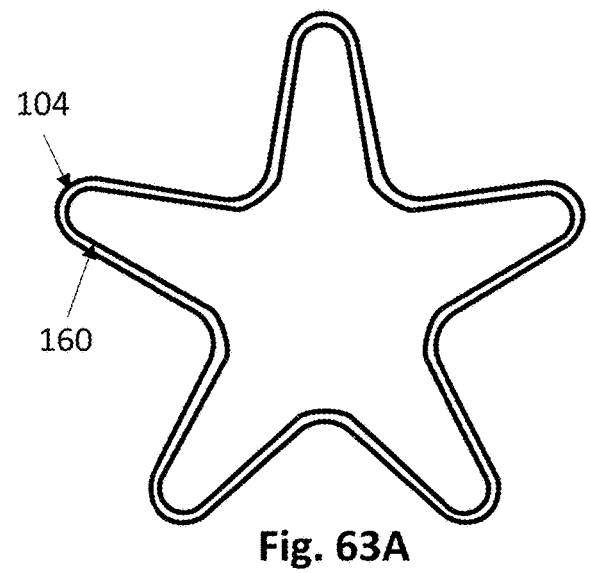
Figure 62B:
Figure 63B:
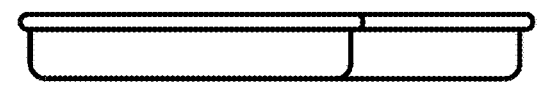
Figure 62C:
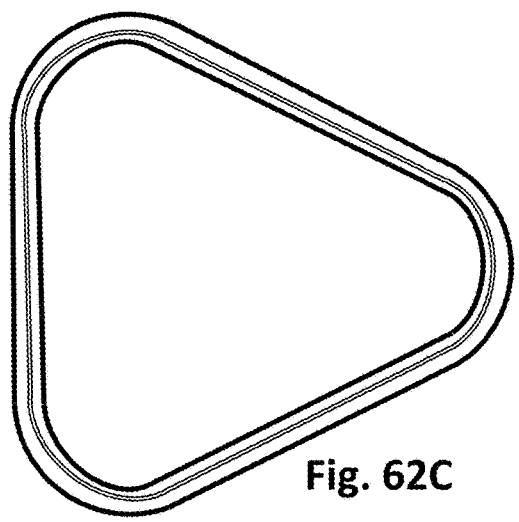
Figure 63C:
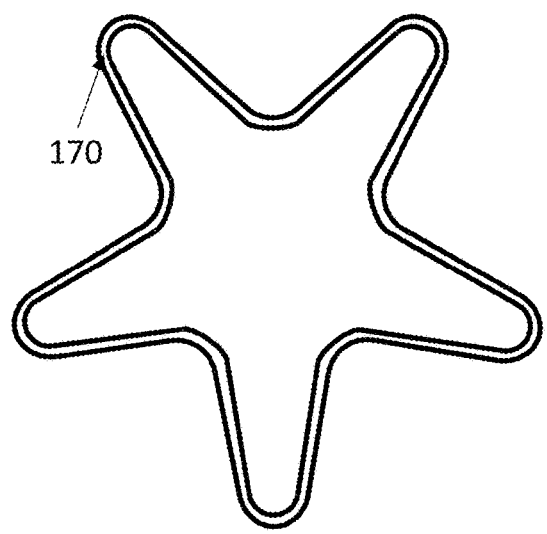

FIGS. 62 and 63 illustrate additional container outlines, namely a rounded triangle (FIG. 62) and a rounded star-like shape (FIG. 63). The container shown in FIG. 62 is otherwise like those in FIGS. 58-60, except that it includes no internal orifice within the outer rim 104. Relative to containers shown in FIGS. 58-62, the star-shaped container shown in FIG. 63 has a substantially smaller height (which may help to reduce "bunching" and "stretching" of substrate sheet material in some of the more obtuse and more acute angles of the container, and the outer rim 104 includes substantially no flat extension region, instead consisting of rounded bend region 160 and bent portion 170.

FIGS. 64 and 65 illustrate that the container may have one or more orifices 106 extending through the substrate sheet within the compartment 105 and that such orifices may, but need not, have an inner rim 107 surrounding them. The container illustrated in FIG. 64 is essentially the same as the container shown in FIG. 58, except that no inner rim 107 or corresponding interior sidewalls 18 supporting that inner rim 107 are present in the container illustrated in FIG. 64; the orifice 106 is simply a hole penetrating the compartment floor 195. The container illustrated in FIG. 65 demonstrates that the container may include both one or more orifices 106 that are surrounded by an inner rim 107 and corresponding sidewalls and one or more orifices 106 which are not surrounded by an inner rim and corresponding sidewalls (these orifices 106 are simply perforations in the compartment floor 195. Of course, combinations of the shape and features described in this section, as well as additional shapes and features that are routine in plastic bins, containers, and trays, can be incorporated by a skilled person in this field.

Figure 66A:
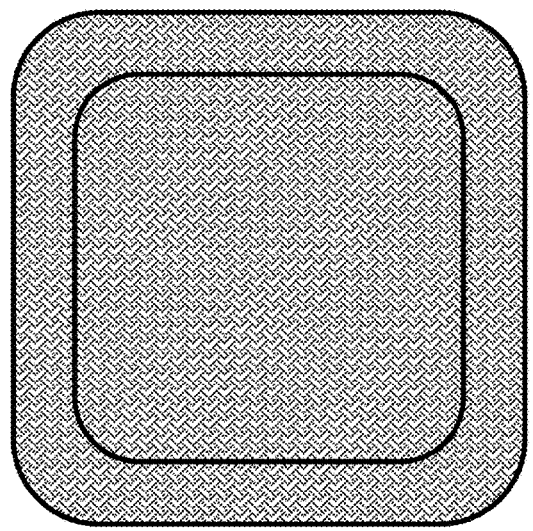
Figure 67A:
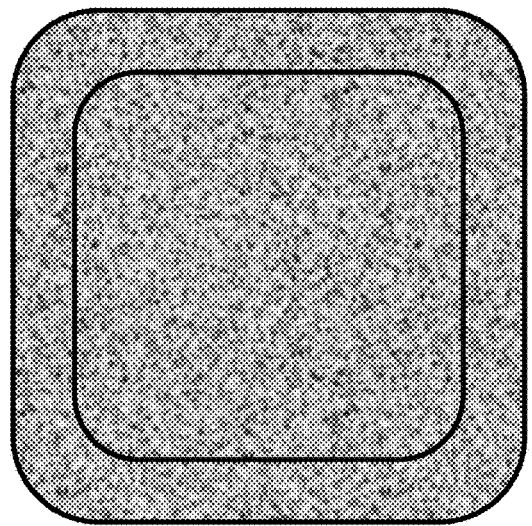
Figure 66B:
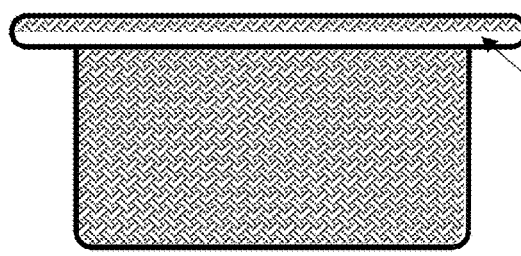
Figure 67B:
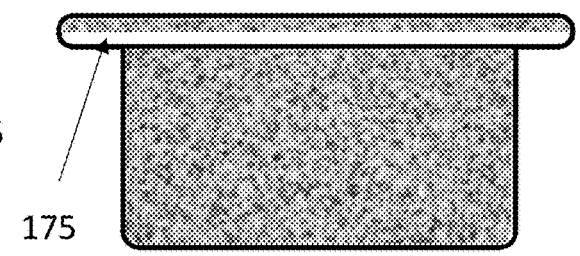
Figure 66C:
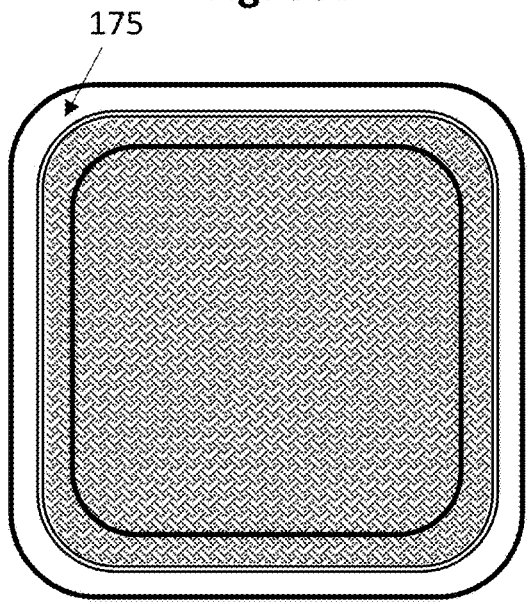
Figure 67C:
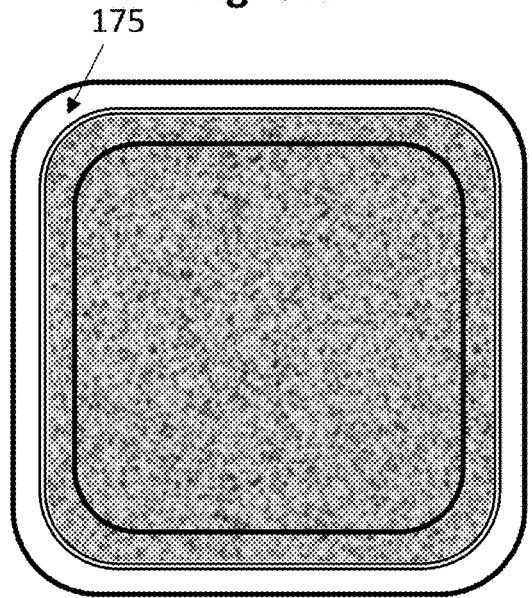

FIGS. 66 and 67 illustrate that containers described herein can be formed using a woven thermoplastic sheet (FIG. 66) or a non-woven mat of thermoplastic fibers (FIG. 67) instead of a solid sheet of thermoplastic. These figures also illustrate that if fibrous or woven materials are used, the rolled-over bent portion 170 of the deflectable flange 160 can be heated to a temperature sufficient to fuse the fibers or weave together, as illustrated by the fused portion 175 indicated by white shading in these figures. Such fusion temperatures can include, for example, temperatures above the melting point of the material, or a lower temperature at which the material does not melt, but becomes sufficiently tacky that strands urged against one another in the tackified state remain adhered when cooled to ordinary room temperature (e.g., 20 degrees Celsius). Such a fused portion 175 can both strengthen the rim thus formed and inhibit unraveling or snagging of fiber ends. Because cut edges of fibrous materials are particularly susceptible to fraying and unraveling, it is important that fibrous substrates be completely and cleanly cut (i.e., few or no non-severed fibers at the edge) and that deflectable flanges formed in fibrous substrates be deflected or curled as described herein as quickly, and with as little intermediate handling, as possible, so as to decrease the likelihood that stray fibers may deviate from the cut edge or the plane of the deflectable flange at its peripheral edge. Porous substrate sheets like those from which the articles illustrated in FIGS. 66 and 67 are made are typically not amenable to use of vacuum to draw them against mold surfaces, and will typically be sandwiched between positive and negative mold forms to achieve the desired three-dimensional shape prior to edge-cutting.

The Deflectable Flange 160

The deflectable flange 160 is a moldable or thermoformable portion of an article that can be deflected, curled, or bent to yield a smooth structure. If a peripheral edge 110 of a sheet is present at, near, or within the deflectable flange 160, then deflecting, bending, or curling the deflectable flange can displace the peripheral edge to a more desirable position (such as away from the periphery of an article) or change the orientation of the sheet at its peripheral edge in a desirable way (e.g., so that the edge of the sheet "points away" from the periphery of an article).

The deflectable flange 160 is a portion of a shaped article that is formed at or near a peripheral edge 110 of a thermoplastic sheet and that facilitates deflection of the sheet so as to dispose that peripheral edge 110 to a position at which sharpness, roughness, or irregularities of the peripheral edge 110 are less accessible to nearby surfaces, such as flesh or thin plastic sealing films. The deflectable flange 160 includes a bend region 150 that is molded, thermoformed, or otherwise controllably shaped to yield a smooth, curving surface that will normally form a part of the outer periphery 191 of an article 100 (or the inner periphery of an rim surrounding an orifice extending through the article) after the deflectable flange 160 is deflected, softened, and re-hardened. The design of the deflectable flange 160 further facilitates formation of other smoothly-curved surfaces as the bent portions 170 created upon deflection are softened and re-hardened. The deflectable flange 160 thereby facilitates formation of a smooth outer periphery 191 defined by one or more of the bend region 160, the bent portion 170, and various flat or pre-formed curved portions of the deflectable flange 160.

The deflectable flange includes a bend region 150, a peripheral edge 110, and, optionally a spacer 140 interposed between the two. When a spacer is present, the bend region forms an angle of less than 180 degrees between the body 10 and the spacer 140 and functions as a flexible 'hinge' at which the spacer region can be displaced relative to the body. The angle formed by the bend region (i.e., the angle designated A in FIG. 1) is preferably about ninety degrees (i.e., approximately a right angle, meaning not less than 75 nor more than 105 degrees, more preferably not less than 85 nor more than 100 degrees, still more preferably not less than 87 nor more than 93 degrees, and most preferably about 92 degrees) prior to deflection of portions of the flange. These elements of the deflectable flange, and their relative arrangements, are generated when the deflectable flange is generated on the article (typically simultaneously with generation of the shaped body 10 of the article, such as by thermoforming). In a very simple embodiment, the deflectable flange 160, a first portion (i.e., an end proximal to the body and junction) of the bend region 150 is connected directly (at junction 162, such as a smooth or sharp, right-angle turn) to a sidewall 19 of the article and bears the peripheral edge 110 at a second portion (i.e., an end of the bend region distal from the body and junction), and smoothly curves through an angle A of about 90 degrees (i.e., 75-135 degrees, preferably about 85-105, and more preferably 90-95 degrees). In more complicated embodiments, the extension 50, spacer 140, elbow 130, peripheral flange 120, or other elements can be incorporated into the deflectable flange 160, as described herein.

When the angle A is less than 90 degrees and the body 10 and deflectable flange 160 are shaped by thermoforming, it can be difficult to remove the thermoformed article from the thermoforming mold (i.e., because the portion of the mold nearest the extension between the spacer and the body can be broader than the width between the body and the spacer nearer to the peripheral edge, meaning that the thermoformed article will 'grip' the mold and must be pulled or expanded to displace it from the mold). Thus, it is preferable that the angle formed by the bend region is 90 degrees or greater (e.g., 91, 92, 93, 94, or 95 degrees) to ease separation of the thermoformed article and the mold, but the angle can be smaller if the body of the article recedes away from the periphery, for example. Less preferably, an angle of 110, 115, 120, 125, 130, or 135 degrees can be employed, but such articles may require application of both an upper body 200 to reduce the angle near to 90 degrees prior to impacting the deflectable flange against the ram 300. As this angle increases, the amount of thermoplastic that is present at exterior corners (e.g., the four corners of the tray shown in FIGS. 12A and 12B) of the thermoformed precursor article increases and can interfere with bending (i.e., "rolling-over"). This thermoplastic material can be accommodated, for example, by permitting the spacer to 'bow out' above the ram (or into a space built into the upper surface of the ram) at sections where the material occurs.

Upon sufficient displacement of the spacer, the bend region forms the periphery of the article (i.e., when the spacer is bent "under" the connected portion of the body, regardless of orientation relative to gravity). Thus, the bend region will normally form the smooth periphery of the article that is desired in one embodiment. The spacer nonetheless forms a part of the periphery of the article in this embodiment (normally the "underside" of the periphery, relative to the article 100, with the underside 161 of the deflectable flange 160 being contained within the curvature of the rolled-over edge). For this reason, portions of the spacer (potentially including the elbow 130 and the peripheral flange 120) that are reasonably accessible to a film or other material pressed against the exterior of the article (e.g., against the underside of its periphery) should preferably be smooth as well. This can be achieved by both inducing bending in the bend region 150 and also inducing bending in other (e.g., adjacent) portions of the deflectable flange 160, such as bending in the extension 50 and/or bending in the spacer 140. In one embodiment, for example, a substantially flat extension 50 can exhibit increasing curvature near and at its boundary with the bend region 150, and the spacer 140 can also exhibit curvature near its boundary with the bend region 150, even if the spacer 140 is substantially flat near the elbow 130.

In formation of the shaped articles with a smooth periphery described herein, deflection of the spacer (and/or other portions) of the deflectable flange induces bending within the bend region, within the spacer, or both. The angular shape of the bend region both controls the location of that bending and the smoothness of the resulting edge. As illustrated in FIGS. 1-4 and 17-34, it can be beneficial if the angular portion of the bend region is not formed as a sharp (i.e., bi-linear) angle, but is instead formed as flat portions (e.g., an extension 50 and a spacer 140) arranged at an angle to one another, with a curved portion (e.g., defined by a radius of curvature, such as a radius of 1, 2, or 3 or more millimeters) connecting the flat portions. Flexing of a curved angular portion will tend to yield a smoother, less film-damaging edge than flexing of a sharply angled portion. As illustrated in FIGS. 1-4, 7-11, and 16-34, the boundary between the bend region 150 and the spacer 140 may be substantially indistinguishable in practice, and flexion of the spacer 140, at least at its extent nearest the bend region 150 is expected in the embodiments shown. As illustrated in FIGS. 17-34 especially, bending of multiple portions, including the peripheral-most portion(s), of the spacer 140 can desirably impart a smooth periphery to the articles prepared as described herein.

In one embodiment (shown in FIGS. 1-4), the deflectable flange 160 includes at least three portions, including the bend region 150, a peripheral flange 120, and an elbow 130 positioned therebetween. The bend region 150 is connected to the remainder of the article 100, optionally by way of an extension 50. The peripheral flange 120 is connected to the bend region 150 by way of the elbow 130, optionally with a spacer 140 interposed between the bend region 150 and the elbow 130. A prototypical deflectable flange 160 having each of these portions is illustrated (attached to the body 10 of an article 100) in FIG. 1.

FIG. 1 illustrates a sectional view of a thermoplastic article 100 having a deflectable flange 160 formed at an edge thereof. The deflectable flange 160 in this embodiment includes an extension 50, a bend region 150, a spacer 140, and a peripheral flange 120. The extension 50 connects the shaped body 10 of the article 100 (the shape in this embodiment defining a compartment 105) to the bend region 150 of the deflectable flange 160. A spacer 140 is interposed between the bend region 150 and the peripheral flange 120. The peripheral flange 120 is connected to the spacer 140 by way of an elbow 130, which is shown as a right-angle (i.e., the angle designated F) bend in this embodiment. The bend region 150 connects the extension 50 and the spacer 140 at an approximately right angle (the angle designated A). The peripheral flange 120 terminates at the peripheral edge 110 of the thermoplastic material (represented by a thick solid line in this figure) of which the article 100 is formed.

In this embodiment, the bend region 150 is situated anti-peripherally (nearer the body 10) than at least the peripheral-most portion of the peripheral flange 120. The function of the bend region 150 is to deflect when the peripheral flange 120 is deflected inwardly (i.e., anti-peripherally, such as by pressing the periphery of the article against a solid object). Deflection of the bend region provides a smooth surface because the peripheral edge 110 of the thermoplastic sheet is not located within the bend region; it is located on the peripheral flange 120. The angle formed by the bend region (for example, approximately 90 degrees over the bend region 150 shown in FIG. 1) is not critical, and can be selected for ease of manufacture. It can, for example, be an obtuse angle, a right angle, or even an acute angle. When this angle is an acute angle, it can be difficult to remove the thermoformed (pre-roll-over) article from its thermoforming mold (because the peripheral portion of the spacer must be deflected to remove the article from the mold), and acute angles are disfavored for that reason (even though such articles can still be made). The radius of curvature of the bend region 150 is also not critical, although it is preferably substantially greater than the radius of curvature of the elbow 130.

The bend region 150 preferably has the conformation of a smooth curve, as shown in FIG. 1, with a substantial radius of curvature (e.g., 0.5 millimeters to several millimeters or more), so that inward deflection of the deflectable flange 160 yields a smooth periphery to the article. However, it is critical that the bend region 150 simply not be sharp or pointed; a non-sharp crease can suffice, for example. Fragile materials, such as thin plastic films or animal skin, which contact that smooth periphery are less likely to be damaged than when the same fragile materials contact the peripheral edge 110 of the thermoplastic sheet.

The bend region 150 can be connected with the remainder of the article 100 by way of an extension 50. The extension 50 can be discretely discernible from the bend region 150 (e.g., a flat region distinct from a curved bend region 150) or substantially indistinguishable (e.g., a slightly curved region not readily distinguished from the curvature of the bend region 150). The dimensions of the extension region are not critical; it can range from non-existent (i.e., the bend region 150 commences at the edge of a body 10 of the article 100), to a fraction of a millimeter, to several millimeters or longer. One function of the extension 50 is to separate the bend region 150 (at which sheet-softening heat is applied in some embodiments) from other portions of the article 100 at which potential heat-induced deformation is undesirable. Another function of the extension 50 can be to provide a functional surface to the article 100, such as a surface adjacent the bend region 150 at which a thin plastic film (which can be pressed against the bend region 150 with little danger of damage to the film) can be adhered to or fused with the article 100 (e.g., to cover a cavity formed in the article that is bordered by the deflectable flange 160 of which the extension 50 is part). The extension 50 can also serve a structural function, such as providing support or rigidity to a section of the article (e.g., by forming a relatively rigid "rim" about a cavity in a container to inhibit flexing of the container while lidding is applied). Yet another function of the extension 50 can be to provide a space which the deflectable flange 160 can occupy when it is deflected anti-peripherally. Because the extension 50 and the peripheral flange 120 are situated on opposite sides of the bend region 150, sufficient flexing of the bend region 150 (e.g., upon insertion of the article 100 within the upper body 200 and insertion of the ram 300 behind the article), the spacer 140, or both, can cause the peripheral flange 120 (and the spacer 140) to approach, or even contact, the extension 50, or to curl or deflect beneath the extension 50 between the periphery of the article and a sidewall of the body of the article (see, e.g., FIG. 15).

Figure 2:
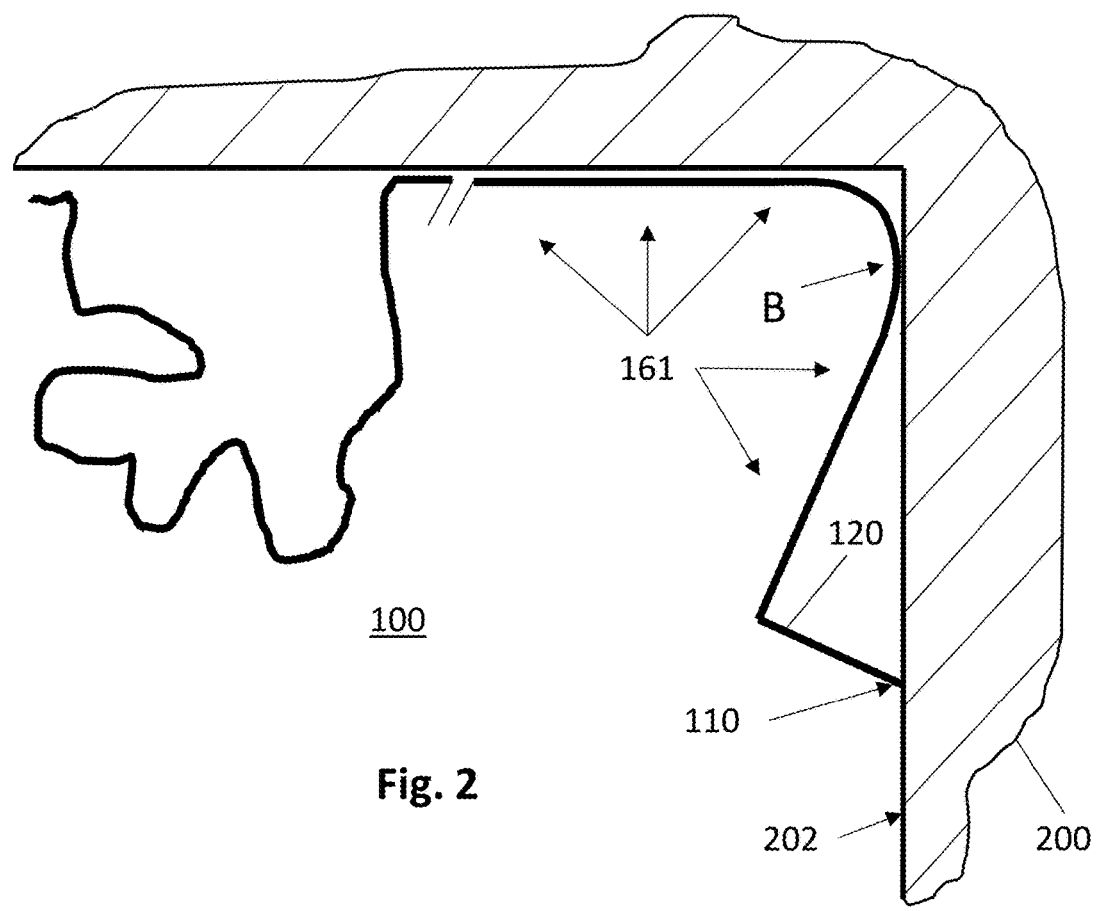

In FIG. 1, the peripheral flange 120 includes the (potentially sharp) peripheral edge 110 of the thermoplastic sheet(s) from which the article is formed. It extends peripherally beyond the bend region 150, so that it will impinge upon the inner surface 202 of the upper body 200 when the article is inserted into the cavity of the upper body 200, as shown in FIG. 2. The peripheral flange 120 extends from the elbow 130 to that peripheral edge 110 and extends in a direction from the bend region 150 or the spacer 140, if present, at an angle defined by the elbow 130. The function of the peripheral flange 120 is to engage with (i.e., impinge upon or be impinged upon by) the inner surface 202 of the upper body 200 when the article is inserted into the cavity of the upper body 200, thereby causing the deflectable flange 160 to deflect inwardly (anti-peripherally). In addition to displacing the peripheral edge 110 of the sheet anti-peripherally and causing flexing or bending of the deflectable flange 160 in the bend region 150 or other portions thereof, this deflection also positions the peripheral flange 120 to be further anti-peripherally deflected when the ram 300 is inserted into the cavity behind the article 100. When the ram 300 is so inserted, it impinges upon the peripheral flange 120 and, upon further advancement of the ram into the cavity, causes both additional flexing or bending of the deflectable flange 160, and additional anti-peripheral deflection of the peripheral edge 110.

The length (elbow-to-peripheral-edge) of the peripheral flange 120 is not critical, but should be selected to facilitate engagement of the ram 300 by the peripheral flange 120 and displacement of the peripheral flange 120 by the ram 300 as the ram advances within the interior of the upper body 200. Frequently, the length of the peripheral flange 120 is influenced, at least in part, by the ability to cut articles from a material in which the article is formed. The elbow 130 can function, in part, to position the thermoplastic sheet at a location at which it can be conveniently cut to free the shaped article from a precursor sheet. Because the peripheral edge 110 formed by such cutting is a source of sharpness or roughness at the periphery of the article prior to 'rolling over' the deflectable flange 160, it can be beneficial to cut the sheet as near to the elbow 130 as possible (i.e., to make peripheral flange 120 as small as possible) so as to reduce the bulk of thermoplastic material that must be displaced in order to displace the sharp or rough peripheral edge 110 from the periphery of the article. As illustrated, for example, in FIG. 25A, a larger peripheral flange also reduces contact (and increases spacing) between the upper surface of a ram which impinges the deflectable flange, and therefore reduces heat transfer from the ram to peripheral portions of the deflectable flange. Because the methods described herein depend upon heating those portions above their glass transition temperature, deflecting them to a desired conformation, and then cooling the portions below that temperature, larger peripheral flanges increase the heat input and/or time required for such processing and are disfavored for that reason as well.

The elbow 130 is interposed between the bend region 150 and the peripheral flange 120, and its function is to connect and transfer forces between them. That is, compressive forces applied to the peripheral flange 120 by impingement thereupon by the upper body 200 or the ram 300 are translated through the elbow 130 (and the spacer 140, if present) to torsional force applied to the bend region 150. This translation of compressive force to torsional force ensures that the bend region 150, the spacer 140, or both flex when force is applied to the peripheral flange 120. Thus, application of force to the peripheral flange 120 by the upper body 200 and/or ram 300 both deflects the peripheral edge 110 anti-peripherally (i.e., displacing the potentially sharp edge away from the periphery of the article) and induces bending of the bend region 150, the spacer 140, or both (i.e., yielding a smooth periphery formed by flexed thermoplastic sheet at the periphery of the article), yielding an article which has a smooth periphery, even if the article was formed by a process that yields a sharp peripheral edge at an intermediate step. In effect, the elbow causes forces applied to the peripheral flange 120 to induce the deflectable flange 160 to "roll over" the periphery of the article, effectively "hiding" the sharp edge of the thermoplastic sheet from materials at the periphery of the article.

A spacer 140 can be interposed between the bend region 150 and the elbow 130. The spacer 140 can be discretely discernible from the bend region 150 (e.g., a flat region distinct from a curved bend region 150) or substantially indistinguishable (e.g., a slightly curved region not readily distinguished from the curvature of the bend region 150). The dimensions of the extension region are not critical; it can range from non-existent (i.e., the bend region 150 commences at the elbow 130), to a fraction of a millimeter, to a few millimeters or longer. One function of the spacer 140, if present, is to act as a 'lever' by which force applied at the elbow 130 (e.g., by impingement between the peripheral flange 120 and one or both of the upper body 200 and the ram 300) is transmitted to the bend region 150. Another function of the spacer 140, if present, can be to position the peripheral flange 120 suitably to engage one or both of the upper body 200 and the ram 300. Yet another function of the spacer 140, if present, is to increase the distance by which the potentially sharp peripheral edge 110 of the thermoplastic sheet can be displaced anti-peripherally from the periphery of the article upon flexing of the bend region 150. All else being equal, the longer the spacer 140 is, the farther from the article's periphery that potentially sharp edge will be when the article is made as described herein. A deflectable flange including the spacer 140, but lacking the elbow 130 and peripheral flange 120 can be used, as shown for example in FIGS. 17A-17C and 21.

A longer spacer 140 facilitates formation of one or more portions of the "rolled edge" that is taller than other "rolled" portions of the edge, yielding a structure useful as a stacking lug (e.g., to facilitate selectable spacing between the rolled edges of adjacent nested, stacked articles). In one embodiment, the size of the spacer and the compressive force applied to the spacer (i.e., the force transmitted to the spacer from the extension region, balanced by resistive force applied to the spacer on account of its impingement upon the ram) can cause the spacer to flex outwardly (i.e., peripherally away from the body of the article), forming a smooth bulge that, upon cooling, forms the outer periphery of the article.

Regardless of whether the bend region 150, the spacer 140, or both are bent in the operations described herein, and further regardless of whether material that was originally part of the bend region 150, the spacer 140, or both ultimately form the outer periphery of the articles described herein, what is important is that that outer periphery be free (or, less favorably, substantially free) of sharp, pointed, rough, or abrasive edges that might damage thin plastic films, human tissues, or other fragile materials which might contact that outer periphery.

The Junction 162

The deflectable flange 160 is connected to the body 10 of the article 100 by way of a junction 162. The junction can be a sharp corner, setting off the deflectable flange 160 from the body 10 (e.g., from an outer sidewall 19 of the body 10) at an approximately right angle. More preferably, the junction 162 is a smoothly curving portion of the substrate sheet 101 that connects the deflectable flange 160 with the body 10. In situations in which it is anticipated that the junction 162 will be positioned on an article 100 at a position at which potential sharpness of the junction is relevant (e.g., at a position at which flesh or film is anticipated to contact the finished article), selecting a smooth or rounded conformation for the junction (see, e.g., FIGS. 32B and 46F) is preferred. Smooth, rounded junctions can also be simpler to reproducibly form in thermoforming operations.

In practice, it will often make little or no difference whether a portion of an article described herein is considered part of the body 10, the junction 162, or the deflectable flange 160, especially since all three elements will typically be embodied in a single piece of shaped- or molded-substrate sheet material. For example, when it is present, the extension 50 serves to position the bend region 150 of the deflectable flange 160 at a distance from the body 10 (e.g., to permit the flange to be "rolled under" the extension 50 while still outside the compartment defined by the body 10 (see, e.g., the articles illustrated in FIGS. 49, 68D, and 69E and the process illustrated in FIGS. 46A-46F); in these embodiments, it makes essentially no difference whether the extension 50 is considered to be part of the body 10, part of the deflectable flange 160, or part of the junction 162 between the two. In other embodiments (see, e.g., the process illustrated in FIGS. 17A-17C), the structure of the junction 162 can have a role, predictable to a skilled person in this field, in transmitting forces between the body 10 and the deflectable flange 160, and a structure suitable for such transmission should be selected. The structure of the junction 162 can also be influenced by aesthetic and article-use issues unrelated to the edge-smoothing process described herein; for example, a sharp-edged or smooth junction 162 may be considered to render the resulting article visually appealing.

The Smoothing Method

The periphery of a thermoplastic article—particularly one formed from a bent or shaped sheet of a thermoplastic material—can be smoothed by a process that includes forming a deflectable flange near the periphery of the edge to be smoothed (usually during forming of other portions of the article, such as its body), deflecting the flange to displace the edge from the periphery of the article (whereby a portion of the flange becomes bent, this portion referred to herein as the "bent portion"), softening the bent portion at least while the flange is in the deflected position, and re-hardening the bent portion while the flange is in the deflected position. This process is illustrated in FIGS. 1-4.

The portion of the deflectable flange 160 that can be softened and bent can be the bend region 150 or, preferably, a portion of the deflectable flange distal to the bend region 150, but proximal to the peripheral edge 110. By way of example, softening the spacer 140 permits its peripheral portion, including the elbow 130, peripheral flange 120 (if these two elements are present), and peripheral edge 110 to be bent inwardly (i.e., toward the body 10 of the article 100) sufficiently to displace the peripheral edge 110 away from the periphery 191 of the article. Moreover, softening some or all of the peripheral edge 110, the peripheral flange 120, the elbow 130, and the spacer 140 facilitates both deflection and smoothing of the periphery of the resulting article, in several ways. The peripheral edge 110 can be smoothed by the molding or sculpting effect that results from impact between the upper body 200 or ram 300 upon the softened peripheral edge 110, and particularly between them and softened sharp or rough portions of the peripheral edge 110. Softening and deflecting the substrate material immediately adjacent the peripheral edge 110 (e.g., the adjacent portion of the spacer 140 or of the peripheral flange 120, if present) can "point" the peripheral edge 110 (or sharp or rough edges of it) in a direction or move the peripheral edge 110 to a position at which it is less likely to damage film or flesh. Softening the elbow can permit deflection of the peripheral flange 120, relative to the spacer 140 (i.e., change the angle 'F' in FIG. 1). Softening and deflecting the spacer 140 permits the position and orientation of the peripheral edge 110 to be altered, whether or not any other portion of the deflectable flange 160 is softened and/or deflected.

In many instances, it will not be desirable to soften either the bend region 150 or the extension 50, because these portions of the deflectable flange are ordinarily formed or molded to provide smooth "top" and/or "side" portions to the periphery 191 (this is a function of the bend region 150) and to position the smooth periphery a selected distance (this is a function of the extension 50) from the article's body 10. Furthermore, simultaneously softening and deflecting both the bend region 150 and the spacer 140 can result in an undesirable flattening of the deflectable flange, potentially yielding a sharply-creased article periphery. Nonetheless, even though not preferred, softening and deflection of the bend region 150 and/or the extension 50 can be effected as part of the edge-smoothing process, particularly if care is taken to prevent flattening (e.g., by supporting one or more portions of the softened deflectable flange during deflection).

Preferably, at least a portion of the spacer 140 is softened and bent sufficiently that the peripheral edge 110 is "rolled over," such that the peripheral edge 110 is positioned such that a film that overwraps the article or that is draped across the article does not contact the peripheral edge 110, even if pulled taut. Still more preferably, the deflectable flange 160 is rolled over sufficiently that the peripheral edge 110 is visually obscured by the spacer 140 or the bend region 150 such that the peripheral edge 110 cannot be seen when the article 100 is viewed horizontally from it periphery (i.e., from its peripheral side). Also preferably, the deflectable flange 160 is rolled over sufficiently that the peripheral edge 110 "points" toward the body 10 or toward the underside of a portion of the deflectable flange 160, meaning that the plane of the deflectable flange at the portion including its peripheral edge 110 intersects the body 10, including the underside 161 of the peripheral edge. When the plane of the deflectable flange at its edge including the peripheral edge 110 does not point at the body 10 (see, e.g., offset angle OA in FIG. 19, which has a magnitude of about 230 degrees; angle OA has a magnitude of 180 degrees when the deflectable flange points "directly at" {i.e., its extension perpendicularly intersects} the nearest sidewall of the body, horizontal in this FIG. 19) or the underside 161 (see, e.g., offset angle OA in FIG. 20, which has a magnitude of about 290 degrees), then that peripheral edge should at least be displaced far enough from the periphery of the article 100 (see, e.g., offset angle OA in FIG. 18, which has a magnitude of about 105 degrees) or rolled over sufficiently to obscure the peripheral edge 110 by one or more portions of the deflectable flange 160. The "plane of the deflectable flange at its peripheral edge" has its ordinary meaning: the planar extension of the flange; an imaginary 'tangential' plane having the same slope as does the deflectable flange at this edge.

When a peripheral flange 120 is present, the desirable degree of edge displacement ("edge-rolling") can be assessed either by measuring the offset angle OA using a plane that extends through the peripheral edge 110 and the portion of the deflectable flange immediately adjacent to it or by measuring the offset angle OA using a plane that extends through the elbow 130 and the portion of the deflectable flange 160 immediately proximal to it, relative to the body (that portion will normally be either the spacer 140, if present, or the bend region 150), as illustrated in FIGS. 26-28 (showing offset angles OA of 105, 230, and 290 degrees, respectively). Which measure should be used to assess OA can be determined by the circumstances of the article and its intended use. Desirable values of the offset angle OA will ordinarily be obvious to and readily selectable by a skilled person, in view of the intended use and construction of the article and the hazards that the peripheral edge may present in such uses. Generally speaking, the greater the hazard the edge presents, the more likely it will be desirable to displace it away from the periphery of the article, tightly against the body of the article, against a face of the deflectable flange, inaccessibly disposed between the body and the deflectable flange (e.g., where it cannot be contacted by a finger inserted between the body and the deflected flange), or enclosed with the interior of a curled deflected flange.

In situations in which the peripheral edge 110 will be positioned where a fragile tissue, film, or other article may contact it, the orientation of the peripheral edge 110 will ordinarily be important (contacting a sharply-pointed edge will tend to cause more damage if the contact occurs against the flat surface including the edge than if the contact occurs directly against the tip of the pointed edge), and OA should be assessed using the plane passing through the peripheral edge 110 and the portion of the peripheral flange immediately adjacent it. On the other hand, when the degree of curling of the peripheral flange will determine the accessibility of the peripheral edge 110 situated on a peripheral flange 120 (e.g., when the peripheral edge 110 and peripheral flange 120 are positioned within the interior of a rolled over deflectable flange) the precise orientation of the peripheral edge 110 may be less important than the degree to which that peripheral flange 120 and edge are curled under (or even within) the more portions of the deflectable flange that are more proximal to the body 10; in these situations, it is more sensible to assess OA using the plane passing through the elbow 130 and the portion of the deflectable flange immediately proximal to it.

FIG. 1 illustrates a thermoplastic article 100 having a body 10 (with, in this figure, an irregular shape defining a compartment 105) and a deflectable flange 160 connected with the body 10. The deflectable flange includes a peripheral flange 120 which includes a peripheral edge 110 of the thermoplastic sheet from which the article 100 is formed. The deflectable flange also includes a bend region 150 interposed between the body 10 of the article 100 and the peripheral flange 120. The bend region 150 is separated from the body 10 by an extension 50, which is simply a flat portion of the thermoplastic sheet in this embodiment. The peripheral flange 120 is similarly separated from the bend region by a flat portion of the thermoplastic sheet designated the spacer 140 in this embodiment. The peripheral flange 120 is connected to the remainder of the deflectable flange by an elbow 130 which, in this embodiment, is a portion of the thermoplastic sheet formed into a right angle. The peripheral edge 110 is positioned at the periphery of the article, as can be seen by its position at the far right in the figure.

FIG. 1 is a cross-section of such an article 100, in which the solid black line represents the cross-section of the thermoplastic sheet from which it is formed. The peripheral edge 110 forms the periphery of the article 100 because no other portion of the article 100 extends farther to the right (in this figure), the spacer 140 and the other portions of the peripheral flange 120 being nearer to the body 10 than the peripheral edge 110 of the sheet. Thus, if an object were urged against the right side (in FIG. 1) of article 100, the object would tend to contact peripheral edge 110 and the sharpness of that peripheral edge 110 could affect the object, such as by cutting, damaging, or injuring the object.

FIG. 2 illustrates the thermoplastic article 100 inserted within the interior of an upper body 200, which is shown as a broken-away portion (indicated by the rough line). In this embodiment, impingement of the peripheral edge 110 of peripheral flange 120 upon the inner surface 202 of the upper body 200 causes the deflectable flange 160 to defect, owing to bending of the deflectable flange 160 at one or more points B within the bend region 150. In this embodiment, the spacer 140 extends away from the same face of the extension 50 as that away from which the shaped body 10 extends (i.e., the cis face of the outer rim of the article), meaning that the underside 161 of the deflectable flange is urged toward itself (i.e., angle A decreases) as the article 100 is inserted into the upper body 200.

In FIG. 2, the thermoplastic article 100 is inserted within an interior cavity of an upper body 200. The inner surface 202 of the upper body impinges upon the peripheral flange 120, deflecting it inwardly (i.e., anti-peripherally) toward the body 10 of the article 100. In this embodiment, both the peripheral edge 110 of the thermoplastic sheet from which the article 100 is formed and the peripheral-most portion of the bend region 150 are positioned about equally peripherally from the body 10. Preferably, the deflectable flange 160 is deflected inwardly sufficiently far that the peripheral edge 110 of the thermoplastic sheet is contained within the interior cavity of the upper body 200. In this embodiment, the spacer 140 is essentially rigid and substantially all bending occurs within the bend region 150. If heat sufficient to soften the thermoplastic sheet is applied to the bend region 150 (at approximately the location identified as "B" in FIG. 2) and the sheet is subsequently cooled (preferably below its glass transition temperature), then the deflectable flange 160 will retain the configuration shown in FIG. 2 (i.e., deflected relative to its initial conformation shown in FIG. 1 on account of impingement of the peripheral edge 110 against the inner surface 202 of the upper body 200) even after upper body 200 is separated from the article 100. In this deflected conformation, the peripheral edge 110 does not extend peripherally beyond the rounded bend region 150, and the resulting article will be more suitable for sealing with a thin plastic film applied to extension 50 and bend region 150 than was the original, pre-deformation article shown in FIG. 1 (i.e., on account of the protuberance of potentially sharp peripheral edge 110 beyond the periphery of bend region 150, at which position the peripheral edge 110 might readily snag, abrade, or cut the film).

Figure 3:
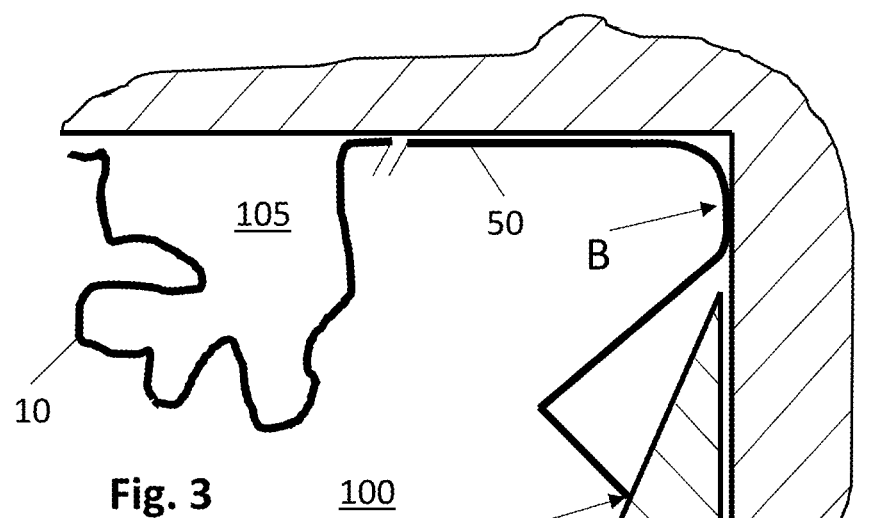
Figure 4:
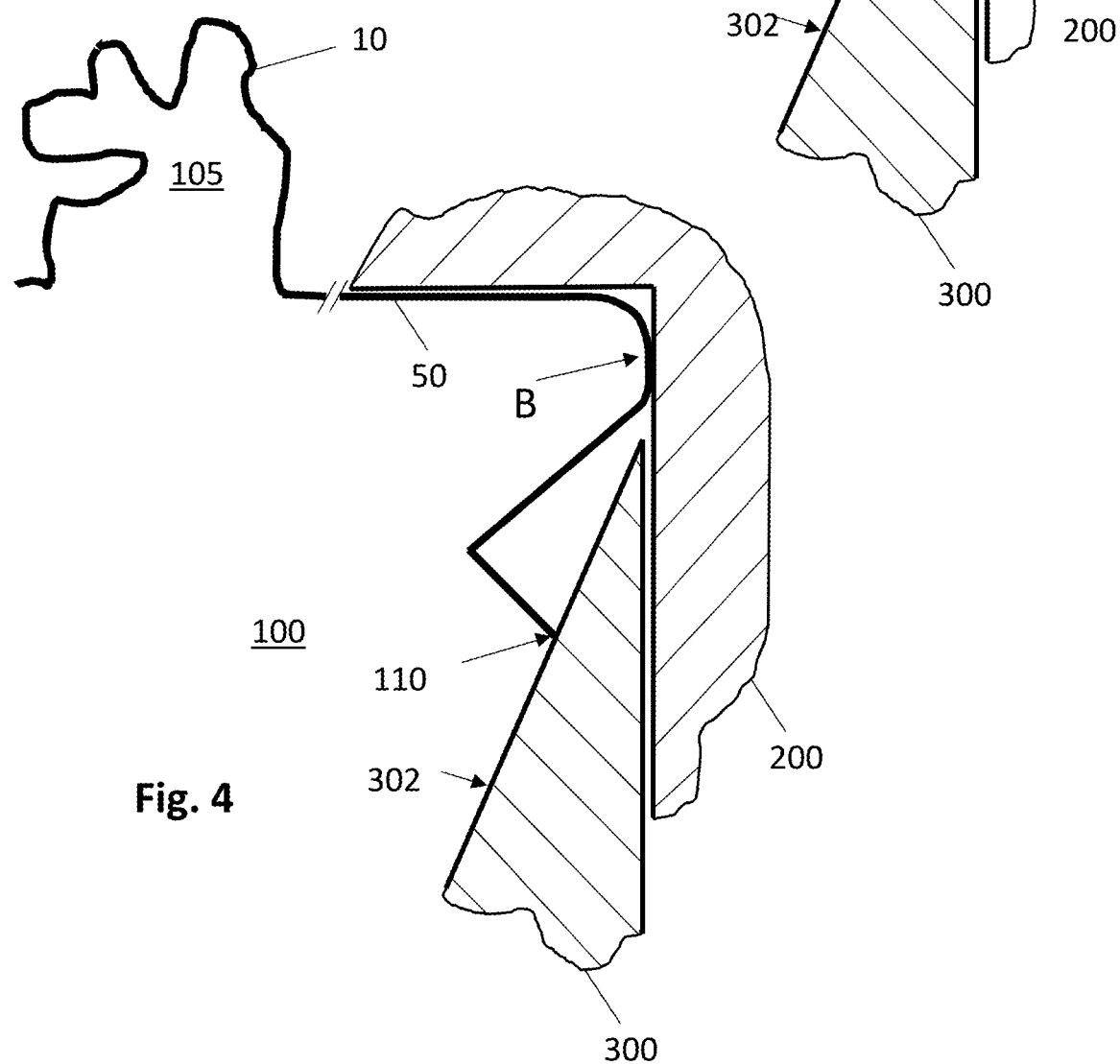

FIGS. 3 and 4 illustrate the outcome of inserting ram 300 (only a broken-away portion shown, as indicated by the rough line) into the interior of the upper body 200 behind the thermoplastic article 100 (i.e., when the ram 300 is inserted into the structures illustrated in FIG. 2) for two different embodiments. The ram 300 is closely opposed against the inner surface 202 of the upper body 200 and the peripheral edge 110 of peripheral flange 120 impinges upon the upper face 302 of the ram 300, causing even greater deflection of the deflectable flange 160 and yielding a rounded periphery to article 100 at the point(s) B at which bending is induced within the bend region 150. In the embodiment shown in FIG. 3, the deflectable flange extends away from the same face (the "cis" face) of the extension 50 as does the article body 10, yielding an article in which the rim is turned or rolled away from the surface of the rim in the same direction as a compartment 105 formed in the body 10. In the embodiment shown in FIG. 4, the deflectable flange extends away from the opposite face (the "trans" face) of the extension 50 as the article body 10, yielding an article in which the rim is turned or rolled away from the surface of the rim in the opposite direction as the compartment 105.

FIG. 3 illustrates an optional, but preferable step in which a ram 300 is inserted within the cavity in the upper body 200 behind the article 100 (i.e., sandwiching at least the deflectable flange 160 between the upper body 200 and the ram 300). This step further deflects (relative to the embodiment show in FIG. 2) the deflectable flange 160 towards the body 10 of the article 100, thereby displacing the (potentially sharp) peripheral edge 110 of the thermoplastic sheet further from the periphery of the article (i.e., farther from inner surface 202 of the upper body 200). Heating the bend region 150 of the deflectable flange 160 sufficiently to at least soften it while it is in the conformation shown in FIG. 3 and subsequently cooling it below its glass transition temperature will 'freeze' the deflectable flange in the conformation shown. In this conformation, the sharp peripheral edge 110 of the sheet from which the article is formed is 'tucked' under other portions (e.g., the bend region 150 and the extension 50, if present) of the deflectable flange 160, and is consequently less accessible to objects contacting the periphery of the article (and less liable to tear, cut, or injure materials which contact the periphery of the article). For example, if a thin plastic film is applied to extension 50 and bend region 150, then the film is even less likely to be snagged, abraded, or cut by the potentially sharp peripheral edge 110 in this embodiment than it was in the embodiment shown in FIG. 2. From this progression (i.e., greater deflection in FIG. 3 than in FIG. 1 and FIG. 1), it can be seen that the more the peripheral edge 110 is deflected away from the periphery of portions of the article to which a sealing film is applied, the less likely damage to the film from the edge becomes, despite the fact that the peripheral edge 110 still extends peripherally away from the body 10 of the article. This is an example in which the position of the peripheral edge 110 is likely more important than its orientation. If the article is to be sealed with a plastic film stretched tautly across the top of compartment 105 and pulled straight down the side (i.e., at approximately the location of the intersection between the upper body 200 and the ram 300 in FIG. 3), it can be expected that the peripheral edge 110 will not contact the film. By contrast, if the article is to be tautly wrapped in such a film, the portion of the film that overwraps the peripheral edge 110 can be expected to directly impinge upon that edge, making the article having the shape shown in FIG. 3 inappropriate for such overwrapping. FIG. 4 shows the same operation performed upon an article in which the deflectable flange is formed and deflected on the "trans" face of the extension 50.

The ram 300 and the upper body 200 each serve the purpose of deflecting the deflectable flange by impacting upon or against it. These two items are therefore essentially interchangeable in some embodiments and can each be used alone or in combinations two or more ram(s) and upper body(ies). In this disclosure, the term "ram" is used to refer to a body that impinges upon the deflectable flange by being applied thereto or thereagainst in a direction from the portion of the deflectable flange most distal from the body of the shaped article. Similarly, the term "upper body" is used to refer to a body that impinges upon the deflectable flange by being applied thereto or thereagainst in about the opposite direction (see, e.g., FIGS. 3, 4, 7, and 8). In some embodiments (see, e.g., FIGS. 46-57), an object (e.g. a plug or a portion of the mold used to form the shape of the article) can be used as the upper body 200; in such situations, the upper body will not necessarily induce deflection of the peripheral flange 160, but will instead stabilize or brace portions of the article as the ram 300 is impacted upon the deflectable flange 160.

Figure 9:
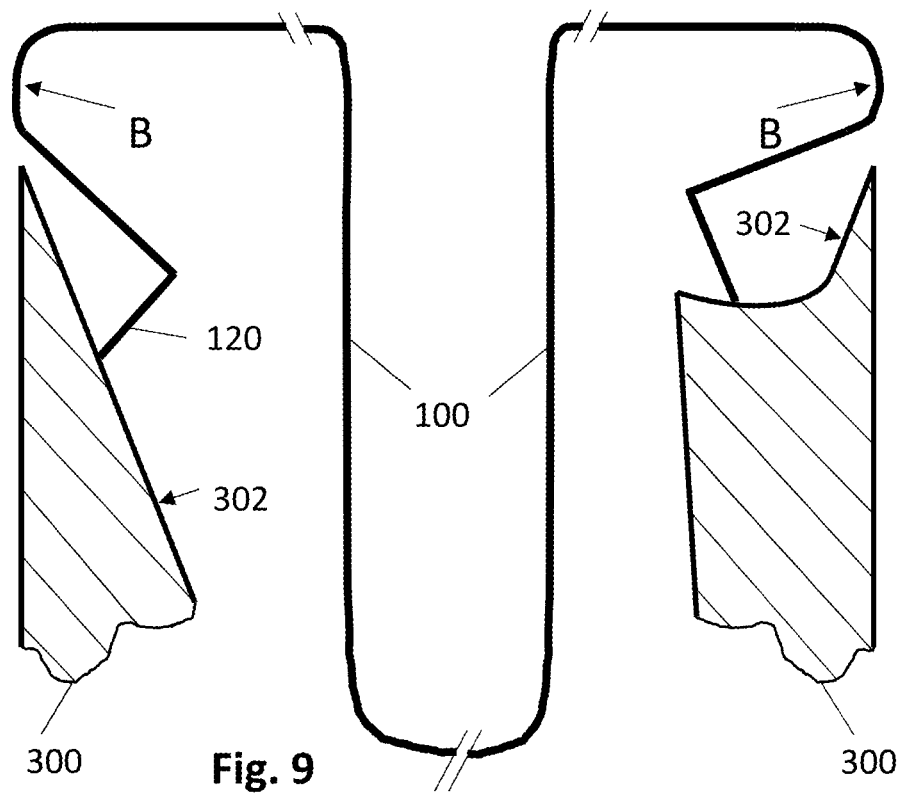
FIGS. 9, 10, and 11 each illustrates a section taken through a storage container article 100 being formed using the methods described herein. In each figure, the article 100 has a deflectable flange 160 formed on each of the sides of the container visible in the figure. The deflectable flanges 160 have been deflected inwardly by infringement thereupon by the upper face 302 of a single ram 300 (only two portions shown in the figure) at each deflectable flange 160. The peripheral edge 110 of the thermoplastic sheet from which article 100 is formed, infringes upon the upper face 302 of the ram 300 at each deflectable flange 160, causing the deflectable flange 160 to deflect inwardly toward the body of the article 100 by flexing at one or more portions B of the bend region 150 of each deflectable flange 160. Application of heat at B in an amount sufficient to soften the thermoplastic sheet causes the deflectable flanges 160 to retain approximately the conformation shown in this figure, with the peripheral edges 110 of the thermoplastic sheet positioned anti-peripherally (i.e., within the periphery of the article 100, which occurs at the positions indicated by B in this figure), yielding smooth peripheries to the formed container upon cooling of the softened portions. In this embodiment, the two parts of the ram 300 are shown with different profiles (one flat and one curved), to illustrate differences in deflection that can be induced by the different profiles.
Figure 10:
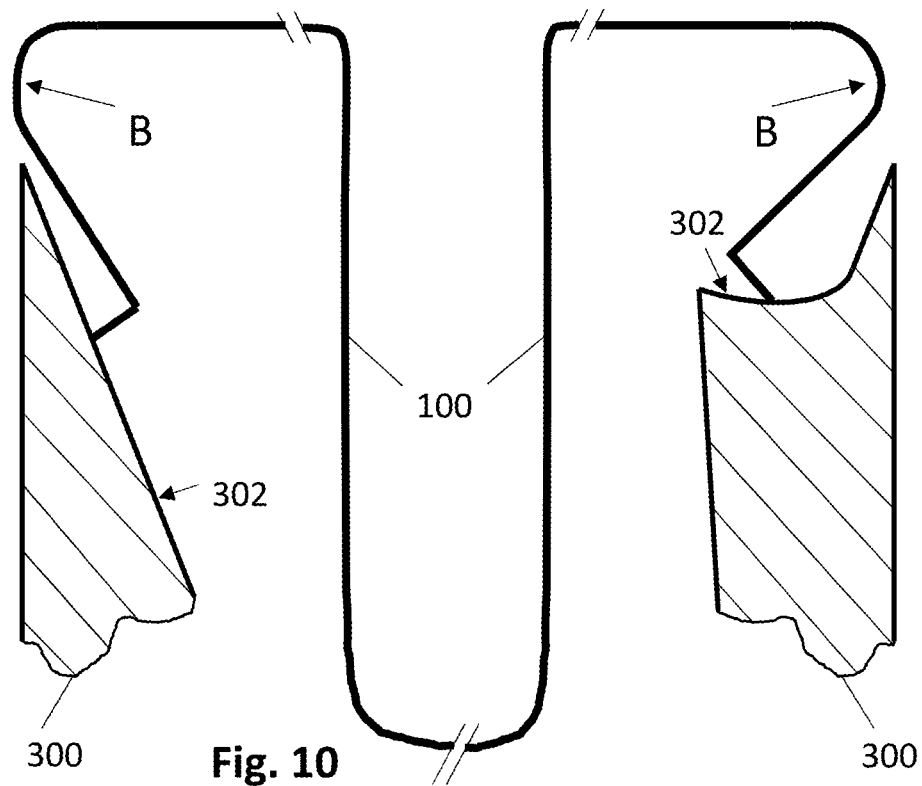
Figure 11:
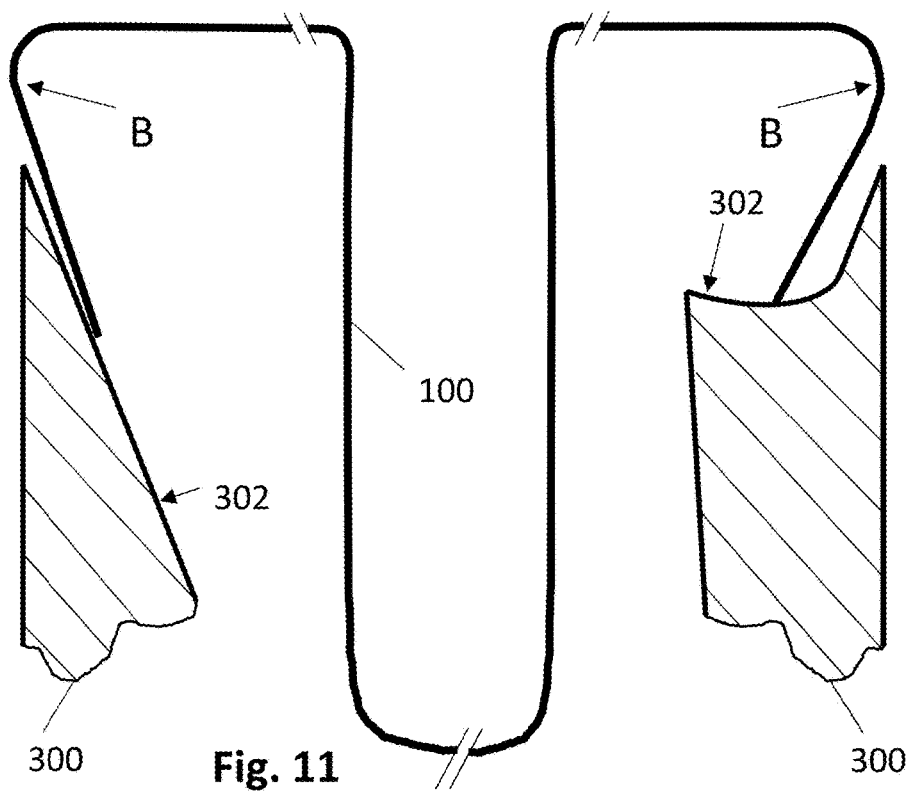

In the example shown in FIGS. 3 and 4, the portions of the ram 300 which impinge upon the peripheral flange 120 of the deflectable flange 160 while the article is lodged within the cavity in the upper body 200 has a wedge-shaped cross section. Such a ram can be useful for directing the peripheral flange 120 and peripheral edge 110 anti-peripherally, in that the farther the ram is advanced within the interior in the direction from the peripheral edge 110 toward the bend region 150, the farther the peripheral flange 120 and peripheral edge 110 will be deflected in an anti-peripheral direction. However, these portions of the ram 300 need not be wedge-shaped. Substantially any shape of ram 300 that will deflect the peripheral flange 120 and peripheral edge 110 anti-peripherally when the ram 300 is inserted behind the article 100 in the upper body 200 can be used, such as blunt or rounded (convex or concave at its upper face 302), or a combination of any of these, can be used, for example as shown in FIGS. 9-11. By way of example, the upper face 302 of the ram 300 portions employed in the operations illustrated in FIGS. 46-57 have the shape of an inclined plane (analogous to a "wedge") over one part of the surface, while an adjacent part of the upper face 302 has a more nearly hemi-circular profile. As illustrated in those figures, this upper face 302 conformation serves, initially, to displace the deflectable flange 160 laterally in one direction following initial contact between the ram 300 and the deflectable flange 160, and to curl one or more portions of the deflectable flange 160 as contact is extended and the ram 300 is urged further against the deflectable flange 160.

Figures 17A, 17B, 17C:
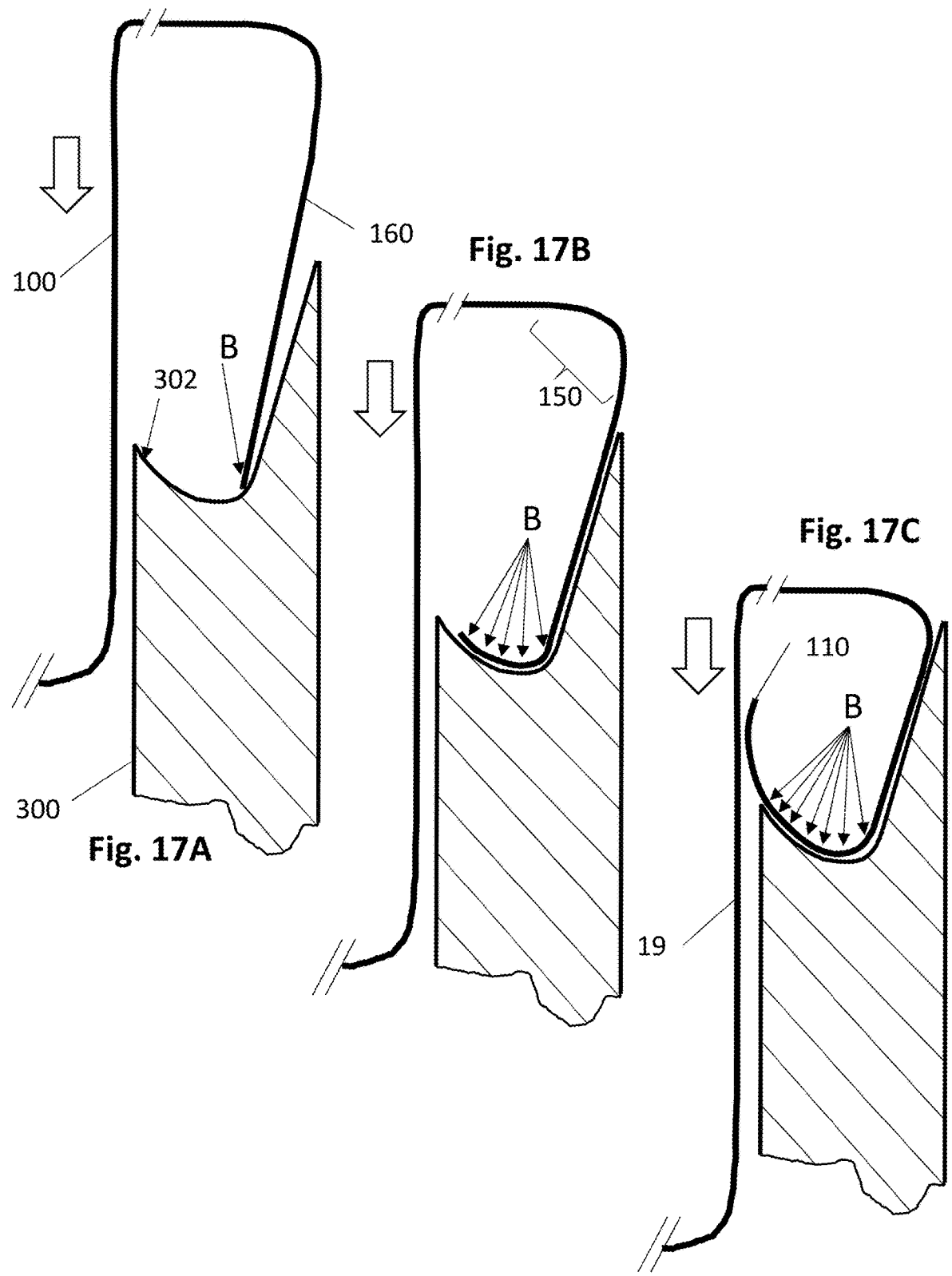

FIGS. 17-34 illustrate an alternate method of rolling or otherwise shaping the edge of an article. As can be seen in FIG. 17A, the deflectable flange 160 in this embodiment lacks an elbow or peripheral flange, and instead includes, distal to the bend region 150, only a spacer portion that terminates at the peripheral edge 110 of the thermoplastic sheet. This deflectable flange is urged (in the direction indicated by the open arrows in FIGS. 17A-17C, 21, 22, 24A-25C, and 29A-32C, regardless of how such urging is achieved, such as by moving either or both of the article 100 or the ram 300) against the upper surface 302 of a heated ram. When the direction of travel of the deflectable flange closely parallels the conformation of the upper surface (i.e., as in FIG. 17A), relatively little of the deflectable flange may contact the upper surface and relatively little heat may be transferred from the ram to the deflectable flange. However, as shown in FIG. 17B, when relative movement of the article and the ram cause greater surface contact or greater proximity between the upper surface of the ram and the deflectable flange, the interfacial area of contact/proximity can be greater, resulting in greater heat flow from the ram to the deflectable flange. Sufficient heat flow will result in softening of the thermoformable substrate sheet 101 material, causing the deflectable flange to assume the conformation of the upper surface. When, as shown in FIG. 17C, still further relative movement of the article and the ram is made, a greater portion of the deflectable flange will be softened and deflected. As with the embodiment shown in FIG. 2, it can be seen in this embodiment that heat suitable for bending the deflectable flange is being applied (at multiple locations B in FIGS. 17B and 17C); however, in order to "roll over" the portion of the deflectable flange that includes the peripheral edge, little or no flexion, and no heat application, is occurring at the bend region 150 (other than perhaps to a small degree as the peripheral-most portions of the bend region 150 approach the heated ram 300, as in FIG. 17C). For the purposes of the processes described herein, it is substantially immaterial which portions of the deflectable flange are softened and bent, so long as the desired result is obtained: the potentially sharp peripheral edge 110 is deflected away from the periphery of the article and, preferably, sequestered (as in FIG. 17C, either within the "rolled-over" deflectable flange 160 or positioned at an inaccessible location between the "rolled-over" deflectable flange 160 and article body 10)

where it is very unlikely to contact any easily-damaged film or tissue which contacts the periphery of the shaped article. The deflectable flange can be contacted with, or brought into close proximity with, the ram in a single smooth motion, in a plurality of discrete, incremental advances, or a combination of these, in order to permit portions of the deflectable flange to soften sequentially.

Figure 36:
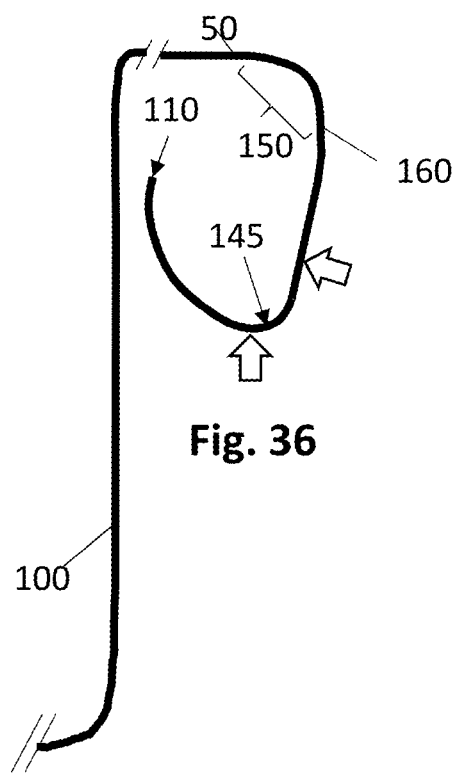

As the thermoformable material moves out of contact with the ram (either by disengaging the two or, as shown in FIG. 17C as a portion of the deflectable flange moves beyond the upper surface of the ram), the thermoformable material can cool and the deflection induced therein will be retained upon cooling. Such cooling can be facilitated or hastened by contacting a cool fluid (e.g., air or a liquid solvent) against the softened material, if desired. As shown in FIG. 36, disengagement of the article and the ram results in a rolled-over edge of the article, the rolled-over edge having a smooth periphery and being suitable for handling and/or contact with fragile plastic films.

Figure 18:
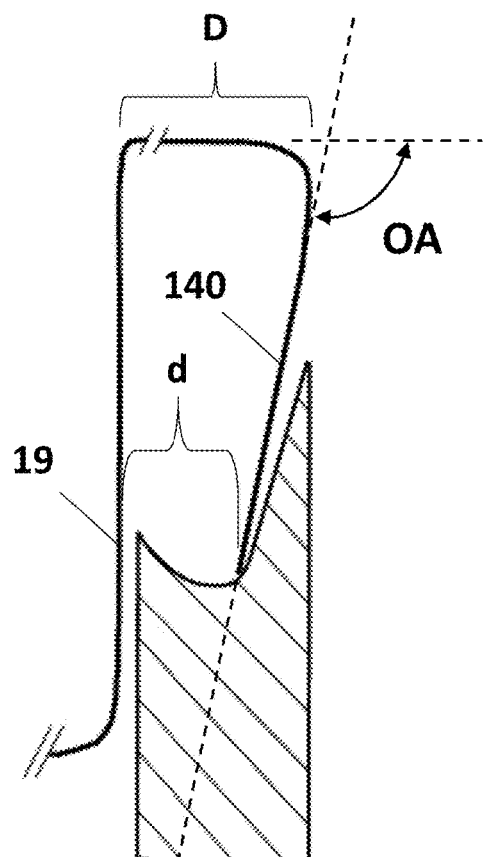
Figure 19:
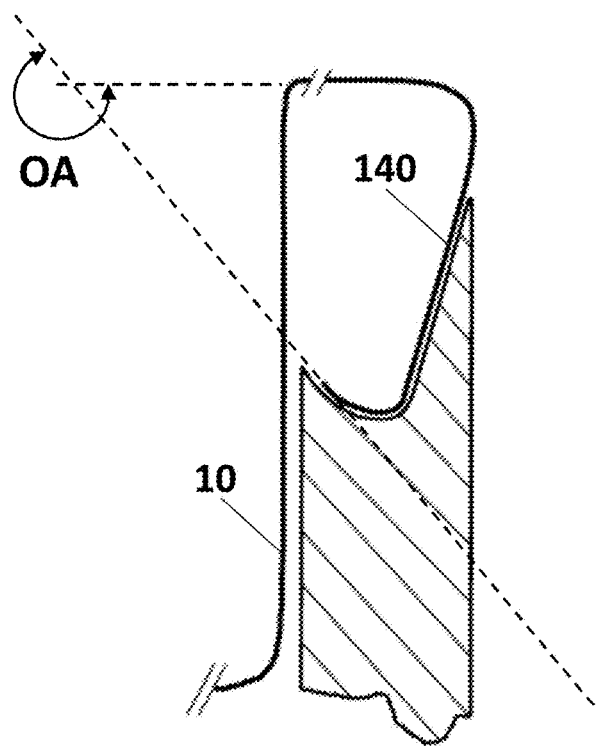
Figure 20:
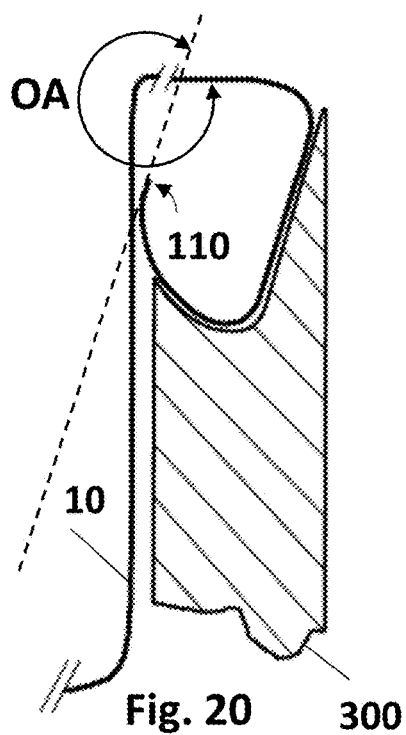

FIGS. 17A-17C sequentially depict the effect of urging the shaped article 100 further against the ram 300 in the direction indicated by the open arrow in each figure, as can be seen by comparing the portion of the article appearing in the left portion of each figure. In the embodiment shown in FIGS. 17A-17C, the deflectable flange 160 lacks an elbow and a peripheral flange. The initial (pre-ram-impingement) conformation of the shaped article is that shown in FIG. 35. FIGS. 18-20 are copies of FIGS. 17A-17C, respectively, each identifying the offset angle OA. In FIG. 18, the initial (i.e., prior to deflection of the deflectable flange) distance D between the sidewall 19 and the peripheral edge 110 is indicated, as is the distance d after deflection, both distances being measured in the direction parallel to the extension 50 and from a point on the sidewall to the peripheral edge at the portion of the deflectable flange nearest that point.

In FIG. 17A, the article has been urged against the ram such that its deflectable flange 160 contacts the upper face 302 of the ram at its peripheral edge 110 (the deflectable flange 160 lacks a peripheral flange 120 in this embodiment). The deflectable flange 160 deflects from its pre-contact position by virtue of resistance to movement encountered by the deflectable flange as it contacts the inclined portion of the upper face 302. In the figure, the peripheral edge 110 of the deflectable flange rests against the upper face at a position where the inclined portion of the upper face transitions to a curved contour and a portion of the spacer 140 is in close proximity to the ram 300, which is heated and transfers heat thereto.

FIG. 17B shows the effect of urging the article 100 depicted in FIG. 17A further against the ram 300. Because the ram 300 shown in FIG. 17B is heated, it softens the material from which the deflectable flange 160 is made at portions where the deflectable flange is in close proximity to or contacts the upper face 302 of the heated ram 300. Because of the shape of the upper face 302, the deflectable flange 160 reaches a position at which it can no longer advance by merely sliding along the upper face surface. Because the article 100 (including the deflectable flange 160) is being urged in the direction indicated by the open arrow, and because the material of which the deflectable flange is constructed has been softened by the heated ram 300, the deflectable flange deforms (at positions B) to follow the contour of the upper face 302 of the ram as the deflectable flange is advanced against the ram, generating one or more bent portions 170.

FIG. 17C shows the effect of continuing to urge the article 100 depicted in FIG. 17B against the heated ram 300. As the article (including the deflectable flange 160) is urged in the direction indicated by the open arrow, the deflectable flange continues to bend where softened by contact with the heated ram (i.e., at positions B). As movement of the deflectable flange against the ram continues, the peripheral edge 110 of the deflectable flange eventually reaches an edge of the upper face 302 of the ram. The portion of the deflectable flange including the peripheral edge remains softened for a period of time (the period being dependent on the operating conditions in predictable ways). If the peripheral end contacts a portion of the article 100 (e.g., a sidewall 19) while softened, it can be deflected thereby (e.g., upwardly, as suggested in the embodiment shown in FIG. 17C). Deflection of the portion of the peripheral flange leaving contact with the upper face can also be influenced by the contour of the upper face 302, for example inducing a "curled" or "spiraling" conformation as shown in FIG. 17C.

In FIG. 17A-17C, the deflectable flange is depicted lacking the elbow 130 and peripheral flange 120 illustrated in FIG. 1 for the sake of simplicity of illustration. Although production of deflectable flanges lacking the elbow and peripheral flange is possible (e.g., by mechanically or laser-cutting the deflectable flange at the spacer 140 shown in FIGS. 1-4), such production can be difficult and costly and is therefore of limited practicality in large-scale production operations. For this reason, shaped articles 100, such as those intended for use as packaging trays for food, that are processed described herein will often have both the elbow 130 and peripheral flange 120 illustrated in FIG. 1. As illustrated in FIGS. 24A-25C, shaped articles bearing the elbow and peripheral flange can nonetheless be processed using the methods and equipment described herein.

FIGS. 24A-24C (analogously to FIGS. 17A-17C) sequentially depict the effect of urging the shaped article 100 farther against the ram 300 in the direction indicated by the open arrow in each figure. In the embodiment shown in FIGS. 24A-24C, the deflectable flange 160 includes a peripheral flange 120 at the peripheral end of the spacer 140. In this figure, it can be seen the peripheral flange 120 deflects (i.e., increasing the magnitude of angle F depicted in FIG. 1) during bending of the deflectable flange 160 to the extent that it becomes indistinguishable from the spacer 140 (i.e., angle F is about 180 degrees). Such deflection (increasing angle F) can, generally speaking, be expected when the portion of the deflectable flange including an elbow and peripheral flange is being stretched or tensioned (e.g., during outward deflection of the deflectable flange 860 surrounding the internal orifice 106 of the container disclosed in FIGS. 54-57, especially at the corners thereof, where tensional stress can be expected to be greatest). However, the direction of bending can depend on the specific geometry of the deflectable flange, in predictable ways.

FIGS. 25A-25C (analogously to FIGS. 17A-17C) sequentially depict the effect of urging the shaped article 100 farther against the ram 300 in the direction indicated by the open arrow in each figure. In the embodiment shown in FIGS. 25A-25C, the deflectable flange 160 includes a peripheral flange 120 at the peripheral end of the spacer 140. In these figures, it can be seen the peripheral flange 120 deflects (decreasing the magnitude of angle F identified in FIG. 1) during bending of the deflectable flange 160 to the extent that it becomes completely bent over the spacer 140, forming a 'hook'-like structure. B in FIG. 25B indicates that bending is occurring in the portion of the deflectable flange 160 spanning the indicated portion of the upper face 302 of the ram 300. Such deflection (decreasing angle F) can, generally speaking, be expected when the portion of the deflectable flange including an elbow and peripheral flange is being compressed or constricted (e.g., during inward deflection of the deflectable flange 160 at the external periphery 191 of the container disclosed in FIGS. 54-57, especially at the corners thereof, where compression can be expected to be greatest as the corner portions of the deflectable flange are forced into spaces above the upper surface of the ram 300 that exhibit decreasing corner radii at that upper face 302). FIGS. 26-28 are copies of FIGS. 25A-25C, respectively, each identifying the offset angle OA, ignoring the bent-back peripheral flange 120 and instead assessing OA with reference to the portion of the spacer 140 nearest the elbow 130 (i.e., where the spacer 140 joins to the bent-back peripheral flange 120).

FIGS. 24A-24C depict processing of a shaped article 100 that has a deflectable flange 160 that includes both the peripheral flange 120 and the elbow 130 described herein, and the processing depicted in these figures is roughly analogous to that depicted in FIGS. 17A-17C. In FIG. 24A, the peripheral edge of the deflectable flange 120 directly contacts the upper surface 302 of the ram 300. Because the ram is heated, heat is conducted directly to the peripheral edge where it contacts the ram and by radiation from closely-opposed portions of the spacer 140. By controlling heat flowing from the ram and the residence time of the article 100 in the position shown in FIG. 24A, an operator can induce softening of portions of the deflectable flange, particularly including at its peripheral edge and at portions of the spacer near that peripheral edge. Softening of these portions facilitates bending of the deflectable flange at the softened portions, such as by urging the article further against the ram, such that a curved portion of the upper surface will induce bending as the more-peripheral portions of the deflectable flange are driven against the curved portion of the upper surface by the less-peripheral portions (which transmit force applied to the article), as shown in FIG. 24B. Further urging of the article against the ram, as shown in FIG. 24C, causes the portions of the deflectable flange that are in contact with the upper surface of the ram to slide across that upper surface. As material is driven beyond positions in which it is in contact with the upper surface, it may remain softened (and susceptible to further bending) for a short period of time, or it may cool and become only deflectable (rather than bendable or moldable). Whether cooled by movement past the heated portion(s) of the ram or by removing the article from contact with the ram (or even by applied cooling, such as by directing cool air at shaped portions, by using a cooled plug element within the body of the article, or otherwise), cooling of the deflectable flange below its glass transition temperature "sets" or "locks in" the conformation of the material at the time of that transition. Thus, by shaping the deflectable flange so that it has the conformation shown in FIG. 24C and cooling it below its glass transition temperature, the edge of the article can be rendered smooth (both because its bend region 150 is smooth and because its spacer 140, including its peripheral edge 110 have been changed to have a conformation in which no rough or sharp edges are present at the periphery of the article. If the omitted portion ("//") in the article illustrated in FIG. 24C is very small, such that the curled portion of the deflectable flange is as closely opposed against the sidewall 19 as is illustrated in FIG. 24C, the smoothness of the edge can also be partly attributed to the non-accessibility of the peripheral edge 110 of the deflectable flange, which is "rolled up inside" the curled flange in this embodiment. A piece of film of flesh would need to be inserted into and upwards (in the Figure) along the gap between the curled portion of the deflectable flange and the sidewall 19 in order to contact the peripheral edge 110, decreasing the likelihood of damage to the film/flesh by the edge.

As shown in FIG. 24B, the peripheral flange 120 can be partially deflected during shaping of the deflectable flange; in the finished article, the peripheral edge preferably "points" toward the body or the underside of the deflectable flange. (The plane extending from the elbow 130 and the portion of the deflectable flange 160 immediately proximal to it also intersects the body/underside). As shown in FIG. 24C, shaping of the deflectable flange will sometimes result in disappearance of the peripheral flange and the elbow interposed between it and the remainder of the spacer. This can occur because the material in the peripheral flange "melts" into the spacer or simply because the offset angle of the elbow becomes approximately 180 degrees. More commonly, as illustrated in FIG. 25B, for example, the peripheral flange 120 can deflect in a direction that it remains distinct from the remainder of the spacer, potentially forming a hook-like structure. Because such a structure could position the potentially-sharp or -rough peripheral edge at or near the periphery of the article, it is preferable that the deflectable flange be deflected sufficiently that any such hook-like structure is contained within (relative to the periphery of the article) the rolled-over edge, as illustrated in FIG. 25C.

Figure 29C:
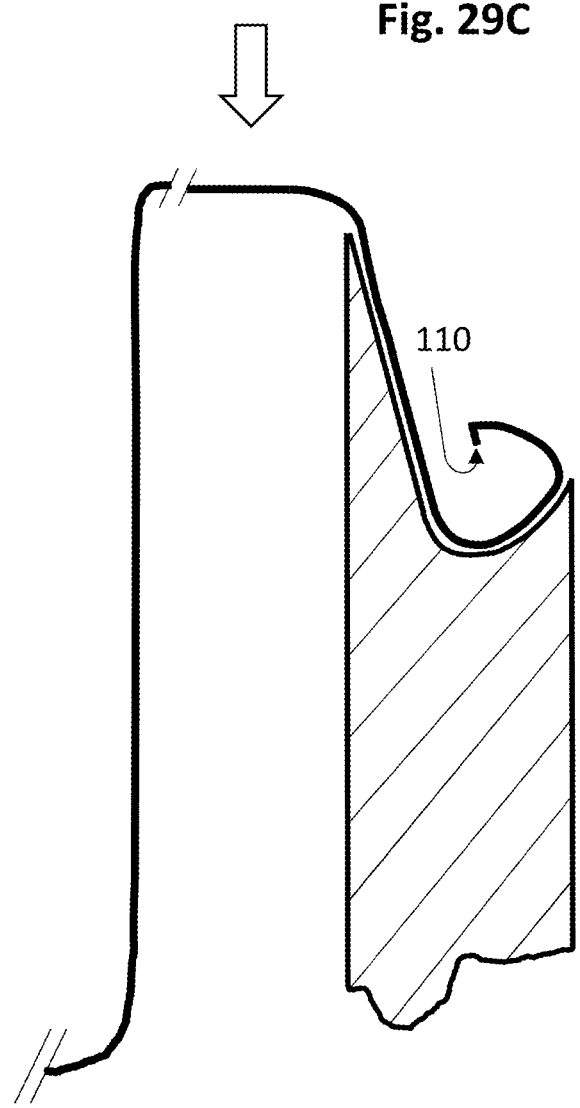

FIGS. 29A-29C (analogously to FIGS. 25A-25C) sequentially depict the effect of urging the shaped article 100 farther against the ram 300 in the direction indicated by the open arrow in each figure, but with the orientation of the ram 300 reversed, relative to the orientation shown in FIGS. 25A-25C. The result of this reversed orientation is that the ram induces peripherally-outward rolling of the peripheral edge 110. In the embodiment shown in FIGS. 29A-29C, the deflectable flange 160 includes a peripheral flange 120 at the peripheral end of the spacer 140. In these figures, it can be seen the peripheral flange 120 initially remains at the periphery of the article 100 (e.g., in FIG. 29A), but is turned so that its sharp peripheral edge 110 points increasingly anti-peripherally (e.g., in FIGS. 29B and 29C) as the deflectable flange 160 is increasingly deflected by the ram 300.

FIGS. 29A-29C illustrate that the edge-smoothing process described herein can be used to deflect the deflectable flange 160 outwardly (i.e., peripherally, with respect to the article body 10) in order to displace the peripheral edge 110 away from the periphery of the article. The processing steps illustrated in FIGS. 29A-29C essentially mirror those illustrated in FIGS. 25A-25C, except that upper surface 302 of the ram 300 opens outwardly (toward the periphery of the article 100). When the deflectable flange 160 is deflected upon the surface 302 of this ram 300, the peripheral flange 120 does not tend to be flattened against the spacer 140, but instead remains at an approximately a right angle to the portion of the spacer 140 adjacent the elbow 130, even as the deflectable flange is softened and curled. As that curling occurs, however, the orientation of the peripheral edge 110 is changed so that it no longer points peripherally away from the article 100 and instead begins to point toward the article 100 (FIG. 29B) and then back toward the bent portion 170 of the deflectable flange 160 itself.

FIGS. 30A-30C and 31A-31C (analogously to 25A-25C and 29A-29C) sequentially depict the effect of urging the shaped article 100 farther against the ram 300 in the direction indicated by the open arrow in each figure. In these figures, the deflectable flange 160 and the shaped body 10 of the article 100 extend away from opposite faces of the extension 50. In FIGS. 30A-30C, the orientation of the ram 300 is the same as that shown in FIGS. 25A-25C, and the peripheral edge 110 of the deflectable flange 160 is initially rolled in the direction of the body of the article 100. In FIGS. 31A-31C, the orientation of the ram 300 is the same as that shown in FIGS. 29A-29C, and the peripheral edge 110 of the deflectable flange 160 is initially rolled in the direction away from the body of the article 100.

FIGS. 30A-30C illustrate that substantially the same processing steps illustrated in FIGS. 25A-25C can be performed to deflect a deflectable flange 160 when the deflectable flange 160 and the body 10 to which it is attached extend in opposite directions away from the junction 162 between the two. The processing steps confer substantially the same shape to the softened-and-deflected deflectable flange 160, but the orientation of the deflectable flange 160 and the body 10 is different. If the body 10 is considered to be on the "bottom" of the article 100, then the softened-and-deflected deflectable flange 160 forms part of a rim at the periphery of the article 100, wherein the deflectable flange is "rolled over the top" of the rim 104 and the rim 104 has a smooth periphery 191.

Similarly, FIGS. 31A-31C illustrate that substantially the same processing steps illustrated in FIGS. 29A-29C can be performed to deflect a deflectable flange 160 when the deflectable flange 160 and the body 10 to which it is attached extend in opposite directions away from the junction 162 between the two. The processing steps confer substantially the same shape to the softened-and-deflected deflectable flange 160, but the orientation of the deflectable flange 160 and the body 10 is different between the two groups of figures. If the body 10 is considered to be on the "bottom" of the article 100, then the softened-and-deflected deflectable flange 160 forms part of a rim at the periphery of the article 100, wherein the deflectable flange is "rolled outwardly from the top" of the rim 104 and the rim 104 has a smooth periphery 191.

FIGS. 32A-32C sequentially depict the effect of urging a shaped article 100 farther against the ram 300 in the direction indicated by the open arrow in each figure. In these figures, the ram 300 has a face 302 which extends inwardly past the sidewall 19, so that when the deflectable flange 160 is urged and softened against the upper surface 302 of ram 300, the deflectable flange is deflected inwardly, forming a curved deflected flange that overlaps the plane of the sidewall 19 beyond the junction 51 between the sidewall 19 and the extension 50. The body 10 of the article 100 illustrated in these figures has a nesting face 15 that include an insertable portion 17 that can be inserted within the bent portion 170 of the deflectable flange 160 of an identically-shaped second article (as shown in FIGS. 33 and 34) and a support surface 16 which has a contour selected to be closely opposable against the bent portion 170 of the second article (that is, the contour of the support surface 16 approximately reversely matches the contour of the bent portion 170).

FIGS. 32A-32C illustrate substantially the same process depicted in FIGS. 30A-30C, there being two primary differences.

First, in FIGS. 32A-32C, the ram 300 is positioned and has a sufficiently broad (side-to-side in the figures) upper face 302 that the bent portion 170 of the rolled-over edge ends up positioned substantially atop the sidewall 19 of the shaped article 100. That is, in FIG. 30C, a plane extending through and parallel to the sidewall 19 would not substantially intersect the bent portion 170, and that rounded bent portion 170 lies against or near that plane instead. By contrast, a plane extending through and parallel to the sidewall 19 in the article 100 shown in FIG. 32C intersects the bent portion 170, and intersects it near the part of the bent portion 17 that is farthest from the junction 162 in the direction of that plane extension. Put another way, the plane of the sidewall 19 divides (and, in this instance, nearly bisects) the outer rim 104 of the shaped article 100.

Second, the shaped article 100 has structures contained within its shape (i.e., formed into the article) that are designed to interact with the outer rim 104 of a second, identical article. These structures are located on or along a nesting face 15 of the article body 10. The nesting face 15 of one such article is configured to fit within the outer rim 104 of a second article when the body of the first article is aligned with the outer rim of the second. This process is illustrated in FIG. 33, in which two of the articles 100 having outer rims 104 made by the process illustrated in FIGS. 32A-32C are shown in a stacked configuration. FIG. 33 is a cross-section of one side of the stacked containers. The figure illustrates the bent portion 170 of the deflectable flange 160 one article 100 (the upper one in the figure) engaged against the support surface 16 of the other article 100. In the figure, a gap is shown between the bent portion 170 and the support surface 16 to emphasize that the contour of the support surface 16 closely approximates the contour of the portion of the bent portion 170 that engages therewith when the lower article 100 is nested within the upper one. The nesting face 15 of each of the two articles includes both an insertable portion 17 and a support surface 16. As can be seen at the intersection of the two articles in FIG. 33, when the nesting face 15 of the lower article is aligned with and inserted within the outer rim 104 of the upper article, the insertable portion 17 is able to slide within the outer rim 104 of the upper article, while the outer rim 104 of the upper article comes to rest upon the support surface 16 of the lower article. When this configuration is present on opposite sides of the two articles, then the lower will nest within the upper article at the plane at which this cross-section is taken. If the configuration is present about the entire periphery of the outer rim 104 and the nesting face 15, then the lower article will be nestable within the outer rim 104 of the upper article, and the support surface 16 will limit the extent to which such nesting will occur. Thus, the extent of nesting can be controlled by varying the position of the support surface 16 along the sidewall, provided the entire insertable portion 17 distal from the outer rim 104 is dimensioned to fit within the outer rim 104 and any portions of the article body 10 which it may encounter during insertion.

FIG. 34 illustrates a stack of four articles, with part of the bent portion 170 of each (other than the lowermost one in the figure) engaged against the support surface 16 of the tray nested within it. In contrast to FIG. 33, FIG. 34 illustrates articles in which the insertable portion 17 of the nesting face 15 of the body 10 of a first article 100 extends beyond the bent portion 170 of a second article 100 when the first article is nested within the second and the bent portion 170 of the second article rests upon the support surface 16 of the first. As illustrated in FIG. 34, for example, if the support surface 16 of the article illustrated in FIGS. 32A-32C and 33 is positioned nearer the outer rim 104, then the articles can be nested to the extent that the outer rim 104 can overlap the body 10 of the article nested within it.

Variations in Edge-Rolling

A thermoplastic sheet can be thermoformed to yield an article having a shaped body 10 connected to the deflectable flange 160 described herein at a junction 162 between the two. There are several variations in the ways and directions in which the peripheral edge 110 (i.e., the part of the deflectable flange most distal from the junction) and adjoining portions of the deflectable flange (e.g., the peripheral flange, the elbow, the spacer, and/or the bend region) can be bent or rolled using the methods described herein. These variations are discussed here and illustrated with reference to FIGS. 25A-25C, 29A-29C, 30A-30C, and 31A-31C.

One pair of variations relates to the relative orientations of the more distal parts of the deflectable flange 160 and the body 10 of the article 100. The body and the distal parts of the deflectable flange are formed from the same substrate sheet 101 and are connected by way of the junction. At the junction 162, the plane of sidewall 19 of the body 10 (shown as a line in the cross-sectional diagrams in FIGS. 25A and 30A, for example) extends away from the extension 50. The bend region 150 causes the more-peripheral parts of the deflectable flange, such as the spacer 140 and the peripheral flange 120 to also extend away from the extension. Where the extension is planar, as in FIGS. 25A and 30A, those more-peripheral parts can extend away from the same face of the extension as the body (as in FIG. 25A), or away from the opposite face of the extension (as in FIG. 30A). If the body and the more-peripheral parts of the deflectable flange are oriented on the same "side" of the junction (i.e., they extend away from the same face of the extension), then the rolled- or deflected-flange will be curled or bent on the same side of the junction (and of the extension) as the body, yielding for example a bowl or container having at its "top" extent a flat, horizontal rim having its peripheral edge rolled or deflected "under" the rim. Likewise, if the body and the more-peripheral parts of the deflectable flange are oriented on different sides of the junction (and extension), then the rolled- or deflected-flange will be rolled on the same side of the junction (and of the extension) as the body, yielding for example a bowl or container having at its "top" extent a curved bead or flexible lip lying atop a flat rim having a smooth underside that merges with the outer surface of the bowl or container.

A second pair of variations relates to the direction in which the deflectable flange is deflected in the methods described herein. The more-peripheral parts of the deflectable flange can be initially deflected either in a peripheral direction or in an anti-peripheral direction. As illustrated in FIGS. 25A-25C and 30A-30C, for example, the more-peripheral parts of the deflectable flange can be initially deflected in an anti-peripheral direction, regardless of whether the body and those more-peripheral parts are oriented on the same or different faces of the extension. Similarly, as illustrated in FIGS. 29A-29C and 31A-31C, for example, the more-peripheral parts of the deflectable flange can be initially deflected in a peripheral direction, regardless of their orientation relative to the body and the extension. It is understood that the curling effect of continued deflection of the deflectable flange against the ram can cause the peripheral-most parts of the deflectable flange to eventually begin to be deflected in the opposite direction as they initially are (e.g., in the method illustrated in FIGS. 25A-25C, the peripheral-most parts are initially deflected anti-peripherally but, by the time they are deflected as much as shown in FIG. 25C, further deflection results in their movement in the peripheral direction), but such "reversed" deflection will be contained within the deflected flange if it occurs, as the deflected flange spirals inwardly). For the purposes of this disclosure, "anti-peripheral" deflection refers to deflection that is initially in the anti-peripheral direction, regardless of whether that deflection continues so long that the deflected portion loops around and begins moving in the peripheral direction (and, upon still longer deflection, back in the anti-peripheral direction again).

In the Figures mentioned, the peripheral-most parts of the deflectable flange: (i) are oriented on the same side of the extension as the body and are initially deflected anti-peripherally in the method illustrated in FIGS. 25A-25C (this method can yield an article having an edge like that shown in FIG. 48); (ii) are on the same side of the extension as the body and are initially deflected peripherally in the method illustrated in FIGS. 29A-29C; (iii) are oriented on the opposite face of the extension as the body and are initially deflected anti-peripherally in the method illustrated in FIGS. 30A-30C (this method can yield an article having an edge like that shown in FIG. 50); and (iv) are oriented on the opposite face of the extension as the body and are initially deflected peripherally in the method illustrated in FIGS. 31A-31C. Thus, all combinations of these variations are envisioned.

The Upper Body 200

The upper body 200 can perform a number of functions when it is present or used. Overall, in embodiments in which it is used (e.g., those illustrated in FIGS. 1-8), its function is to contain the deflectable flange 160 described herein within a cavity in the upper body 200 while heat is applied to one or more portions of the bend region 150 thereof. This containment function can prevent non-desired deformation (or guide desired deformation) of the deflectable flange 160 or portions of it during the periphery-smoothing operations described herein. The shape of the interior cavity of the upper body 200 can also affect the shape of the deflectable flange as it bends, particularly as it is softened. By way of example, in FIG. 2, the upper body 200 includes a cavity with an internal right angle into which a portion of the bend region 150 is forced; the right-angle shape of this portion of the cavity will tend to cause the bend region 150 to conform to a right-angle shape, especially as the bend region 150 softens. The heat source (e.g., a common electrical resistive heating element) can be a part of the upper body 200, applied to the upper body 200 for conduction of heat therethrough, or positioned adjacent the upper body when it is not engaged with an article 100, for example. The upper body 200 can also impinge upon, and be impinged upon by, the peripheral flange 120 of the deflectable flange 160 when it is inserted into that cavity. When a ram 300 is used together with an upper body, the upper body 200 also serves to prevent the deflectable flange 160 from being forced out of the cavity, and it can also limit deflection of the bend region 150 when the deflectable flange 160 is being compressed by the ram 300.

The materials from which the upper body is constructed are not critical, other than that they should be suitable to withstand the manufacturing conditions described herein. That is, they should not melt or degrade at the temperatures used in the processing. A wide variety of metal, ceramic, stone, and polymeric materials can be used.

It is important that the shape of the upper body 200 be selected so that impingement between the interior of the cavity in the upper body 200 and the peripheral flange 120 will occur when the article 100 described herein is inserted into the cavity in the upper body. The upper body can have a shape sufficient to simultaneously impinge multiple peripheral flanges 120 on an article, or to impinge upon most or all of a single peripheral flange 120 that occurs upon an article (e.g., one which occurs about the entire peripheral edge of an article). As illustrated in FIG. 5, the upper body 200 can be formed of a solid block of material that covers an entire face of an article while impinging peripheral flange(s) 120 that occur on one or more portions of the article. The upper body 200 depicted in FIG. 5, for example, is designed to impinge upon the single peripheral flange 120 that extends completely around the periphery of an article having the shape of a rectangular tray-type container having rounded corners. In some embodiments (see, e.g., FIGS. 46-57), one or more parts of a mold 700 used for forming the article can be employed as the upper body 200, the mold fitting snugly against surfaces of the article after thermoforming or molding and holding and/or confining portions of the article as a ram 300 is impinged against its deflectable flange 160.

The bend region 150 of the articles described herein will typically be within the cavity of the upper body 200 when heat is applied to that bend region 150. For that reason, the upper body should be constructed in a way that facilitates application of such heat. The upper body 200 can, for example, include a heat source (e.g., electrically operated heating plates or rods) within it, applied to it, or fluidly connected with it. Alternatively, the upper body 200 can include one or more ports through which a heated fluid (e.g., a heated gas or liquid) can pass from a source into the interior of the cavity therein. The method selected to deliver heat to the bend region 150 (and/or other portions of the peripheral flange, such as the spacer 140, the elbow 130, and the peripheral flange 120) is not critical, and any of a variety of well-known heat delivery methods and equipment can be used. If the upper body 200 is able to conduct heat and is cooled, then heat that is present in the deflectable flange 160 during its shaping can flow to the upper body 200, and this heat flow can serve to cool and thereby stiffen the deflectable flange 160 in its deflected position upon its compression between the upper body 200 and the ram 300, for example.

Figures 21, 22:
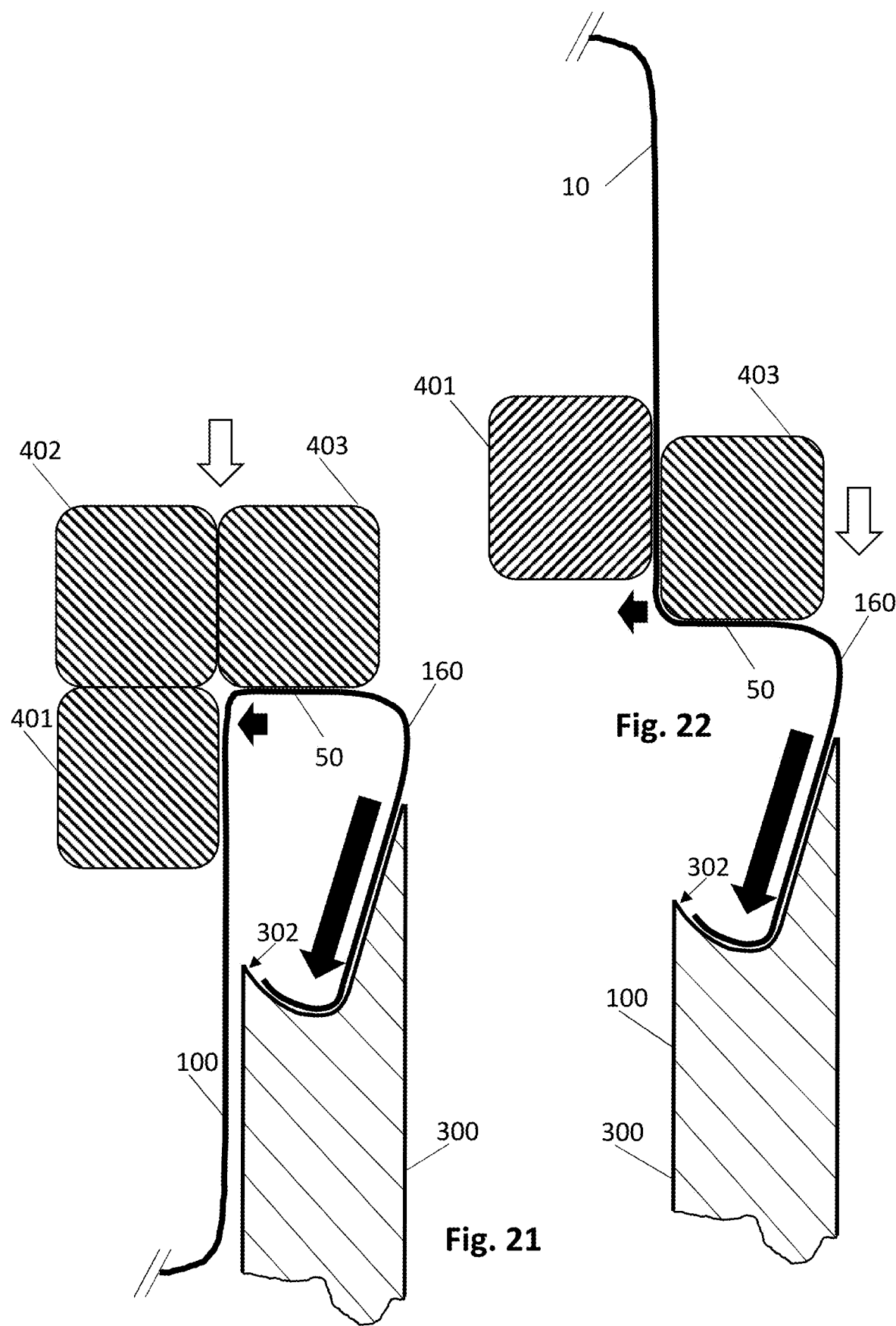

As shown, for example in FIGS. 9-11 and 17-34, the deflectable flange can be deflected using a ram 300 alone, with or without use of an upper body 200. The upper body can be used both to partially deflect the deflectable flange and to apply force to the article so as to impinge the deflectable flange thereof against the ram. When the upper body 200 is not used, some alternate means of applying force to the article to cause impingement between the ram and the deflectable flange must be used. In FIG. 21, for example, this alternate means is depicted simply as object 403 (optionally coordinated with object 402). The orientation of the parts relative to gravity is not important, the "downward" force (open arrow in FIG. 21) need only be directed so as to urge the deflectable flange 160 against the ram 300 to cause impingement between the two. It is also immaterial to which of the article and the ram (or both) force is applied in order to cause such impingement. What is important is that impingement of the deflectable flange 160 against the ram 300 (and/o the upper body 200, if used) induces deflection of the peripheral edge 110 of the deflectable flange to a position where it is not readily accessible at the periphery of the article. Thus, in one embodiment, the upper body 200 can be a simple flat plate which can be applied against a flat portion (e.g., the extension 50 of the deflectable flange 160 depicted in FIG. 21) of the article to drive the deflectable flange in the direction of, and ultimately against, the ram.

Figure 23A:
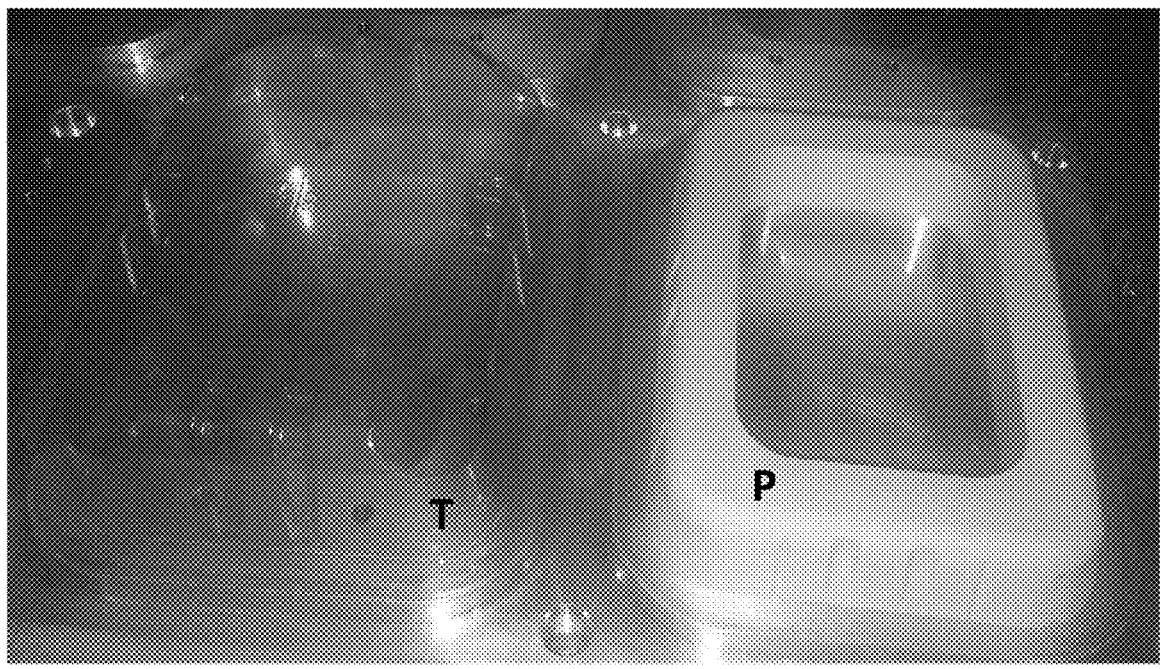
FIG. 23A shows the tray T and plug P side by side.
Figure 23B:
FIG. 23B shows the plug inserted within the interior of the tray.

FIGS. 21 and 22 illustrate using one or more objects to assist with deflection and rolling over of the deflectable flange as described herein. Object 401 (referred to elsewhere herein as a plug) is disposed within an interior compartment of the shaped article 100 and abuts against an inner surface of the shaped article 100 during impingement of the deflectable flange 160 against the ram 300, in order to reduce or prevent inward deflection of the inner surface during the operation. Object 403 applies downward pressure (open arrow) against, in this embodiment, the extension 50 portion of the deflectable flange 160, in order to impinge the deflectable flange 160 against the upper surface 302 of the ram 300. In the embodiment shown in FIG. 21, object 402 rigidly connects objects 401 and 403. Filled arrows depict forces imposed upon the article 100 upon application of the downward pressure. FIG. 23A depicts a shaped article in the form of a rounded rectangular tray T having an interior and a plug P that is shaped and dimensioned to fit within that interior, so as to act as object 401 in FIG. 21 and to reduce or prevent inward deflection of the side walls of the tray T during the rolling over of the deflectable flange of the tray T. FIG. 23B shows the plug inserted within the interior of the tray. In the embodiment shown in FIG. 22, the deflectable flange 160 is formed and rolled away from the face of the extension 50 that is opposite to the face away from which the body 10 of the article extends, and objects 401 and 403 are not connected to one another. It is substantially immaterial in most instances how impingement between the ram and the deflectable flange is effected: the ram can be movably urged against the deflectable flange of a stationary article, the article can be movably urged against a stationary ram, or the article and the ram can both be movably urged against one another.

The Ram 300

Figure 7:
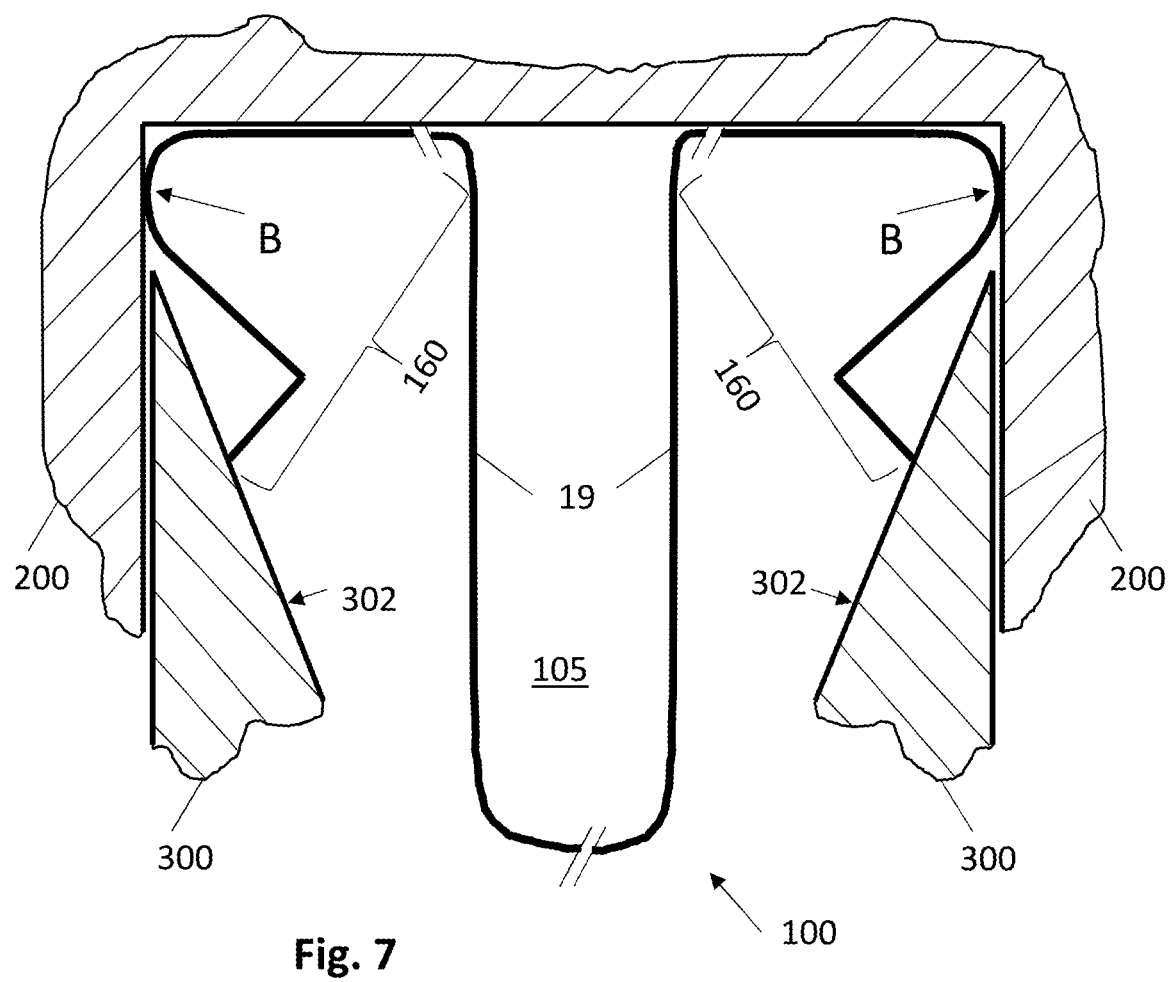
FIGS. 7 and 8 each illustrates a section taken through a storage container article 100 being formed using the methods described herein for a different embodiment. In each figure, the article 100 has a deflectable flange 160 formed on each of the sides of the container visible in the figure. A single upper body 200 extends across the entire container, including around the sides at which the deflectable flanges 160 are located. A single ram 300 (only two portions shown in the figure) has been inserted within the interior of the cavity in the upper body 200 behind the article 100. The peripheral edge 110 of the thermoplastic sheet from which article 100 is formed, infringes upon the upper face 302 of the ram 300 at each deflectable flange 160, causing the deflectable flange 160 to deflect inwardly toward the sidewalls 19 of the body of the article 100 by flexing at one or more portions B of the bend region 150 of each deflectable flange 160. Application of heat at B in an amount sufficient to soften the thermoplastic sheet causes the deflectable flanges 160 to retain approximately the conformation shown in this figure, with the peripheral edges 110 of the thermoplastic sheet positioned anti-peripherally (i.e., within the periphery of the article 100, which occurs at the positions indicated by B in this figure), yielding smooth peripheries to the formed container upon cooling of the softened portions. In the embodiment shown in FIG. 7, the deflectable flange is formed and deflected in the same direction as that in which the compartment 105 extends away from the rim, while in the embodiment shown in FIG. 8, the deflectable flange is formed and deflected in the opposite direction.
Figure 8:
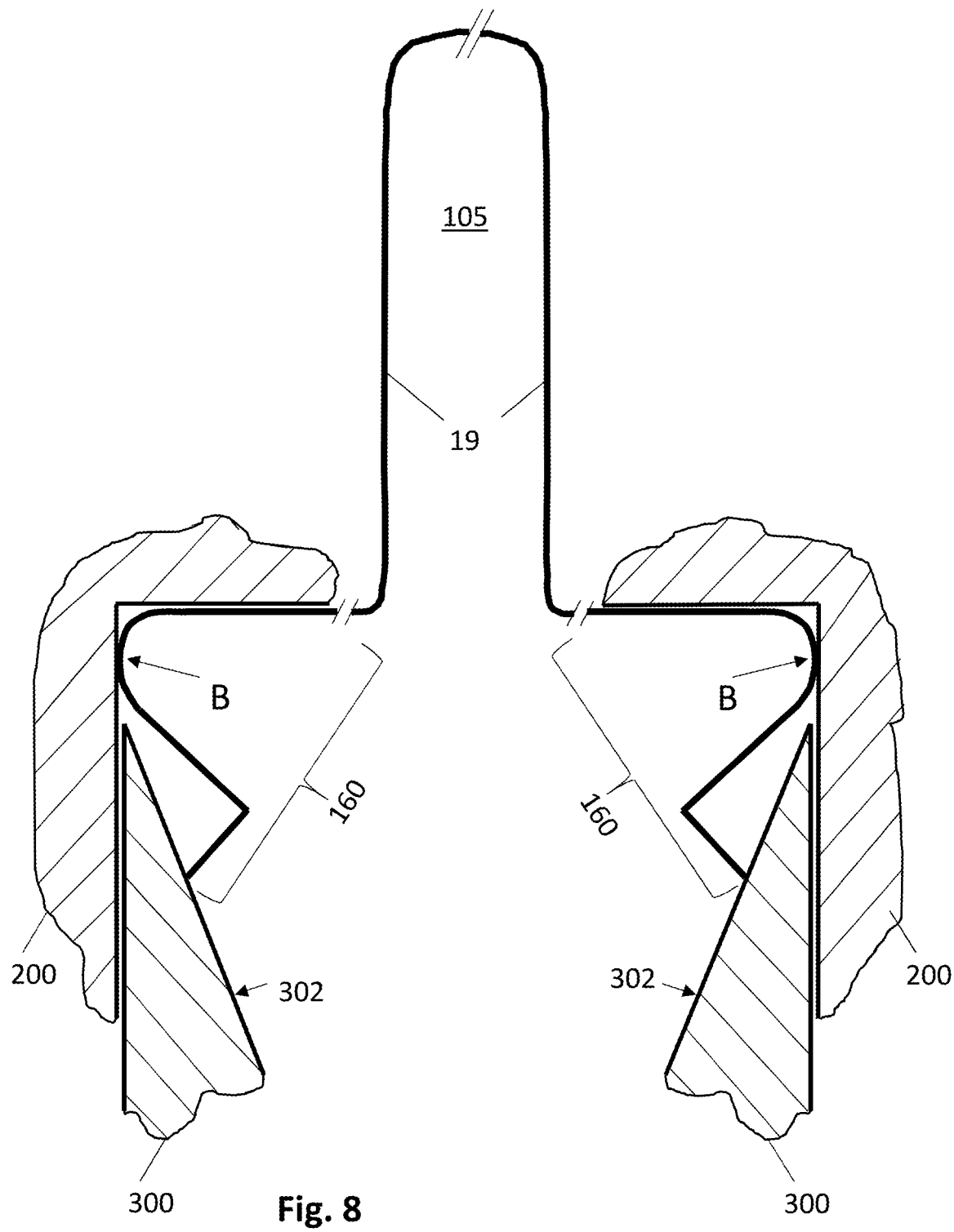

The primary function of the ram 300 is to induce deflection in the deflectable flange. The ram can be used with or without a corresponding upper body 200, but such an upper body can serve to contain and control the article as it is contacted with the ram. The method and mechanism(s) used to impart relative motion between the article and the ram are not critical. When an upper body is employed, the ram is used to impinge upon and apply compressive force to the peripheral flange 120 of the deflectable flange 160 when the article is disposed in the upper body 200. This compressive force tends to drive the peripheral flange 120 upwardly toward the bend region 150 and the extension 50, if present, and anti-peripherally, thereby moving the potentially sharp peripheral edge 110 of the thermoplastic sheet away from the periphery of the article so formed. Accordingly, the design of the ram 300 is not particularly critical, so long as such compressive force is applied. As illustrated in FIGS. 3, 7, and 8, a ram 300 having an angled upper face 302 will tend to direct the peripheral flange 120 in the direction along that angle as it compresses the peripheral flange 120. Thus, it can be beneficial to shape the upper face 302 of the ram 300 in a conformation that deflects or "pushes" the peripheral flange 120 and/or the peripheral edge 110 anti-peripherally as compression occurs.

The conformation of the shaped body 10 of the article is substantially irrelevant to the usefulness of the edge-smoothing methods described herein, except that the conformation must include a deflectable flange 160 of the type disclosed herein at the edge to be smoothed and the conformation must also permit a ram 300 to be applied against a portion of that deflectable flange in a manner that the flange can be deflected thereby to effect the smoothing. For an article having the conformation of a MAP tray, for example, the ram is easily urged against the edged to be smoothed because that edge is present at the periphery of the tray, permitting the ram to be readily applied to all or a part of the edge at once (see, e.g., FIG. 41). For trays having the edge to be smoothed present at the periphery of the tray, the shape of the tray is substantially irrelevant, because the entire tray edge can be urged against a ram having a similar shape in order to deflect parts or the entirety of the edge. For a MAP tray (having a rounded rectangular periphery) for example, a ram having a rounded rectangular-shaped upper surface 302 can be urged against the entire edge (see, e.g., FIG. 5A). Similarly, a ram having an upper surface shaped like an annulus or circular conical section can be employed to deflect the edges of like-shaped sheet edges. Likewise, the edges of a three-sided container (e.g., triangular or pie-slice-shaped) can be smoothed using a ram have three sloped surfaces arranged in a similar configuration (i.e., three straight sides or two straight and one curved side, respectively, arranged in a configuration that matches the configuration of the peripheral edges of the sheet from which the container is formed prior to edge-smoothing). Using a ram having an upper surface configured to impinge upon all portions of the deflectable flange that are desired to be deflected (and thereby smoothed), substantially any configuration of edges can be smoothed using the methods and equipment described herein. For articles possessing multiple peripheral edges (e.g., the containers having a deflectable flange 160 about their entire periphery and a second deflectable flange 860 about the periphery of an internal orifice 106 (see, e.g., the containers illustrated in FIGS. 54-60 and 65), a ram 300 can be shaped and configured to impinge upon one or more or the deflectable flanges simultaneously. When discrete rams are applied to different individual deflectable flanges, the multiple rams can be impinged upon their respective deflectable flanges serially or simultaneously. Multiple rams (e.g., each contacting a discrete portion of a single deflectable flange) can, of course be used to deflect some or all of a single deflectable flange, or a single unitary ram can contact the entire distal portion of a deflectable flange at once.

The upper surface of the ram can be shaped to conform to 'corner' portions of the edge to be shaped (e.g., the vertices of the three side edges of a triangular container) to deflect such corner portions by urging them directly against the ram surface. Alternatively, the ram can be designed so that its upper face contacts only portions of the edge being deflected, and portions of the edge which do not contact the upper surface of the ram can be induced to deflect by ram-induced deflection of adjacent portions of the sheet edge. By way of example, a container having a rectangular outline (four right-angle corners smoothed, if at all, only slightly) can be formed from a thermoplastic sheet. To induce deflection of the four corners of this container, the entire (rectangular) peripheral edge of the sheet can be urged against that upper surface of a ram which engages the edge about its entire periphery—including at the corners. Alternatively, the corners of the same container can be deflected by softening the entire edge of the sheet, while engaging only the straight portions of the deflectable flange against matching ram surfaces; the ram will induce deflection of the straight portions, and deflection of those straight portions will (by way of intra-sheet tension induce by deflection of those straight portions) transmit deflecting torque to the corner portions, with the result that the softened corner portions will be induced to deflect in the same direction (e.g., inwardly or outwardly) as the adjacent straight edge portions. As another alternative, the straight portions of the deflectable flange of the same container can be deflected by softening the entire edge of the sheet, while engaging only the corner portions of the deflectable flange of the against matching ram surfaces; the ram will induce deflection of the corner portions, and deflection of those corner portions will (by way of intra-sheet tension induce by deflection of those corner portions) transmit deflecting torque to the straight portions, with the result that the softened straight portions will be induced to deflect in the same direction (e.g., inwardly or outwardly) as the adjacent corner edge portions. Thus, the upper surface of the ram need not precisely match the shape of the edge to be deflected, so long as the portions of the ram which do match and contact the edge are sufficiently numerous, large, and properly positioned to induce deflection at the non-contacted portions. A skilled artisan in this field can readily determine (with little or no experimentation) the portions of the edge which must be contacted to induce deflection of all desired edge portions, given the shape of the edge and the process conditions used.

Like the upper body 200, the materials from which the ram 300 is made are not critical. Metals, ceramics, stones, and polymeric materials capable of withstanding the temperatures and pressures of operation are suitable and readily selectable by a skilled artisan. If the ram 300 is able to conduct heat and is cooled, then heat that is present in the deflectable flange 160 during its shaping can flow to the ram 300, and this heat flow can serve to cool and thereby stiffen the deflectable flange 160 in its deflected position upon its compression between the upper body 200 and the ram 300, for example. Heat can likewise be provided by the ram 300 to one or more portions of the deflectable flange in conventional ways, such as by using a heated ram or incorporating a heating element into or onto the ram.

In an embodiment illustrated in FIG. 5, a single ram 300 can be constructed to impinge upon substantially all peripheral flanges 120 of an article simultaneously. The ram 300 depicted in FIG. 5, for example, is designed to impinge upon and apply compressive force to the single peripheral flange 120 that extends completely around the periphery of an article having the shape of a rectangular tray-type container having rounded corners.

In an alternative embodiment illustrated in FIGS. 9-11, the deflectable flange 160 of an article is heated to softening and impacted against a ram 300 in the absence of an upper body 200 of the type described herein. The absence of an upper body 200 may lead to distortion or deflection of softened portions of the deflectable flange 160, at least if the other portions (e.g., the extension 50 or parts of the body 10 of the article 100 that are adjacent the deflectable flange 160 are insufficiently rigid to prevent such distortion or deflection. However, if such rigidity is present, or if such distortion or deflection is tolerable in the final product, the methods described herein can be used without an upper body 200.

FIGS. 9-11 also illustrate the significance of the length (measured from the elbow to the peripheral edge) of the peripheral flange. The peripheral edge contacts the ram. Force imparted upon the peripheral edge by the face 302 of the ram induces deflection of the deflectable flange 160 toward the body 10 of the article 100. When the deflectable flange 160 includes a peripheral flange 120 that is offset from the spacer portion 140 by a ninety-degree elbow 130, as shown in FIGS. 9 and 10, the length of the peripheral flange will influence the degree of deflection of the deflectable flange. Comparing FIG. 11 (a deflectable flange in which the "length" of the peripheral flange is zero; i.e., a deflectable flange lacking a peripheral flange) with FIG. 10, it can be seen that the presence of the peripheral flange induces greater deflection of the deflectable flange in the configuration shown. Moreover, looking to FIG. 9, increasing the length of the peripheral flange increases the degree of deflection induced by the ram. Thus, although the elbow and peripheral flange are optionally not present, their presence enhances deflection and can enhance the "rolling" effect that can be achieved.

Figure 41:
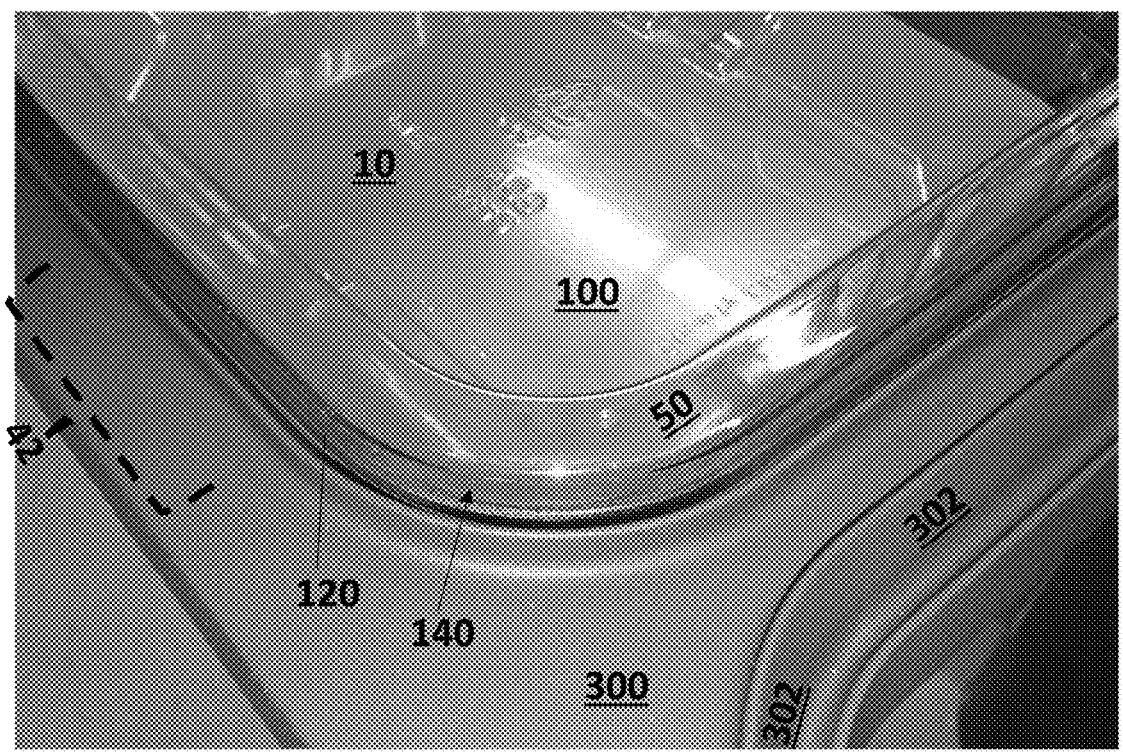
FIG. 41 is an image of a ram 300 having a shaped article 100 in the form of a rimmed, rounded rectangular tray borne thereby. In the lower right portion of the image can be seen the upper surface 302 in which a second article could be disposed, but which does not currently bear an article. In the article 100 borne by the ram 300 in the upper part of the figure, it can be seen that the extension 50 connects the spacer 140 and peripheral flange 120 portions of the deflectable flange to the body 10 of the article 100. The spacer 140 and peripheral flange 120 are carried by the upper surface of the ram 300 in the upper part of the figure, and that upper surface (analogous to upper surface 302 in the lower right portion of the figure) cannot therefore be seen directly. "42" indicates a portion of the ram 300 shown (with the shaped article 100 removed) in FIG. 42.
Figure 42:
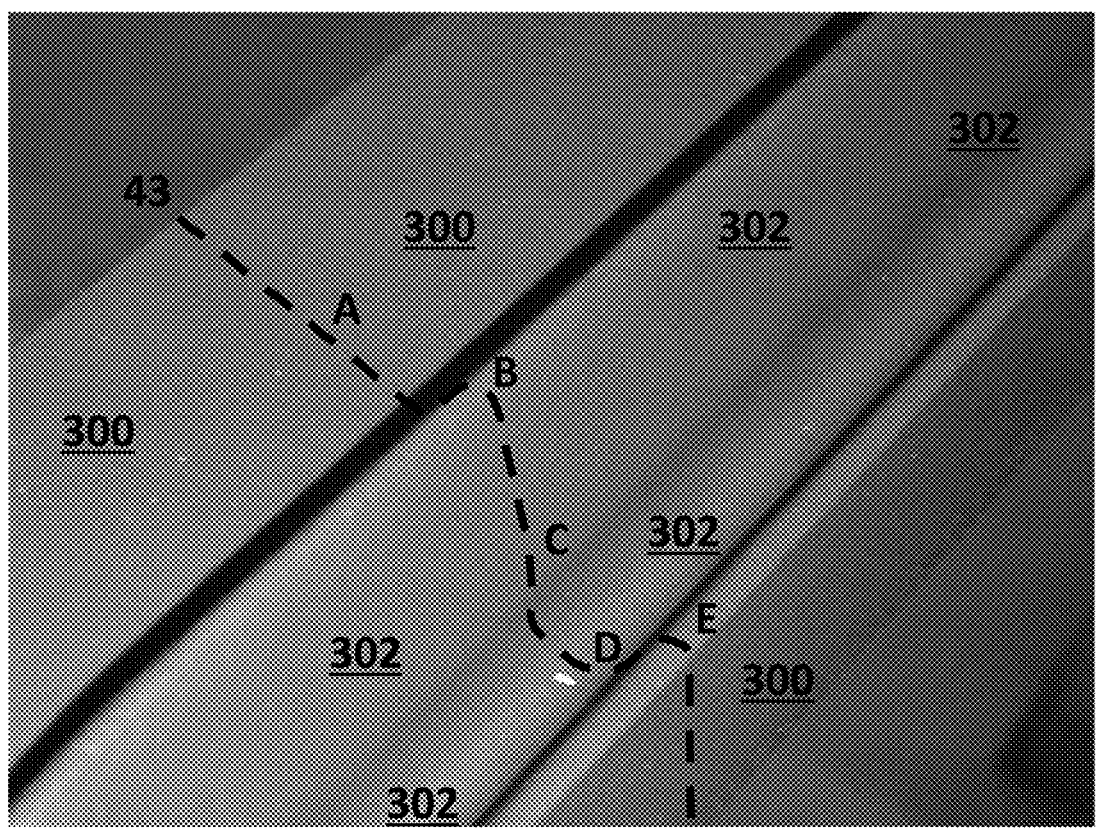
In FIG. 42, portions of the upper surface 302 of the ram 300 can be seen. Dashed line 43-43 in FIG. 42 indicates the approximate position of the cross-section depicted in FIG. 43, and letters A-E are included as landmarks so that the surface configuration of the ram 300 can be better understood by comparing FIGS. 42 and 43.
Figure 43:
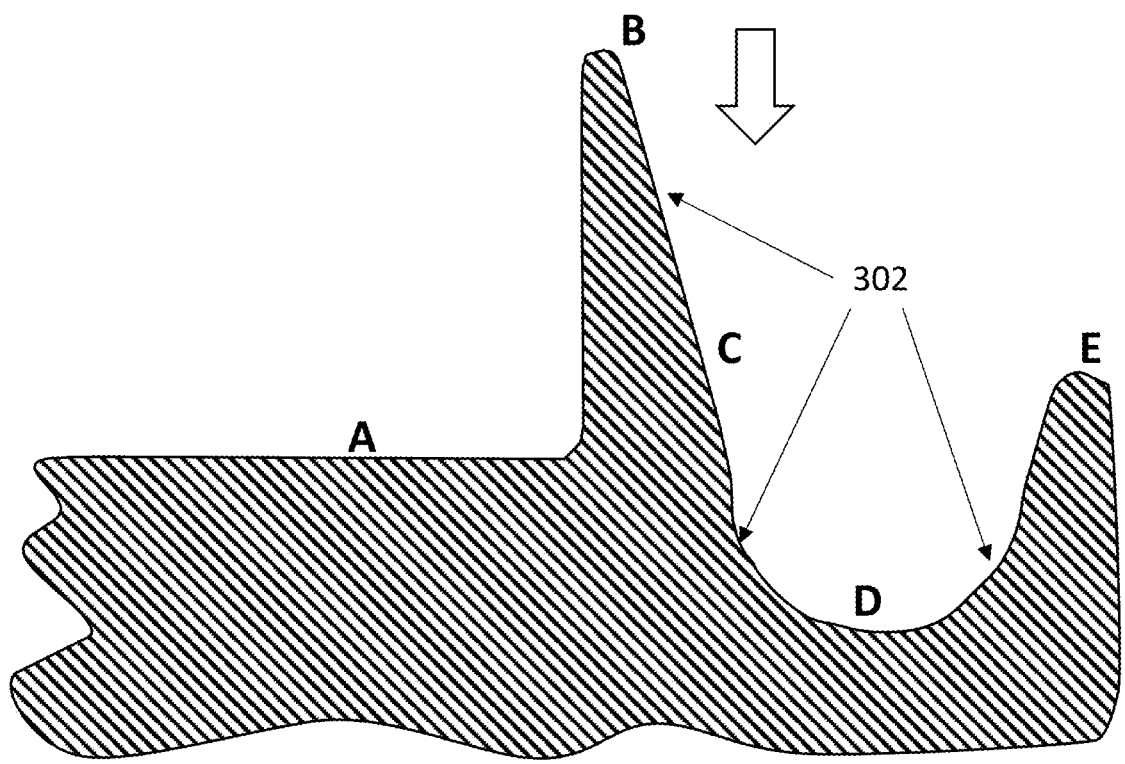
FIG. 43 is a diagrammatic cross-section of the ram 300 shown in FIG. 42, including landmark letters A-E.

FIGS. 41-43 depict an embodiment of the ram 300 described herein for rolling over the edge of a shaped article having a deflectable flange 160. FIG. 41 depicts a ram 300 having at least two positions for accepting articles 100 having deflectable flanges as described herein. The upper portion of the figure shows a position that bears an article 100. Because it does not bear an article, the position partially shown in the lower right of the figure reveals the upper surface 302 upon which the article is borne when present. The position in which an article is borne in the figure has an identical upper surface 302, but it is obscured by the spacer 140 and peripheral flange 120 of the article 100 borne therein. This figure also illustrates how the extension 50 spaces the body 10 of the article away from the spacer and away from the ram, providing space (visible through the clear material that forms the extension) into which the spacer and peripheral flange can be deflected, bent, or curled.

FIGS. 42 and 43 show details of the upper surface 302 of the ram 300, including a curved portion (at approximately D in FIG. 43) which will deflect the peripheral edge 110 of the deflectable flange when urged against it at a softened temperature. FIG. 42 is a close-up image of the upper surface, and FIG. 43 is a cross-sectional diagram illustrating the approximate shape of that upper surface. In operation, the ram is used by impinging the peripheral edge 110 of the deflectable flange against the upper surface 302 (from the 'downward' direction indicated by the open arrow in FIG. 43) at a position anywhere between positions B and D, and then applying further downward force to drive the peripheral portion of the deflectable flange further against the ram. This further force induces the peripheral edge to slide, scrape, or skip across the upper surface and induces the deflectable flange to deflect inwardly (i.e., toward the body of the article which, in this embodiment, is located closer to the E position than to any of A-D). When the deflectable flange is heated above its softening point (i.e., glass transition temperatures), this deflection will be non-elastic and will be reflected in the shape of the deflectable flange if it is thereafter cooled to a temperature below its softening point.

The curved portion of the upper surface 302 of the ram 300 between positions C and E in FIG. 43 induces the softened portion of the deflectable flange to roll or curve, and the degree of curvature induced is controlled by the extent to which the deflectable flange is impinged against the ram. Thus, for example, only the peripheral-most portion of the deflectable flange might be deflected if the deflectable flange is caused to impinge only slightly against the upper surface after softening, the peripheral edge will be pointed approximately toward the body if a softened portion of the deflectable flange is impinged to the extent of position D, and the peripheral edge of the deflectable flange will be effectively "rolled over" (i.e., the plane of the deflectable flange at its peripheral edge extends to intersect the underside 161 of the deflectable flange) if a softened portion of the deflectable flange is impingingly extended beyond position D (as shown in FIGS. 24C and 25C, for example). Depending on the material from which the deflectable flange is made, the deflectable flange can substantially retain its shape as it cools in the 'rolled over' configuration (e.g., PET and PVC materials tend not to slump or droop when acted upon by gravity in a softened state, while PE and PP materials can be bent substantially by gravity alone when softened). Even when this is not so, so long as the peripheral edge of a deflectable flange that droops or slumps does not expose the peripheral edge at the periphery of the article, such bending is acceptable (e.g., when the rolled-over edge is rolled over sufficiently that any drooping occurs in the interior space of the roll).

Accessories

In the methods illustrated in FIGS. 1-4 and 17-34, impingement of the upper body 200, the ram 300, or both upon the deflectable flange 160 can induce inward flexing of the walls of the shaped article. By way of example, the compression induced in the deflectable flange upon impingement upon the flange of the sidewalls of the upper body (compare the positions of spacer 140 in FIGS. 1 and 2) will induce inward (i.e., away from the sidewalls of the upper body and toward the shaped body 10 of the article 100) force on extension 50, which force will be transmitted to the shaped body, potentially causing a portion of the body to buckle or deflect. Similarly, impingement of the ram upon the peripheral flange portion 120 of the deflectable flange will also induce inward force on the extension and thereby upon the shaped body. Further by way of example, inward force exerted upon deflectable flanges in embodiments shown in FIGS. 16-34 can also be transmitted to the shaped body of the article.

Transmission of force from the deflectable flange to the shaped body can be undesirable for at least three reasons. First, deflection of the shaped body can alter the orientation of the deflectable flange and the portions that are bent as described herein, making control of the final shape of the article (and its edge) difficult. Second, force that is transferred from the deflectable flange to the body will generally not drive the deflectable flange against the ram and/or upper body, meaning that the force will not cause the bending and deflection of the deflectable flange described herein, at least to the intended degree. Third, if portions of the article body 10 remain in a softened state during the edge-smoothing process, then transmission of force from the deflectable flange 160 to the body 10 may deform the body in undesirable ways. It is therefore desirable to limit transmission of force from the deflectable flange 160, deflection of the shaped body 10 by such forces, or both, so as to direct the force into deflection of the deflectable flange 160.

Substantially any equipment or method for preventing or reducing transmission of force from the deflectable flange to the body, reducing or preventing deflection of the shaped body, or both can be employed. Shown in FIG. 21 is an example of such equipment and how it is used. FIG. 21 illustrates shaping of the deflectable flange 160 in a shaped article 100 by application of downward force (open arrow), as shown in FIG. 17B. In contrast with FIG. 17B, the shaped article shown in FIG. 21 is coupled with three objects, 401, 402, and 403. Shown here in cross-section, each of the three objects is a solid having a rounded square profile (e.g., rounded metal bars). Object 401 is abutted against a portion of the shaped article 100 upon which inward force (smaller, horizontal solid arrow) is applied when the downward force causes the deflectable flange 160 to impinge upon the upper surface 302 of the ram 300. Object 403 abuts the extension 50 of the deflectable flange and transmits the downward force to the deflectable flange. Object 402 connects (rigidly, in this example, but not necessarily) objects 401 and 402. One or more of the three objects can be cooled, to prevent heat (e.g., from heated ram 300) from softening the plastic at its body or extension.

In FIG. 21, when downward force (open arrow) is applied to the object 403, the force is transmitted to the deflectable flange. Impingement of the deflectable flange upon the ram 300 opposes the downward force. This force could, in the absence of object 401 be transmitted through the deflectable flange (i.e., through extension 50) to the shaped body of the article 100. However, because object 401 is present and held in place sufficiently to prevent deflection of the portion of the article it abuts, downward force applied to the deflectable flange cannot be dissipated by deflection of the shaped body (i.e., in the direction indicated by the small horizontal black arrow in FIG. 21, because object 401 prevents such deflection), and the downward force is instead imposed along the deflectable flange in the direction shown by the large black arrow in FIG. 21. This force drives the deflectable flange (particularly its peripheral edge, the peripheral flange if present, and the portion of the spacer nearest the peripheral edge) against the ram 300 and induces deflection of the deflectable flange, conformation of portions of the deflectable flange against the upper surface 302 of the ram (especially when the amount of heat provided by the ram is sufficient to soften those portions), and displacement of the deflectable flange across the surface of the ram. As shown in the figure, the contour of the upper surface of the ram is thereby imparted to the peripheral-most portions of the deflectable flange, resulting in smooth bending of those portions (assuming a smooth contour to the upper face of the ram) and displacement of the peripheral edge of the deflectable flange toward the body of the article (or even 'curled' back beyond the body, for example as shown in FIG. 17C).

FIG. 22 illustrates similar concepts for an article in which the body 10 and the deflectable flange 160 extend away from the junction 162 between them in opposite directions (i.e., wherein the deflectable flange 160 is rolled on the "trans" face of the extension 50). In this illustration, the shaped article is coupled with two objects, 401 and 403. Object 401 is abutted against a portion of the shaped article 100 upon which inward force (smaller, horizontal solid arrow) is applied when the deflectable flange 160 is impinged upon the upper surface 302 of the ram 300. Object 403 abuts the extension 50 of the deflectable flange and transmits the force to the deflectable flange 160 to induce such impingement. When force (open arrow) is applied to the object 403, the force is transmitted to the deflectable flange. Impingement of the deflectable flange upon the ram 300 opposes the downward force. This force could, in the absence of object 401 be transmitted through the deflectable flange (i.e., through extension 50) to the shaped body of the article 100. However, because object 401 is present and held in place sufficiently to prevent deflection of the portion of the article it abuts, downward force applied to the deflectable flange cannot be dissipated by deflection of the shaped body (i.e., in the direction indicated by the small horizontal black arrow in FIG. 22, because object 401 prevents such deflection), and the downward force is instead imposed along the deflectable flange in the direction shown by the large black arrow in FIG. 22. This force drives the deflectable flange against the ram 300 and induces deflection, conformation against the upper surface 302, and displacement across the surface. As shown in the figure, the contour of the upper surface of the ram is thereby imparted to the peripheral-most portions of the deflectable flange, resulting in smooth bending of those portions and displacement of the peripheral edge in the direction of the body of the article.

The shape, size, arrangement, attachments (if any) of objects 401, 402, and 403 are not critical. Likewise, not all three objects need necessarily be used together; one, two, or all three can be employed. In one embodiment, the three objects are fixed together to form a "lid" or "plug" for a container like that shown in FIGS. 12-15, so that the portion of the lid/plug that corresponds to object 401 can substantially fill the interior of the container (i.e., pressing against all walls, and especially including the four long, straight walls of the container), the portion of the lid/plug that corresponds to object 403 forms a ring that can be applied against the entire rim of the container surrounding its interior, and the portion of the lid/plug that corresponds to object 402 can be any material or mechanism that connect them. For example, such a lid/plug could be formed from a single piece of material (e.g., a 'plug' that fills the entirety of the interior and overlaps the rim surrounding the interior). One or more of the objects can be cooled to reduce heating of the shaped article (other than where desired, at portions of the deflectable flange) and to thereby prevent undesired deformation of the shaped articles during processing.

Generalized, object 401 is simply a mass for preventing flexing of the sides of the shaped article during deflection of the deflectable flange. Such an object may fill substantially all portions of the interior of the shaped article (e.g., the entire interior of the container shown in FIG. 14). Alternatively, one or more objects 401 may be used to buttress portions of the shaped article that are more easily deflected than others (e.g., the long straight sides of the container shown in FIG. 14).

Object 403 can be any object that can urge the deflectable flange against the ram. Multiple objects can be used to urge the deflectable flange against one or more rams at various locations on the article, or a single object 403 that contacts the article at or near all portions of the deflectable flange can be used. In one embodiment, object 403 is the upper body 200 described herein, such as in the form that completely surrounds the rim of a container such as that shown in FIG. 14. Object 403 can be a brace or frame designed to fit snugly against the entire rim of a container surrounding an internal concave compartment of the chamber, so as to simultaneously urge a deflectable flange that completely surrounds that rim against a ram in the manner described herein. In one embodiment, object 403 can be deliberately cooled (e.g., by directing a cooling fluid such as chilled water, chilled oil, or ambient air against or through the object, particularly where the object is made of a good conductor of heat, such as a metal) so as to reduce, inhibit, or prevent heating of the body of the shaped article during processing (e.g., as shown in FIG. 21). Object 403 can be linked, rigidly or movably, with object 401 so that the flex-resisting object 401 can be applied to the interior of a shaped article simultaneously with application of force to the deflectable flange of the shaped article by object 403.

Object 402, when present, can be an object that connects object 403 to a source of force, an object that holds object 401 in place within a concave portion of shaped article 100 during deflection of deflectable flange 160, or a combination of these. In an important embodiment (illustrated, for example, in FIGS. 46-57) Objects 401, 402, and 403 are all embodied in a thermoforming mold 700 used for shaping a substrate sheet into the article bearing the deflectable flange (prior to edge-rolling); some portions or all of the mold 700 is employed during the edge-smoothing process to impart force to the shaped article and to hold the article in place during the edge-smoothing operation.

System for Forming Articles

As described above, precursors of the shaped articles described herein can be formed by standard thermoforming methods, using standard thermoforming equipment. To do so, a thermoforming mold is used to make a precursor article by imposing upon a thermoplastic sheet the desired conformation of the finished article, except that the deflectable flange described herein is included at the peripheral edge(s) at which the smooth periphery is to be formed. Upon cutting the precursor article from the web of thermoplastic sheet, the edge-smoothing operations described herein can be performed by impinging the deflectable flange upon the ram (optionally with the aid of an upper body).

Newly-thermoformed precursor articles will tend to emerge from the thermoformer at a temperature close to (but below) the glass transition temperature of the thermoplastic. Impinging the deflectable flange and the ram shortly after removing the precursor article from the thermoformer can reduce the quantity of heat energy which must be supplied to one or more portions of the deflectable flange in order to achieve the desired deflection (or "rolled over" edge effect) of the deflectable flange described herein. For this reason, it can be desirable to combine the thermoformer, the ram, and an impingement mechanism into a single system or a single piece of equipment. Such a system or piece of equipment should include i) a thermoformer module capable of forming the precursor article; ii) a cutter for cutting the precursor article from a thermoplastic sheet or roll from which it was formed; iii) the ram; and iv) a mechanism for positioning the precursor article against the ram (i.e., so that the deflectable flange portions line up with the corresponding ram portions) and impinging the precursor article and the ram together. The heat required during the deflectable flange-deflection operations described herein can be provided by the ram, by the cutter (e.g., using a heated cutting blade to heat the peripheral edge and an adjacent peripheral portion of the deflectable flange above the softening temperature of the thermoplastic), by a separate heater (e.g., a radiant heating element disposed in close opposition to the ram when it is engaged against the deflectable flange), or by a combination of these. The precise selection, orientation, order, and construction of these pieces of equipment are not critical and can be selected by a skilled artisan in light of the requirements and processing steps described herein. The system or equipment can also include the plug described herein for insertion within a void in the precursor article prior to impingement of the deflectable flange against the ram.

One purpose of the upper body 200, object 401, and the plug P described herein is to reduce or prevent undesired flexion, deflection, buckling, bending, or displacement of portions of the shaped article during deflection or rolling-over of the deflectable flange 160. Another purpose of the upper body 200 and the object 403 described herein is to impart force to the shaped article in a direction that will cause the deflectable flange 160 to impinge upon and be deflected by the ram 300. Yet another purpose for the upper body 200 and the object 402 is to retain substantially constant, relative to one another, the spatial configuration of the portions of the upper body and objects which perform the first two purposes. These purposes require that the corresponding elements exhibit rigidity, conformity to the shape, size, and configuration of the portion of the shaped article to which they are applied, and/or the ability to confer forces to (or resist deformation of) the shaped article. In addition to the articles mentioned already in this paragraph, there is another item of equipment which can perform some or all of these purposes: the mold element(s) used to confer or define the shape of the shaped article while it is formed.

One or more mold elements can be used to confer a shape to a surface of the shaped article and thereafter used to support that surface during edge-smoothing operations, whether or not the mold element(s) remain in constant contact with the surface throughout the forming and edge-smoothing processes. That is, a mold element may be used to confer a shape to a surface during article formation, separated from that article for a brief or long (long enough to permit the article to thoroughly cool, for example) period of time, and thereafter reapplied against that surface to perform any of the purposes set forth in the preceding paragraph during the edge-smoothing operation. Alternatively, the mold element may be used to confer a shape to a surface during article formation, remain in contact with that same surface between article formation and edge-smoothing, and then continue to remain in contact with the same surface during the edge-smoothing process. Naturally, when multiple substantially identical mold elements are used to form a surface of numerous shaped articles, it is immaterial whether the same mold element that was used during forming of an individual shaped article is also used during the edge-smoothing process or whether a substantially identical mold element is used in its place during edge-smoothing. What is relevant is that the mold element(s) snugly fit against the shaped article.

Multiple mold elements can be used to form the various parts of an article that has a shaped body joined at a junction to a deflectable flange formed at or near the edge of the article. Various ones of the mold elements can be moved or removed during the article-forming process, including during the edge-smoothing process. By way of example, some mold elements can be used to confer to a softened substrate sheet 101 the shape of the body 10 of an article described herein, while one or more other mold elements can be used to confer to the substrate sheet 101 the shape of the junction 162 and some or all parts of the deflectable flange 160. Alternatively, one or more first mold elements can be used to confer to the substrate sheet 101 the shape of the body 10, the junction 162, and portions of the deflectable flange 160 that do not need to be manipulated by edge-smoothing equipment, while one or more second mold elements can be used to confer to the substrate sheet 101 only the shape of the portions of the deflectable flange 160 that are manipulated by edge-smoothing equipment during the edge-smoothing operation. In this alternative embodiment, the first mold elements can be opposed against the substrate sheet 101 throughout both the thermoforming and edge-smoothing operations, while the second elements are opposed against the substrate sheet 101 during the thermoforming operation, but are removed, displaced, or deformed during the edge-smoothing operation. An example of such a process is described in each of Examples 3 and 4, in which mold elements used to shape portions of the deflectable flange 160 during thermoforming are displaced by ram 300 elements during the edge-smoothing operation.

There is necessarily close correspondence between the shape of the mold element(s) 700 used for forming the article having a deflectable flange 160 and the shape of the ram 300 used for deflecting the deflectable flange after it has been formed. For this reason, it can be beneficial to make, transfer, and sell mold elements and rams that are designed to be used together. As shown, for example in FIGS. 46-57, mold elements, rams, and other equipment for containing, cutting, heating, and manipulating the substrate sheet 101 from which the articles described herein are formed can be combined into a single machine or series of cooperating machines. Similarly, machinery for combining and/or laminating plastic layers which compose the substrate sheet or one or more liner sheets can be included in such a system. Likewise, machinery for filling (with items to be contained, with a gas to fill a compartment, or both) and sealing (i.e., with a lidding film) containers as they are made can be included as well. Such a system can, for example, take in rolls of a thermoformable substrate sheet, rolls of a peelable liner sheet, rolls of a lidding film, a canister of compressed gas, and items to be packaged and produce therefrom packages in which the items are contained within a smooth-periphery container formed of the substrate, lined with the liner, and sealed with the lidding within a compartment having a selected gas content. More typically, container manufacture (smooth-periphery shaped substrate and liner) is performed separately from filling and sealing operations. If desired, the precursor-container manufacture, edge-smoothing, and filling/sealing operations can each be performed in different locations and at different times, using discrete machinery.

Stacking Characteristics

FIGS. 35-40 illustrate a beneficial feature of one embodiment of the shaped articles disclosed herein.

Figure 35:
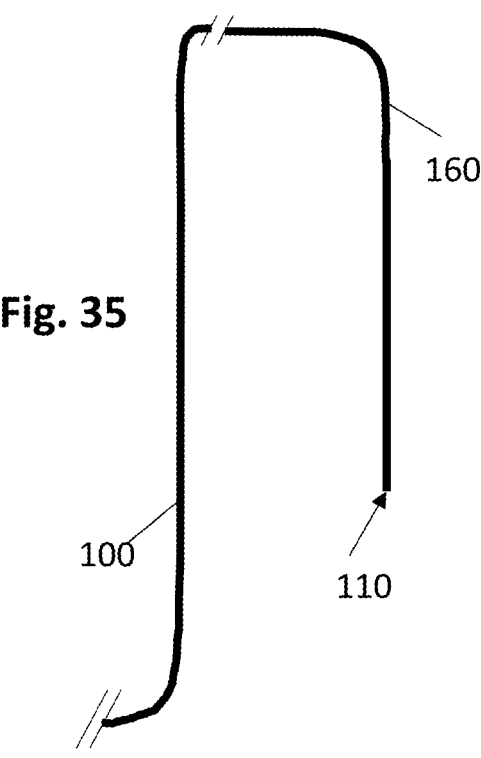
FIGS. 35-40 illustrate a beneficial feature of one embodiment of the shaped articles disclosed herein.

FIG. 35 is a cross-sectional view of one edge of an article 100 showing the conformation of its deflectable flange 160 prior to the rolling-over operation described herein, including the property that the potentially sharp or rough peripheral edge 110 is accessible to contact a film used to seal the article or another nearby film or object. FIG. 36 is a cross-sectional view of one edge of an article 100 have a peripheral edge 110 rolled over by the technique illustrated in FIGS. 17A-17C. Relative to the article engaged with the ram illustrated in FIG. 17C, the deflectable flange 160 of the article has 'rebounded' in a peripheral direction following disengagement from the ram. Because the plastic material of which the article is constructed is flexible, the rolled-over edge shown in FIG. 36 exhibits 'springiness' when urged in directions normal to the plane of the figure, such as in the directions indicated by the open arrows.

Figure 37:
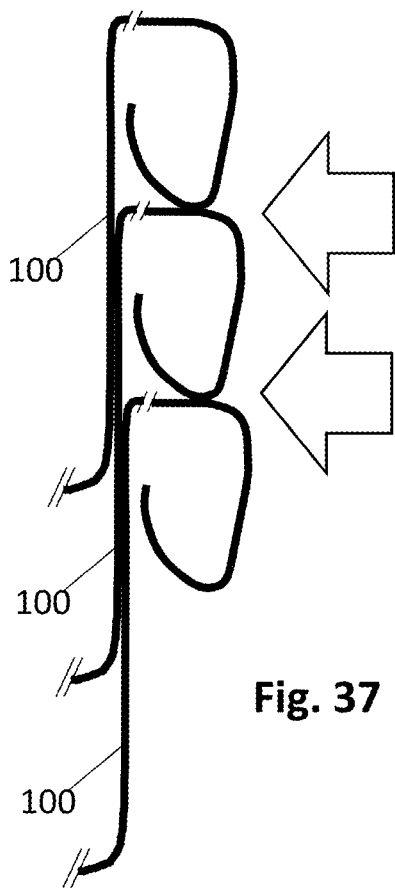

FIG. 37 is a cross sectional view of the edges of three of the articles 100 shown in FIG. 36, the articles being stacked in a nested configuration. Because each of the article has the same shapes (e.g., a tray like the one shown in the lower portion of FIG. 13), each article can nest and be urged together until with others its rolled-over edge contacts the tray above and/or below it. FIG. 37 illustrates three thus-stacked nested trays, with open arrows indicating positions at which standard de-nesting equipment can be employed to separate the nested trays. Fingers or threads, for example, can engage the inter-tray regions at these positions, the fingers or threads being operable (per ordinary de-nesting procedures) to separate the trays from one another for individual use.

Figure 38:
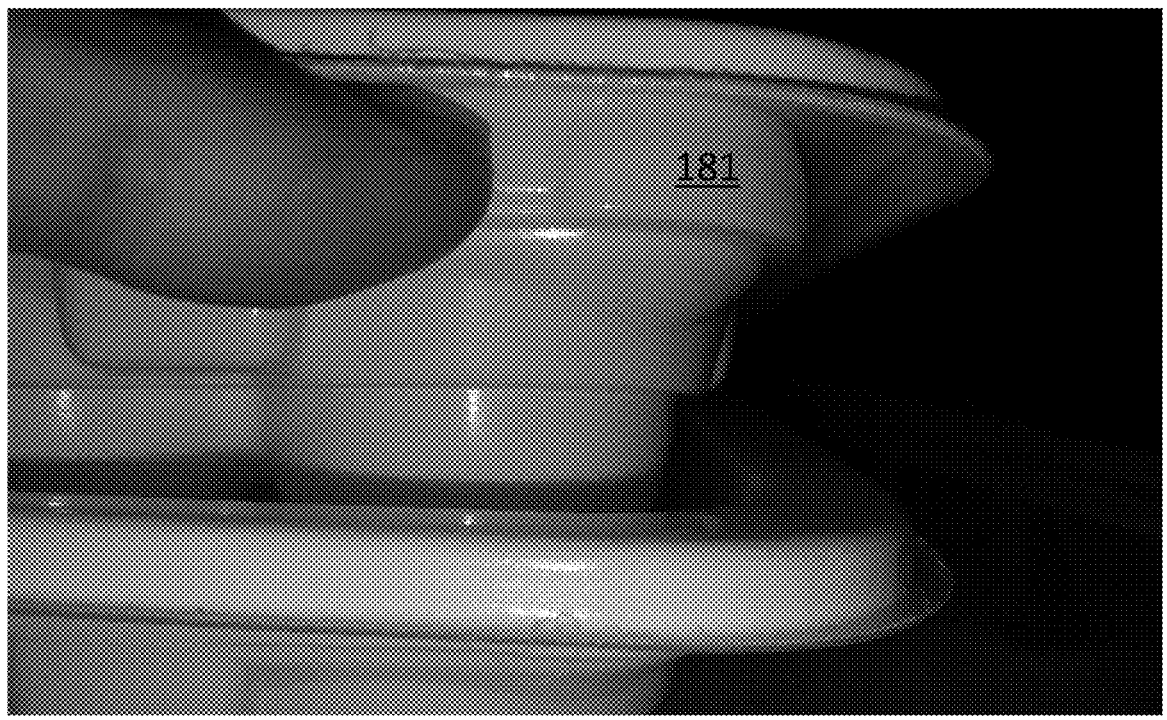
Figure 39:
Figure 40:
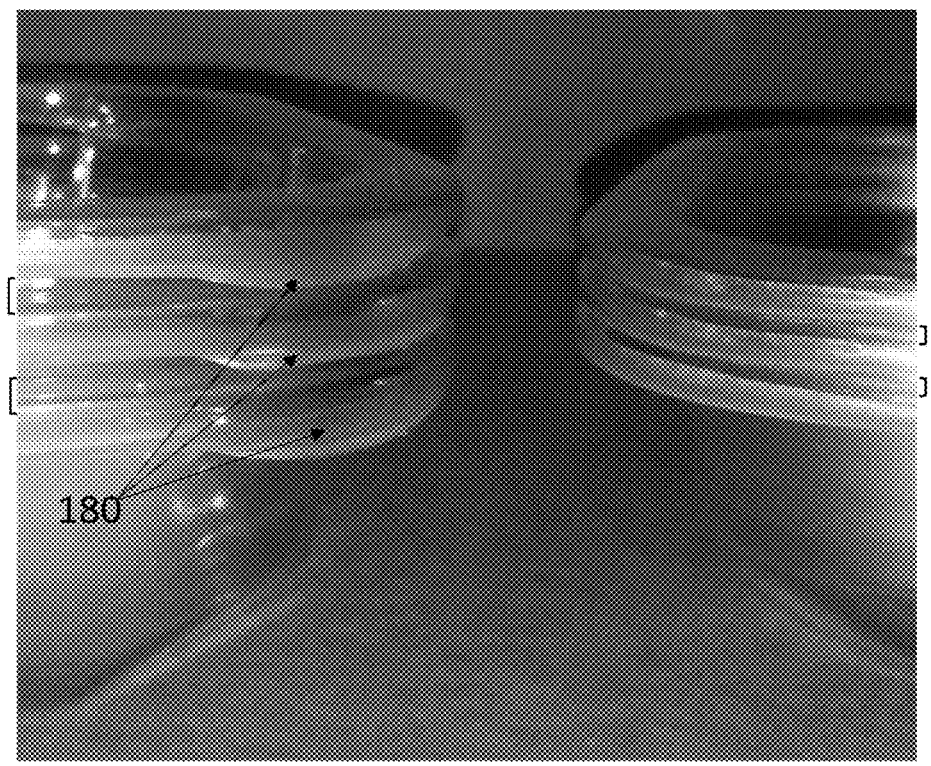

FIG. 38 is an image of a prior art thermoformed plastic tray having a stacking lug 181 (the corner extension beneath the rim, toward which the finger in the image is pointing). The stacking lug serves to maintain a controlled separation distance between stacked trays, as shown in the left portion of FIG. 39 (which is an image of two of these prior art trays stacked against one another, with the inter-tray distance being limited by the stacking lug). The right portion of FIG. 39 shows two stacked, nested trays having rolled-over edges (as illustrated diagrammatically in FIG. 37 with three trays). An inter-tray division is visible between the rims of the two stacked trays. FIG. 39 illustrates that two trays having rolled-over edges as described herein can be stacked in a separable way in a smaller volume than can prior art trays having stacking lugs. FIG. 40 shows, on its left side, three nested and stacked trays having rolled-over edges and having stacking extensions 180 formed into the corners thereof to increase separation between the straight edges of the stacked trays. The three stacked trays having stacking extensions 180 can be seen to have greater separation (large brackets on left side of figure) than the separation (small brackets on right side of figure) of three otherwise-identical stacked trays lacking stacking extensions.

As illustrated in FIGS. 37 and 39, an additional advantage of the rolled-over edge formed by this process is that the rolled edge can be used instead of conventional stacking lugs (i.e., thermoform-shaped portions of articles contoured to limit how closely an article can nest within another otherwise-identically shaped article). Such known stacking lugs, in order to perform their desired anti-nesting function, must furthermore be narrower at their upper end than their lower end (referring to FIG. 38 as an example) in order to prevent nesting of the stacking lugs of adjacent trays. This 'narrower-at-the-top' conformation presents known difficulties with de-molding the trays during thermoforming, since the narrower 'top' portion of the lug must be stretched or deformed over the larger 'bottom' portion of the lug mold in order to remove the thermoformed tray from the mold. The rolled edge depicted in FIGS. 17-40 (i.e., made as described herein) avoids this difficulty, while still preventing inappropriately close nesting of adjacent trays. Trays having the rolled edge described herein can be separated using conventional de-nesting equipment (e.g., screw- and finger-based machines for separating adjacent nested/stacked trays) and, as shown in FIG. 39, permit denser packing of trays than is possible using trays having formed stacking lugs.

FIG. 40 illustrates an optional embodiment of the rolled edge described herein that also affects the stacking characteristics of shaped articles having the rolled edge. On the right side of FIG. 40 are shown three stacked trays having the rolled edge described herein, the rolled edge being substantially identical (including in height) about the entire periphery of the tray. On the left side of FIG. 40 are shown three other stacked trays, these trays also bearing a rolled over edge as described herein about their entire periphery. However, in contrast to the trays on the right of the figure, the rolled edge of those on the left are not uniform about their entire periphery. As shown in the figure at one corner, a smaller portion of the deflectable flange has been rolled over at the corners of these trays than the portion of the deflectable flange that is rolled over along other portions of their edge. As a result, the trays bear rounded stacking extensions 180 at their corners. Like that stacked trays shown on the right of FIG. 40, those on the left of the figure are nested within one another and settle until the lower surface of the rolled edge of a tray contacts and rests upon the upper surface of the rolled edge of a second tray within which it is nested. However, because the stacking extensions 180 of the trays on the left of the figure have a greater height than much of the rest of the rolled edge of those trays, the trays on the left will nest such that the lower surface of a stacking extension 180 rests on the upper surface of the rolled edge of a tray beneath it, leaving the lower surface of much of the rolled edge of the upper tray out-of-contact with the tray beneath it, yielding a gap between the nested trays (compare the gap indicated by the large brackets in the left of FIG. 40 with the indentation indicated by the small brackets in the right of FIG. 40). When a shaped article 100 is given a rolled over edge including a stacking extension 180 as described herein, the degree to and way in which the deflectable flange is deflected should nonetheless be selected to position the peripheral edge 110 at the stacking extension 180 such that it is unlikely to contact films or other materials at the periphery of the article 100, as described herein.

Yet another advantage of the 'rolled edge' depicted in FIGS. 17-40 is the mechanical strength imparted to a shaped article by such an edge conformation. Thin plastic films tend to be highly flexible, and articles formed from such films can have 'flimsy' edges that are easily deformed upon handling or manipulation (e.g., during sealing or wrapping with film). For the same reasons that hollow tubes or rounds of material tend to be stronger and more rigid than planar sheets of material of the same type and thickness, the curved or rolled edge described herein confer greater edge strength and rigidity to the shaped articles described herein than corresponding articles lacking such an edge. This edge strength and rigidity permits formation of lids upon, or engagement of separately-made lids with shaped articles described herein. Thus, in addition to the shaped articles being sealable with film using OW, VSP, or MAP technologies, the enhanced edge strength of the shaped articles described herein permits them to be sealed with snap-on/snap-off type lids or other conventional sealing technologies. The edge strength and rigidity conferred to the shaped article also prevents deflection induced by tension in a film used to overwrap or seal the article (e.g., so-called "bow-tying" as the phenomenon of a concave article closing upon its concavity when wrapped or sealed) and to withstand stresses imposed by (or necessary to the operation of) container-handling equipment, such as de-nesting equipment used for segregating individual containers from a stack of nested containers.

What is important in these methods is that the potentially sharp peripheral edge 110 of the thermoplastic sheet(s) from which the article 100 is formed should be deflected away from the periphery of the article and 'frozen' in that position by heat-softening and cooling a portion of the sheet that is bent (which will normally include substantially only portions of the deflectable flange) while the sheet is so deflected. The heated, bent, and cooled portion preferably includes at least the bend region 150 of the deflectable flange 160, because that region is designed for smooth flexing and yields a smooth periphery to the container. Softening, flexing, and hardening of other portions of the deflectable flange (e.g., the extension 50, spacer 140, elbow 130, and/or peripheral flange 120) can also (or alternatively) be done, and can contribute to smoothness of the article's periphery.

Others have used different methods to smooth the edges of circular articles, such as plastic cups and plates. For example, in U.S. Pat. No. 5,758,773, circular plastic plates are heated at their edges and spun while their edges are engaged with threaded rollers. Similarly, in U.S. Pat. No. 3,355,536, plastic cups having a circular cross-section and circular rims are warmed by radiant heating while being rotated about their axis and their rims are pressed against spinning threads. These and other prior methods are limited by the need to spin the workpiece while the edge is rolled, which limits their applicability to articles and containers that have a circular periphery and, if present, a circular concavity or orifice. The methods described herein are not limited in this way, because they do not require spinning of the article for which the peripheral edges are to be smoothed. The methods described herein also do not require that the periphery of the article be circular, or that any concavity or orifice defined by the article be circular; instead, an article can have its peripheral edges smoothed using the methods described herein, essentially regardless of the shape of the periphery of the article (e.g., see FIGS. 58-67). If all peripheral edges of an article are to be smoothed using the disclosed methods, then this can be accomplished using a single ram that has the shape of (and thus engages) the peripheral edge of the article or by using a plurality of rams which engage multiple portions.

Yet another advantage of the methods described herein is that the edge-smoothing mechanism (i.e., the ram) is a static block of material which can be immobile (i.e., while the peripheral edge of the article is urged against it) or need be moved in relatively simple ways (e.g., moved in a linear direction against the peripheral edge of a static article), unlike the edge-smoothing mechanisms described by others, which depend upon spinning the article, a threaded shaft, or both.

Still another advantage of the methods described herein is that edge-smoothing can be accomplished shortly after thermoforming—even while a thermoformed article remains within a thermoforming mold, if desired.

Thermoplastics

The methods and articles described herein can be performed and made with substantially any thermoplastic material. What is important is that the material be capable of being softened by heating and re-stiffened upon cooling, at least in the deflectable flange 160 described herein. Substantially all thermoplastics exhibit a characteristic temperature above which they soften and become flexible or workable and below which they become more rigid and retain their shape. Desirable thermoplastics for the articles and methods described herein retain their shape under normal conditions of the anticipated end use of the container. It is also desirable to use thermoplastics which can be softened under conditions that are readily attainable in a manufacturing environments. Examples of suitable thermoplastics include polyethylene (PE), polypropylene (PP), polyethylene terephthalate (PET), and polyvinyl chloride (PVC). Other suitable thermoplastics are apparent to skilled workers in this field, and substantially any of these can be used. Also potentially useful are flexible plastics having deformable materials such as metal foils bound to their surface.

The thermoplastic article includes a thermoplastic material, including at at least the portions of the article at which the deflectable flange 160 described herein is formed or present. The identity of the thermoplastic material is not critical, nor is the presence or absence of non-thermoplastic materials. Where non-thermoplastic materials are present (e.g., in a thermoplastic sheet to which a metal foil or a paperboard layer is laminated), the rigidity imparted to the article by the thermoplastic material in its non-softened, non-molten state is preferably sufficient to define the conformation of the article, even when the non-thermoplastic material is bent. The article can include one or more peelable layers, for example as described in U.S. Pat. No. 9,302,842 to Wallace and in U.S. patent application publication 2018/0272666 of Wallace. When one or more peelable layers is present, it is substantially unimportant whether those layers are "rolled over" at the peripheral edge of the shaped article (rather than the edges of the peelable layers peeling from the underlying substrate). Both for aesthetic reasons and to promote sealing, it can be preferable that any peelable layers remain adhered. When peelable layers are present and adherence is to be promoted, the working temperature should be selected both to be suitable for deflection of the deflectable flange as described herein and for working the substrate and peelable layers of the shaped article without causing delamination of the peelable layers.

Among the advantages of the methods described herein is the fact that articles can be made which both have smooth peripheries and which are substantially optically clear—even at their smooth peripheries. Many known thermoformable plastic sheets are substantially optically clear, meaning that a substantial amount of light incident upon one face of the sheet will pass therethrough and be visible to an observer looking at the opposite face. More simply put, it is possible to "see through" such materials, whether the material appears "clear-as-glass" or somewhat cloudy (like frosted glass). Optical clarity is especially important for containers meant to contain articles which a purchaser may wish to visually inspect prior to purchasing—such as foodstuffs like cuts of meat, fish, fruits, berries, or vegetables. It is well known that many optically clear plastic materials become opaque (or, at least too opaque to facilitate visual inspection) when they are bent. For this reason, containers made from such materials are typically not intentionally bent during their manufacture or, when bent, the bent portions are not expected to remain optically clear.

The methods described herein permit bending of optically clear thermoplastic materials to form containers without significantly reducing the optical clarity of the materials. Thus, for the first time, these materials can be used to form containers which have smooth peripheries and yet retain substantial optical clarity. While not being bound by any particular theory of operation, it is believed that the ability to bend these materials without opacification is attributable to raising the temperature of the materials above their glass transition temperature (but below their melting temperature) prior to bending them. To the extent an objective measure of optical clarity is considered necessary, a material can be considered "substantially optically clear" if at least 50% of visible white light (measured as luminous flux) that is incident upon one face of the material from directly above it is transmitted out the opposite face of the material (without regard to diffraction- or scattering-related redirection of the light).

It is partially on account of this optical clarity that sanitary food containers made using the methods described herein are sold under the CLEARLY CLEAN (TM, Converter Manufacturing, LLC, Orwigsburg, Pa.) brand name in the United States.

Sealing Films

An important advantage of articles having peripheries treated in the manner described herein is that such treatment renders the articles suitable for sealing with thin plastic films (sometimes called "lidding" herein). Sealing articles with thin plastic films is a well-known process, and many suitable films are known (e.g., thin monolayer or multilayer sheets made of materials such as polyethylene or polyvinylidene chloride, optionally including polymer layers which inhibit passage of moisture or certain gases). Articles can be sealed with plastic films, for example, by completely enveloping the article in the film and sealing the film to itself. Alternatively, articles can be sealed by sealing a film about the periphery of a concavity, compartment, or other orifice defined by an article and, if desired, thereafter trimming the portion(s) of the film beyond that periphery. All technologies for sealing articles with thin plastic films are believed to involve at least intermittent contact between peripheral areas of the article and the film used for sealing.

It is therefore beneficial for an article to be sealed with a thin plastic film to be free, or at least substantially free, of sharp, pointed, rough, jagged, or abrasive structures, at least at areas of the article which contact the film. It is particularly important that such structures be absent from the surface of the article which will necessarily contact sealing films, and highly desirable that these structures are also absent from article surfaces which are likely to contact sealing films, whether during the sealing process, or whether during further packaging, shipping, unpackaging, or retail display of the film-sealed article. Still more preferably, articles to be wrapped with a thin film bear no such structures at surfaces at which there is a substantial likelihood of contact between the surface and the film during any of these processes. Ideally, the articles bear no such surface at any position at which a film used for sealing might reasonably be expected to contact the surface position during these processes.

A wide variety of thin plastic films are known to be useful for sealing containers, and substantially any of these films can be used to seal the shaped articles described herein (or compartments thereof). Selection of sealing films (and materials for making shaped articles compatible with such sealing films) is well known in the art, and substantially any known combination of materials can be adapted for use with the shaped articles described herein. By way of example, when a sealing film is to be removably sealed about a shaped article described herein (e.g., an overwrap film that is sealed to itself but not to the wrapped article), the materials used to make the shaped article should be selected such that it will not fuse with the film under the sealing conditions to be used. By contrast, when a sealing film is to be substantially permanently sealed to a shaped article (e.g., about the perimeter of a compartment defined by the article), the material(s) used to make the article should be selected to facilitate formation of a substantially permanent seal under practical processing conditions. Similarly, combinations of sealing and container materials and operating conditions that yield containers sealed with material that is peelable therefrom are known and can be used.

One highly desirable embodiment of the articles described herein is a tray-shaped article that is made by thermoforming (and that therefore possesses potentially sharp peripheral edges prior to the edge-rolling treatment described herein) such that it possesses about its entire periphery the deflectable flange described herein and for which the peripheral edge is deflected beneath the extension and behind the spacer and bend region of the deflectable flange, about the entire periphery of the tray, sufficiently that the peripheral edge cannot be touched by a human fingertip that is swiped along the gap between the deflected peripheral flange and the body of the tray, even if that fingertip is swiped along this gap around the entire periphery of the tray. Such a tray will bear no sharp, pointed, rough, jagged, or abrasive edge at any position that can reasonably be expected to contacted by a sealing film, regardless of whether OW, VSP, or MAP technology is used in the sealing process. A tray suitable for use with all of these sealing technologies is highly desirable and believed to be unavailable prior to the disclosure of the subject matter described herein.

Many plastic films used for sealing of articles are flexible and do not thermoset over the range of temperatures ordinarily employed during sealing and subsequent handling. Flexible films that are sealed to surfaces are sometimes difficult to remove in a single piece from the sealing surface. For example, a flexible film that is sealed about the flat periphery of a tray may tear or split when one portion of the film is pulled away from the tray, potentially requiring a user to remove the film in multiple passes or many strips or pieces. Such difficulties may be particularly acute in situations in which the sealing surface is broad, such as in a VSP-sealed package in which a sealing film may be adhered to or fused with a relatively large area of a tray on which an item has been sealed between the film and the tray. The technology described herein can be used to reduce or overcome this difficulty as follows.

The shaped articles described herein (e.g., a tray-shaped article having a smooth periphery) can be sealed with a thermosettable (i.e., thermoformable) film to yield an article in which the thermoformable sealing film is heated above its glass transition temperature to soften it and applied against the smooth periphery of the shaped article. A thermoformable film that is heated above the glass transition temperature of the material of which it is made and thereafter cooled below that temperature will retain whatever conformation the film has (e.g., a conformation imposed upon it) when the temperature falls below its glass transition temperature. Thus, if a thermoplastic film is formed "around" (i.e., extending more than about 90 degrees about) the smooth outer periphery of an article described herein, the film will be held to the article not only by whatever attraction or adhesion may exist between the film and the article surface, but also by mechanical forces (i.e., the film's resistance to deflection about the smooth outer periphery), forming a structure analogous to a "snap off" lid.

Even though softened thin plastic films can be extremely delicate (e.g., liable to be damaged by sharp, pointed, rough, jagged, or abrasive surfaces), the smooth periphery of the shaped articles described herein permits even such delicate films to be applied thereto. In one example, a shaped article in the form of a tray having a smooth periphery can be VSP-sealed to encase an article between a softened thermoplastic sealing film and the tray, with little or no gas included within the sealed portion. Furthermore, the smooth periphery of the articles described herein permits a softened film to be drawn, pressed, or formed around the smooth periphery—that is, contacting not only the top portion of the periphery (i.e., analogous to the extension 50 of the article edge depicted in FIG. 36), but around the bend region 150 of the deflectable flange, and along the spacer 140 and any bent or rounded portions thereof (such as to or around the rounded underside 145 of the spacer depicted in FIG. 36) and thereafter set by reducing the temperature of the sealing film below its glass transition temperature. Such a seal will form a relatively rigid "lid" and, even if the film is not adhered or fused to the shaped article where the film intersects the article, frictional forces or the shape of the "lid" (e.g., turned about the rounded underside 145 of the spacer depicted in FIG. 36, such that the "lid" must be stretched or expanded to disengage it from the rolled over peripheral flange 160) can hold the sealing film in place on the article. Furthermore, because softened thermosettable film can be substantially thicker, therefore stronger, and/or more rigid than thin flexible sealing films, a thermosettable sealing film can form a seal or "lid" that can tend to be more likely removable in a single piece.

In one embodiment of the shaped articles described herein, for example, the article is a tray having a food item placed thereon, with a thermosettable film draped across the food item and the periphery of the tray while the film is in a softened state; gas between the film and the tray is withdrawn to form a VSP-type seal (with the film closely opposed against the food item and the tray surface upon which the food item rests); and the film is draped around (from the top, to or around, the bottom of the periphery), optionally sealed or fused to the tray, trimmed about the bottom of the tray periphery, and cooled. In the finished tray, the "lid" formed upon cooling of the film must be "snapped off" the tray by stretching the edge of the lid around the periphery of the tray, but once this operation is performed, the entire lid can be removed from the tray in a single piece.

In another embodiment, a shaped article described herein is sealed (after its smooth outer periphery has been formed) using a thermoformable plastic film that is extended across a compartment defined by the article and at least about 90 degrees about opposed smooth peripheral sides of the article (i.e., opposite ends of a rounded rectangular tray). The film is heated above its glass transition temperature and cooled below that temperature while extended about the opposed smooth peripheral sides. If desired, a vacuum or modified atmosphere can be applied to the compartment during such sealing. The resulting article has a thermoset film cover that must be stretched (or "snapped") around at least one peripheral side of the article in order to remove the film from the article (in addition to any other seal that may exist between the film and the article).

Peelable Surface Layers

The substrate sheet 101 used to form an article 100 described herein can have a peelable polymer layer (i.e., a "liner sheet" 500) attached to it, such as along one face of the substrate sheet 101, after or (preferably) before forming the sheet into the article. The liner sheet 500 can be attached to the substrate sheet prior to forming a tray shaped article 100, for example, by laminating the substrate sheet 101 and the liner sheet 500 prior to thermoforming. Alternatively, the liner sheet 500 can be attached to the substrate sheet 101 during thermoforming by simultaneously urging the two sheets together while thermoforming one or both of them. As another alternative, the liner sheet 500 can be attached to the substrate sheet 101 after the substrate sheet has been formed into an article having a desired shape (e.g., a food storage tray), such as by applying a flexible liner sheet against a surface (e.g., a planar rim) of the shaped article and withdrawing gases and/or liquids from between the liner sheet and the surface of the article. If the liner sheet 500 covers an entire face of a thermoformable substrate sheet 101, then that an article having a peelable surface can be made by thermoforming the bi-layer sheet.

By way of example, a thermoformable substrate sheet 101 made of PET can have a multi-layer liner sheet 500 peelably attached to the face of the PET sheet that will, after thermoforming the laminated sheets, define the concave interior portion of a food storage tray. The multi-layer liner sheet 500 can, for example, include a substrate-binding layer bonded to a moisture barrier layer, a gas barrier layer (e.g., an ethylene vinyl alcohol, "EVOH"), and a sealing layer (e.g., a pliable, low-melting polymer {e.g., a low-density polyethylene} suitable for bonding with a similar layer of a lidding sheet), as disclosed in U.S. application publication 2013/0142975 of Wallace and in U.S. patent application publication 2018/0272666 of Wallace. A wide variety of lidding materials (thin plastic sheets, often clear, and sometimes including information or images printed thereon) are known, and substantially any can be used with the articles described herein.

Multiple liner sheets 500 can be adhered to the thermoformable substrate sheet 101, such as adjacent one another, overlapping, or (more preferably) in a "stacked" conformation in which a first liner sheet covers the face of the thermoformable sheet, a second liner sheet covers the exposed face (i.e., opposite the face bound to the thermoformable sheet) of the first liner sheet, and, optionally, additional liner sheets cover the exposed face of a previous liner sheet.

In another embodiment, one or more liner sheets 500 are attached to the thermoformable substrate sheet 101 after it has been thermoformed to yield a precursor tray. In this embodiment, a sheet material intended to be attached to the tray is heated to at least its softening point, applied against a surface of the tray (e.g., the face of a MAP tray which defines a concave central portion and a surrounding rim) and any gas or other fluid between the tray surface and the liner sheet is withdrawn (e.g., by application of a vacuum to the space between the tray and liner sheet). The softened liner sheet is thereby drawn against the face of the tray and can adhere to it (by virtue of the nature of the opposed polymer surfaces or by an adhesive applied to one or both opposed surfaces). Upon cooling, the liner sheet has the conformation of, and adheres to, the face of the tray against which it was applied and drawn. If the liner sheet extends beyond the periphery of the tray, then it can be trimmed in any known manner (e.g., by "punching" out the portion of the liner adhered to the tray from a larger sheet of liner material using a tray-periphery-shaped die, or by running a blade along the edges of the tray). Also, the trimming operation can leave a tab of liner sheet material that is not adhered to the tray (e.g., to facilitate peeling of the liner from the tray). This operation can be repeated twice or more times to add additional liner sheets to the tray. When multiple liner sheets are added to the tray, they can overlap completely, partially, or not at all (i.e., they can be applied to different portions of the tray). In a useful embodiment, multiple liner sheets are applied to a tray in this manner, and each of the multiple liners completely covers the same face of the tray, except at tabs corresponding to each sheet, the tabs being cut and marked or colored in such manner that the tabs are distinguishable from one another, so as to permit peeling of a desired liner using the corresponding tab. For example, a rounded rectangular tray having three liners may have a tab for the lowermost (i.e., adjacent the thermoformable sheet) liner sheet at the corner of the tray, a tab for the uppermost liner sheet at the midpoint of the longer side of the tray, and a tab for the intermediate liner sheet at the midpoint of the shorter side of the tray.

For smoothed-edge shaped articles described herein, the liner sheet can be added before or after performing the edge-smoothing operation upon the thermoformed shaped article. That is, one or more liner sheets can be applied to a face of the shaped article (including, if desired, a deflectable flange portion thereof) prior to edge-smoothing and the deflectable flange (including an added liner) can thereafter be deflected and/or curled as described herein. Alternatively, a shaped article can be thermoformed (e.g., including the deflectable flange described herein), its edge can be smoothed, and liners added to one or more faces thereof after the edge-smoothing operation has been completed. In one embodiment, for example, a thermoformable substrate sheet 101 is formed, by a thermoforming process, into individual trays which have the deflectable flange described herein completely about their periphery. The formed trays can be subjected to the edge-smoothing process to yield stackable trays having smooth peripheries 191. The smooth-edged trays can be stacked and stored. At a later time, a stack of trays can be de-nested to yield individual smooth-edged trays, and the individual trays can be fed into a VSP work station to which a continuous roll of liner sheet material is fed. At the work station, the liner sheet material is softened, drawn into and against the interior portions of the smooth-edged trays by withdrawing gas from between the softened liner material and the formed trays. The liner material is permitted to cool, yielding a smooth-edged tray having a portion of the continuous sheet of liner material bound to its inner surface. After being drawn against the tray surface (i.e., during that operation or after cooling), the liner sheet material can be cut around the perimeter of the tray (optionally leaving a 'loose' piece of liner material unbound to the tray, to act as a tab for later peeling of the liner) to yield an individual smooth-edged tray having a liner sheet adhered thereto. The operation can be repeated as many times as desired to add additional liner sheets to the tray.

The equipment and methods used to add liner sheets to the surface of a pre-formed tray are not critical. Substantially any equipment and methods capable of softening a liner sheet, opposing it against a surface of the pre-formed tray, and withdrawing gas or other fluid between the tray and the liner sheet can be employed. For example, a standard VSP workstation includes facilities for holding a pre-formed tray in a fixed position, softening a polymer sheet at a position near the tray, applying the softened polymer sheet against a face of the preformed tray (e.g., against the upper rim surface of a tray having a rim surrounding its concave interior), and withdrawing gas from the space defined by the tray, the softened sheet, and their intersection. In a standard VSP workstation, this arrangement is typically used to soften a sheet of lidding material, apply it against a tray, withdraw gas from the space between the lidding and the tray to bring the lidding flush against the surface of the tray and any materials carried on or in the tray, and to seal the lidding to the tray. The same equipment setup can be used to add a liner (instead of lidding) to a tray, although the sealing equipment is unnecessary (but can be used if desired). In this setup, the tray will be empty (will not carry materials within or on it), so the softened liner sheet will be drawn flush against the surface(s) of the tray when gas is withdrawn. Careful selection of tray material, liner sheet material, and (if necessary) barrier composition will yield a tray in which a liner that has been applied against the tray can be peeled therefrom when desired.

The material from which the liner sheet is made is not critical, but it is preferably a flexible plastic material. It is not necessary that the liner sheet be made of a thermoformable plastic, but it can be. The liner sheet can also be a non-thermoformable plastic that exhibits sufficient flexibility to conform to the shape of the thermoformable sheet. The liner sheet can be made from the same material as the thermoformable sheet or a different material. By way of example, a relatively thick thermoformable sheet of PET can be used as a substrate and a relatively thin sheet of PE can be adhered to a face of the PET sheet (after or, preferably, before thermoforming the PET sheet to make the shaped article). Because PE and PET exhibit similar shrink rates, temperature-influenced delamination of the two sheets should be limited. If the PE sheet is attached to the face of a PET sheet that defines a concavity (e.g., the interior portion of a MAP tray or a VSP tray), then it may be possible to peel the PE and PET sheets apart without discharging the contents of the concavity from the PE liner sheet. Furthermore, if a lidding is attached to the liner sheet about its periphery, then it may be possible to detach the liner from the PET substrate sheet without losing materials sealed between the liner and lidding sheets. Numerous suitable liner sheet materials are disclosed in U.S. application publication 2013/0142975 of Wallace and in U.S. application publication 2018/0272666, for example.

FIGS. 44 and 45 illustrate features of an embodiment of the shaped articles having a peelable liner sheet attached to a face of the article.

FIG. 44A is a cross-sectional view of an edge of an article that includes a relatively thick thermoformable substrate sheet 101 and a relatively thin, flexible liner sheet 500 attached to a face thereof, showing the conformation of the deflectable flange 160 of the article prior to the rolling-over operation described herein, including its potentially sharp or rough peripheral edge 110 at an accessible position. FIG. 44B is a cross-sectional view of the same edge of this article after its peripheral edge has been rolled over as described herein. The peripheral edge 110 of the substrate sheet 101 has been rolled sufficiently that it "points back at" the body of the article, and the peripheral edge 510 of the liner sheet 500 has detached from (or been peeled away from) the peripheral edge 110 of the substrate sheet in this view. In FIG. 44C, a sheet of lidding 600 contacts the liner sheet 500 at the extension 50 portion of the deflectable flange, while a peripheral edge 610 of the lidding is positioned beyond the periphery of the article. The lidding 600 and the liner sheet 500 can be attached to one another by interposing an adhesive between them, or by pressing them against one another (e.g., while applying heat sufficient to bind or melt them together), at the position indicated by the open arrow. If so bound to the liner sheet 500, the lidding 600 can be removed from the substrate sheet 101 of the article simultaneously with the liner sheet 500 by grasping the liner sheet at or near its peripheral edge 510 and peeling the liner sheet 500 (with the lidding 600 still attached) away from the substrate sheet 101.

FIGS. 45A-45C are analogous to FIGS. 44A-44C, respectively, and illustrate a second embodiment in which the deflectable flange 160 and the shaped body 10 of the article extend away from opposite faces of the extension 50. In this embodiment, the liner sheet 500 remains separately peelable from the substrate sheet 101 because the lidding 600 is attached to the opposite face of that substrate sheet 101. In either the first embodiment shown in FIGS. 44A-44C or the second embodiment shown in FIGS. 45A-45C, the liner sheet 500 can be peelably attached to the opposite face of the substrate sheet 101 to yield, in the case of the first embodiment, an article in which the liner sheet 500 remains separately peelable from the substrate sheet 101 and, in the case of the second embodiment, an article in which the lidding 600 and the liner sheet 500 are attached to one another.

A shaped article, with one or more liner sheets peelably attached thereto, can be subjected to the edge-smoothing process described herein, wherein the deflectable flange is bent, deflected, or curled to yield a smooth periphery. Because the finished, smooth-edged article has a peelable liner attached to the thermoformable sheet, that liner can be peeled therefrom. Lidding material can be attached to the liner or to the thermoformable sheet, or can overwrap the finished article. In one embodiment, the lidding is bound to the liner about the entire periphery of the sealing surface (thereby defining a compartment between the liner and the lidding) sufficiently resiliently that the liner can be peeled from the thermoformable sheet without breaching the compartment. In this embodiment, the liner, the lidding, and anything contained within the compartment can be separated from the shaped article (and the substrate sheet can be recycled, for example) prior to accessing the contents of the compartment. Alternatively, the contents of the compartment can be accessed prior to peeling the liner from the substrate sheet, and the liner (and any remaining lidding) can be peeled therefrom afterwards.

If the liner completely covers a face of the thermoformable sheet prior to forming the article, it is possible that the liner may become detached from all or part of the peripheral edge during shaping of the article. Similarly, even if the liner remains peelably attached to the entire face of the thermoformable sheet after the article has been formed, the liner may become detached from all or part of the peripheral edge during the edge-smoothing process described herein. Such detachment (delamination) can be undesirable (e.g., if the liner is intended to remain visually undetectable) and, if so, can be reduced or prevented by increasing the strength of binding of the liner to the thermoformable sheet, by increasing the pliability or thermoplastic stretching capacity of the liner, by reducing the 'sharpness' (i.e., radius of curvature) of deflections made to form the precursor tray, by other methods known to skilled artisans in this field, or by a combination of these. On the other hand, partial delamination of the liner from the thermoplastic sheet, especially at its peripheral edges can be desirable (e.g., to yield a free, grippable portion of the liner that can be used to further peel the liner from the thermoplastic sheet when a user so desires). Such peeling can be enhanced or induced in similar ways—e.g., by decreasing the strength of binding of the liner to the thermoformable sheet, by decreasing the pliability or thermoplastic stretching capacity of the liner, by increasing the 'sharpness' (i.e., radius of curvature) of deflections made to form the precursor tray, by rubbing or abrading the peripheral edge of the article, by other methods known to skilled artisans in this field, or by a combination of these.

Uses

The shaped article described herein can be used in ways which are believed to be not possible using previously-known trays and other articles. Typically, others have used containers especially designed and made for each of the various sealing technologies described herein (e.g., OW, VSP, and MAP technologies) for sealing containers with thin plastic films. That is, food trays designed for OW-sealing have been generally considered unsuitable for VSP- and MAP-wrapping (e.g., owing to the lack of surfaces suitable for sealing in VSP- and/or MAP-technologies). Similarly, the sharp edges of many containers designed for use with VSP- and MAP-sealing technologies render those containers unsuitable for overwrapping with fragile polymer films. The shaped articles described herein can be used to make shaped articles that can suitably be used as containers for sealing by any of OW, VSP and MAP technologies. Because the shaped articles are thermoformed, container surfaces suitable for VSP- and/or MAP-sealing can be included in the shape of the articles. Using the methods described herein, any edges of a shaped article which might provide a risk of tearing sealing films (or, alternatively, all edges of the shaped article) can be made to have a smooth conformation, such as by forming a rolled-over edge or by smoothing the shape of the mold used for thermoforming the precursor article. Thus, unlike previously-known trays, the shaped articles described herein can be used with substantially any film-sealing technology.

Other advantageous uses of the shaped articles described herein relate to the smoothness of their edges. The articles can be used in substantially any environment in which it is desirable or necessary that a solid object exhibit smooth edges. By way of example, instruments used in surgical procedures are typically packaged in openable containers (to permit reuse and sterilization between uses) that are opened by personnel wearing easily-torn surgical gloves during medical surgery procedures. Thermoformed articles (e.g., so-called "clam-shell" type snap-open packages of known design) can be made as described herein, with those articles being initially made having a deflectable flange wherever they are cut from the web of thermoformed material, and thereafter rolling over that deflectable flange to yield the smooth edge described herein. Articles made in this manner will present smooth edges to users, reducing the likelihood that surgical gloves will be torn by opening such packages during surgery procedures. Similarly, thermoformed packages of known design that are employed to facilitate handling, to inhibit theft, or to achieve other ends can be adapted (e.g., by including a deflectable flange in their design and rolling it over) to take advantage of the edge-smoothing technology described herein.

EXAMPLES

The subject matter of this disclosure is now described with reference to the following Examples. These Examples are provided for the purpose of illustration only, and the subject matter is not limited to these Examples, but rather encompasses all variations which are evident as a result of the teaching provided herein.

Example 1

Figure 12A:
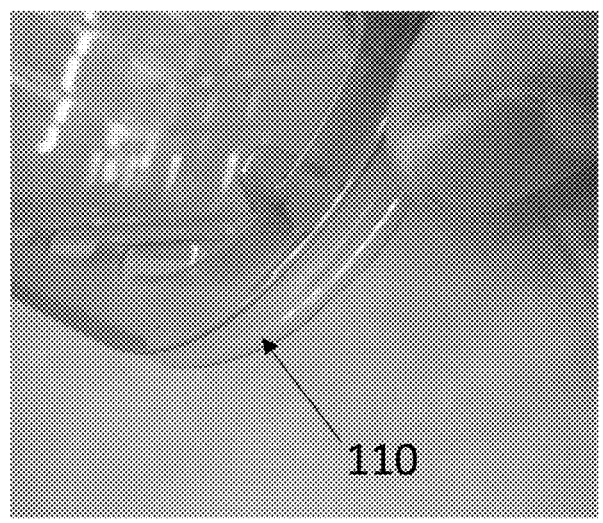
FIGS. 12 (consisting of FIGS. 12A and 12B), 13, 14, and 15 illustrate deflectable flanges formed in tray-shaped articles thermoformed from a sheet of thermoplastic material. In each of FIGS. 12A and 12B, a finger touches the sharp edge (i.e., the peripheral edge 110 at the periphery of peripheral flange 120) where the tray has been cut from the sheet. In these figures, the deflectable flange has not yet been softened, deflected, and cooled, so the sharp edge remains positioned about the periphery of the tray. By comparison, the sharp edge has been deflected inwardly and away from the periphery of the trays shown in FIG. 6 and in the tray shown in the lower portion of FIG. 13. The tray shown in the upper portion of FIG. 13 is the same as that shown in the lower portion, differing in that the tray in the upper portion has not had its deflectable flange "rolled over" as the tray in the lower portion has.
Figure 12B:
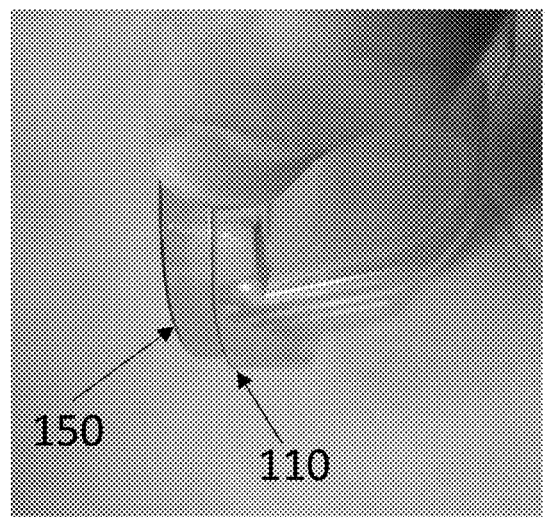

FIGS. 12A and 12B illustrate a thermoplastic tray which was thermoformed from a flat sheet of thermoplastic material and then cut from the sheet. The sharp edge formed by the cutting process is shown in each of these figures, with a finger touching the sharp edge. After the smoothing process described herein was performed on these trays, the appearance of the trays was approximately that shown in FIG. 6, in which the sharp edge has been "rolled over" such that it faces the body of the tray and a smooth portion, formed by flexing at least the bend region of the deflectable flange and heating and cooling it to yield a smooth outer periphery to the tray which will not impact either upon a thin plastic film attached to the rim of the tray or upon a thin plastic film which is snugly wrapped about the entirety of the tray.

Figure 13:
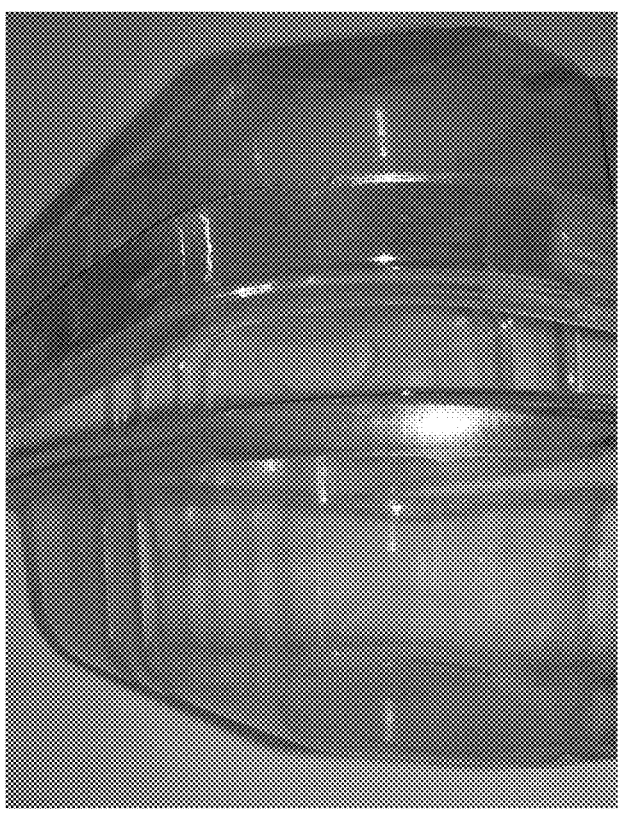
Figure 14:
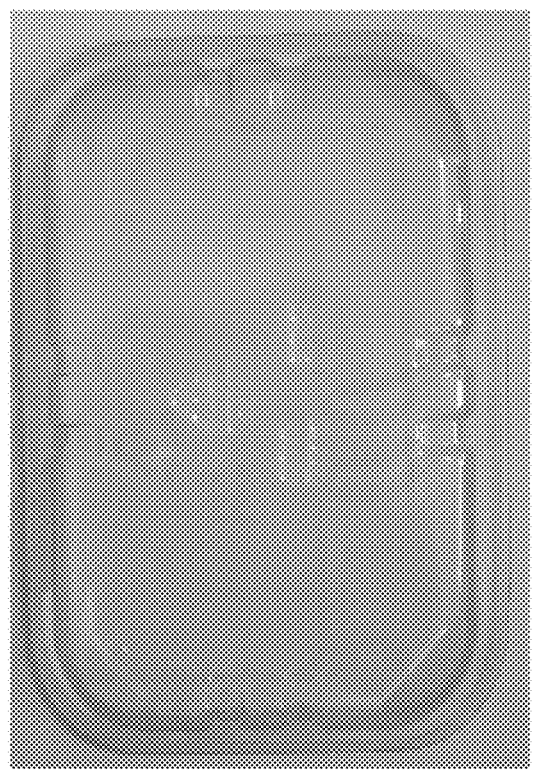
FIG. 14 is a view from the underside of a rounded rectangular tray which has a "rolled over" edge about its entire periphery. The absence of sharp edges at or near the periphery of this tray is visible.

The rolled-over edge is visible on the lower tray in FIG. 13; an otherwise-identical tray prior to edge-rolling is the upper tray in FIG. 13. A bottom view of the tray, including a rolled-over edge about its entire periphery, is shown in FIG. 14. Various degrees of edge-rolling are depicted in trays 1, 2, and 3 in FIG. 15.

Example 2

This example is provided for the sake of explaining formation and sealing of a shaped article as described herein. In this example, formation, filling, and sealing of a container containing a cut of fresh fish is described.

A shaped article for receiving the fish is formed by traditional thermoforming methods. A thermoformable material (e.g., PET) in sheet form is heated above its glass transition temperature and urged against a mold using traditional thermoforming techniques (using either a male or female mold, with or without the application of positive and/or negative pressure to urge portions of the sheet against portions of the mold). Such thermoforming yields a tray-shaped container having a rounded rectangular shape overall and including a concave interior portion for receiving the cut of fish. The rounded rectangular overall shape of the container is defined by a deflectable flange that surrounds the interior portion about the entire perimeter of that interior portion. The deflectable flange has the configuration shown in FIG. 1, and the tray has the approximate shape of the tray shown in FIG. 14 upon cutting the thermoformed tray from the sheet at peripheral edge 110 of the deflectable flange 160. The die used to cut the tray from the sheet is heated so that the peripheral edge of the tray is at or near its glass transition temperature.

A plug having a shape that substantially fills the interior portion of the tray at the portions adjacent the extension 50 of the deflectable flange 160 is inserted into the interior portion (approximately as shown in FIG. 23B). The plug-filled tray is then inserted into a ram 300 (approximately as shown in the upper position in FIG. 41, except that no plug is present in FIG. 41; note that the tray shown in FIG. 41 is inverted, relative to the tray shown in FIG. 23B), so that the peripheral edge 110, the spacer 140, or both contact the upper surface 302 of the ram 300 at substantially all portions of the deflectable flange. Downward pressure (referring to FIG. 41, the force being applied downwardly from the top of the image) is applied to the extension 50 of the deflectable flange 160 about the entire periphery of the interior, driving the spacer 140 and/or peripheral edge 110 portions of the deflectable flange 160 against the ram. The deflectable flange is driven against the ram to a position analogous to that shown in cross-section in FIG. 25A, and the parts are held in this position for a period of time sufficient for at least the portion of the deflectable flange indicated by "B" in FIG. 25B to attain a temperature above its glass transition temperature by virtue of heat conducted or radiated thereto from the ram. The deflectable flange is thereafter urged (by the force applied to the extension 50) further against the ram so that the peripheral edge 110 slides, scrapes, or skips across the inner surface 302 of the ram 300 and the deflectable flange advances to approximately the position shown in FIG. 25B. If desired, the deflectable flange can be further advanced to the position shown in FIG. 25C, optionally upon pausing to permit additional portions of the deflectable flange to achieve a temperature above its glass transition point. Also, if desired, a coolant such as ambient air can be injected (e.g. at the position occupied by element 120 in FIG. 25C) to reduce the temperature of the deflectable flange at the injection point, in order to prevent further irreversible deflection of such portion. The deflectable flange is urged against the ram sufficiently that the peripheral edge is not readily accessible to films or other materials present at the periphery of the tray.

The force urging the deflectable flange against the ram is discontinued, and the article is removed from contact with the ram, whereby the material of the deflectable flange cools below its glass transition temperature and retains its shape in the absence of applied force. At this point, a shaped article in the shape of the desired tray has been formed, the tray having a smooth periphery. The tray can be used immediately for packaging the cut of fish or, more typically, it can be stacked with other such trays and shipped to a fish processor.

Whether the tray is used immediately after formation or retrieved by de-nesting the tray from a stack of trays, the cut of fish can now be deposited within the interior compartment of the tray, together with any other materials (e.g., sauce, an absorbent pad, vegetable, or seasonings) to be packaged therewith in preparation for sealing. Any of a number of known sealing technologies can be used to seal the container and the fish.

The tray can simply be over-wrapped with a thin plastic film (the film extending across the opening of the compartment between extensions 50 on opposite sides of the compartment, around smoothly-bent bend region 150 and/or spacer 140 of the deflectable flange 160), and the terminus of the film can be sealed to a portion of the film overlaying the tray, for example by application of a heated pad against the terminus and the portion, followed by heat-shrinking of the film to yield a visually pleasing taut film surface. Because the tray has no sharp or rough edges at its periphery, the overwrapped film is not torn during sealing, nor do such edges tear, snag, or abrade other sealed packages during shipping. The over-wrapped, fish-containing container can be packaged (e.g., in a box with other such containers or in a plastic bag containing both a selected gas or liquid phase and other such containers), and shipped to a wholesaler, retailer, or customer.

Rather than sealing the package using an over-wrap that is sealed to itself, the container can be sealed after filling with a film that does not envelop the tray, but instead seals the compartment at the extension 50 about the periphery of the compartment. Such a seal can be generated by simply sealing a film (using any one or combination of heat, pressure, and an adhesive) to the extension 50 and, preferably, trimming the film about the periphery of the seal (e.g., by trimming the film at approximately the peripheral extent of the container). If desired, any free ends of the film seal can be shrunk using heat. Prior to sealing, a vacuum can be applied to withdraw gases from the interior of the compartment and to draw the film against the contents of the compartment, and a selected gas or gas mixture can optionally be injected prior to sealing.

Example 3

In-Mold Edge-Smoothing

FIGS. 46-53 illustrate an edge-smoothing process that can be performed while the shaped article 100 described herein is in contact with a mold used to thermoform the article 100. The process can be performed by re-inserting the article 100 into the mold, or (preferably) while the just-thermoformed article remains in the mold (i.e., while the substrate sheet 101 has been formed into the shape of the article 100, including the peripheral flange 160, and cut from the larger sheet, but before smoothing the edge.

The processes and articles illustrated in FIGS. 46-53 are essentially the same, except in that in those illustrated in FIGS. 46, 48, 49, and 52, the deflectable flange is formed (and then deflected, softened, and cooled) on the same face (i.e., the "cis" face) of a flat extension portion that ultimately forms the outer rim of the article as the central body of the article (i.e., the rolled-over edge and the body are on the same "side" or face of the rim), whereas in FIGS. 47, 50, 51, and 53, the deflectable flange is formed on the opposite face of the extension than the body (i.e., the rolled-over edge and the body are on opposite faces of the rim/extension—the rolled edge ends up on the "trans" face of the rim). Each of the figures depicts a cross section taken through one edge (or both edges in FIGS. 49 and 51) of an article during this process. Because similar processes are illustrated in many of the individual figures, they are described pair-wise.

In FIGS. 46A and 47A, a thermoforming mold 700 and a ram 300 are positioned apart from one another, on opposite faces of a thermoplastic substrate sheet 101 that is interposed between them. The shaped article, having a smoothed periphery, will be formed from the sheet 101, and the sheet is initially much larger than the surface area of the article, meaning that the portion of the sheet 101 that will ultimately form the article will need to be trimmed from the remainder of the sheet during the process. The thermoforming mold 700 in these embodiments includes at least two parts: a core mold element 710 and a peripheral mold element 720, the two parts being displaceable past each other at a slip joint 715. Each of the mold elements have surfaces against which the sheet 101 will be urged when the sheet 101 is softened, in order to induce the softened sheet 101 to assume a topology at the face that contacts the mold similar or identical to the topology of the face of the mold which it contacts. The mold surfaces can be categorized as body-shaping surfaces (i.e., those which define the topology and shape of portions of the substrate sheet 101 which form the body 10 of the article) and flange-shaping surfaces (i.e., those which define the topology and shape of portions of the substrate sheet 101 which form elements of the deflectable flange 160 described herein). The core mold element 710 illustrated in each of FIGS. 46A and 47A includes a body-shaping surface 711 that molds substantially the entire shaped body 10 of the article and also includes a flange-shaping surface 712 that molds the extension 50 and bend region 150 portions of the deflectable flange 160, as well as the junction 162 at which the deflectable flange joins the body. The peripheral mold element 720 illustrated in FIGS. 46A and 47A includes a flange-shaping surface 722 that molds the portions of the deflectable flange 160 corresponding to the spacer 140, the peripheral flange 120, and the elbow 130 disposed at their junction. FIGS. 46A and 47A also illustrate a ram 300 having a curved upper surface 302 that will be used to deflect the deflectable flange 160. The ram bears a knife 310 for cutting the substrate sheet 101 and a mold-impact surface 304 shaped and positioned to abut against a ram-impact surface 723 on the peripheral mold.

In FIGS. 46B and 47B, the substrate sheet has been softened and urged against the surfaces of the mold 700, including the body-shaping surface 711 of the core mold element 710 and the flange-shaping surfaces 712 and 722 of the core and peripheral mold elements 710 and 720. In the diagram, this is represented by the substrate sheet being flush against these surfaces. Dashed portions of the substrate sheet represent sections of unspecified length and conformation. In the figures, the ram 300 has also been moved (in the direction indicated by the open arrow) toward the mold surfaces and the substrate sheet, but has not yet contacted either.

In FIG. 46C (FIG. 47 includes no equivalent figure), the knife 310 has cut through the substrate sheet as the ram 300 draws near the mold 700. As it passes through the substrate sheet and out the face of the sheet opposed against the mold surfaces, the knife 310 passes into a slot 726 formed in the peripheral mold element 720. Cutting of the substrate sheet 101 forms the sharp peripheral edge 110 which the smoothing method is intended to smooth, deflect, or hide, as the peripheral flange 120 is severed from the remainder of the substrate sheet (shown as a dashed line to the left of the knife 310 in the figure. In many thermoforming operations, the knife 310 extends completely around the body 10 of the article, and it is at this point that the article becomes physically separated from the substrate sheet 101. As is evident from this figure, the length of the peripheral flange 120 can be selected by positioning the knife 310 and its corresponding slot 726 nearer to or farther from the elbow-shaping portion of the flange-shaping surface 722 or 712.

Figure 46D:
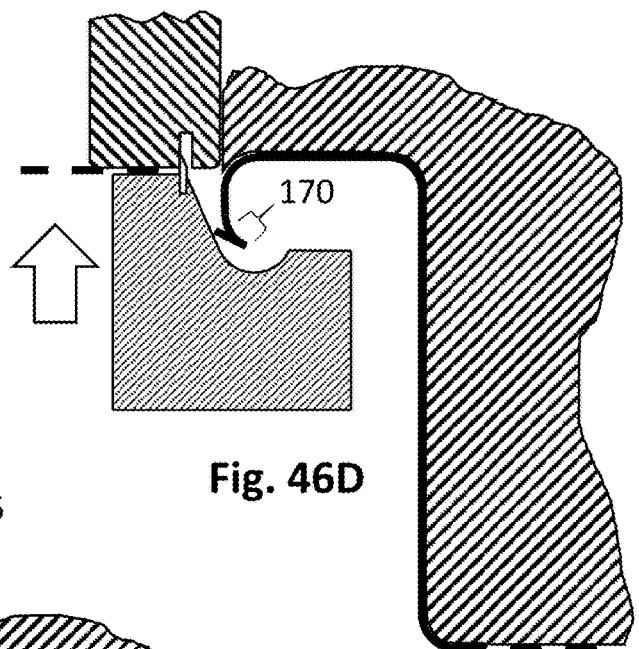
FIG. 46 consists of FIGS. 46A-46F.

In FIGS. 46D and 47C, after the knife 310 has severed the peripheral flange 120 from the remainder of the substrate sheet 101, the ram 300 continues moving in the direction of the open arrow, so that the mold-impact surface 304 of the ram 300 impacts upon the ram-impact surface 723 of the peripheral mold element 720 (as in these illustrations, a piece of the substrate film may be sandwiched between the two surfaces as they impact, such that the surfaces do not literally touch one another; this is nonetheless "impact"). Upon impacting the peripheral mold element 720, the ram 300 continues its motion, causing the peripheral mold element 720 to move, relative to the core mold element 710. The displacement caused by this movement is evident by comparing FIG. 46D with 46C and FIG. 47C with 47B. Displacement of the peripheral mold element 720 causes a portion of the substrate sheet that has been molded to the shape of the deflectable flange to become no longer flush against the peripheral mold element 720 flange-forming surface 722, but to instead extend toward (and eventually impact, as ram movement continues) the upper surface 302 of the ram 300. As the deflectable flange 160 contacts the ram's upper surface 302, one or more portions of the deflectable flange 160 become deflected. In FIGS. 46D and 47C, the peripheral flange 120 (at or near the recently-cut peripheral edge 110) is one of the first portions of the deflectable flange to impact upon the upper surface 302 of the ram 300, and the inward- and upward-directed force resulting from that impact (possibly in cooperation with tensional forces which likewise may have pulled the peripheral-most portion of the peripheral flange upwards during cutting of the substrate sheet 101 by the knife 310) induce the peripheral flange 120 to deflect toward the spacer 140 and, when the deflection becomes sufficiently great, induces bending of the portion of the spacer 140 nearest the elbow 130, generating one or more bent portions 170 in the deflectable flange. If the bent portions 170 of the deflectable flange are at (or are heated to) the softening point of the material from which the substrate sheet 101 is made, then the bent portions 170 will retain this conformation when cooled below that softening temperature.

Figure 46E:
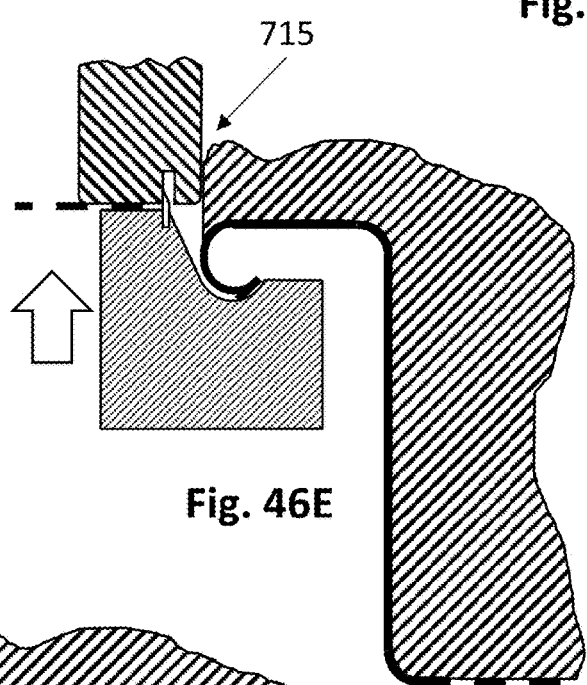

As illustrated in FIGS. 46E and 47D, the ram 300 continues moving toward or past the core mold element 710, and the portion(s) of the deflectable flange 160 occupying space from which the peripheral mold element 720 has been displaced will experience compression as the core mold element 710 presses on them from one direction, while the ram 300 impacts them from the opposite direction. This compressive force is relieved by the peripheral-most portions of the deflectable flange (i.e., the peripheral edge 110, the peripheral flange 120, the elbow 130, the spacer 140, and eventually even the bend region 150, as compression continues) sliding, skipping, skittering, or otherwise moving along the upper face of the ram 300. The contour of that upper face 302 will thus control the direction in which these portions of the deflectable flange 160 are deflected as compression continues. In these figures, the upper face 302 of the ram has a flat portion (on the left in the figures) that merges into a curved semi-circle or arcuate portion, and the peripheral-most portions of the deflectable flange are caused to deflect according to these contours as it moves along or past the surface. In FIGS. 46E and 47D, it can be seen that the curvature of the upper surface 302 of the ram 300 induces the peripheral-most portions of the deflectable flange to assume a roughly circular profile.

Figure 46F:
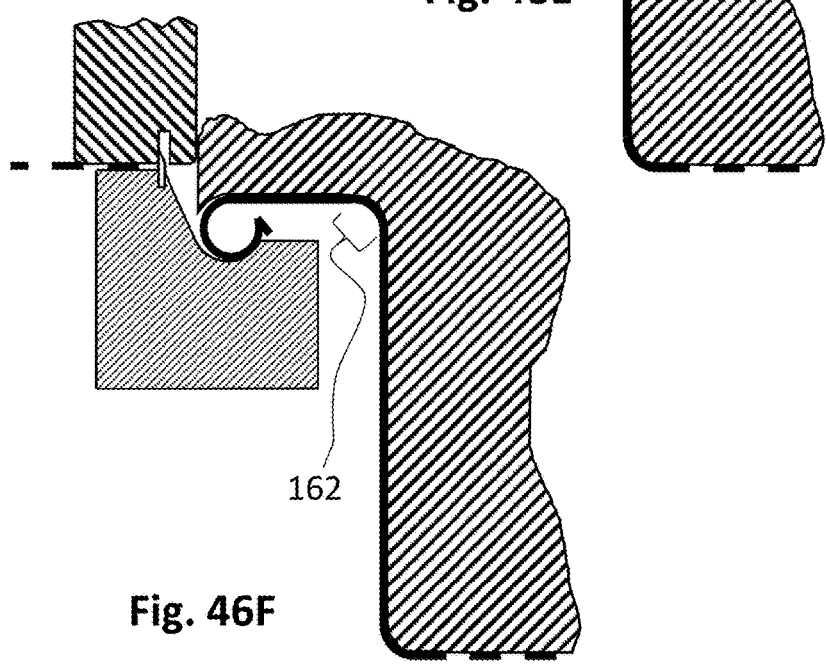

In FIGS. 46F and 47E, the greatest degree of deflection of the deflectable flange shown in these series of figures is achieved, such that the portions of the deflectable flange including and beyond the bend region 150 have an ovoid or circular configuration (roughly three-quarters of a circle in these figures), with the sharp peripheral edge 110 offset by an angle of approximately 120-135 degrees from the position it had when initially cut (compare FIGS. 46C/46F and FIGS. 47B/47E). Furthermore, the sharp peripheral edge 110 is no longer positioned at the periphery of the container (i.e., not at the periphery 191 of the outer rim 104 formed from the deflected, rolled-over deflectable flange).

FIGS. 48 and 50 illustrate the conformation the edge of the article has when the molded-and-deflected articles shown in FIGS. 46F and 47E are cooled below the softening temperature of the substrate material and removed from the mold 700 and ram 300. These figures show the profile of the edge of rimmed containers made in this fashion. The containers have an outer rim 104 which encircles a compartment. From the floor of the containers arise sidewalls 19 with inner and outer surfaces 194 and 196. Surrounding the opening of the compartment is the rim 104, the peripheral edge 191 of which rim is smooth on account of the container having been made by the processes described herein. The potentially sharp or rough peripheral edge 110 of the substrate sheet 101 from which the container was formed is positioned away from the peripheral edge 191 of the rim and points in a direction away from that peripheral edge 191. Depending on the method used, the peripheral edge 110 of the sheet can be positioned on the same face of the rim (FIG. 48, the "cis" face 192 of the rim 104) as the container body or on the opposite face (FIG. 50; the "trans" face 193 of the rim 104).

Figure 52:
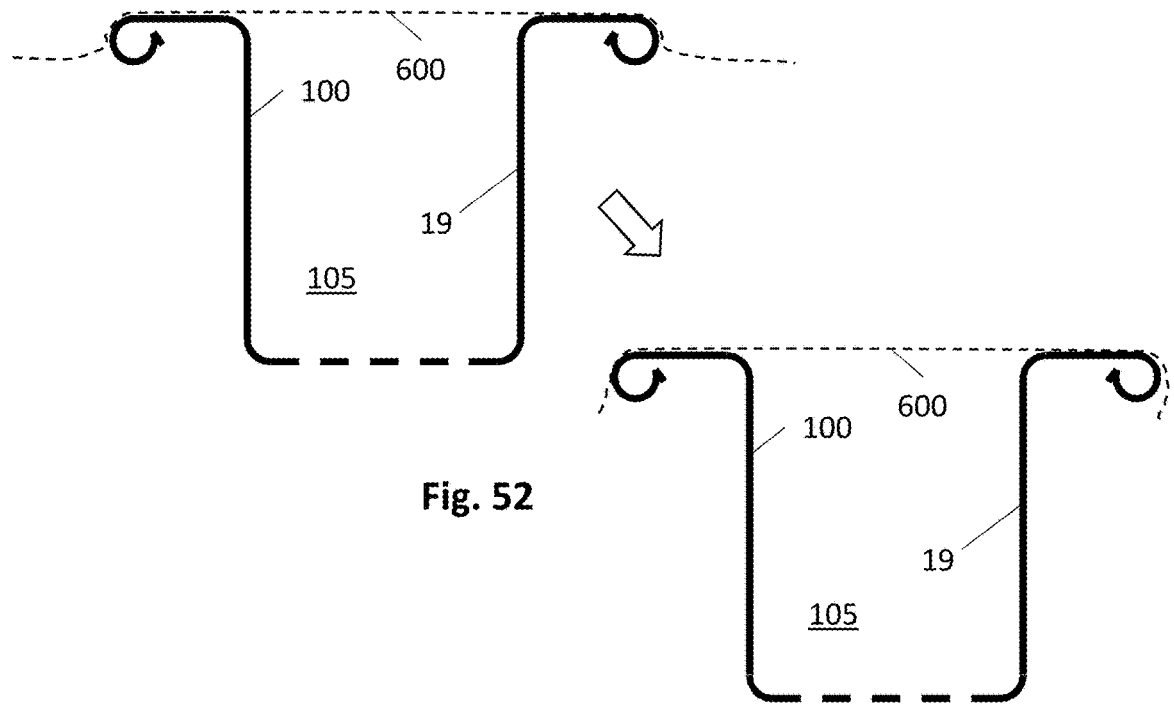
FIG. 52 illustrates an article made by the processes shown in FIGS. 46A-46F, with a flat lidding film 600 pressed against the top surfaces of these containers (left half of the figure) without contacting the sharp peripheral edge 110, and thereafter cut to leave a short free end (right half of the figure).
Figure 53:
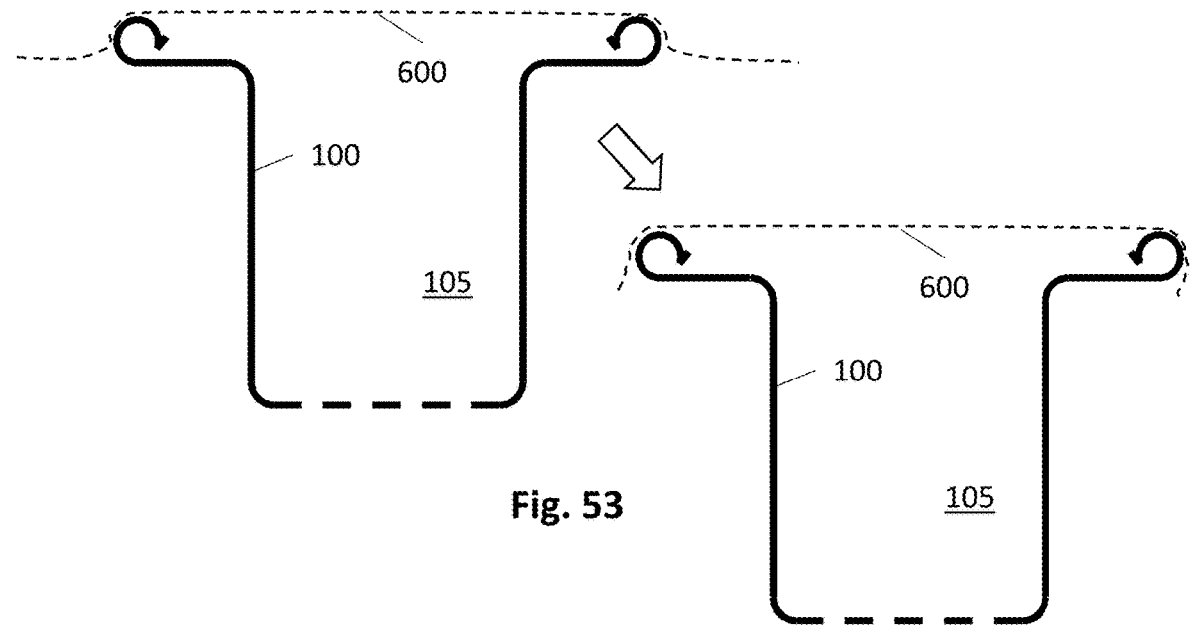
FIG. 53 illustrates an article made by the processes shown in FIGS. 47A-47E, with a flat lidding film 600 pressed against the top surfaces of these containers (left half of the figure) without contacting the sharp peripheral edge 110, and thereafter cut to leave a short free end (right half of the figure).

When the same edge is formed on opposite sides of an article (e.g., a tray having a concave compartment between opposite sides), articles like those shown in FIGS. 49 and 51 can be made. As illustrated in FIGS. 49 and 51, a plastic film lidding 600 can be wrapped about the entire article, including the peripheral edges thereof, and the sharp peripheral edge 110 will not ordinarily contact the fragile film. Furthermore, formation of a tubular rim structure, as shown in these figures, greatly rigidifies the rim and reduces the likelihood that it will tear when stressed, relative to rims made from flat, planar sheets of the substrate material. In FIGS. 49 and 51, the bottom surface of the containers is depicted as a dashed line, to indicate that the size of, shape of, and presence of perforations in this bottom surface is not critical. Similarly, FIGS. 52 and 53 illustrate how a flat lidding film 600 can be pressed against the top surfaces of these containers (left half of each figure) without contacting the sharp peripheral edge 110, and thereafter cut to leave a short free end (right half of each figure).

The processes and configurations illustrated in FIGS. 46-53 are shown in cross-section and the structures shown can be formed at a single peripheral edge of a thermoformed article, along multiple peripheral edges, or about the entire peripheral edge of the article. The conformations and configurations illustrated in FIGS. 46-53 generally correspond to those achieved at relatively straight portions of a peripheral edge. At curved peripheral edge portions, some variation in the precise conformations and configurations are to be expected, depending on the direction and tightness (i.e., radius of curvature) of the curve. Two examples illustrate this concept.

Figure 15:
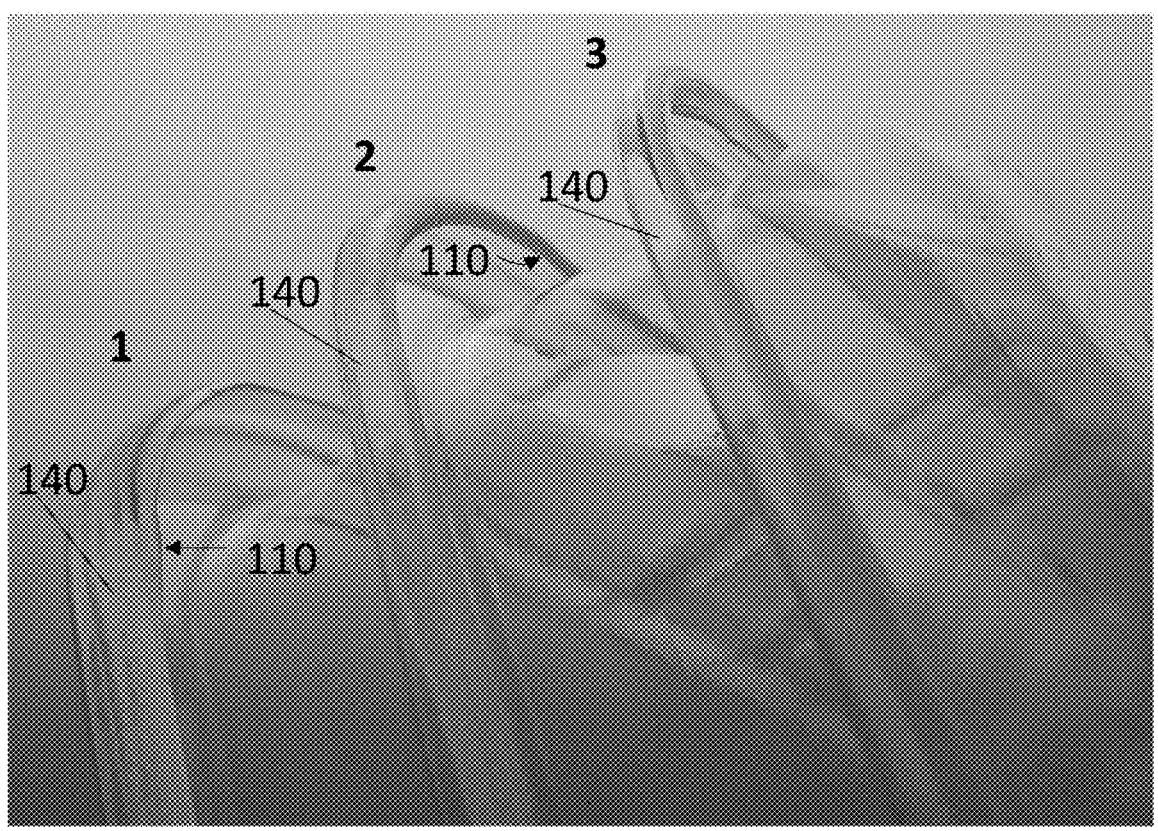
FIG. 15 is an oblique view of three initially-identical trays, each having a "rolled over" edge as described herein, the degree to which the edge has been "rolled over" differing among the three. The tray labeled "1" has a peripheral edge that has only barely been "rolled over" (i.e., the portion of the deflectable flange including the peripheral edge 110 has been deflected not more than about 45 degrees inwardly from the plane of the remainder of the spacer 140, most which remains substantially flat in this tray. The tray labeled "2" has a peripheral edge that has been more fully "rolled over"—so much so that the peripheral edge 110 can nearly not be seen (it has been 'tucked' behind the remaining visible portion of the spacer 140). On the tray labeled "3," the deflectable flange has been rolled over further still and the peripheral edge 110 cannot be seen. That the deflectable flange of tray "3" has been rolled over to a greater degree than that of tray "2" is detectable by virtue of the shorter portion of spacer 140 that remains visible on tray "3" than on tray "2" (and the visible portion of spacer 140 of each of trays "2" and "3" is shorter than the visible portion of spacer 140 of tray "1.") The three trays shown in FIG. 15 can thus be thought to illustrate discrete degrees of "rolling over" of the deflectable flange.
Figure 16A:
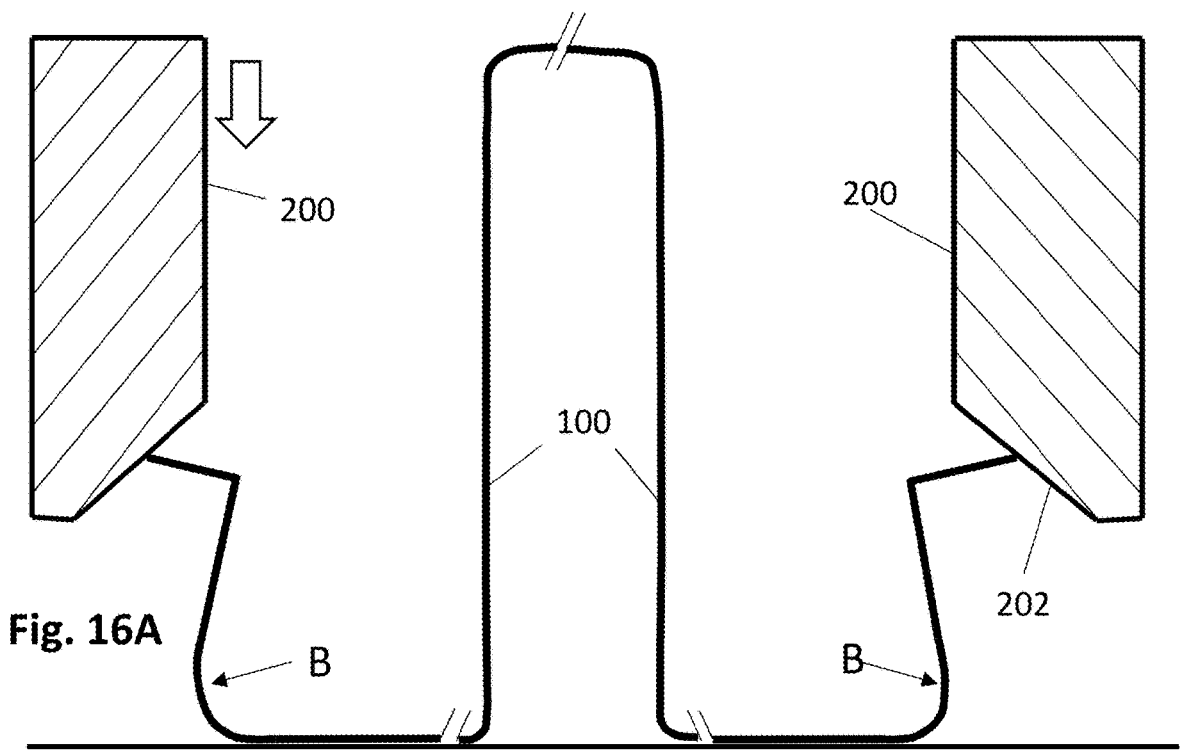
In FIG. 16A, outwardly-flared portions of the inner surface 202 of upper body 200 have just contacted the peripheral flanges 120 of the article 100 as the upper body 200 is lowered onto the article toward the horizontal surface; the deflectable flanges are beginning to deflect at the areas marked "B.
Figure 16B:
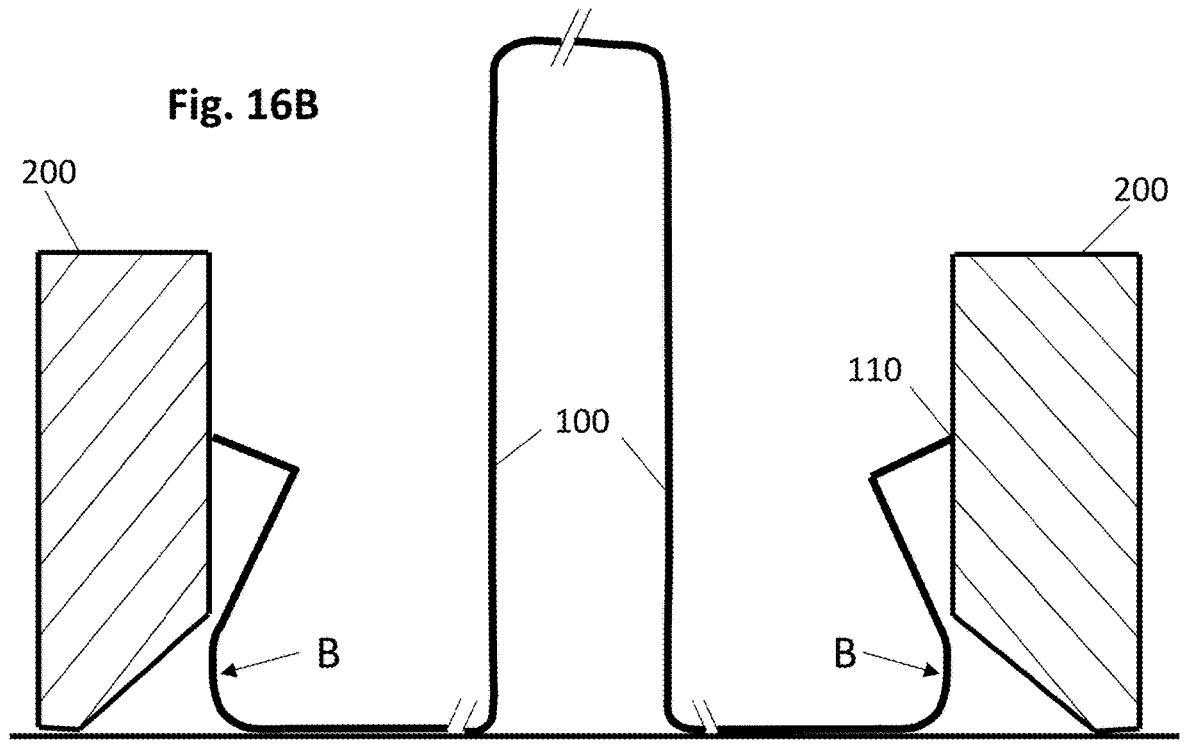
" In FIG. 16B, the upper body 200 has been lowered onto the horizontal surface, and the peripheral edges 110 and the peripheral flanges 120 of the article 100 are partially deflected inwardly toward the body 10 of the article 100.
Figure 16C:
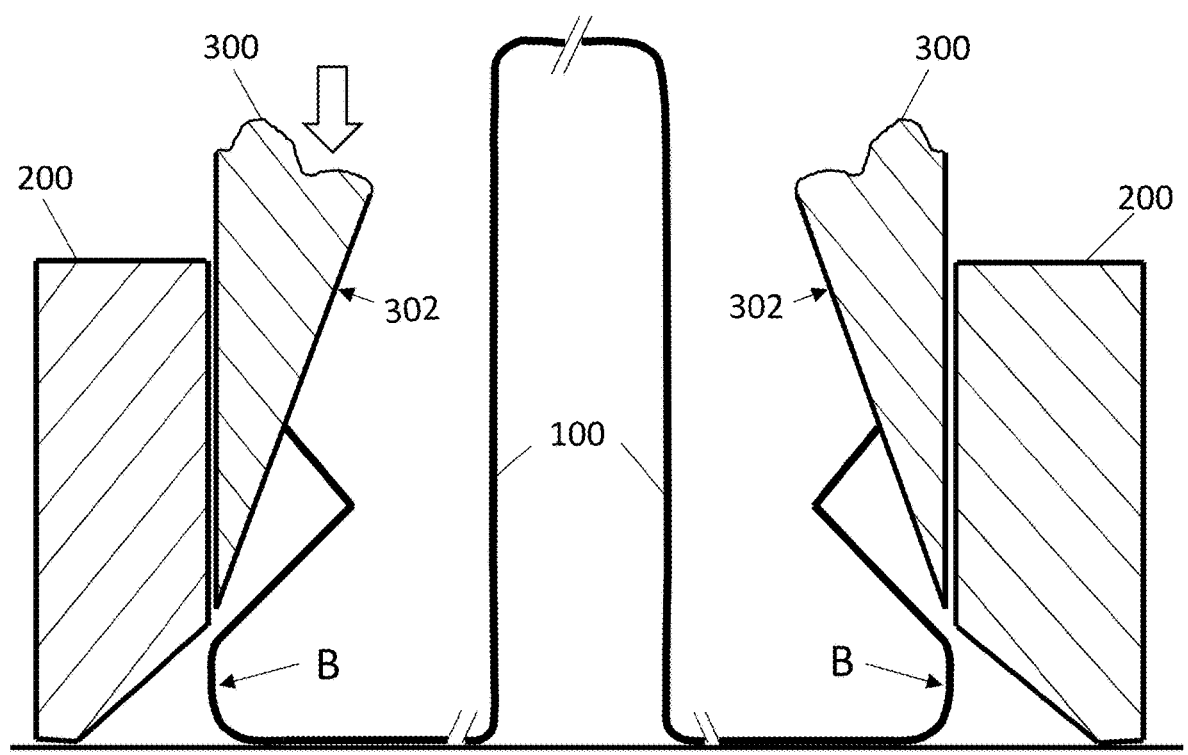
In FIG. 16C, the ram 300 has been inserted, in the direction indicated by the open arrow, into a cavity in the upper body 200 behind the article 100 and further deflects the peripheral flanges 120 (and, with them, the deflectable flanges 160) through bending of the thermoplastic sheet of which the article is formed at the areas marked "B."

As a first example, when a curved peripheral edge is being smoothed 'inwardly' (i.e., when the peripheral flange is being rolled in the direction toward the center of the radius of curvature, as with the corners shown in FIG. 15), compression of the peripheral flange occurs (that is, the same amount of material is present, but its radius of curvature being decreased, effectively forcing more material into a common space) and resistance to curling of the compressed portion can be expected. That resistance to curling can manifest itself as an increase in the radius of curvature of the bent portion 170 at the curved portion of the peripheral edge, as wrinkling of the softened portion of the flange (see, e.g., FIGS. 6A and 6B), as movement of the peripheral flange 120 toward or away from the spacer 140 (i.e., changing the angle F depicted in FIG. 1), or a combination of these. A skilled artisan is able to reduce or eliminate this effect by altering the shape of the peripheral flange 160 at curved portions of the peripheral edge (e.g., reducing the size or height of the spacer 140 so as to reduce the amount of material compressed upon edge-smoothing), by increasing the radius of curvature of the peripheral edge (e.g., by using smoothly-rounded corners, rather than right-angle corners, in an otherwise-rectangular tray, as illustrated in FIG. 14), altering the design of the article's edge to account for the bulging effected by smoothing of such curved peripheral edges, or other known methods. By way of example, such bulging can be used to form or enhance the conformation of a stacking extension 180, such as that shown in FIG. 40.

Conversely, and as a second example, when a curved peripheral edge is being smoothed 'outwardly' (i.e., when the peripheral flange is being rolled in the direction away from the center of the radius of curvature), stretching of the peripheral flange occurs (that is, the same amount of material is present, but its radius of curvature is being increased, effectively forcing the same amount of material to fill a greater volume) and resistance to curling of the compressed portion can be expected. That resistance to curling can manifest itself as an decrease in the radius of curvature of the bent portion 170 at the curved portion of the peripheral edge (even to the degree of flattening it), as thinning (or even fracture) of the softened portion of the flange, as movement of the peripheral flange 120 toward or away from the spacer 140 (i.e., changing the angle F depicted in FIG. 1), or a combination of these. A skilled artisan is able to reduce or eliminate this effect by altering the shape of the deflectable flange 160 at curved portions of the peripheral edge (e.g., increasing the size or height of the spacer 140 so as to increase the amount of material available for spreading and thinning), by increasing the radius of curvature of the peripheral edge (e.g., by using smoothly-rounded corners, rather than right-angle corners, in an otherwise-rectangular interior orifice 106, as illustrated in FIG. 58A), altering the design of the article's edge to account for the narrowing effected by smoothing of such curved peripheral edges, or other known methods.

Example 4

Simultaneous Smoothing of Multiple Edges

FIGS. 54-57 illustrate edge-smoothing in an article 100 having a relatively complicated shape.

Figure 54C:
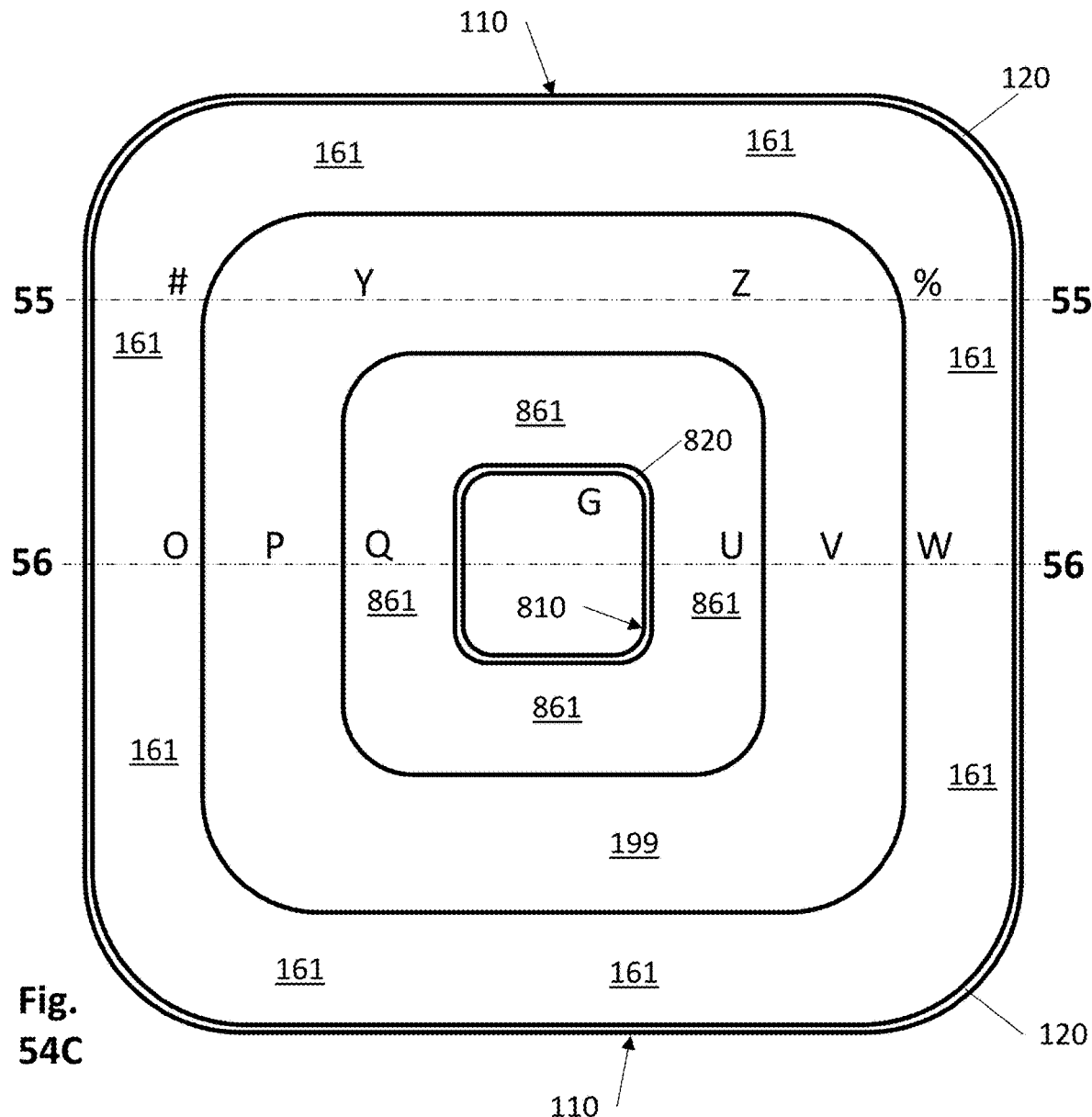

FIGS. 54A, 54B, and 54C are top, left side, and bottom views of the article after it has been thermoformed and before its edges have been smoothed. FIG. 54B is a cutaway view, in which a portion of the article is cut-away along lines 54B-54B in FIG. 54A (the cut-away portion remains present in FIGS. 54A and 54C). Similarly, FIGS. 57A, 57B, and 57C are top, left side, and bottom views of the article after it has been thermoformed and after its edges have been smoothed. FIG. 57B is a cutaway view, in which a portion of the article is cut-away along lines 57B-57B in FIG. 57A (the cut-away portion remains present in FIGS. 57A and 57C). FIGS. 55 and 56 are cross-sectional views of the thermoforming mold 700, the ram 300, and the article 100 during one embodiment of the thermoforming and edge-smoothing operations. The views in FIG. 55 (i.e., 55A to 55F) are taken along line 55-55 (which is shown in each of FIGS. 54A-54C and 57A-57C). The views in FIG. 56 (i.e., 56A to 56F) are taken along line 56-56 (which is likewise shown in each of FIGS. 54A-54C and 57A-57C). Wavy lines at the edges of core mold element(s) 710 and peripheral mold element(s) 720 indicate that the structures of those elements may extend further, but the structures not shown are not critical.

Referring to FIGS. 57A-57C, the finished article has the overall shape of a container having a flat bottom surface 199, external sidewalls 19 which have the height h and which form a rounded square exterior to the article (i.e., viewed as horizontal sections when the bottom surface rests on a horizontal surface). Internally, the external sidewalls 19 define a compartment 105; because the article 100, including its external sidewalls 19, is formed from a thin thermoplastic substrate sheet 101, the compartment 105 also has a rounded square shape at its exterior surface (i.e., along the external sidewalls 19, when viewed as horizontal sections). Within the compartment 105, internal sidewalls 18 arise from the bottom and extend to height h, forming an internal limit to the compartment 105, the internal sidewalls 18 and the internal limit of the compartment 105 each also having a rounded square shape when viewed in horizontal sections.

The article 100 has two deflectable flanges (labeled in FIG. 54B prior to edge-smoothing), one deflectable flange 160 extending outwardly from the tops of exterior sidewalls 19 about the outer periphery of the container, and the other deflectable flange 860 extending inwardly from the tops of the interior sidewalls 18 about the circumference of a central orifice 106 that extends completely through the center of the article 100.

Immediately after thermoforming (and prior to edge-smoothing), as shown in FIGS. 54A-54C, the outer deflectable flange 160 has a peripheral flange 120 along its outer, lower edge, and the peripheral edge 110 of the thermoformed substrate sheet 101 is present at the outermost edge of the peripheral flange 120. Similarly, the inner deflectable flange 860 has a peripheral flange 820 along its edge (abutting the perimeter of the orifice 106) and the inner peripheral edge 810 of the thermoformed substrate sheet 101 is present at the outermost edge of the peripheral flange 820 (i.e., at the perimeter of the orifice 106). Prior to edge-smoothing, the spacers 140 and 840 are straight and vertically oriented, and the peripheral flanges 120 and 820 are straight and horizontally oriented. Bend regions 150 and 850 form smooth upper edges of the upper outer periphery of the article 100 and the upper inner edge of the orifice 106, respectively. Potentially sharp and/or rough peripheral edges 110 and 810 are oriented to the side of the exterior periphery 191 of the article 100 and the side of the orifice 106, respectively, where those edges can be contacted by, for example, a finger pressed against the side of the article or inserted within the orifice.

After smoothing the outer and inner edges of the thermoformed article 100, as shown in FIGS. 57A-57C, the potentially sharp and/or rough peripheral edges 110 and 810 are displaced to positions and configurations at which it would be more difficult to contact a finger, for example, against those edges. As is visible in the cut-away portion of FIG. 57B, the peripheral flange 160 that skirts the outer periphery of the article 100 has been curled beneath the rim 104 so that the peripheral edge is displaced to a position between the rim 104 and the exterior sidewall 19 of the container and the peripheral flange 120 points (i.e., its flat section extends from the elbow toward the peripheral edge) in the direction from the underside 161 of the now-curled deflectable flange 160 toward the sidewall 19. Adjacent the orifice 106 that extends through the center of the article 100, the inner deflectable flange 860 has been curled such that the inner peripheral edge 810 is positioned beneath the inner rim 107 and between the inner rim 107 and the inner sidewall 18. The inner peripheral flange 820 points in the direction from the underside 861 of the inner deflectable flange 860 toward the inner peripheral edge 810. As a result of the smoothing of the outer and inner peripheries, achieved by curling the outer and inner deflectable flanges, the article 100 can be handled, both at its outer peripheral edge 191 and within its orifice, by unprotected human fingers with substantially less risk of injury than can the article prior to edge-smoothing. Similarly, a fragile plastic film can be applied against the outer rim 104 and/or against the inner rim 107 (e.g., applied and/or sealed to the top of the container and sealed against the upper or outer peripheral surface(s) thereof or wrapping about the entire article) without significant risk of the film contacting the outer peripheral edge 110 and/or the inner peripheral 810 and being torn, cut, or snagged thereby.

FIGS. 55 and 56 illustrate positions and conformations of the substrate sheet 101 and of elements of the thermoforming mold 700 at various positions during manufacture of the article 100.

Figure 55D:
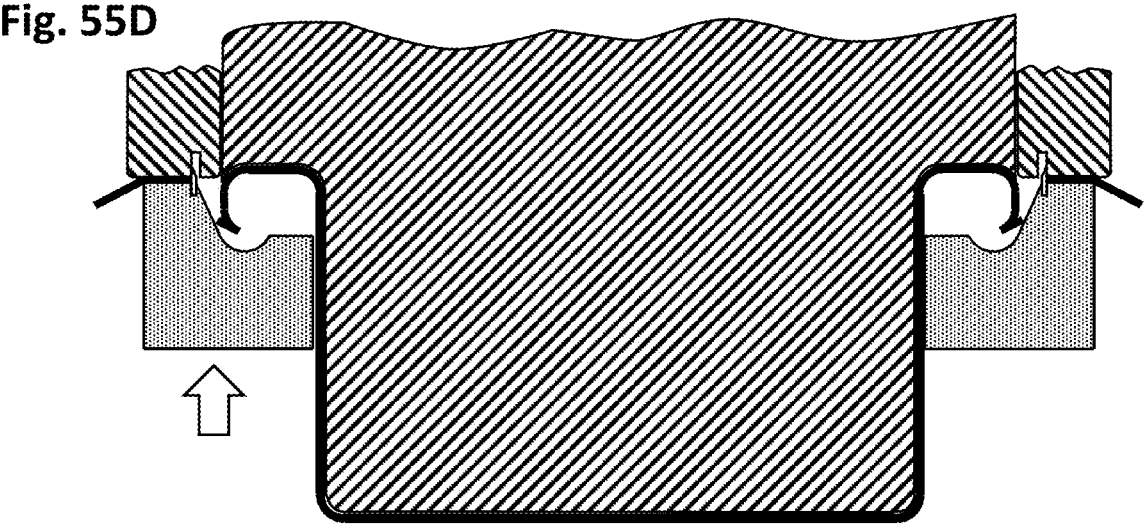
FIG. 55F is a sectional view of the article taken along line 55-55 in FIGS. 57A and 57C.
FIG. 55 consists of FIGS. 55A-55F, each of which is a sectional view of the article taken along line 55-55, and the processing steps illustrated in FIGS. 55A to 55F roughly correspond to those illustrated in FIGS. 46A, 46B, 46C, 46D, 46F, and 48, respectively.
Figure 56A:
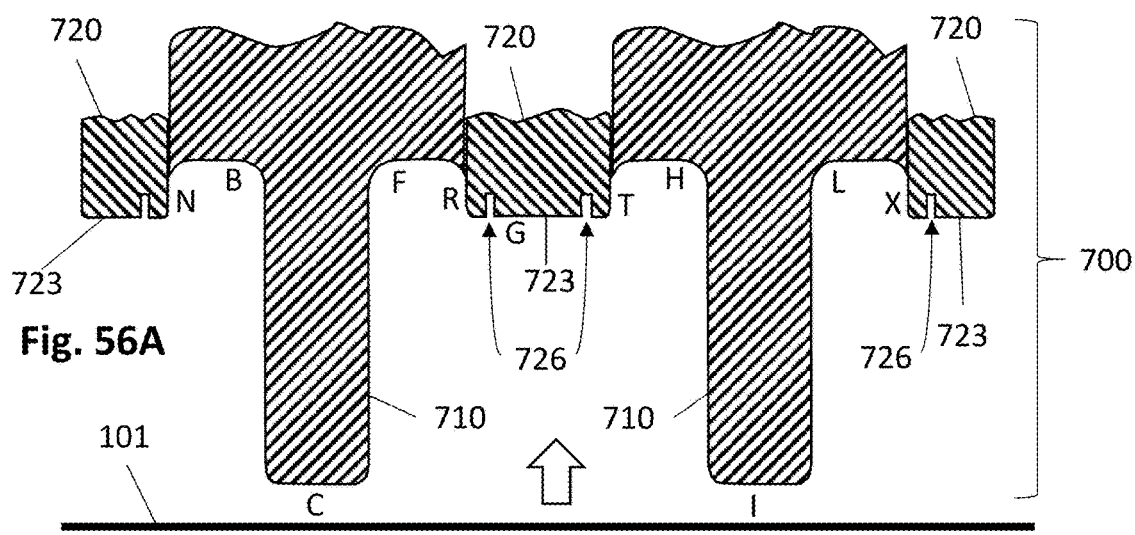
FIG. 56F is a sectional view of the article taken along line 56-56 in FIGS. 57A and 57C.
FIG. 56 consists of FIGS. 56A-56F, each of which is a sectional view of the article taken along line 56-56, and the processing steps illustrated in FIGS. 56A to 56F roughly correspond to those illustrated in FIGS. 46A, 46B, 46C, 46D, 46F, and 48, respectively.
Figure 57C:
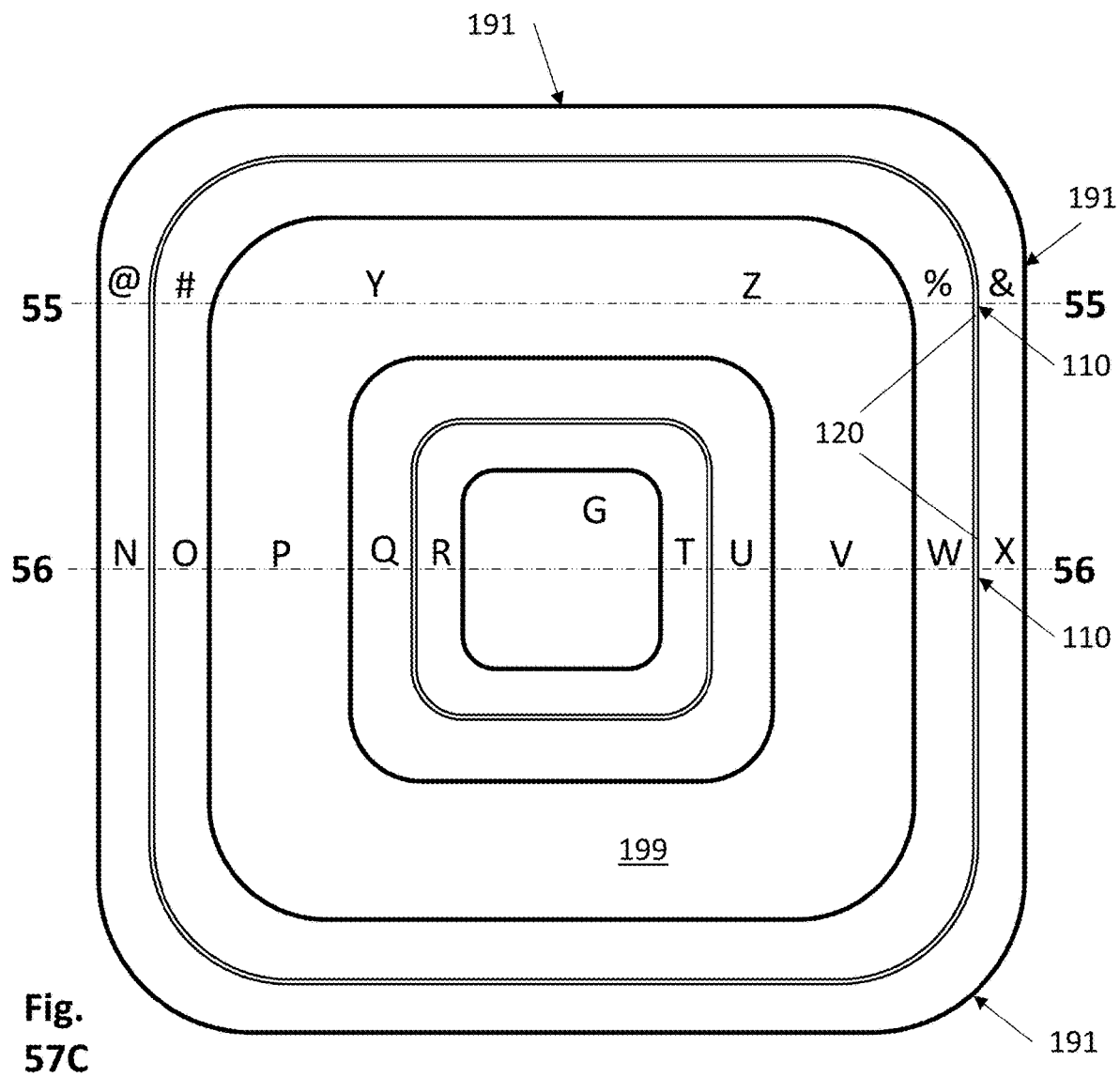

FIGS. 55A and 56A illustrate conditions prior to thermoforming. In those figures, the substrate sheet 101 is not in contact with elements of the thermoforming mold 700. In this position, the substrate sheet 101 can be heated above its glass transition temperature before being moved in the direction (open arrow) toward and, ultimately, against the surfaces of the core mold element(s) 710 and the peripheral mold elements 720. The core mold element(s) 710 and peripheral mold elements 720 abut one another at slip joints 175 at which adjacent mold elements are able to move, slip, or slide past each other. In FIGS. 55A and 56A, the body-shaping surfaces 711 of the core mold element(s) 710 (no surface of the peripheral mold element 720 serves to shape a body surface in this embodiment) responsible for forming the upper surfaces of the body of the article visible in FIG. 54A are identified with the same landmark letters (D, E, and J in FIG. 55A; C and I in FIG. 56A) as in FIGS. 54A and 57A. Similarly, flange-shaping surfaces 712 and 722, respectively, of the core and peripheral mold elements 710 and 720 responsible for forming the upper surfaces of the deflectable flange of the article visible in FIG. 54A are identified with the same landmark letters and symbols (@, A, K, and & in FIG. 55A; N, B, F, R, T, H, L, and X in FIG. 56A) as in FIGS. 54A, 54B, and 57A. The letter G indicates the position at which the orifice 106 will be formed. It can be seen by comparing FIGS. 54A, 54B, 55A, and 56A that the shape/conformation of all surfaces visible in FIG. 54A are defined by the shape/conformation of the combined elements of the thermoforming mold 700.

Figure 56B:
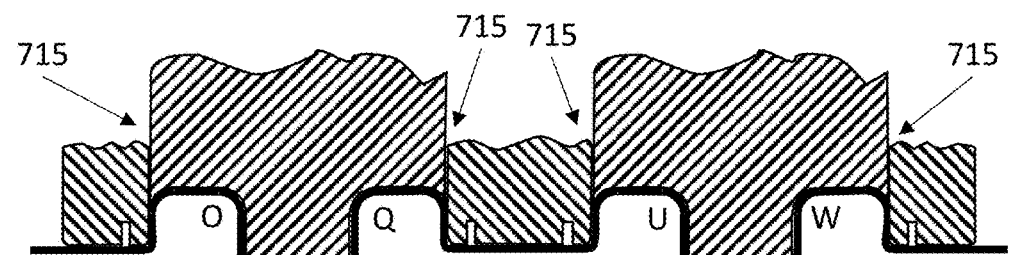

In FIGS. 55B and 56B, the softened substrate sheet 101 has been applied against the surfaces of the elements of the thermoforming mold 700. Symbols and letters (#, Y, Z, and % in FIG. 55B; O, P, Q, U, V, and W in FIG. 56B) indicate the positions of the underside of the article 100 visible in FIG. 54C. The substrate sheet 101 thus attains the shape of the article 100 shown in FIGS. 54A-54C, except that excess material has not yet been trimmed from the edge of the article at which the inner and outer peripheral edges 810 and 110, respectively will be formed. Also in FIGS. 55B and 56B, one more ram 300 portions (i.e., multiple rams or multiple portions of a single ram) are visible at positions from which they will be moved to impinge against the substrate sheet 101 and or elements of the mold 700. In these positions, the ram 300 portions do not yet contact the mold 700, although they may (but need not) contact the substrate sheet 101 to urge it against one or more surfaces of the mold 700.

Figure 55E:
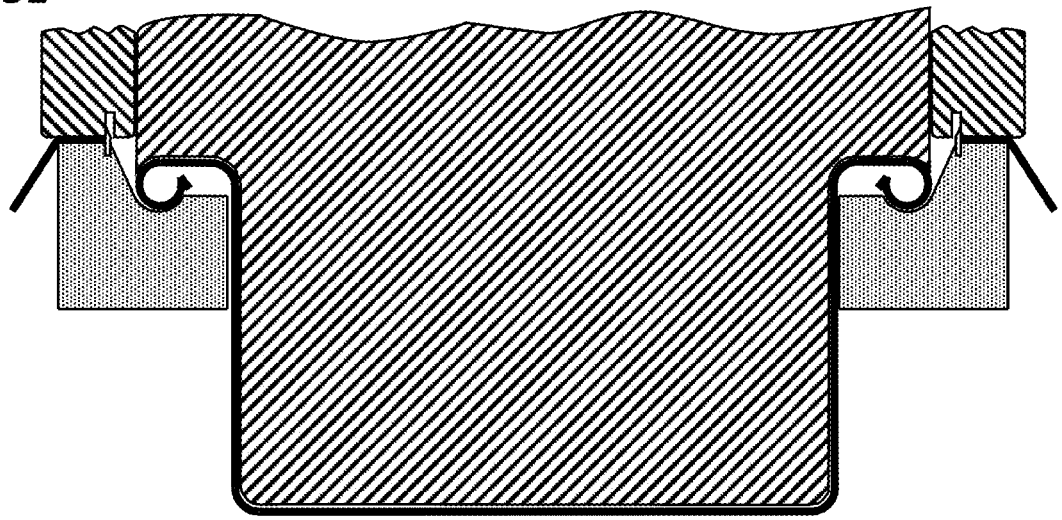
Figure 55F:
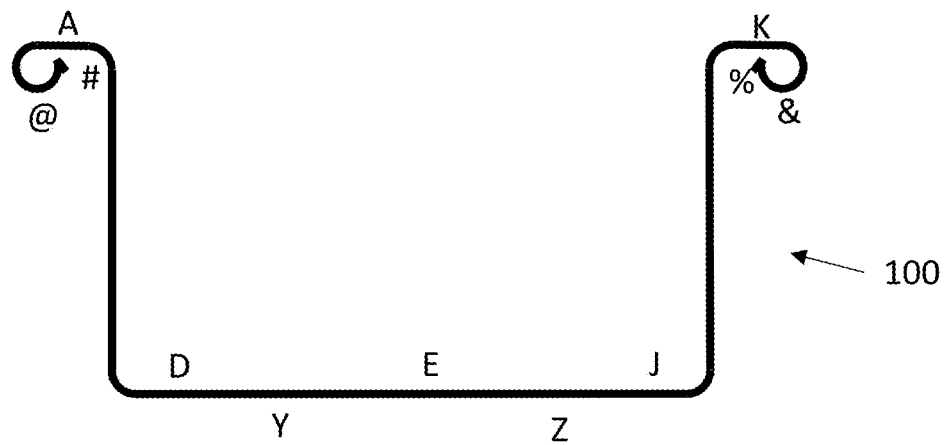
Figure 56C:
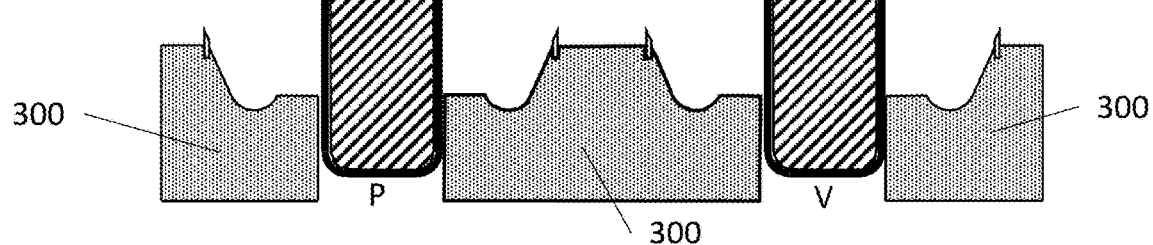

In FIGS. 55C and 56C, the ram 300 portions have been moved in the direction (open arrow) toward the mold 700 elements, such that the knife 310 of each ram 300 portion cuts through the substrate sheet 101 where it overlies a slot 726 in the peripheral mold element 720. Thus severed from the remainder of the substrate sheet 101, the portions of the substrate sheet 101 molded against the body-shaping surfaces 711 (and 721, when present) and the flange-shaping surfaces 722 (and 712, when present) of the mold 700 form the article shown in FIGS. 54A-54C. The article 100 can be cooled in this conformation (e.g., for later edge-smoothing) or, preferably, the operations can continue while the substrate sheet 101 remains in a softened state. This latter option is illustrated in FIGS. 55D to 55F and 56D to 56F.

Figure 56D:
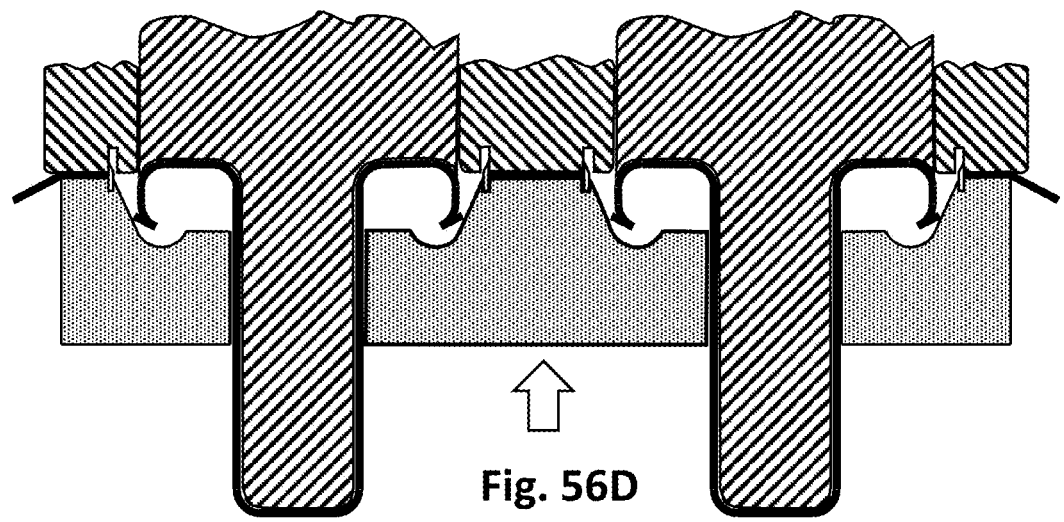

In FIGS. 55D and 56D, the substrate sheet 101 has already been cut at outer and inner peripheral edges 110 and 810, respectively, and the ram 300 portions have continued moving in the direction shown by the open arrow. The mold-impact surfaces 304 of the ram 300 portions impinge upon the ram-impact surfaces 723 of the peripheral mold elements 720, with the result that the peripheral mold elements 720 are displaced (vertically in the figures) relative to the core mold element(s) 710. In these figures, portions of the substrate sheet 101 that do not form the article body are shown sandwiched between the ram 300 portions and mold 700 elements. This need not be so; the shape, contour, and surface roughness of the portions of the ram 300 and the mold 700 that contact the substrate sheet 101 and impinge against each other can be designed or selected so that the substrate sheet slips from between the ram 300 and mold 700 as they are impinged against one another. The knife 310 of each ram 300 portion has passed into and been received by a corresponding slot 726 in the peripheral mold element 720 against which the ram 300 portion impinges. As each peripheral mold element 720 is displaced, the portion of the substrate sheet 100 that was formed along its flange-shaping surface 722 remains in the position (relative to the rest of the formed sheet) it had before the peripheral mold element 720 was displaced. As the nearby ram 300 portion advances and displaces the peripheral mold element 720, it eventually advances sufficiently far (in the direction indicated by the upper arrow) that the peripheral edge 110 or 810 of the deflectable flange 160 or 860 impacts upon the sloped upper surface 302 of the ram 300 portion. As the ram continues to advance, the peripheral edge 110 or 810 and/or peripheral flange 120 or 820 slides, skips, scrapes, or otherwise moves against the upper surface 302 and is displaced toward the sidewall 19 or 18 to which the deflectable flange 160 or 860 is connected. At first, as illustrated in FIGS. 55D and 56D, the peripheral edge, peripheral flange, elbow, and the portion of the spacer most distant from the bend region are deflected. A skilled artisan could, alternatively, select geometric configurations (of the ram 300 upper surface 302, the bend region 150/850, the spacer 140/840, or other portions) to induce initial bending elsewhere. The edge-deflection illustrated in FIGS. 55D and 56D is analogous to that illustrated in FIG. 46D, while the deflection and smoothing illustrated in FIGS. 55E and 56E is analogous to that illustrated in FIG. 46F (no figure analogous to FIG. 46E is depicted in FIGS. 55 and 56, although the same deflection and smoothing illustrated in FIG. 46E occurs).

Figure 56E:
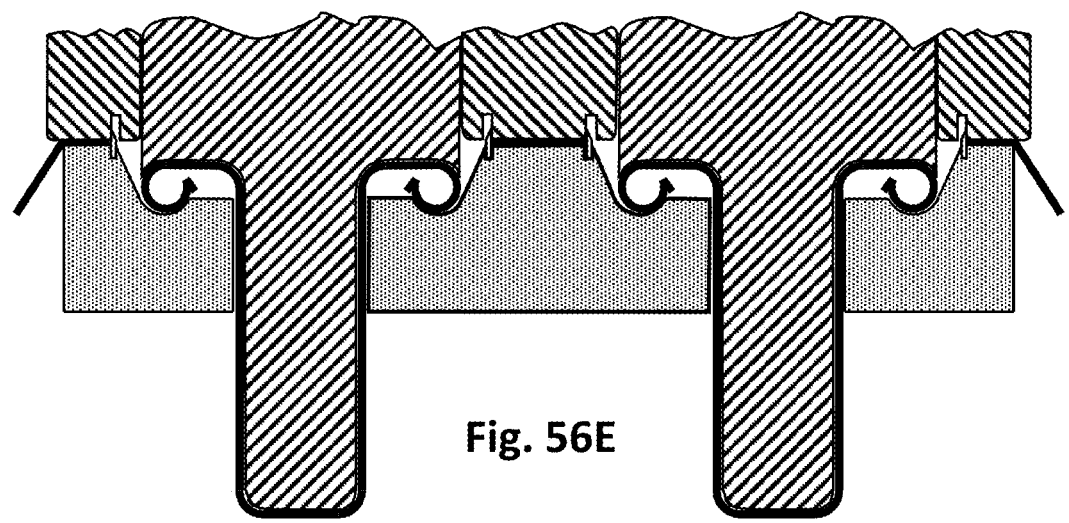

In FIGS. 55E and 56E, the ram 300 portions are illustrated at the position at which they maximally deflect the peripheral mold elements 720 and induce the greatest curling of peripheral flanges 160 and 860. The article thus formed can be cooled and ejected from the mold 700 after removing the ram 300 portions from their positions 'clamping' the curled edges against the core mold element(s) 710. Note that the piece of substrate sheet 101 lodged between the knives 310 of the ram 300 portion in the central portion of FIG. 56E will typically need to be removed or displaced prior to repeating the steps shown in FIGS. 55 and 56.

Figure 56F:
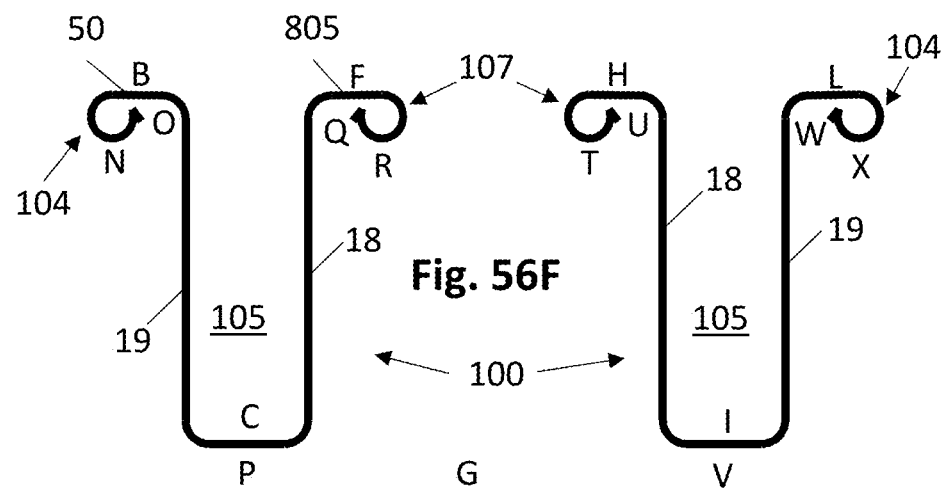

FIGS. 55F and 56F depict the shape of sections of the article formed. The same symbols and letters used as landmarks in FIGS. 54A, 54B, 54C, 57A, and 57C are shown in these figures to assist in understanding of the pre- and post-edge-smoothing positions of the various portions of the substrate sheet 101 in the finished article 100. In FIG. 56F, the curvatures of the inner rim 107 and outer rim 104 are shown as being substantially identical (the curved upper surface 302 portions of all ram 300 portions being identical in the operations shown in FIGS. 55 and 56); this is somewhat unrealistic. Comparing the various parts of FIGS. 54-57, it can be seen that the inner rim 107 is formed by turning the inner peripheral edge 810 'under and outward,' which would result in creation of tension in the material forming the inner rim 107 as it is 'stretched' during the edge-rolling process; this would likely result in the curvature of the inner rim 107 being less than that shown in FIG. 56F. Similarly, comparing the various parts of FIG. 54-57, it can be seen that the outer rim 104 is formed by turning the outer peripheral edge 110 'under and inward,' which would result in creation of compression of the material forming the outer rim 104 as it is 'squashed upon itself' during the edge-rolling process; this would likely result in the curvature of the outer rim 104 being greater than that shown in FIG. 56F (i.e., greater than the curvature of the inner rim 107 made using a similarly-shaped ram 300 portion). The 'stretching' and 'compression' effects can be expected to be greatest at the four rounded corners of the orifice 106 and the outer peripheral edge 191, respectively, of the article 100.

PARTS LIST

The following list is provided as an aid to describing the indicia intended to be used to refer to the various elements of the subject matter described herein, unless the context of a particular disclosure of an indicium indicates otherwise. In the list, the indicium is followed by its intended meaning.
- 10 shaped body of article
- 15 nesting face of body 10
- 16 support surface of nesting face 15
- 17 insertable portion of nesting face 15
- 18 sidewall(s) of body 10 surrounding intracompartment orifice 106
- 19 sidewall(s) of body 10 surrounding compartment 105
- 50 extension
- 100 article (formed from a thermoplastic material)
- 101 substrate sheet of article 100
- 104 outer rim (surrounds compartment 105)
- 105 compartment
- 106 intra-compartment orifice (extends through substrate sheet 101)
- 107 inner rim (surrounds intracompartment orifice 106)
- 110 peripheral edge of substrate sheet 101
- 120 peripheral flange (part of deflectable flange 160)
- 130 elbow (between peripheral flange 120 and spacer 140)
- 140 spacer of deflectable flange 160
- 145 rounded underside of the spacer 140
- 150 bend region of deflectable flange 160 (between extension 50 and spacer 140)
- 160 deflectable flange
- 161 underside of the deflectable flange 160
- 162 junction (between body 10 and deflectable flange 160)
- 170 bent portion of deflectable flange 160 (i.e., bent after being deflected)
- 175 fused portion (of substrate sheet 101)
- 180 stacking extension
- 181 stacking lug
- 190 periphery of article
- 191 peripheral edge of outer rim 104
- 192 trans face of outer rim 104
- 193 cis face of outer rim 104
- 194 inner (within compartment 105) surface of sidewall(s) 19
- 195 floor of compartment 105
- 196 exterior surface of sidewall(s) 19
- 197 interior wall within compartment 105
- 199 exterior surface of floor 195
- 200 upper body
- 202 inner surface of upper body 200
- 300 ram
- 302 upper surface of ram 300
- 304 mold-impact surface
- 310 knife
- 401 plug (object)
- 402 object (connects plug 401 and object 403)
- 403 object
- 500 liner sheet
- 510 peripheral edge of the liner sheet 500
- 600 lidding
- 610 peripheral edge of the lidding 600
- 700 thermoforming mold
- 710 core mold element
- 711 body-shaping surface
- 712 flange-shaping surface
- 715 slip joint
- 720 peripheral mold element
- 721 body-shaping surface
- 722 flange-shaping surface
- 723 ram-impact surface
- 726 slot
- 805 extension of deflectable flange surrounding intra-compartment orifice 106
- 810 peripheral edge of deflectable flange surrounding intra-compartment orifice 106
- 820 peripheral flange of deflectable flange surrounding intra-compartment orifice 106
- 850 bend region of deflectable flange surrounding intra-compartment orifice 106
- 861 underside of deflectable flange surrounding intra-compartment orifice 106
- A angle between extension 50 and spacer 140
- B point(s) at which bending is induced
- D distance (in the peripheral direction) of the peripheral edge 110 from the nearest sidewall 19 prior to deflecting the deflectable flange 160
- d distance (in the peripheral direction) of the peripheral edge 110 from the nearest sidewall 19 after deflecting the deflectable flange 160
- F angle between spacer 140 and peripheral flange 120
- OA offset angle between plane of extension 50 and plane extending from peripheral edge 110 or from spacer at elbow
- P plug
- T tray The disclosure of every patent, patent application, and publication cited herein is hereby incorporated herein by reference in its entirety.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. An article having a smooth, non-circular periphery, the article comprising a shaped thermoplastic substrate sheet, the shape of the substrate sheet including
   a body including a bottom surrounded by sidewalls and
   a deflectable flange joined at a junction to the sidewalls at at least a portion of the periphery, the deflectable flange including
      a peripheral edge of the substrate sheet at a position distal from the junction;
      a smoothly-curved bend region interposed between the junction and the peripheral edge wherein a proximal portion of the bend region is offset from a distal portion thereof by an angle A of from 85 to 135 degrees;

a substantially planar extension interposed between the junction and the proximal portion of the bend region, the plane of the extension being substantially parallel to the bottom, and the distal portion of the bend region and the body extending away from the same face of the extension;

a peripheral flange bearing the peripheral edge and being connected to the rest of the deflectable flange by way of an elbow; and a curved bent portion interposed between the elbow and the bend region, wherein the curvatures of the bend region and the bent portion position the peripheral edge away from the periphery.

2. The article of claim 1, wherein angle A is from 90 to 105 degrees.

3. The article of claim 1, wherein angle A is from 90 to 95 degrees.

4. The article of claim 1, wherein the deflectable flange includes a substantially flat spacer interposed between the elbow and the bend region.

5. The article of claim 1, wherein the deflectable flange is positioned at an outer periphery of the article.

6. The article of claim 1, wherein the deflectable flange is positioned at an inner periphery of an orifice that extends through the article.

7. The article of claim 1, wherein the bottom is substantially flat and the sidewalls are substantially vertical.

8. The article of claim 7, wherein
the offset angle OA between the plane of the extension and a plane that extends through the elbow and the portion of the deflectable flange immediately proximal to it, relative to the body, is at least 105 degrees.

9. The article of claim 8, wherein the offset angle OA is at least 230 degrees.

10. The article of claim 7, wherein the body has the shape of a rectangular tray having rounded corners and edges.

11. The article of claim 7, wherein the bent portion of the deflectable flange is bent anti-peripherally.

12. The article of claim 1, wherein substantially every part of the article is substantially optically clear.

13. The article of claim 1, comprising a pliable liner sheet conforming to and being peelably attached to the substrate sheet.

14. The article of claim 13, wherein the liner sheet is detached from the substrate sheet at at least a portion of the peripheral edge.

15. The article of claim 1, further comprising a lidding sheet which contacts the article about its entire periphery.

16. The article of claim 15, wherein the lidding sheet is sealed to the article about its entire periphery.

17. The article of claim 16, wherein the body has the shape of a container defining a concavity within the periphery, whereby the lidding sheet and the container define a closed compartment.

18. The article of claim 17, wherein each of the substrate sheet and the lidding sheet inhibits passage of oxygen.

19. The article of claim 17, wherein each of the substrate sheet and the lidding sheet inhibits passage of water vapor.

20. The article of claim 1, wherein the deflectable flange extends completely around the body at the periphery.

21. The article of claim 20, wherein the body has the shape of a rectangular tray having rounded corners and edges.

22. The article of claim 21, wherein the bottom is substantially flat.

23. The article of claim 20, wherein the body has the shape of a container defining a concavity, the body having a nesting face with a shape adapted to nest at least partially within the concavity of an identical article when the nesting face is inserted within the concavity of the identical article.

24. The article of claim 23, wherein the nesting face includes an insertable portion and a support surface, the insertable portion having a shape adapted to pass into the concavity of the identical article and the support surface having a shape adapted to impinge against at least a portion of the deflectable flange of the identical article, whereby impingement of the support surface of the article against the deflectable flange of the identical article limits the extent to which the nesting face can be inserted into the concavity of the identical article.

25. The article of claim 1, wherein the angle F between the plane of the peripheral flange and the plane of the portion of the deflectable flange immediately proximal to the elbow is less than 90 degrees.

* * * * *

(12) INTER PARTES REVIEW CERTIFICATE (3993rd)

United States Patent
Wallace

(10) Number: US 10,562,680 K1
(45) Certificate Issued: Jun. 26, 2025

(54) FORMED THERMOPLASTIC ARTICLE HAVING A SMOOTHLY-CURVED DISTAL PERIPHERY

(71) Applicant: Millard F. Wallace

(72) Inventor: Millard F. Wallace

(73) Assignee: CONVERTER MANUFACTURING, LLC

Trial Number:

IPR2021-00919 filed May 10, 2021

Inter Partes Review Certificate for:

Patent No.: 10,562,680
Issued: Feb. 18, 2020
Appl. No.: 16/212,846
Filed: Dec. 7, 2018

The results of IPR2021-00919 are reflected in this inter partes review certificate under 35 U.S.C. 318(b).

INTER PARTES REVIEW CERTIFICATE
U.S. Patent 10,562,680 K1
Trial No. IPR2021-00919
Certificate Issued Jun. 26, 2025

AS A RESULT OF THE INTER PARTES REVIEW PROCEEDING, IT HAS BEEN DETERMINED THAT:

Claims 1-5, 7-12 and 15-24 are cancelled.

\* \* \* \* \*